(12) United States Patent
Kim et al.

(10) Patent No.: US 10,555,201 B2
(45) Date of Patent: Feb. 4, 2020

(54) METHOD AND APPARATUS OF TRANSMITTING RLC STATUS REPORT IN NEXT GENERATION MOBILE COMMUNICATION SYSTEM

(71) Applicant: Samsung Electronics Co., Ltd, Suwon-si (KR)

(72) Inventors: Donggun Kim, Seoul (KR); Sangbum Kim, Suwon-si (KR); Soenghun Kim, Suwon-si (KR); Seungri Jin, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/963,820

(22) Filed: Apr. 26, 2018

(65) Prior Publication Data

US 2018/0317114 A1    Nov. 1, 2018

(30) Foreign Application Priority Data

Apr. 26, 2017  (KR) ................. 10-2017-0053568

(51) Int. Cl.
*H04J 3/24* (2006.01)
*H04W 24/10* (2009.01)
*H04L 1/16* (2006.01)

(52) U.S. Cl.
CPC .......... *H04W 24/10* (2013.01); *H04L 1/1628* (2013.01); *H04L 1/1635* (2013.01); *H04L 1/1642* (2013.01); *H04L 1/1685* (2013.01)

(58) Field of Classification Search
CPC ....... H04L 1/16; H04L 1/1614; H04L 1/1635; H04L 1/165; H04L 1/1685; H04L 5/0023;
(Continued)

(56) References Cited

U.S. PATENT DOCUMENTS 7,936,723 B2*  5/2011  Yi .................... H04L 1/1614
                                              370/331
7,978,616 B2*  7/2011  Chun ................... H04W 28/06
                                              370/242
(Continued)

FOREIGN PATENT DOCUMENTS

EP        2315383 B1    10/2016
WO    2013048049 A1     4/2013

OTHER PUBLICATIONS

Technical Specification, 3GPP TS 36.523-3, 3rd Generation Partnership Project; Technical Specification Group Radio Access Network; Evolved Universal Terrestrial Radio Access (E-UTRA) and Evolved Packet Core (EPC); User Equipment (UE) conformance specification Part 3, V11.2.0, 374 pages, 2013.*
(Continued)

*Primary Examiner* — Frank Duong

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

20 Claims, 69 Drawing Sheets

(58) Field of Classification Search
CPC .... H04L 5/003; H04L 27/2601; H04W 24/10; H04W 36/0016; H04W 36/0027; H04W 36/023; H04W 36/32
See application file for complete search history.

(56) References Cited

U.S. PATENT DOCUMENTS

| | | | | |
|---|---|---|---|---|
| 8,098,620 | B2* | 1/2012 | Sun | H04L 1/1628 370/328 |
| 8,401,017 | B2* | 3/2013 | Wang | H04L 1/1621 370/310 |
| 9,014,010 | B2* | 4/2015 | Yi | H04W 24/10 370/242 |
| 2008/0298322 | A1 | 12/2008 | Chun et al. | |
| 2009/0061878 | A1 | 3/2009 | Fischer | |
| 2011/0041024 | A1* | 2/2011 | Burbidge | H04L 1/1621 714/749 |
| 2014/0169320 | A1 | 6/2014 | Yi et al. | |
| 2015/0139064 | A1 | 5/2015 | Kim et al. | |
| 2015/0237621 | A1 | 8/2015 | Zhu | |
| 2015/0289171 | A1* | 10/2015 | Jung | H04L 1/0001 370/331 |
| 2016/0212661 | A1* | 7/2016 | Basu Mallick | H04L 1/1614 |
| 2017/0288821 | A1* | 10/2017 | Baek | H04L 1/1864 |
| 2018/0199251 | A1* | 7/2018 | Kim | H04W 36/08 |
| 2018/0316619 | A1* | 11/2018 | Hong | H04L 47/34 |
| 2019/0052409 | A1* | 2/2019 | Kainulainen | H04L 1/1642 |

OTHER PUBLICATIONS

Ericsson, Intel Corp., Nokia, Qualcomm Technologies Inc., Samsung Electronics & KT, KT PyeongChang 5G Special Interest Group (KT 5G-SIG); KT 5th Generation Radio Access; Radio Link Control (RLC); Protocol specification (Release 1), TS 5G.322 V1.1, 32 pages, Aug. 2016.*
ISA/KR, International Search Report for International Application No. PCT/KR2018/004865, dated Aug. 10, 2018, 9 pages.

* cited by examiner

FIG. 1EE

| LCG ID #0 | LCG ID #1 | LCG ID #2 | LCG ID #3 | LCG ID #4 | LCG ID #5 | LCG ID #6 | LCG ID #7 |
|---|---|---|---|---|---|---|---|
| discard Indi | Buffer Size #X | | | | | | |
| discard Indi | Buffer Size #Y | | | | | | |

...

| discard Indi | Buffer Size #Z |
|---|---|

FIG. 1EF

| LCG ID #0 | LCG ID #1 | LCG ID #2 | LCG ID #3 | LCG ID #4 | LCG ID #5 | LCG ID #6 | LCG ID #7 |
|---|---|---|---|---|---|---|---|
| LCG ID #8 | LCG ID #9 | LCG ID #10 | LCG ID #11 | LCG ID #12 | LCG ID #13 | LCG ID #14 | LCG ID #15 |
| discard Indi | Buffer Size #X ||||||||
| discard Indi | Buffer Size #Y ||||||||

...

| discard Indi | Buffer Size #Z |
|---|---|

FIG. 1EG

| LCG ID #0 | LCG ID #1 | LCG ID #2 | LCG ID #3 | LCG ID #4 | LCG ID #5 | LCG ID #6 | LCG ID #7 |
|---|---|---|---|---|---|---|---|
| discard Indi = 0 | Buffer Size #X ||||||||
| discard Indi = 1 | Buffer Size #Y ||||||||
| reserved | Buffer Size #Y (to be discarded) ||||||||

...

| discard Indi = 0 | Buffer Size #Z |
|---|---|

FIG. 1EH

| LCG ID #0 | LCG ID #1 | LCG ID #2 | LCG ID #3 | LCG ID #4 | LCG ID #5 | LCG ID #6 | LCG ID #7 |
|---|---|---|---|---|---|---|---|
| LCG ID #8 | LCG ID #9 | LCG ID #10 | LCG ID #11 | LCG ID #12 | LCG ID #13 | LCG ID #14 | LCG ID #15 |
| discard Indi = 0 | Buffer Size #X ||||||||
| discard Indi = 1 | Buffer Size #Y ||||||||
| reserved | Buffer Size #Y (to be discarded) ||||||||

...

| discard Indi = 0 | Buffer Size #Z |
|---|---|

FIG. 2G 2g-05

| D/C | CPT | ACK_SN | | | | | Oct 1 |
|---|---|---|---|---|---|---|---|
| ACK_SN | | | | | | | Oct 2 |
| E1 | NACK_SN | | | | | | Oct 3 |
| NACK_SN | | | | E1 | E2 | | Oct 4 |
| NACK_SN | | | | | | | Oct 5 |
| | | E1 | E2 | | | | Oct 6 |
| SOstart | | | | | | | Oct 7 |
| SOstart | | | | SOend | | | Oct 8 |
| SOend | | | | | | | Oct 9 |
| SOend | | | | NACK_SN | | | |

...

2g-10

| D/C | CPT | E1 | R | R | R | Oct 1 |
|---|---|---|---|---|---|---|
| R | R | R | R | ACK_SN | | Oct 2 |
| ACK_SN | | | | | | Oct 3 |
| E1 | E2 | R | R | NACK_SN | | Oct 4 |
| NACK_SN | | | | | | Oct 5 |
| E1 | E2 | R | R | NACK_SN | | Oct 6 |
| NACK_SN | | | | | | Oct 7 |
| SOstart | | | | | | Oct 8 |
| SOstart | | | | | | Oct 9 |
| SOend | | | | | | |
| SOend | | | | | | |
| E1 | E2 | R | R | NACK_SN | | |
| NACK_SN | | | | | | |

...

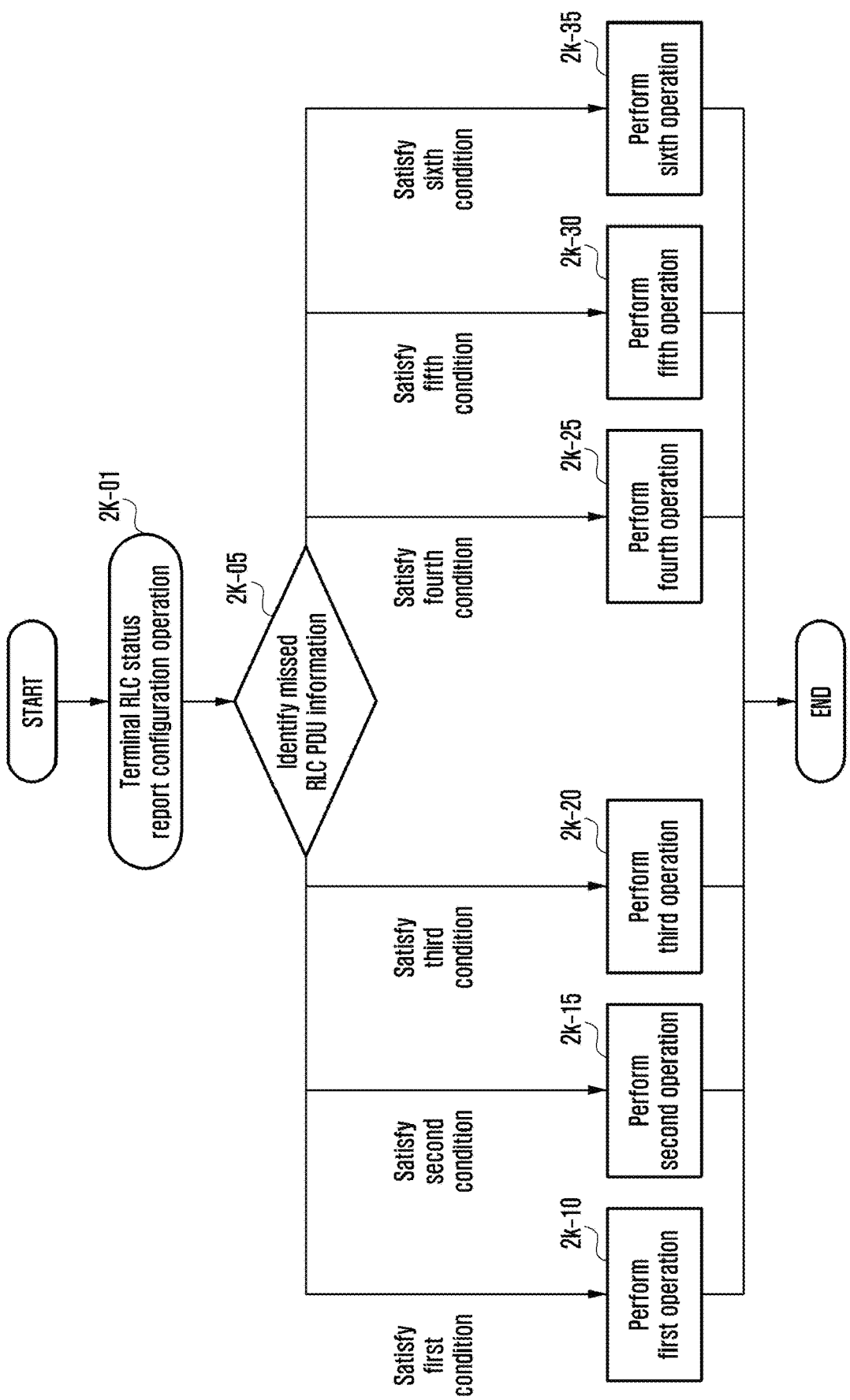

- Upon receiving an indication for immediate SI update, UE starts to acquire the corresponding SIB (a) ETWS/CMAS update (b) EAB update A bit corresponding to public warning, e.g. ETWS, CMAS (5f-05)

(a) indication for immediate SI update of public warning

A bit corresponding to a SIB (5f-10)

(b) SIB-based indication for immediate SI update if c is set to `1', e.g. all categories have to be
updated immediately, then the bitmap is ignored if configured

FIG. 5H

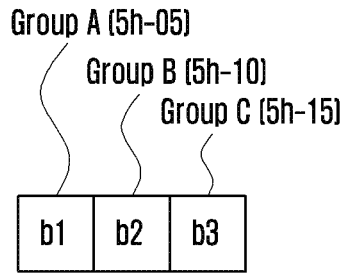

Group A
- corresponds to all UEs
Group B
- corresponds to the UEs that are neither in their HPLMN nor in a PLMN that is equivalent to it
Group C
- corresponds to the UEs that are neither in the PLMN listed as most preferred PLMN of the country where the UEs are roaming in the operator-defined PLMN selector list on the USIM, nor in their HPLMN nor in a PLMN that is equivalent to their HPLMN

METHOD AND APPARATUS OF TRANSMITTING RLC STATUS REPORT IN NEXT GENERATION MOBILE COMMUNICATION SYSTEM

CROSS-REFERENCE TO RELATED APPLICATION(S) AND CLAIM OF PRIORITY

This application is based on and claims priority under 35 U.S.C. § 119 to Korean Patent Application No. 10-2017-0053568 filed on Apr. 26, 2017, in the Korean Intellectual Property Office, the disclosure of which is incorporated herein by reference in its entirety.

BACKGROUND

1. Field

Various embodiments of the present disclosure relate to a method of reporting an uplink data buffer status to allow a terminal which transmits/receives data simultaneously using a plurality of radio access technology (RAT) to transmit the data to a base station in a radio communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

Accordingly, embodiments of the present disclosure are directed to the provision of a method of efficiently reporting an uplink data buffer status to allow a terminal which transmits/receives data simultaneously using a plurality of radio access technology (RAT) to transmit the data to a base station in a radio communication system.

In addition, in the next generation mobile communication system, when PDCP layers for each logical channel receive data, data pre-processing can be performed on the data before receiving an uplink transmission. That is, data processing of the RLC layer and data processing of the MAC layer can also be performed in advance. The reason why the data pre-processing described above can be performed is that there is no data concatenation function in the RLC layer. That is, the RLC layer processes the data in units of a receiving PDCP PDU (RLC SDU) and transmits the processed data to the MAC layer. Therefore, in the next generation mobile communication system, the data pre-processing can be performed for each logical channel, and a plurality of RLC PDUs can be generated for each logical channel. In the MAC layer, upon receiving uplink transmission resources from the base station, a procedure for dividing the transmission resources for each logical channel is performed, and the RLC PDUs generated for each logical channel are configured as one MAC PDU to perform the transmission.

That is, if one MAC PDU is missed, several RLC PDUs may be missed for each logical channel. Therefore, there is a need of a method of efficiently reporting several RLC PDUs missed for each logical channel from a receiving end. Accordingly, the present disclosure proposes a method and apparatus for efficiently reporting an RLC status in a next generation mobile communication system.

Also, since the RLC layer triggers polling according to various conditions, if data are processed in units of PDCP PDUs, a plurality of pollings can be transmitted to the receiving end, which may cause a problem. In addition, there is a need to drive a polling retransmission timer (t-pollRetransmit) to prepare the case where the polling is not normally transmitted to the receiving end. Here, the time to drive the polling retransmission timer also needs to consider the data pre-processing. In particular, in a multiple access environment to an LTE system and a next generation mobile communication system, the terminal needs to operate the polling retransmission timer differently.

In addition, in order to realize a method of performing channel measurement using a synchronization signal newly introduced in the next generation mobile communication system, a method of reporting signaling for measuring neighboring cells and synchronization signal information on neighboring cells measured by a terminal to a base station is proposed.

Objects of the present disclosure are not limited to the above-mentioned objects. That is, other objects that are not mentioned may be obviously understood by those skilled in the art to which the present disclosure pertains from the following description.

In accordance with an aspect of the present disclosure, a method of transmitting a radio link control (RLC) status report by a terminal in a wireless communication system is provided. The method includes receiving, from a base station, at least one RLC protocol data unit (PDU), identifying, a missed RLC service data unit (SDU) based on a sequence number of the at least one RLC PDU and transmitting, to the base station, the RLC status report for reporting the missed RLC SDU, and wherein the RLC status report includes a first field for indicating whether the RLC SDU is missed.

The RLC status report includes a second field to indicate the sequence number of the missed RLC SDU.

A RLC SDU includes a plurality of segments, and the RLC status report includes a fifth field to configure a third field and fourth field which are used to indicate a missed segments.

The third field indicates a start position of the missed segments, and the fourth field indicates an end position of the missed segments.

The third field is configured to 0, when the start position of the missed segments is equal to a start position of the missed RLC SDU including the missed segments.

The fourth field is configured to 0 or 1, when the end position of the missed segments is equal to an end position of the missed RLC SDU including the missed segments.

The RLC status report includes a seventh field to configure a sixth field indicating a range of a consecutively missed RLC SDU, and information indicated by the fourth field is varied corresponding to the value of the seventh field.

In accordance with an aspect of the present disclosure, a terminal in a wireless communication system is provided. The terminal includes a transceiver and a controller coupled with the transceiver and configured to control the transceiver to receive, from a base station, at least one RLC protocol data unit (PDU), identify, a missed RLC service data unit (SDU) based on a sequence number of the at least one RLC PDU, and control the transceiver to transmit, to the base station, the RLC status report for reporting the missed RLC SDU, and wherein the RLC status report includes a first field for indicating whether the RLC SDU is missed.

The RLC status report includes a second field to indicate the sequence number of the missed RLC SDU.

A RLC SDU includes a plurality of segments, and the RLC status report includes a fifth field to configure a third field and fourth field which are used to indicate a missed segments.

The third field indicates a start position of the missed segments, and the fourth field indicates an end position of the missed segments.

The third field is configured to 0, when the start position of the missed segments is equal to a start position of the missed RLC SDU including the missed segments.

The fourth field is configured to 0 or 1, when the end position of the missed segments is equal to an end position of the missed RLC SDU including the missed segments.

The RLC status report includes a seventh field to configure a sixth field indicating a range of a consecutively missed RLC SDU.

According to the embodiment of the present disclosure, even if the plurality of logical channels or the logical channel groups exist, the terminal can elaborately report the buffer status with the small overhead.

In addition, according to the present disclosure, it is possible to smooth the RLC ARQ operation of the RLC layer by proposing the method of efficiently reporting the ACK/NACK information on the plurality of missed RLC PDUs from the receiving end RLC layer to the transmitting end in a RLC layer in the next generation mobile communication system.

In addition, the present disclosure proposes the method of processing, by the receiving end RLC layer, several pollings transmitted by the RLC layer in the next generation mobile communication system, proposes the time to trigger the polling retransmission timer in consideration of the data pre-processing at the transmitting end, and proposes the method for driving, by the terminal, the polling retransmission timer differently in the multiple access environment to the LTE system and the next generation mobile communication system.

In addition, according to the present disclosure, it is possible to use the synchronization signal for the neighboring cell measurement by the detailed embodiment for the method of receiving, by a terminal, the information for measuring synchronization signals of neighboring cells in the next generation mobile communication system and the method of receiving, by a base station, synchronization signal information on neighboring cells when there is no information on neighboring cells.

The effects that may be achieved by the embodiments of the present disclosure are not limited to the above-mentioned objects. That is, other effects that are not mentioned may be obviously understood by those skilled in the art to which the present disclosure pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2G is a diagram illustrating a first method of reporting an RLC status according to the present disclosure;

FIG. 2K is a diagram illustrating an operation of a terminal to which the embodiments of the present disclosure are applied;

FIG. 5H is a diagram for explaining a fourth method for renewing access connection configuration information to be urgently renewed in the present disclosure;

DETAILED DESCRIPTION

FIGS. 1A through 5J, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, an operation principle of the present disclosure will be described in detail with reference to the accompanying drawings. Hereinafter, when it is determined that the detailed description of the known art related to the present disclosure may obscure the gist of the present disclosure, the detailed description thereof will be omitted. Further, the following terminologies are defined in consideration of the functions in the present disclosure and may be construed in different ways by the intention or practice of users and operators. Therefore, the definitions thereof should be construed based on the contents throughout the specification.

Terms identifying an access node, terms indicating network entity, terms indicating messages, terms indicating an interface between network entities, terms indicating various types of identification information, and so on that are used in the following description are exemplified for convenience of explanation. Accordingly, the present disclosure is not limited to terms to be described below and other terms indicating objects having the equivalent technical meaning may be used.

Hereafter, for convenience of explanation, the present disclosure uses terms and names defined in the 3rd generation partnership project long term evolution (3GPP LTE) that is the latest standard among the currently communication standards. However, the present disclosure is not limited to the terms and names but may also be identically applied even to the system according to other standards. In particular, the present disclosure may be applied to 3GPP new radio (NR: 5G mobile communication standard).

Figure 1A:
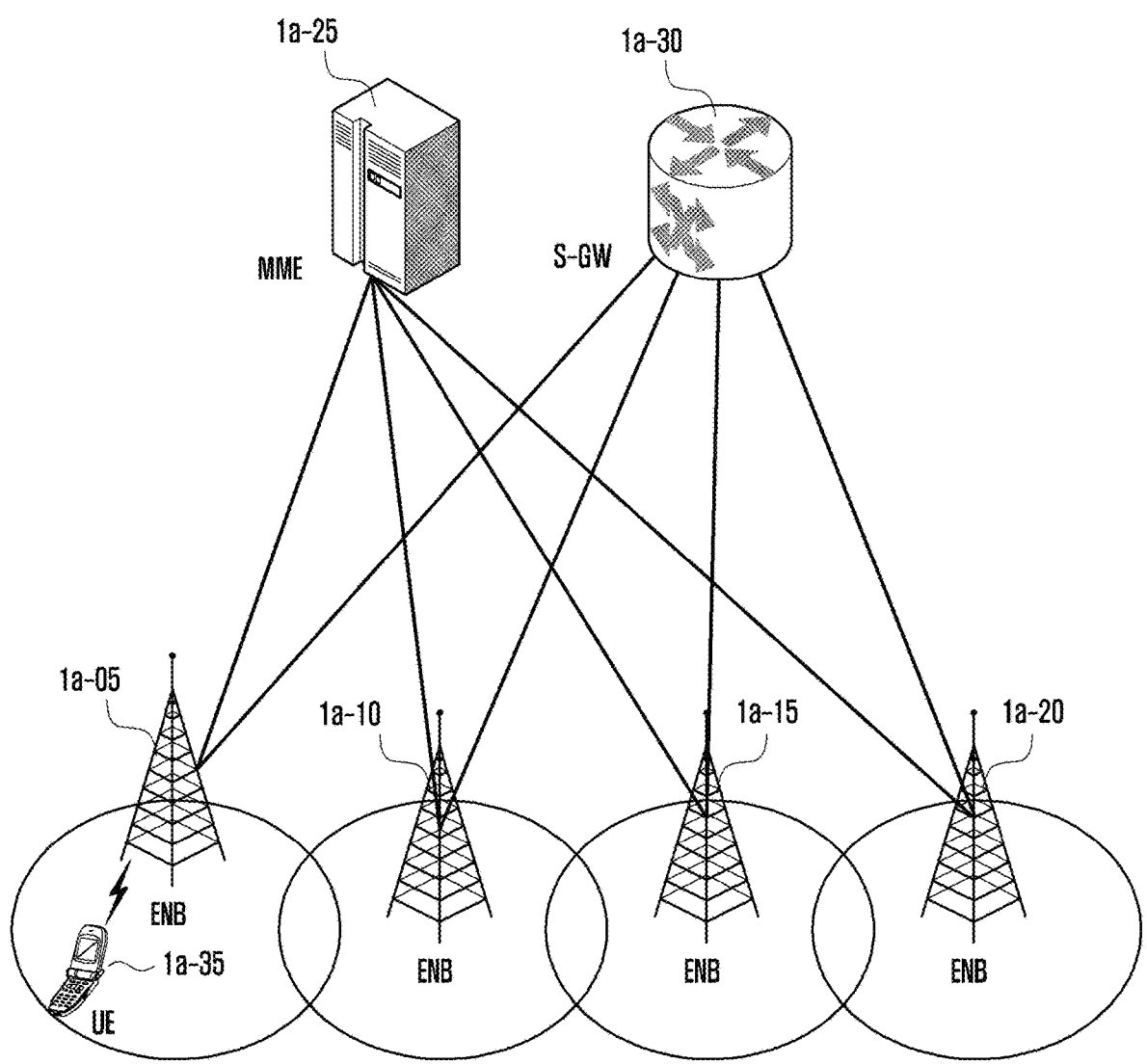
FIG. 1A is a diagram illustrating a structure of an LTE system referenced for the explanation of the present disclosure.

FIG. 1A is a diagram illustrating a structure of an LTE system referenced for the explanation of the present disclosure.

Referring to FIG. 1A, a wireless communication system is configured to include a plurality of base stations 1a-05, 1a-10, 1a-15, and 1a-20, a mobility management entity (MME) 1a-25, a serving-gateway (S-GW) 1a-30. A user equipment (hereinafter, UE or terminal) 1a-35 accesses an external network through the base stations 1a-05, 1a-10, 1a-15, and 1a-20 and the S-GW 1a-30.

The base stations 1a-05, 1a-10, 1a-15, and 1a-20 are access nodes of a cellular network and provide a radio access to terminals that accesses a network. That is, in order to serve traffic of users, the base stations 1a-05, 1a-10, 1a-15, and 1a-20 collect and schedule status information such as a buffer status, an available transmission power status, a channel status, or the like of the terminals, thereby supporting a connection between the terminals and a core network (CN). The MME 1a-25 is an apparatus for performing various control functions as well as a mobility management function for the terminal and is connected to a plurality of base stations, and the S-GW 1a-30 is an apparatus for providing a data bearer. Further, the MME 1a-25 and the S-GW 1a-30 may further perform authentication, bearer management, and the like on the terminal accessing the network and may process packets that are to be received from the base stations 1a-05, 1a-10, 1a-15, and 1a-20 and packets that are to be transmitted to the base stations 1a-05, 1a-10, 1a-15, and 1a-20.

Figure 1B:
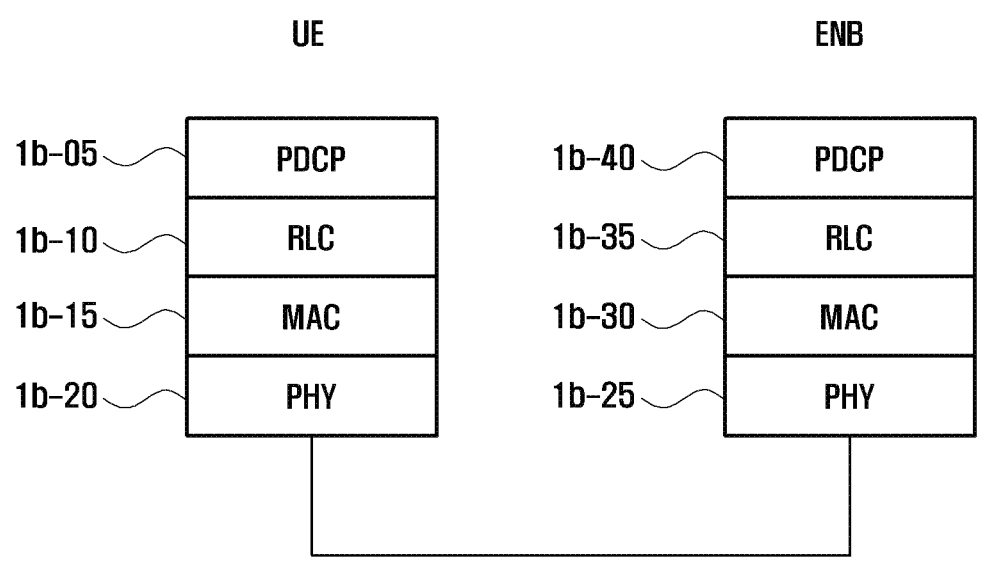
FIG. 1B is a diagram illustrating a radio protocol structure in the LTE system referenced for the explanation of the present disclosure.

FIG. 1B is a diagram illustrating a radio protocol structure in the LTE system referenced for the explanation of the present disclosure. The NR to be defined below may be partially different from the radio protocol structure in the present figure, but will be described for convenience of explanation of the present disclosure.

Referring to FIG. 1B, the radio protocol of the LTE system consists of packet data convergence protocols (PDCPs) 1b-05 and 1b-40, radio link controls (RLCs) 1b-10 and 1b-35, and medium access controls (MACs) 1b-15 and 1b-30 in the terminal and the ENB, respectively. The packet data convergence protocols (PDCPs) 1b-05 and 1b-40 performs operations such as compression/recovery of an IP header, and the radio link controls (hereinafter, referred to as RLC) 1b-10 and 1b-35 reconfigure a PDCP packet data unit (PDU) to be an appropriate size. The MACs 1b-15 and 1b-30 are connected to several RLC layer apparatuses configured in one terminal and perform an operation of multiplexing RLC PDUs into an MAC PDU and demultiplexing the RLC PDUs from the MAC PDU. Physical layers 1b-20 and 1b-25 perform an operation of channel-coding and modulating an upper layer data, making the upper layer data into an OFDM symbol and transmitting them to a radio channel, or demodulating and channel-decoding the OFDM symbol received through the radio channel and transmitting the demodulated and channel-decoded OFDM symbol to the upper layer. Further, the physical layer uses an HARQ (Hybrid ARQ) for additional error correction and a receiving end transmits whether to receive the packet transmitted from a transmitting end in 1 bit. This is called HARQ ACK/NACK information. The downlink HARQ ACK/NACK information on the uplink transmission may be transmitted on a physical hybrid-ARQ indicator channel (PHICH) physical channel, and the uplink HARQ ACK/NACK information on the downlink transmission may be transmitted on a physical uplink control channel (PUCCH) or physical uplink shared channel (PUSCH) physical channel.

Meanwhile, the PHY layer may consist of one or a plurality of frequency/carriers, and a technology of simultaneously setting and using a plurality of frequencies in one base station is called carrier aggregation (hereinafter, referred to as CA). Unlike using only one carrier for communication between the terminal (or user terminal (UE)) and the base station (E-UTRAN NodeB, eNB), the CA technology additionally uses a main carrier and one or a plurality of sub-carriers to be able to surprisingly increase throughput as many as the number of sub-carriers. Meanwhile, in the LTE, a cell within the base station using the main carrier is called a primary cell (PCell) and the sub-carrier is called a secondary cell (SCell). The technology for extending the CA function to two base stations is referred to as dual connectivity (hereinafter, referred to as DC). In the DC technology, the terminal simultaneously connects and uses a master base station (Master E-UTRAN Node B (MeNB) or Master Node B (MN)) and a secondary base station (Secondary E-UTRAN Node B (SeNB) or Secondary NodeB (SN)), and cells belonging to the master base station are referred to as a master cell group (hereinafter, referred to as MCG) and cells belonging to the secondary base station are called a secondary cell group (hereinafter, referred to as SCG). There are representative cells for each cell group. The representative cell for the master cell group is a primary cell (hereinafter, referred to as PCell), and the representative cell for the secondary cell group is referred to as a primary secondary cell (hereinafter, referred to as PSCell). When the above-mentioned NR is used, the MCG uses the LTE technology, and the SCG uses the NR, such that the terminal may simultaneously use the LTE and the NR.

Although not illustrated in the present drawings, radio resource control (hereinafter, referred to as RRC) layers exist at a higher part of the PDCP layer of the terminal and the base station, and the RRC layer may receive/transmit access and various configuration control messages for a radio resource control. For example, the terminal may be instructed to measure the neighboring cells using the RRC layer message, and the terminal may report the measured results to the base station using the RRC layer message.

Figure 1C:
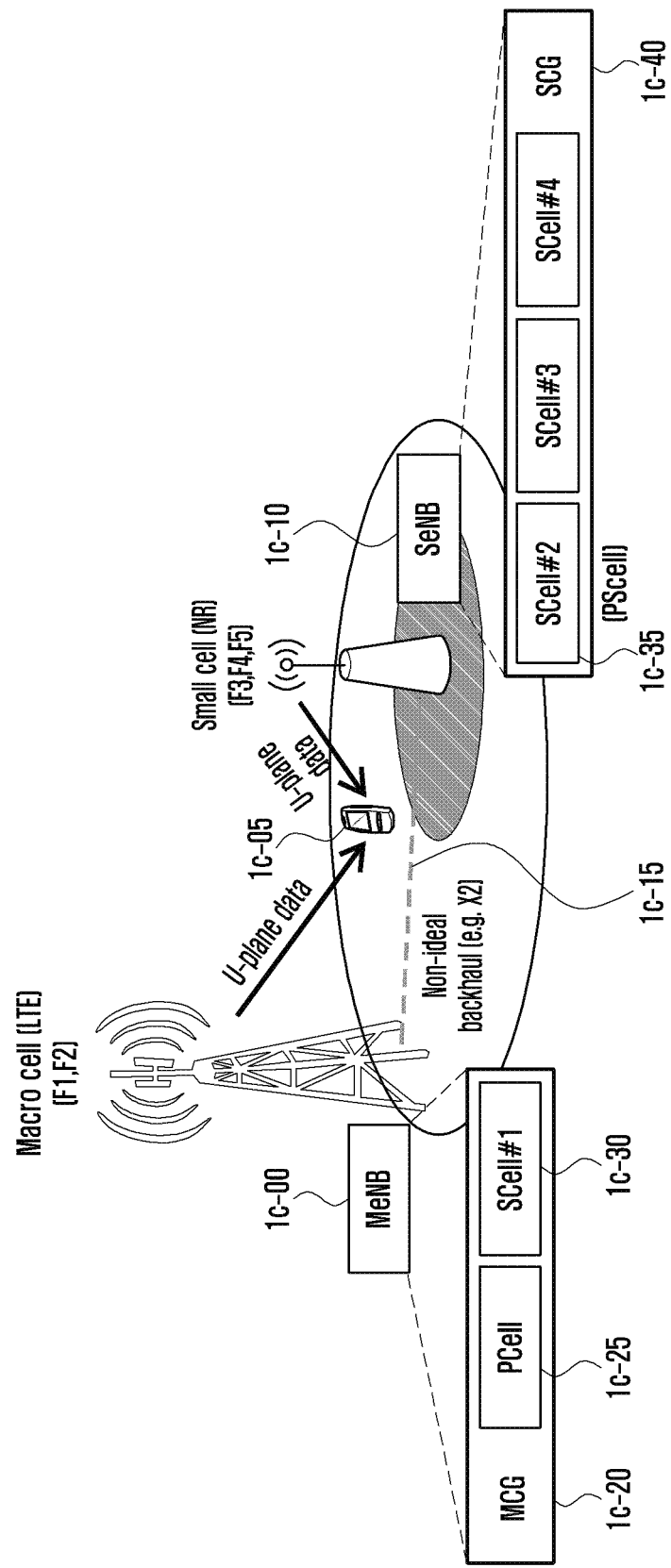
FIG. 1C is a diagram for explaining a concept of multiple access in LTE and NR.

FIG. 1C is a diagram illustrating the concept of the dual connectivity.

Using the dual connectivity technology, the terminal may simultaneously connect and use two base stations. In the illustrated example, it is illustrated that the terminal 1c-05 simultaneously connects a macro base station 1c-00 using the LTE technology and a small cell base station 1c-10 using the NR technology to transmit/receive data. The macro base station is referred to as Master E-UTRAN NodeB (MeNB), and the small cell base station is referred to as Secondary E-UTRAN NodeB (SeNB). A plurality of small cells may be present in a service area of the MeNB, and the MeNB is connected to the SeNBs via a wired backhaul network 1c-15. A set of serving cells received from the MeNB is referred to as a master cell group (MCG) 1c-20. In the MCG, one serving cell is a primary cell (PCell) 1c-25 which necessarily has all functions such as connection establishment, connection re-establishment, and handover that have been performed by the existing cells. Also, the PCell may include a physical uplink control channel (PUCCH) which is an uplink control channel. The serving cell other than the PCell is called a secondary cell (SCell) 1c-30. FIG. 1C illustrates a scenario in which the MeNB provides one SCell and the SeNB provides three SCell. The set of serving cells provided by the SeNB is called the secondary cell group (SCG) 1c-40. When the terminal transmits/receives data from two base stations, the MeNB issues, to the SeNB, a command to add, change, or remove serving cells provided by the SeNB. In order to issue such a command, the MeNB may configure the terminal to measure the serving cell and neighboring cells. The terminal should report the measured results to the MeNB based on the configuration information. In order for the SeNB to efficiently transmit/receive data to the terminal, the serving cell which plays a role similar to the PCell of the MCG is used. In the present disclosure, this is referred to as a primary SCell (PSCell). The PSCell is defined as one of the serving cells of the SCG, and may include the PUCCH which is the uplink control channel. The PUCCH is used to allow the terminal to transmit HARQ ACK/NACK information, channel status information (CSI), scheduling request (SR) and the like to the base station.

Figure 1D:
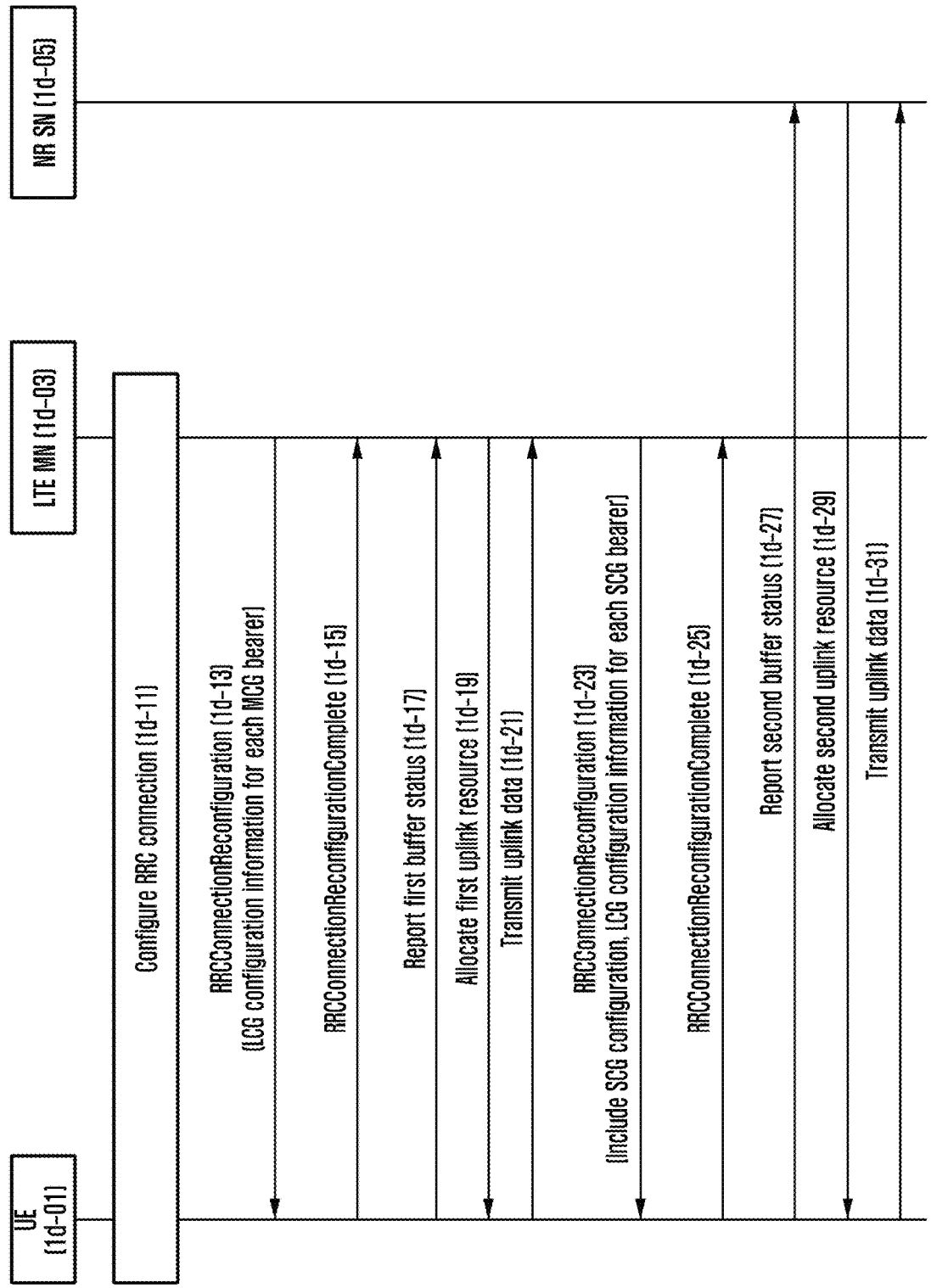
FIG. 1D is a diagram illustrating an example of a message flow between a terminal and a base station when the present disclosure is applied.

FIG. 1D is a diagram illustrating message flow between the terminal and the base station when using a method of reporting a data buffer status for an uplink data transmission proposed in the present disclosure.

In the present drawing, the terminal 1d-01 in an idle mode (RRC_IDLE) performs an access to the LTE cell for reasons such as a generation of data to be transmitted (1d-11). In the idle mode, data may not be transmitted because the terminal is not connected to the network for power saving or the like, and a transition to a connection mode (RRC_CONNECTED) is used to transmit data. If the terminal succeeds in the access procedure to the LTE cell 1d-03, the terminal changes its state to the connection mode (RRC_CONNECTED).

Thereafter, the base station creates a logical (or virtual) channel on which data may be transmitted so that the terminal may transmit data. A logical (or virtual) channel on which data may be transmitted is called a data radio bearer (DRB). In contrast, a logical (or virtual) channel on which a control signal may be transmitted is called a signaling radio bearer (DRB). The DRB and the SRB each have a logical channel identity (LCID). When the signaling or data is transmitted on the downlink or the uplink, the DRB and the SRB transmit the corresponding logical channel identifier by including the logical channel identifier in a header according to the corresponding data type in the MAC layer, so that the receiving end identifies whether the corresponding packet is signaling or data. If the corresponding data is the data, the receiving end determines which DRB the data belong to identify the received data.

In order to configure the DRB as described above, the base station transmits an RRCConnectionReconfiguration message to the terminal to newly configure the DRB to the terminal, in which the DRB configuration information includes the above-mentioned PDCP, RLC and MAC layer related configuration information (1d-13). If the plurality of DRBs are configured, separate configuration information is included for each DRB. In addition, it is possible to configure logical channel group (LCG) information for each DRB as the MAC layer related information. For example, if the base station configures a total of 5 DRBs for the UE, the LCIDs each may be allocated to each of the DRBs as 3, 4, 5, 6, and 7. As will be described later, the LCG is used when the terminal requests a resource to the base station. For example, if the terminal has 100 bytes of data to be transmitted in LCID No. 3, 100 bytes of data to be transmitted in LCID No. 4, and 100 bytes of data to be transmitted in LCID No. 7, the terminal may report the base station that there are 200 bytes of data to be transmitted in LCG No. 1 and 100 bytes of data to be transmitted in LCG No. 3, instead of reporting the amount of data to be transmitted in each LCID.

The terminal receiving the configuration information may transmit to the base station an acknowledgement message indicating that the configuration information has been successfully received. For example, the terminal may transmit the acknowledgment message to the base station using an RRConnectionReconfigurationComplete message of the RRC layer.

Thereafter, if the terminal has data to be transmitted by DRB to the base station as described above, the terminal reports the amount of data to be transmitted for each LCG according to a first buffer status report (BSR) format (1d-17). The BSR is divided as follows according to the condition in which the transmission is triggered.

First type: Regular BSR
  The BSR transmitted when the terminal has data that can be transmitted for the SRB/DRB belonging to the LCG, and a BSR retransmission timer (retxBSR-Timer) expires.
  BSR transmitted when the data to be transmitted from the upper layer (RLC or PDCP layer) for the SRB/DRB belonging to the LCG described above are generated and the data have priority higher than the logical channel/wireless bearer belonging to any LCG.
  BSR transmitted when the data to be transmitted from the upper layer (RLC or PDCP layer) for the logical channel/radio bearer belonging to the LCG are generated and no data exists in any data except the data.
Second Type: Periodic BSR
  BSR transmitted when a periodic BSR-timer (periodicBSR-Timer) configured in the terminal expires.
Third Type: Padding BSR
  BSR transmitted when the uplink resource is allocated and the padding bit filling the space remaining after the data are transmitted is equal to or larger than the sum of the size of the BSR MAC control element (CE) and the side of the sub-header of the BSR MAC CE.
  If the packets exist in the plurality of LCG buffers, the truncated BSR is transmitted.

Accordingly, if padding (i.e., remaining space) occurs upon receiving the uplink resource allocation from the base station, it is possible to transmit a long BSR or a short BSR/truncated BSR depending on the size of the remaining space. The first buffer status report format will be described in detail in FIGS. 1EA-EH. The base station receiving the report allocates the uplink resource to the terminal (1d-19). The terminal receiving the resource allocation information transmits data in the buffer as the corresponding resource to the base station (1d-21).

Meanwhile, when the terminal supports the DC and the NR cell exists around the terminal according to the neighbor cell measurement report information received from the terminal, the base station transmits the SCG information to the terminal in order to set the DC function (1d-23). The information may be transmitted through the RRCConnectionReconfiguration message, and the SCG configuration information may include addition and revocation information for the PSCells and SCells added to the SCG. In addition, if the DC is set for the DRB as described above, the following bearer types exist.

MCG Bearer: Bearer Transmitted Only to the MCG
  MCG split bearer: in the case of the downlink from the core network connected to the MCG, bearer on which data is transmitted by being divided into the MCG and the SCG; in the case of the uplink, bearer on which data may be transmitted by being divided into the MCG and the SCG and the packet received by the SCG is transmitted to the MCG to be transmitted to the MCG side core network.
  SCG bearer: Bearer transmitted only to the SCG
  SCG split bearer: In the case of the downlink from the core network connected to the SCG, bearer on which data is transmitted by being divided into the SCG and the MCG; in the case of the uplink, bearer on which data may be transmitted by being divided into the MCG and the SCG and the packet received by the MCG is transmitted to the SCG to be transmitted to the SCG side core network.

If the bearer type of the DRB is the MCG split bearer, the SCG bearer, or the SCG split bearer, the LCID and LCG information used in the SCG may be additionally transmitted to the configuration information. At this time, the LCID and LCG information to be used in the SCG included in the configuration information are independent of the LCID and LCG information used in the MCG. For example, the LCID used for the DRB in the LTE has values from 3 to 10, but the LCID used for the DRB in the NR may have other ranges such as 4 to 15. In addition, the LCG also has values from 0 to 3 in the LTE, but can have values from 0 to 7 in the NR.

Thereafter, the terminal transmits a message confirming that it receives the configuration information, which may be transmitted using the RRCConnectionReconfigurationComplete message (1d-25). Accordingly, the terminal can simultaneously transmit and receive data using the LTE cell 1d-03 which is the MCG, and the NR cell 1d-05 which is the SCG.

Thereafter, if the terminal wants to transmit data to the SCG for the DRB configured to be transmitted to the SCG, the terminal reports the amount of data to be transmitted to each LCG according to the second buffer status report format (1d-27). The second buffer status report format will be described in detail in FIGS. 1EA-EH. The base station receiving the report allocates the uplink resource to the terminal (1d-29). The terminal receiving the resource allocation information transmits data in the buffer as the corresponding resource to the base station (1d-31).

Figure 1E:
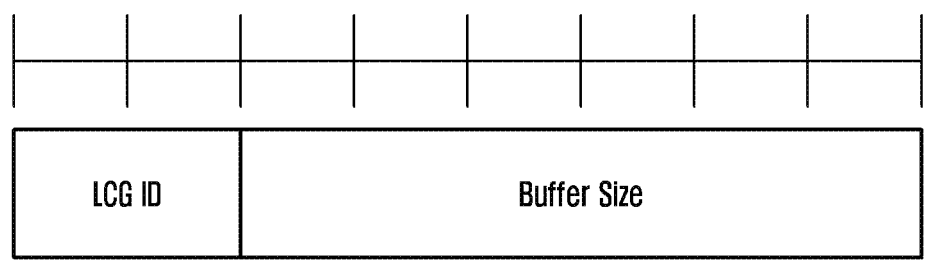
FIGS. 1EA-EH are diagrams of an example of a buffer status report format proposed in the present disclosure.
Figure 1E:
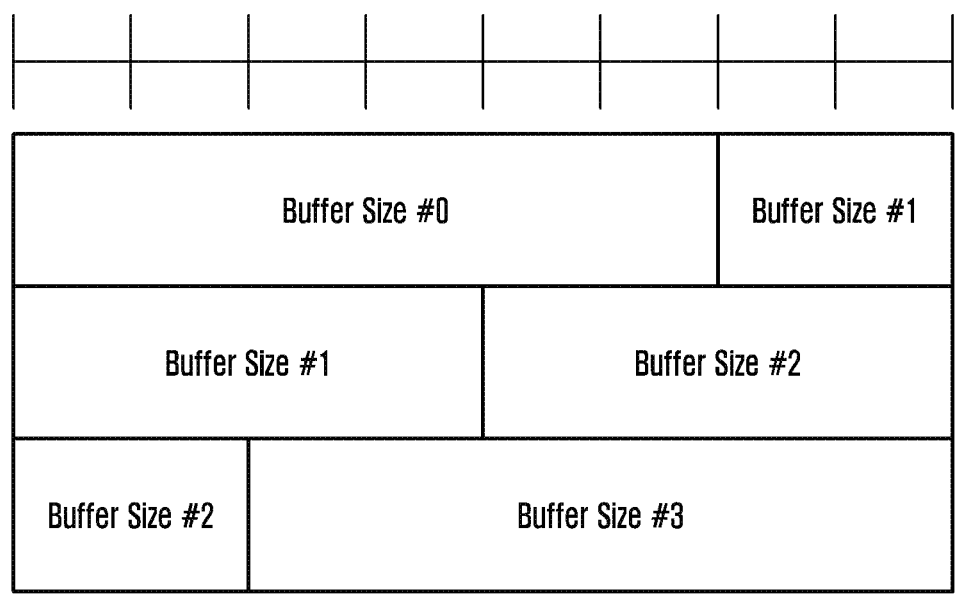
Figure 1E:
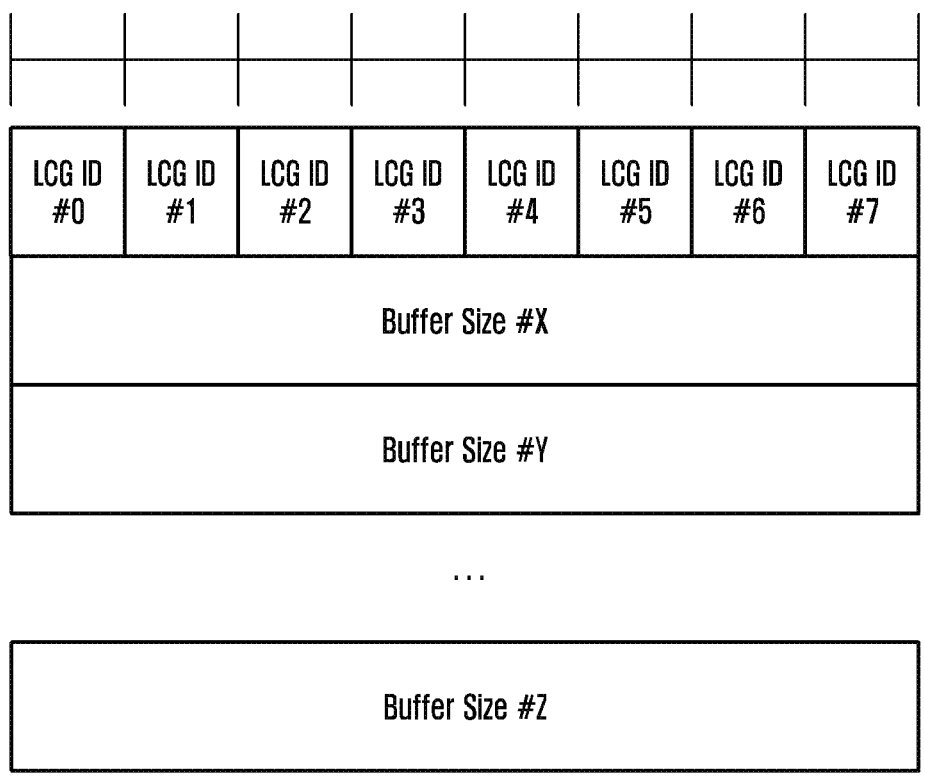
Figure 1E:
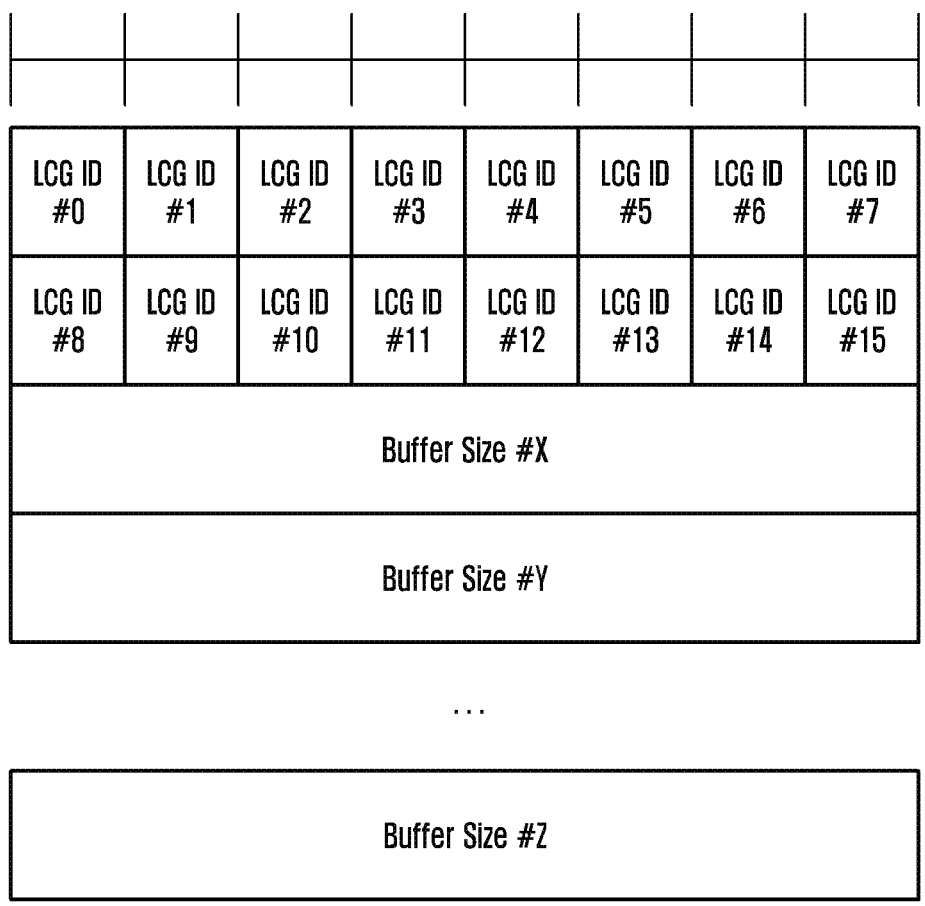

FIGS. 1Ea to 1Eh are diagrams illustrating an example of a buffer status report format proposed in the present disclosure.

FIGS. 1Ea and 1Eb are examples of a first buffer status report format.

FIG. 1Ea illustrates a short BSR MAC control element (MAC CE: control message used in the MAC layer) format that transmits the buffer status report for one LCG. In the LTE, there are a maximum of four LCGs, so four LCGs (i.e., 00, 01, 10, and 11) are represented by two bits, and the buffer status step thereof is represented in 64 steps ($2^6$) by six bits. As an example of 64 steps, a range as shown in Table 6.1.3.1 of the 3GPP standard TS 36.321 may be used.

FIG. 1Eb illustrates a long BSR MAC CE format which transmits a buffer status report for all four LCGs. That is, the buffer status for four LCGs of the LTE, respectively, is transmitted. Buffer Size #0 is mapped to a buffer status of LCG No. 0, and Buffer Size #1 is mapped to a buffer status of LCG No. 1.

If padding is generated due to a margin in the allocated uplink resources as described above, the padding BSR may be transmitted. For example, when the padding is generated enough to transmit the long BSR MAC CE, the long BSR MAC CE is transmitted. On the other hand, if the long BSR MAC CE may not be transmitted, but only the size capable of transmitting the short BSR MAC CE remains and data exists in only one LCG, the short BSR MAC CE is transmitted. If the Long BSR MAC CE may not be transmitted, but only a size enough to transmit the Short BSR MAC CE remains and data exists in a plurality of LCGs, data is transmitted in the same format as the Short BSR MAC CE, but the corresponding MAC CE uses different logical channel identifiers to inform the base station that the corresponding MAC CE is the truncated BSR MAC CE, thereby informing the base station that there is data in another LCG not included in the LCG ID of FIG. 1Ea.

FIGS. 1Ec, 1Ed, 1Ee, 1Ef, 1Eg, and 1Eh are examples of the second buffer status report format used in the NR. The NR assumed the situation where the number of LCGs are increasing (e.g., from 4 to 8 or 16 in the existing LTE), or may report the buffer status for each LCID instead of using the LCG. If 8 or fewer LCGs or LCIDs are used, the format of 1Ec or 1Ee or 1Eg may be used as the second buffer status report format, and if more than 9 LCGs or LCIDs are used, the format of 1Ed or 1Ef or 1Eh can be used as the second buffer status report format.

In FIGS. 1Ec, 1Eg, and 1Eg, 8 bits of a first byte may each indicate the LCG or the LCID. (That is, bit map). In the case of the LCG, each bit may mean Nos. 0 to 7, and in the case of the LCG, each bit may mean Nos. 1 to 8. In addition, 16 bits of the first and second bytes in FIGS. 1Ed, 1Ef, and 1Eh may each indicate the LCG or the LCID (i.e., bitmap). For example, in the case of the LCG, each bit may mean Nos. 1 to 16 and in the case of the LCID, each bit may mean Nos. 1 TO 16. Buffer size information corresponding to the corresponding LCG or LCID may be included in the buffer status report according to the bit information of the bitmap. For example, if the corresponding bit is set to be 1, the buffer size information corresponding to the corresponding LCG or LCID is included. For example, in the case of FIG. 1Ec, when the LCG is used and data exists in the buffer in the LCG ID #1, #5, and #6, data is included in the bit map as 01000110, and the buffer sizes corresponding to 1 in the bitmap are each included. In this drawing, on the assumption that that each buffer size has a length of 1 byte, it was assumed that a buffer status report having a total of 4 bytes obtained by summing 1 byte of the bitmap and 1*3=3 bytes which are the product of the number of is of the bitmap by each buffer size is generated. As described above, if the buffer size is a size of 1 byte, that is, a size of 8 bits, the buffer status of $2^8=256$ steps may be reported, and the alignment even in units of byte may be made as illustrated in this drawing.

On the other hand, the buffer status report format shown in FIGS. 1Ee, 1Ef, 1Eg, and 1Eh includes discard indicator information together with buffer size fields having a length of 7 bits for each LCG or LCID. If the field is set to be 1, the buffer of the corresponding LCG or LCID should be transmitted quickly, and if the discard indicator is not transmitted within x milliseconds, the terminal informs the base station that the packet is deleted. The x value may be a value that the terminal informs to the base station in advance or a value set by the base station. For example, when the base station sets the DRB, the x value may be set. That is, if the packet of the terminal is useless data after x milliseconds (for example, if a too large delay occurs in the case of voice, the packet becomes meaningless) to be deleted, the base station can set the terminal to use the discard indicator. In addition, in FIGS. 1Eg and 1Eh, if the discard indicator information is set to be '1', buffer size # Y to be discarded soon may be additionally informed along with the discard indicator. Accordingly, the base station quickly allocates uplink resources to the data received by the discard indicator together with the buffer status report, thereby preventing the loss of the packet.

Figure 1F:
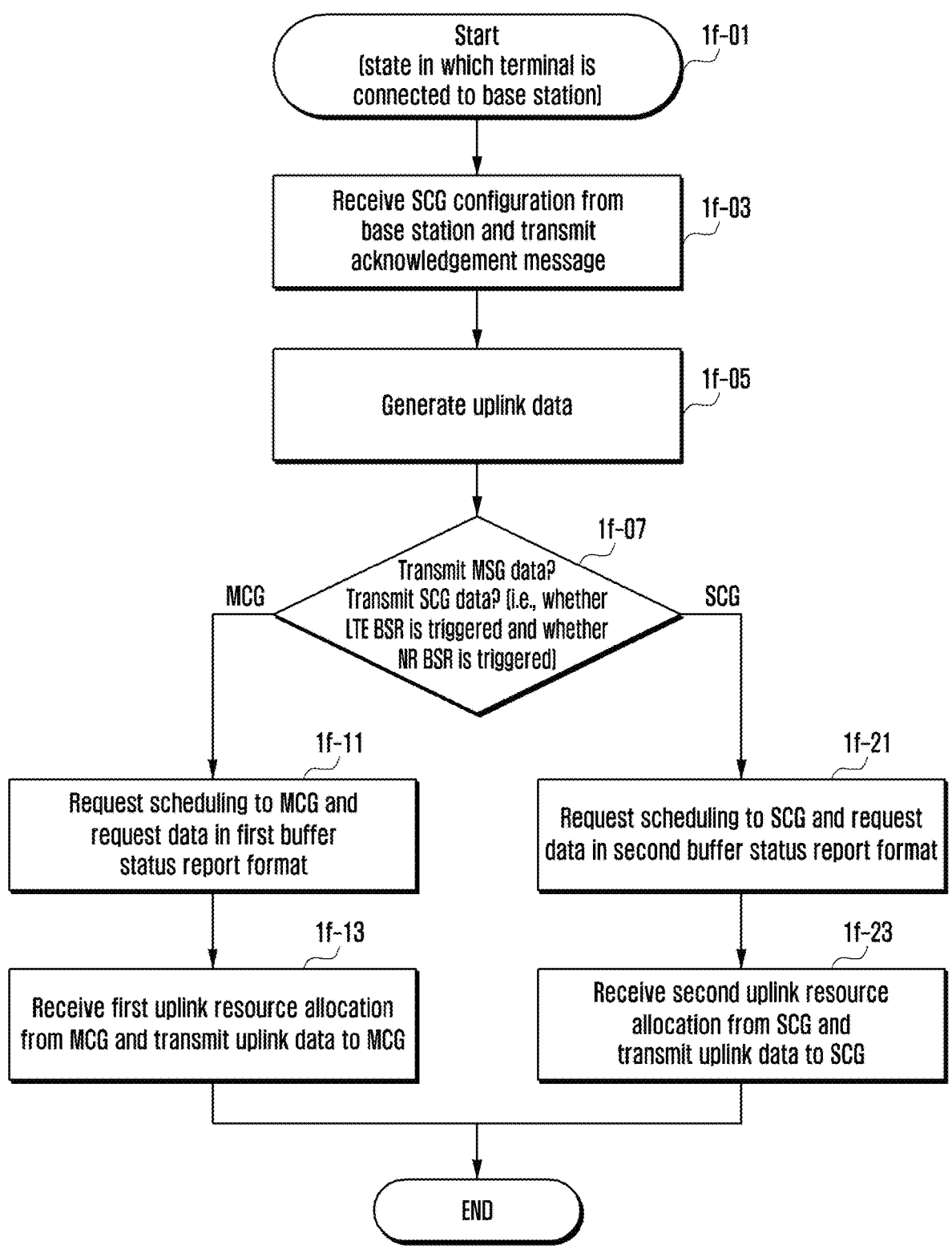
FIG. 1F is a diagram illustrating an example of an operation sequence of the terminal when the present disclosure is applied.

FIG. 1F is an operation flow chart illustrating the terminal to which the present disclosure is applied.

In FIG. 1F, the terminal completes the connection procedure to the base station and is in a connected state (RRC_CONNECTED). Accordingly, it is assumed that the base station transmits the RRCConnectionReconfiguration message to the terminal to set the DRB for data transmission to the terminal (1f-01). Accordingly, the LCG and the like may be set for each DRB.

Thereafter, if the terminal supports the dual connectivity (DC) and the NR cell exists around the terminal according to the neighboring cell measurement report information received from the terminal, the terminal receives the SCG configuration in which the NRG cell searched by the base station is added to the SCG (1f-03). The configuration information may include the addition and revocation information for the PSCell and the SCell added to the SCG as described above with reference to FIG. 1D, and the LCID and LCG information to be used in the NR may be additionally transmitted.

Thereafter, if the uplink data belonging to the corresponding data bearer is generated in the terminal (1f-05), the terminal can decide to transmit the uplink data to the LTE or the NR depending on the set value of the base station. Examples of the set value may include a basic transmission direction and a predetermined threshold value that the base station provides to the terminal. If the amount of uplink data is equal to or less than (or less than) the predetermined threshold value, the uplink data may be transmitted to the established basic transmission direction (e.g., NR or LTE), and if the amount of uplink data is above (or equal to or more than) the predetermined threshold, the uplink data may be transmitted in both of the LTE and NR directions. The basic transmission direction can be transmitted by DRB or in units of terminal. Although not shown in the present disclosure, for the DRB expected that the delay is short or the amount of data is large, the base station establishes the NR for the terminal as the basic transmission direction. Alternatively, if it is determined that the amount of traffic is large according to the buffer status report information reported from the terminal even if the basic transmission direction is the LTE, the base station may re-establish the basic transmission direction as NR.

Meanwhile, the terminal may receive the uplink resource allocation information from the base station, and if the resource previously allocated for the uplink data transmission remains, as described above, the terminal may transmit the buffer status report instead of the padding. Accordingly, if there is a resource remaining after the terminal receives the uplink resource allocation information from the base station through the LTE while having data to be transmitted through the LTE, the terminal may use the above-mentioned first buffer status report to the padding buffer status report. If there is no remaining resource, the terminal may receive the uplink allocation by transmitting a scheduling request previously configured by the base station or receive the uplink allocation by performing the random access, thereby transmitting a Regular BSR (1*f*-11). Thereafter, the terminal may transmit the uplink data stored in the buffer according to the uplink resource allocation information received from the base station (1*f*-13).

If there is a resource remaining after the terminal receives the uplink resource allocation information from the base station through the NR while having data to be transmitted through the NR, the terminal may transmit the padding buffer status report using the second buffer status report described above. If there is no remaining resource, the terminal may receive the uplink allocation by transmitting the scheduling request previously set by the base station or receive the uplink allocation by performing the random access, thereby transmitting the Regular BSR (1*f*-21). Thereafter, the terminal may transmit the uplink data stored in the buffer according to the uplink resource allocation information received from the base station (1*f*-23).

Figure 1G:
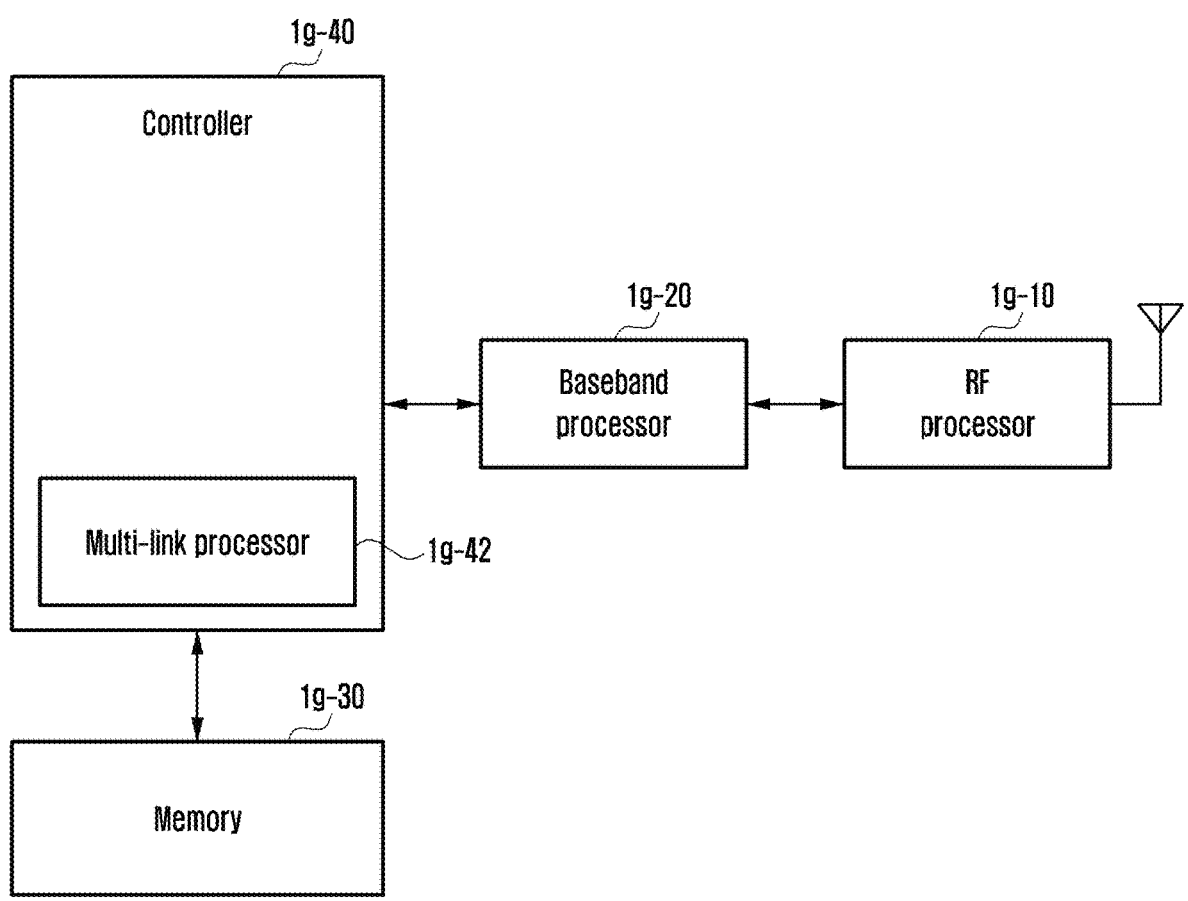
FIG. 1G is a diagram illustrating an example of a block configuration of the terminal according to the embodiment of the present disclosure.

FIG. 1G illustrates a block configuration of the terminal according to the embodiment of the present disclosure.

Referring to FIG. 1G, the terminal includes a radio frequency (RF) processor 1*g*-10, a baseband processor 1*g*-20, a memory 1*g*-30, and a controller 1*g*-40.

The RF processor 1*g*-10 serves to transmit/receive a signal through a radio channel, such as band conversion and amplification of a signal. That is, the RF processor 1*g*-10 up-converts a baseband signal provided from the baseband processor 1*g*-20 into an RF band signal and then transmits the baseband signal through an antenna and down-converts the RF band signal received through the antenna into the baseband signal. For example, the RF processor 1*g*-10 may include a transmitting filter, a receiving filter, an amplifier, a mixer, an oscillator, a digital to analog converter (DAC), an analog to digital converter (ADC), or the like. FIG. 1G illustrates only one antenna but the terminal may include a plurality of antennas. Further, the RF processor 1*g*-10 may include the plurality of RF chains. Further, the RF processor 1*g*-10 may perform beamforming. For the beamforming, the RF processor 1*g*-10 may adjust a phase and a size of each of the signals transmitted and received through a plurality of antennas or antenna elements.

The baseband processor 1*g*-20 performs a conversion function between the baseband signal and the bit string according to a physical layer standard of the system. For example, when data are transmitted, the baseband processor 1*g*-20 generates complex symbols by coding and modulating a transmitting bit string. Further, when data are received, the baseband processor 1*g*-20 recovers the received bit string by demodulating and decoding the baseband signal provided from the RF processor 1*g*-10. For example, according to the orthogonal frequency division multiplexing (OFDM) scheme, when data are transmitted, the baseband processor 1*g*-20 generates the complex symbols by coding and modulating the transmitting bit string, maps the complex symbols to sub-carriers, and then performs an inverse fast Fourier transform (IFFT) operation and a cyclic prefix (CP) insertion to configure the OFDM symbols. Further, when data are received, the baseband processor 1*g*-20 divides the baseband signal provided from the RF processor 1*g*-10 in an OFDM symbol unit and recovers the signals mapped to the sub-carriers by a fast Fourier transform (FFT) operation and then recovers the receiving bit string by the modulation and decoding.

The baseband processor 1*g*-20 and the RF processor 1*g*-10 transmit and receive a signal as described above. Therefore, the baseband processor 1*g*-20 and the RF processor 1*g*-10 may be called a transmitter, a receiver, a transceiver, or a communication unit. Further, at least one of the baseband processor 1*g*-20 and the RF processor 1*g*-10 may include different communication modules to process signals in different frequency bands. Further, different frequency bands may include a super high frequency (SHF) (for example: 2.5 GHz, 5 GHz) band, a millimeter wave (for example: 60 GHz) band.

The memory 1*g*-30 stores data such as basic programs, application programs, and configuration information or the like for the operation of the terminal.

The controller 1*g*-40 controls the overall operations of the terminal. For example, the controller 1*g*-40 transmits/receives a signal through the baseband processor 1*g*-20 and the RF processor 1*g*-10. Further, the controller 1*g*-40 records and reads data in and from the memory 1*g*-30. For this purpose, the controller 1*g*-40 may include at least one processor. For example, the controller 1*g*-40 may include a communication processor (CP) performing a control for communication and an application processor (AP) controlling an upper layer such as the application programs. According to the embodiment of the present disclosure, the controller 1*g*-40 includes a multi-link processor 1*g*-42 that performs the processing to be operated in a multi-link mode. For example, the controller 1*g*-40 may control the terminal to perform the procedure illustrated in the operation of the terminal illustrated in FIG. 1F.

According to the embodiment of the present disclosure, the terminal receives the SCG addition and the specific configuration for each DRB, so that the terminal determines which base station data transmits to and generates the format suitable for the corresponding base station to report the buffer status of the terminal.

The methods according to the embodiments described in claims or specification of the present disclosure may be implemented in hardware, software, or a combination of hardware and software.

When the methods are implemented in the software, a computer readable storage medium storing at least one program (software module) may be provided. At least one programs stored in the computer readable storage medium is configured for execution by at least one processor within an electronic device. At least one program includes instructions that allow the electronic device to execute the methods according to the embodiments described in the claims or specification of the present disclosure.

The program (software module, software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other types of optical storage devices, and a magnetic cassette. Alternatively, the programs may be stored in the memory that is configured of combinations of some or all of the memories. Further, each configuration memory may also be included in plural.

Further, the program may be stored in an attachable storage device that may be accessed through communication networks such as Internet, an intranet, a local area network (LAN), a wide LAN (WLAN), and a storage area network (SAN) or a communication network configured in a combination thereof. The storage device may access a device performing the embodiment of the present disclosure through an external port. Further, a separate storage device on the communication network may also access a device performing the embodiment of the present disclosure.

In the detailed embodiments of the present disclosure, components included in the present disclosure are represented by a singular number or a plural number according to the detailed embodiment as described above. However, the expressions of the singular number or the plural number are selected to meet the situations proposed for convenience of explanation and the present disclosure is not limited to the single component or the plural components and even though the components are represented in plural, the component may be configured in a singular number or even though the components are represented in a singular number, the component may be configured in plural.

Although embodiments of the present disclosure have been disclosed for illustrative purposes, various modifications, additions and substitutions are possible, without departing from the scope and spirit of the disclosure as disclosed in the accompanying claims. Accordingly, the scope of the present disclosure is not construed as being limited to the described embodiments but is defined by the appended claims as well as equivalents thereto.

Figure 2A:
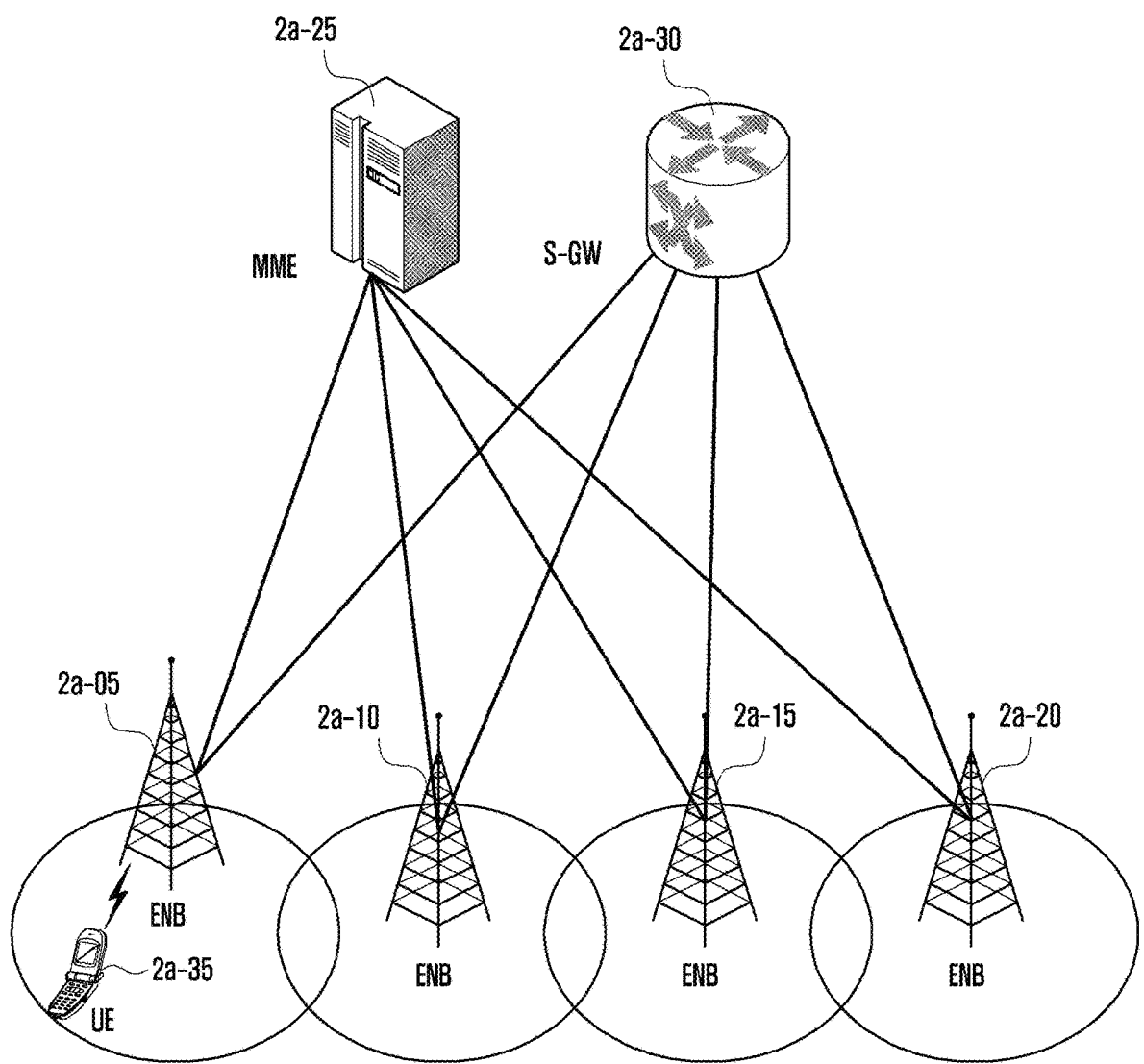
FIG. 2A is a diagram illustrating a structure of an LTE system to which the present disclosure may be applied.

FIG. 2A is a diagram illustrating a structure of an LTE system to which the present disclosure may be applied.

As illustrated in FIG. 1A, a radio access network of an LTE system is configured to include next generation base stations (evolved node B, hereinafter, ENB, Node B, or base station) 2a-05, 2a-10, 2a-15, and 2a-20, a mobility management entity (MME) 2a-25, and a serving-gateway (S-GW) 2a-30. User equipment (hereinafter, UE or terminal) 2a-35 accesses an external network through the ENBs 2a-05 to 2a-20 and the S-GW 2a-30.

In FIG. 2A, the ENBs 2a-05 to 2a-20 correspond to the existing node B of the UMTS system. The ENB is connected to the UE 2a-35 through a radio channel and performs more complicated role than the existing node B. In the LTE system, in addition to a real-time service like a voice over Internet protocol (VoIP) through the Internet protocol, all the user traffics are served through a shared channel and therefore an apparatus for collecting and scheduling status information such as a buffer status, an available transmission power status, and a channel status of the terminals is used. Here, the eNBs 2a-05 to 2a-20 take charge of the collecting and scheduling. One ENB generally controls a plurality of cells. For example, to implement a transmission rate of 100 Mbps, the LTE system uses, as a radio access technology, orthogonal frequency division multiplexing (hereinafter, OFDM) in, for example, a bandwidth of 20 MHz. Further, an adaptive modulation & coding (hereinafter, referred to as AMC) determining a modulation scheme and a channel coding rate according to a channel status of the terminal is applied. The S-GW 2a-30 is an apparatus for providing a data bearer and generates or removes the data bearer according to the control of the MME 2a-25. The MME is an apparatus for performing a mobility management function for the terminal and various control functions and is connected to a plurality of base stations.

Figure 2B:
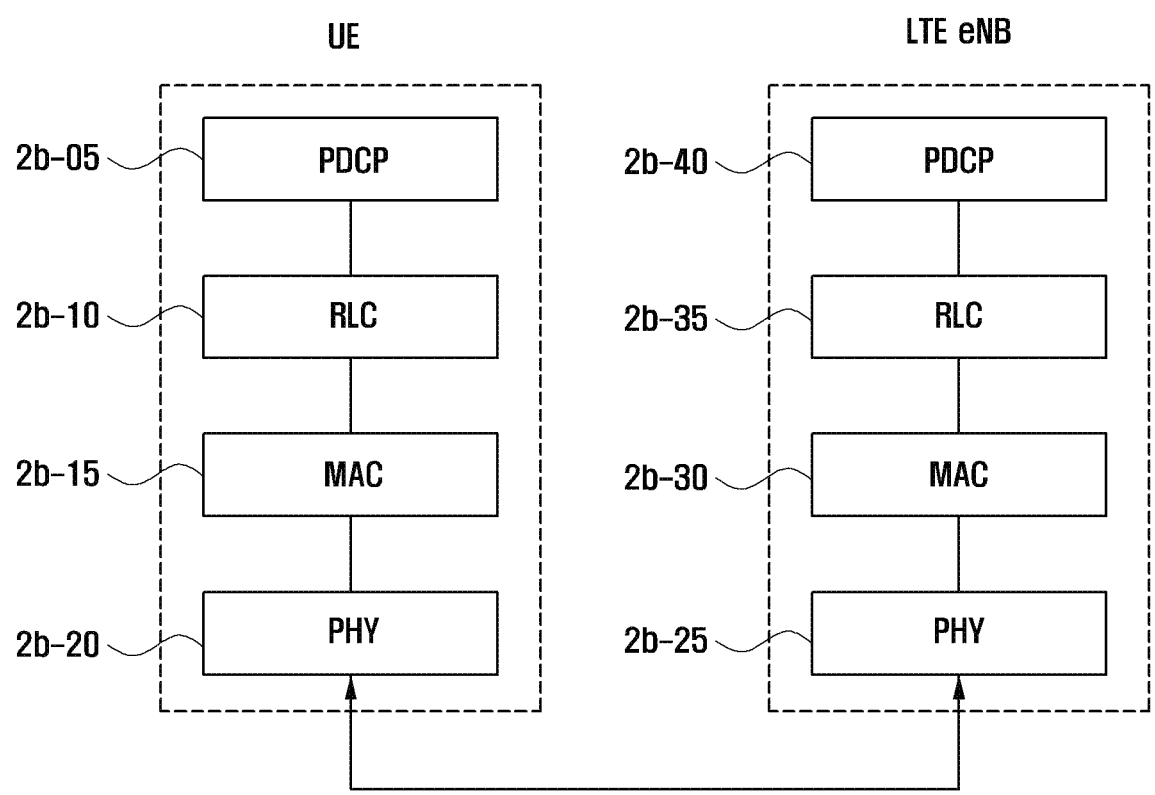
FIG. 2B is a diagram illustrating a radio protocol structure in the LTE system to which the present disclosure may be applied.

FIG. 2B is a diagram illustrating a radio protocol structure in the LTE system to which the present disclosure may be applied.

Referring to FIG. 2B, the radio protocol of the LTE system is configured to include packet data convergence protocols (PDCPs) 2b-05 and 2b-40, radio link controls (RLCs) 2b-10 and 2b-35, and medium access controls (MACs) 2b-15 and 2b-30, respectively, in the terminal and the ENB, respectively. The packet data convergence protocols (PDCPs) 2b-05 and 2b-40 are in charge of operations such as IP header compression/decompression. The main functions of the PDCP are summarized as follows.

Header compression and decompression function (Header compression and decompression: ROHC only)
Transfer function of user data (Transfer of user data)
In-sequence delivery function (In-sequence delivery of upper layer PDUs at PDCP re-establishment procedure for RLC AM)
Reordering function (For split bearers in DC (only support for RLC AM): PDCP PDU routing for transmission and PDCP PDU reordering for reception)
Duplicate detection function (Duplicate detection of lower layer SDUs at PDCP re-establishment procedure for RLC AM)
Retransmission function (Retransmission of PDCP SDUs at handover and, for split bearers in DC, of PDCP PDUs at PDCP data-recovery procedure, for RLC AM)
Ciphering and deciphering function (Ciphering and deciphering)
Timer-based SDU discard function (Timer-based SDU discard in uplink)

The radio link controls (hereinafter, referred to as RLCs) 2b-10 and 2b-35 reconfigures the PDCP packet data unit (PDU) to an appropriate size to perform the ARQ operation or the like. The main functions of the RLC are summarized as follows.

Data transfer function (Transfer of upper layer PDUs)
ARQ function (Error Correction through ARQ (only for AM data transfer))
Concatenation, segmentation, reassembly functions (Concatenation, segmentation and reassembly of RLC SDUs (only for UM and AM data transfer))
Re-segmentation function (Re-segmentation of RLC data PDUs (only for AM data transfer))
Reordering function (Reordering of RLC data PDUs (only for UM and AM data transfer))
Duplicate detection function (Duplicate detection (only for UM and AM data transfer))
Error detection function (Protocol error detection (only for AM data transfer))
RLC SDU discard function (RLC SDU discard (only for UM and AM data transfer))
RLC re-establishment function (RLC re-establishment)

The MACs 2b-15 and 2b-30 are connected to several RLC layer apparatuses configured in one terminal and perform an operation of multiplexing RLC PDUs into an MAC PDU and demultiplexing the RLC PDUs from the MAC PDU. The main functions of the MAC are summarized as follows.

Mapping function (Mapping between logical channels and transport channels)
Multiplexing/demultiplexing function (Multiplexing/demultiplexing of MAC SDUs belonging to one or different logical channels into/from transport blocks (TB) delivered to/from the physical layer on transport channels)
Scheduling information reporting function (Scheduling information reporting)
HARQ function (Error correction through HARQ)
Priority handling function between logical channels (Priority handling between logical channels of one UE)
Priority handling function between terminals (Priority handling between UEs by means of dynamic scheduling)
MBMS service identification function (MBMS service identification)
Transport format selection function (Transport format selection)
Padding function (Padding)

Physical layers 2b-20 and 2b-25 perform an operation of channel-coding and modulating an upper layer data, making the upper layer data as an OFDM symbol and transmitting them to a radio channel, or demodulating and channel-decoding the OFDM symbol received through the radio channel and transmitting the demodulated and channel-decoded OFDM symbol to the upper layer.

Figure 2C:
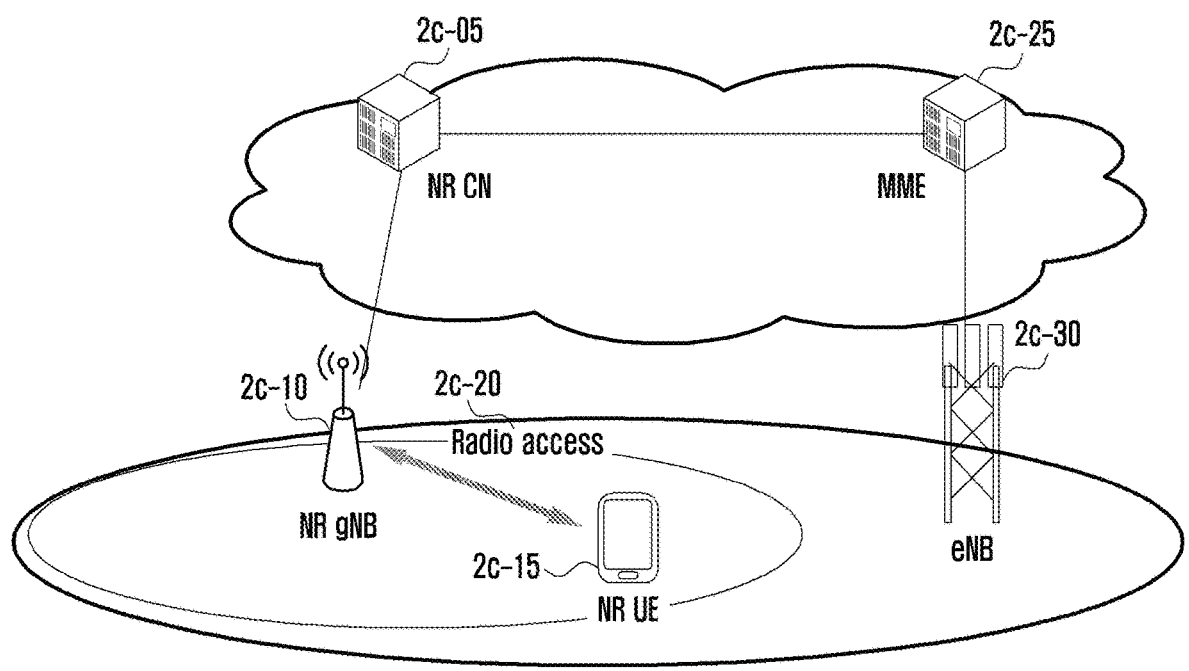
FIG. 2C is a diagram illustrating a structure of a next generation mobile communication system to which the present disclosure may be applied.

FIG. 2C is a diagram illustrating a structure of a next generation mobile communication system to which the present disclosure may be applied.

Referring to FIG. 2C, a radio access network of a next generation mobile communication system (hereinafter referred to as NR or 5G) is configured to include a next generation base station (New radio node B, hereinafter NR gNB or NR base station) 2c-10 and a new radio core network (NR CN) 2c-05. The user terminal (new radio user equipment, hereinafter, NR UE or UE) 2c-15 accesses the external network through the NR gNB 2c-10 and the NR CN 2c-05.

In FIG. 2C, the NR gNB (2c-10) corresponds to an evolved node B (eNB) of the existing LTE system. The NR gNB is connected to the NR UE 2c-15 via a radio channel and may provide a service superior to the existing node B. In the next generation mobile communication system, since all user traffics are served through a shared channel, an apparatus for collecting state information such as a buffer status, an available transmission power status, and a channel status of the UEs to perform scheduling is used. The NR NB 2c-10 may serve as the apparatus. One NR gNB generally controls a plurality of cells. In order to realize high-speed data transmission compared with the current LTE, the NR gNB may have an existing maximum bandwidth or more, and may be additionally incorporated into a beam-forming technology may be applied by using orthogonal frequency division multiplexing (hereinafter, referred to as OFDM) as a radio access technology. Further, an adaptive modulation & coding (hereinafter, referred to as AMC) determining a modulation scheme and a channel coding rate according to a channel status of the terminal is applied. The NR CN 2c-05 may perform functions such as mobility support, bearer setup, QoS setup, and the like. The NR CN is an apparatus for performing a mobility management function for the terminal and various control functions and is connected to a plurality of base stations. In addition, the next generation mobile communication system can interwork with the existing LTE system, and the NR CN is connected to the MME 2c-25 through the network interface. The MME is connected to the eNB 2c-30 which is the existing base station.

Figure 2D:
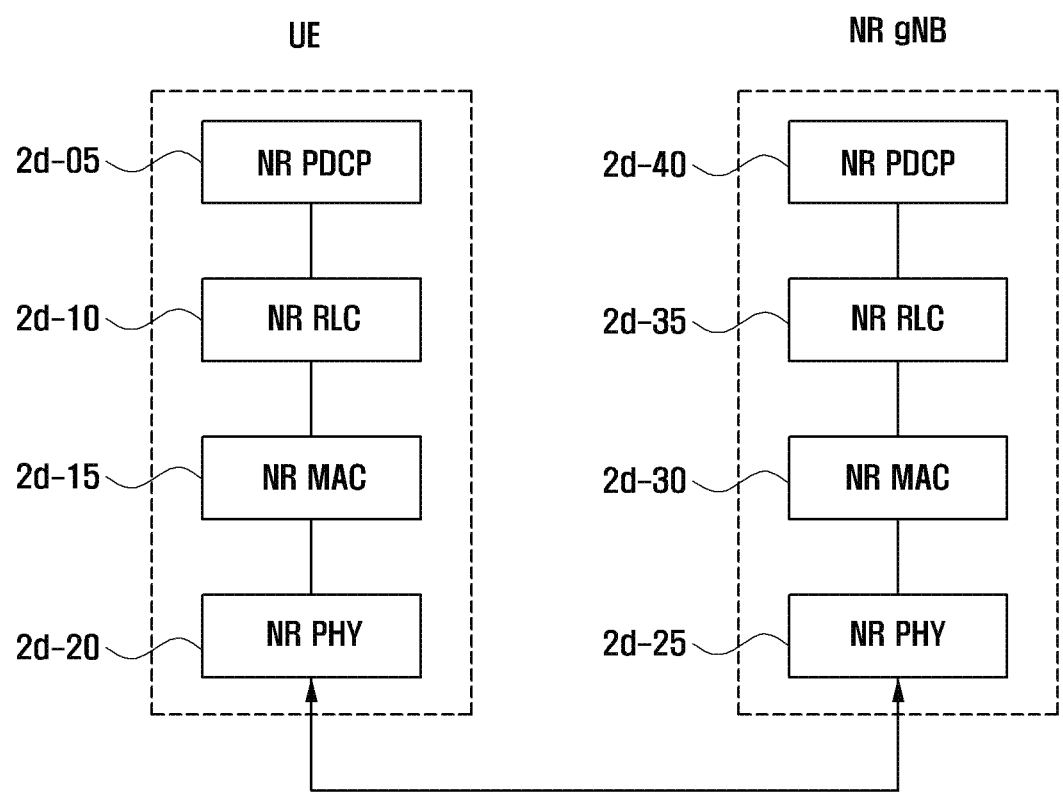
FIG. 2D is a diagram illustrating the radio protocol structure of the next generation mobile communication system to which the present disclosure may be applied.

FIG. 2D is a diagram illustrating the radio protocol structure of the next generation mobile communication system to which the present disclosure may be applied.

Referring to FIG. 2D, the radio protocol of the next generation mobile communication system is configured to include NR PDCPs 2d-05 and 2d-40, NR RLCs 2d-10 and 2d-35, and NR MACs 2d-15 and 2d-30 in the terminal and the NR base station. The main functions of the NR PDCPs 2d-05 and 2d-40 may include some of the following functions.

- Header compression and decompression function (Header compression and decompression: ROHC only)
- Transfer function of user data (Transfer of user data)
- In-sequence delivery function (In-sequence delivery of upper layer PDUs)
- Reordering function (PDCP PDU reordering for reception)
- Duplicate detection function (Duplicate detection of lower layer SDUs)
- Retransmission function (Retransmission of PDCP SDUs)
- Ciphering and deciphering function (Ciphering and deciphering)
- Timer-based SDU discard function (Timer-based SDU discard in uplink)

In this case, the reordering function of the NR PDCP apparatus refers to a function of reordered PDCP PDUs received in a lower layer in order based on a PDCP sequence number (SN) and may include a function of transferring data to the upper layer in the reordered order, a function of recording PDCP PDUs missed by the reordering, a function of reporting a state of the missed PDCP PDUs to a transmitting side, and a function of requesting a retransmission of the missed PDCP PDUs.

The main functions of the NR RLCs 2d-10 and 2d-35 may include some of the following functions.

- Data transfer function (Transfer of upper layer PDUs)
- In-sequence delivery function (In-sequence delivery of upper layer PDUs)
- Out-of-sequence delivery function (Out-of-sequence delivery of upper layer PDUs)
- ARQ function (Error correction through HARQ)
- Concatenation, segmentation, reassembly function (Concatenation, segmentation and reassembly of RLC SDUs)
- Re-segmentation function (Re-segmentation of RLC data PDUs)
- Reordering function (Reordering of RLC data PDUs)
- Duplicate detection function (Duplicate detection)
- Error detection function (Protocol error detection)
- RLC SDU discard function (RLC SDU discard)
- RLC re-establishment function (RLC re-establishment)

In this case, the in-sequence delivery function of the NR RLC apparatus refers to a function of delivering RLC SDUs received from a lower layer to an upper layer in order, and may include a function of reassembling and transferring an original one RLC SDU which is divided into a plurality of RLC SDUs and received. The NR RLC may include a function of reorder the received RLC PDUs based on the RLC sequence number (SN) or the PDCP sequence number (SN) and a function of recording the RLC PDUs missed by the reordering. The NR RLC may include a function of reporting a state of the missed RLC PDUs to the transmitting side and a function of requesting a retransmission of the missed RLC PDUs. The NR RLC may include a function of transferring only the SLC SDUs before the missed RLC SDU to the upper layer in order when there is the missed RLC SDU and a function of transferring all the received RLC SDUs to the upper layer before a predetermined timer starts if the timer expires even if there is the lost RLC SDU. Alternatively, the NR RLC may include a function of transferring all the RLC SDUs received until now to the upper layer in order if the predetermined timer expires even if there is the missed RLC SDU. Further, the NR RLC may process the RLC PDUs in the received order (in order of arrival regardless of the order of a serial number and the sequence number), and may transmit the processed RLC PDUs to the PDCP apparatus the out-of-sequence delivery. In the case of the segment, the NR RLC may receive the segments which are stored in the buffer or is to be received later and reconfigure the RLC PDUs into one complete RLC PDU and then transmit the complete RLC PDU to the PDCP apparatus. The NR RLC layer may not include the concatenation function and may perform the function in the NR MAC layer or may be replaced by the multiplexing function of the NR MAC layer.

In this case, the out-of-sequence delivery function of the NR RLC apparatus refers to a function of directly delivering the RLC SDUs received from the lower layer to the upper layer regardless of order. The NR RLC may include a function of reassembling and transferring an original one RLC SDU which is divided into several RLC SDUs and received, and a function of storing and reordering the RLC SN or the PDCP SP of the received RLC PDUs to record the missed RLC PDUs.

The NR MACs 2d-15 and 2d-30 may be connected to several NR RLC layer apparatus configured in one terminal, and the main functions of the NR MAC may include some of the following functions.

Mapping function (Mapping between logical channels and transport channels)
Multiplexing and demultiplexing function (Multiplexing/demultiplexing of MAC SDUs)
Scheduling information reporting function (Scheduling information reporting)
HARQ function (Error correction through HARQ)
Priority handling function between logical channels (Priority handling between logical channels of one UE)
Priority handling function between terminals (Priority handling between UEs by means of dynamic scheduling)
MBMS service identification function (MBMS service identification)
Transport format selection function (Transport format selection)
Padding function (Padding)

The NR PHY layers 2d-20 and 2d-25 may perform an operation of channel-coding and modulating an upper layer data, making the upper layer data as an OFDM symbol and transmitting them to a radio channel, or demodulating and channel-decoding the OFDM symbol received through the radio channel and transmitting the demodulated and channel-decoded OFDM symbol to the upper layer.

Figure 2E:
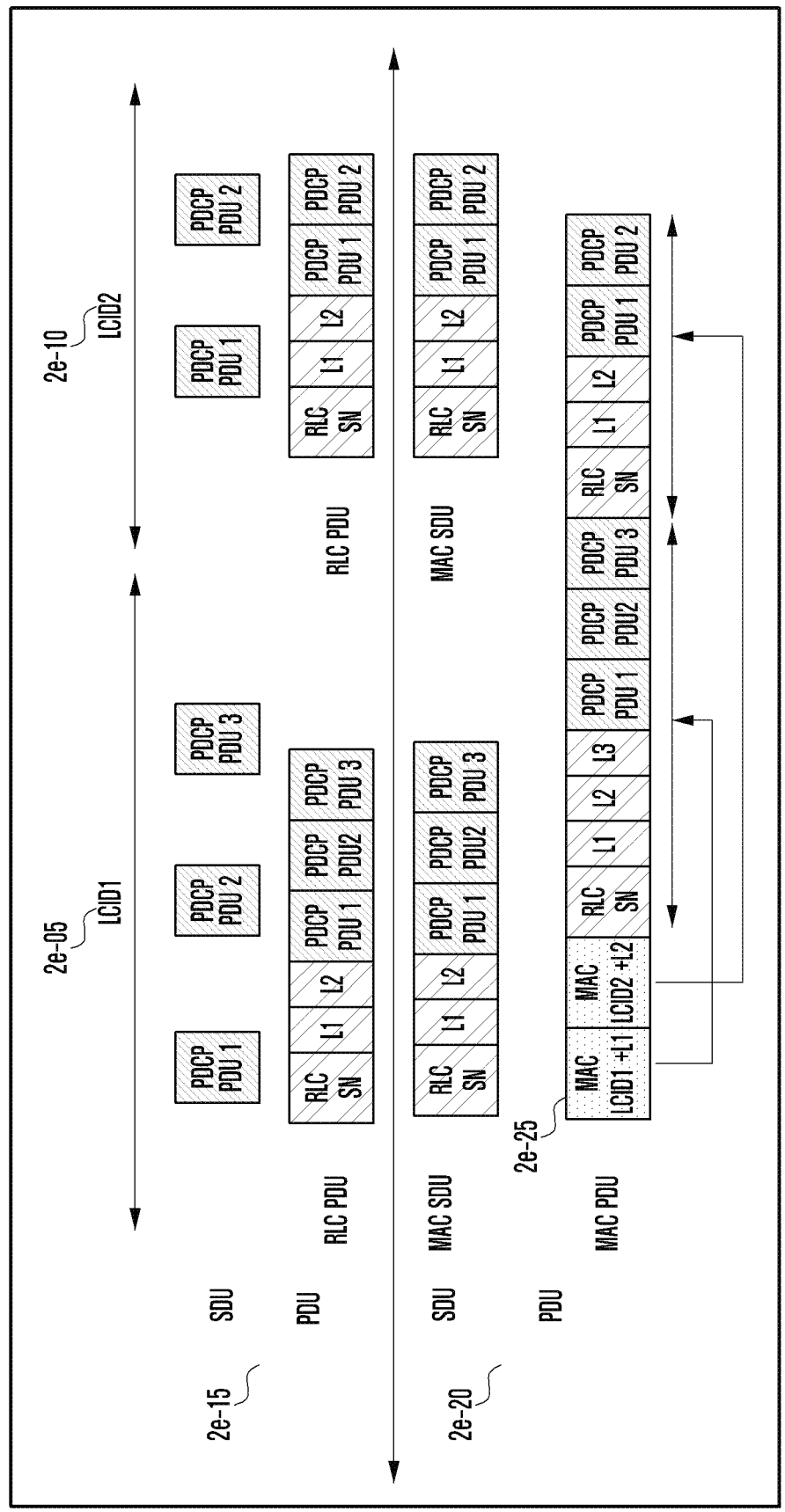
FIGS. 2EA-2EB are diagrams illustrating a structure of processing data in the LTE system.
Figure 2E:
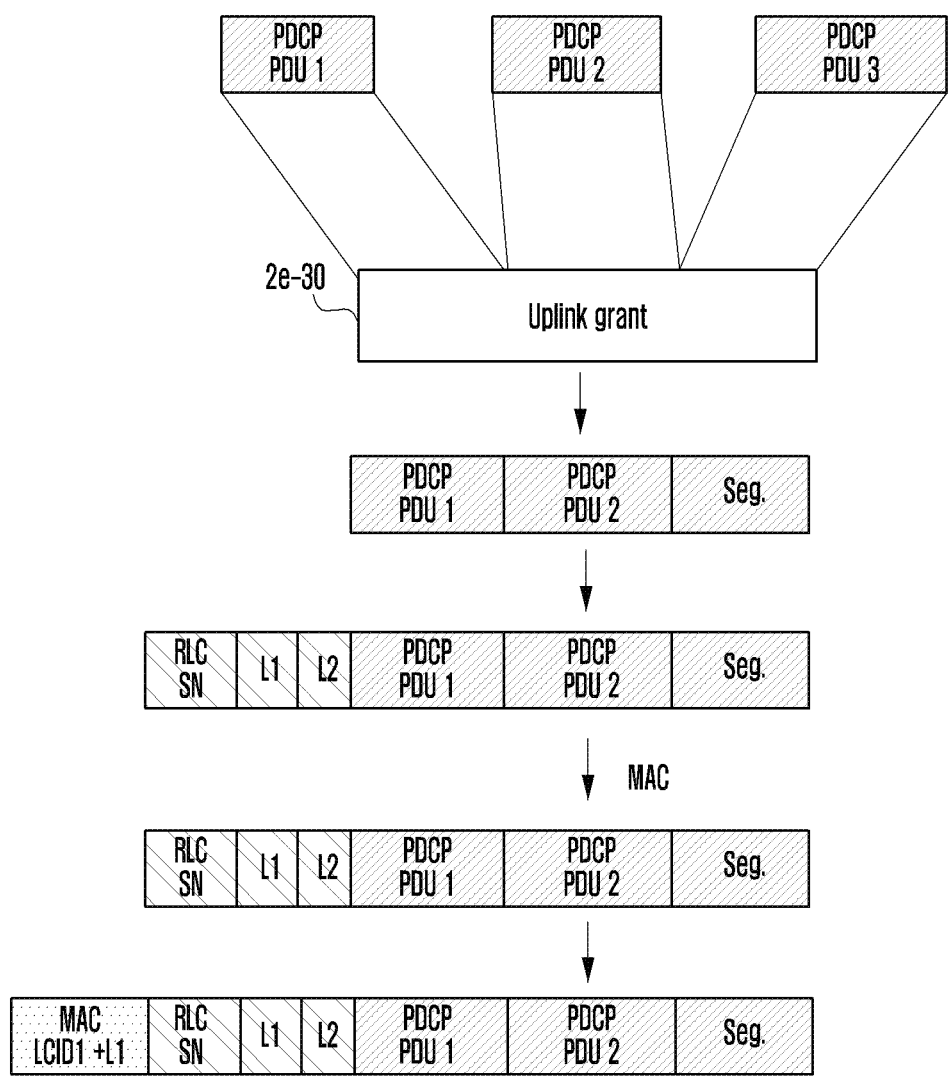

FIGS. 2EA-2EB are diagrams illustrating a structure of processing data in the LTE system.

As shown in FIGS. 2EA-2EB, in the LTE system, the data processing is performed in the PDCP layer and the RLC layer for each logical channel. That is, the logical channel 1 2e-05 and the logical channel 2 2e-10 have different PDCP layers and RLC layers and perform independent data processing. Then, the RLC PDU generated from the RLC layer of each logical channel is transmitted to the MAC layer, which is configured as one MAC PDU, and then transmitted to the receiving end. In the LTE system, the PDCP layer, the RLC layer, and the MAC layer may include the functions described with reference to FIG. 2B, and may perform corresponding operations.

The LTE system may be characterized in that the PDCP PDUs concatenate in the RLC layer and in the MAC PDU structure as shown in 2e-25, all the MAC subheaders are located at the head part and the MAC SDU part is located at the tail part of the MAC PDU. Due to the above characteristics, in the LTE system, the data processing may be performed in advance or prepared in the RLC layer before the uplink transmission resource (uplink grant) is received. If receiving the uplink transmission resource 2e-30 as shown in FIGS. 2EA-2EB, the terminal concatenates the PDCP PDUs received from the PDCP layer according to the uplink transmission resource to generate the RLC PDU. The uplink transmission resources are received from the base station in the MAC layer and then subjected to logical channel prioritization (LCP), and the uplink transmission resources are allocated to each logical channel. That is, the uplink transmission resource 2e-30 is the uplink transmission resource allocated from the MAC layer. If the size of the PDCP PDUs to be concatenated does not match the uplink transmission resource, the RLC layer performs a segmentation procedure to match the PDCP PDUs with the uplink transmission resources. The above procedure may be performed for each logical channel, and each RLC apparatus can configure an RLC header using the concatenated PDCP PDUs and transmit the completed RLC PDU to the MAC apparatus. The MAC apparatus may configure the RLC PDUs (MAC SDUs) received from each RLC layer as one MAC PDU and transmit the MAC PDU to the PHY apparatus. When the RLC apparatus performs a segmentation operation when configuring the RLC header and includes the segmented information in the header, the MAC apparatus may include the length information of each of the concatenated PDCP PDUs in the header (which is to be reassembled at the receiving end).

As described above, in the LTE system, the data processing of the RLC layer, the MAC layer, and the PHY layer starts from the time when the uplink transmission resource is received.

In the LTE system, the RLC layer may operate in an RLC acknowledged mode (AM) mode, an RLC unacknowledged mode (UM) mode, and an RLC transparent mode (TM) mode. In the RLC AM mode, the RLC layer supports the ARQ function, the transmitting end may receive the RLC status report from the receiving end and perform the retransmission on the RLC PDUs that receive the NACK through the status report. Accordingly, reliable data transmission may be achieved without error. Therefore, it is suitable for a service requiring high reliability. On the other hand, the ARQ function is not supported in the RLC UM mode. Therefore, the RLC status report is not received and there is no retransmission function. In the RLC UM mode, when the uplink transmission resource is received, the transmitting end RLC layer concatenates the PDCP PDUs (RLC SDUs) received from the upper layer and transmits the received PDCP PDUs to the lower layer. Therefore, the data can be continuously transmitted without the transmission delay and can be useful for a service sensitive to the transmission delay. In the RLC TM mode, the RLC layer directly transmits the PDCP PDUs received from the upper layer to the lower layer without performing any processing. That is, in the TM mode of the RLC layer, the data from the upper layer is transparently transmitted to the lower layer in the RLC layer. Therefore, it can be useful for transmitting system information, paging message, or the like transmitted on a common channel such as a common control channel (CCCH).

Figure 2F:
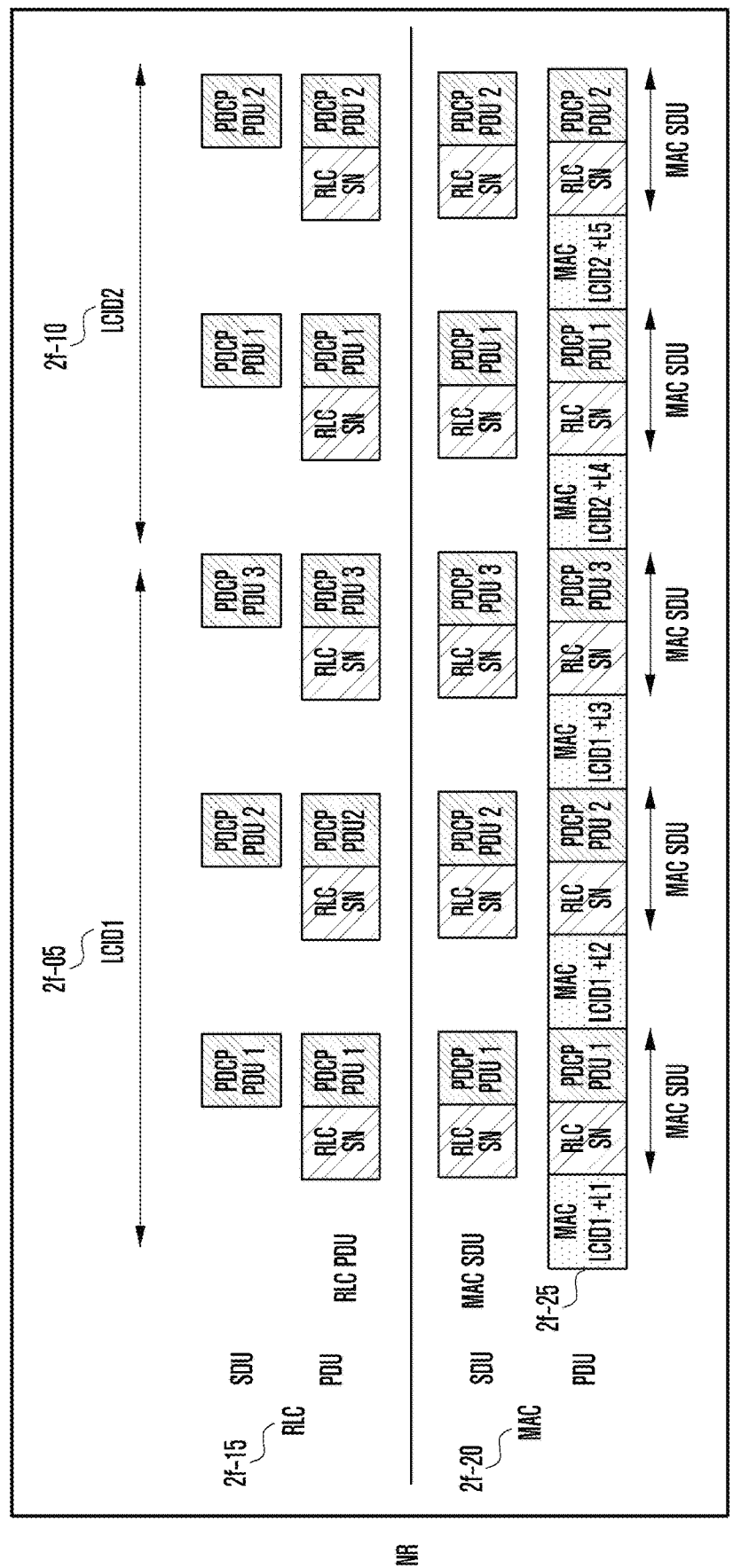
FIGS. 2FA-2FB are diagrams illustrating a structure of processing data in the next generation mobile communication system of the present disclosure.
Figure 2F:
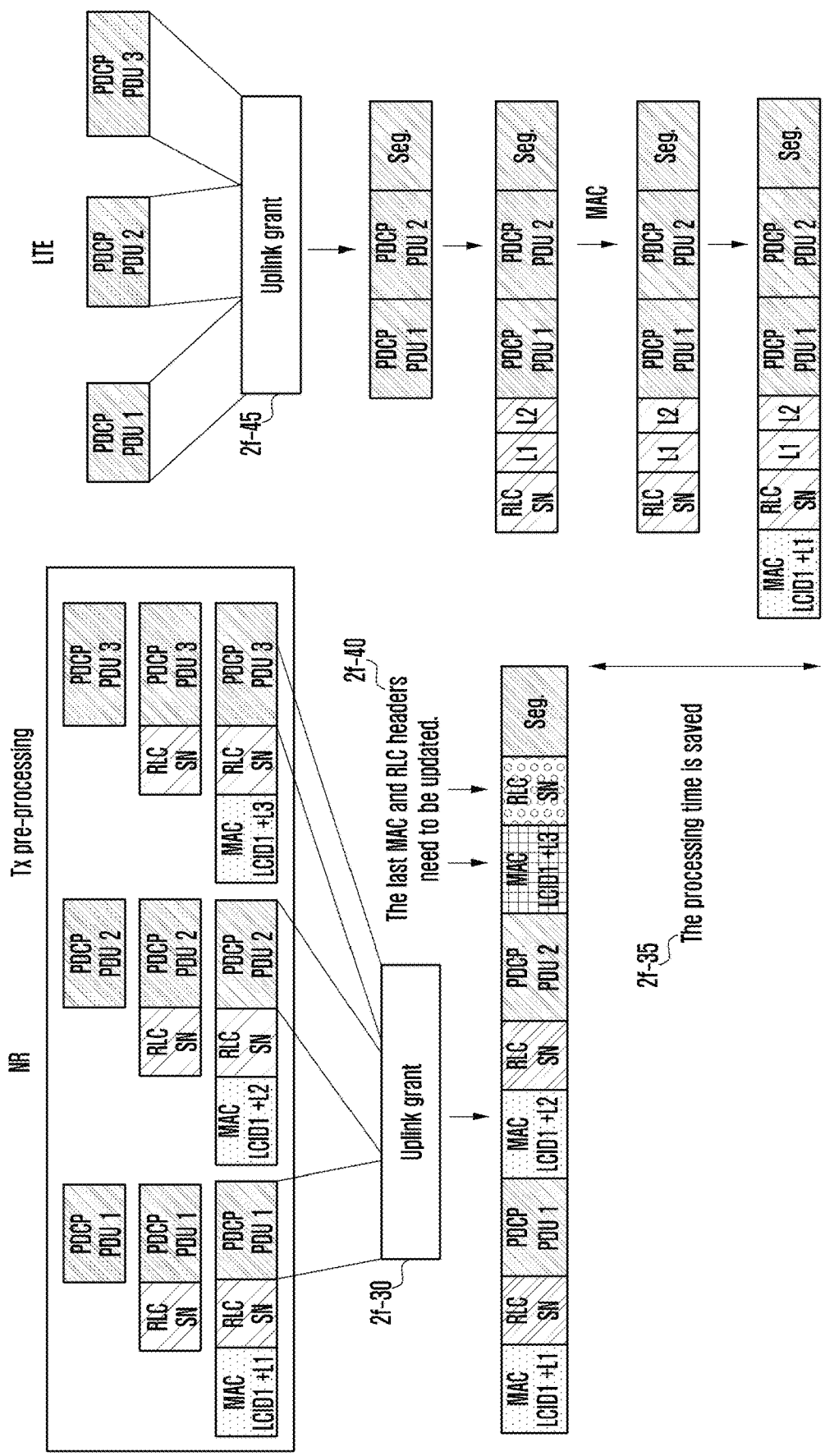

FIGS. 2FA-2FB are diagrams illustrating a structure of processing data in the next generation mobile communication system of the present disclosure.

As shown in FIGS. 2FA-2FB, in the next generation mobile communication system, the data processing is performed in the PDCP layer and the RLC layer for each logical channel. That is, the logical channel 1 2f-05 and the logical channel 2 2f-10 have different PDCP layers and RLC layers and perform independent data processing. Then, the RLC PDU generated from the RLC layer of each logical channel is transmitted to the MAC layer, which is configured as one MAC PDU, and then transmitted to the receiving end. In the LTE system, the PDCP layer, the RLC layer, and the MAC layer may include the functions described with reference to FIG. 2D, and may perform corresponding operations.

The next generation mobile communication system may be characterized in that the PDCP PDUs concatenate in the RLC layer and in the MAC PDU structure as shown in 2e-25, the MAC subheaders have for each MAC SDU, that is, are repeated in units of the MAC sub-header and the MAC SDU. Therefore, in the next generation mobile communication system, as shown in 2f-30, the data may be pre-processed in advance before receiving the uplink transmission resource. That is, if the terminal receives an IP packet from the PDCP layer before receiving the UL grant, the terminal may perform the PDCP processing (ciphering, integrity protection, or the like) on the IP packet, generate a PDCP header to generate the PDCP PDU, and transmit the PDCP PDU to the RLC layer to configure the RLC header, and transmit the RLC PDU to the MAC layer to configure the MAC subheader and the MAC SDU in advance.

If the terminal receives the uplink transmission resource 2f-30, the terminal may configure the MAC PDU by fetching the MAC subheaders and the MAC SDUs corresponding to the size of the uplink transmission resource, and if the uplink transmission resource is not sufficient, the segmentation operation may be performed to fully fill and efficiently use the transmission resources. Then, the corresponding RLC header (segmented information or length information) and MAC header (since the L field and length are changed) can be updated (2f-40). Therefore, assuming that the NR system receives the uplink transmission resources at the same time points 2f-30 and 2f-45 as compared with the LTE system, the next generation mobile communication system may have a large gain in a processing time like 2f-35. The RLC layer and the PDCP layer may use a common serial number if necessary or when configured by a network.

The pre-processing operation may be performed for each logical channel, and the RLC PDUs pre-processed for each logical channel may be pre-processed to MAC SDUs and MAC subheaders in the MAC layer. In addition, if the MAC layer receives the uplink transmission resource (2f-30), the terminal may allocate the uplink transmission grant to each logical channel and multiplex the MAC SDUs and MAC sub-headers generated in advance. After receiving the uplink transmission resource from the base station, the terminal performs the logical channel prioritization (LCP) in the MAC layer, and allocates the uplink transmission resources to each logical channel. The terminal multiplexes the MAC SDUs and the MAC subheaders generated for each logical channel to form one MAC PDU and transmits the MAC PDU to the PHY layer. If the uplink transmission resources allocated to each logical channel are insufficient, the terminal may perform the segmentation request to the RLC layer and if the segmentation operation is performed in the RLC layer, the terminal includes the segmented information in the header and updates the segmented information and transmits the segmented information to the MAC layer again, in which the MAC layer may update the MAC header corresponding thereto. That is, the next generation mobile communication system starts the data processing of the PDCP layer, the RLC layer, and the MAC layer starts before receiving the uplink transmission resource.

Since the next generation mobile communication system has the above-mentioned structure, several RLC PDUs may enter one MAC PDU. Since there is a concatenation function in the RLC layer in the LTE system, a plurality of PDCP PDUs are concatenated to form one RLC PDU, which is in turn transmitted to the MAC layer. Therefore, one MAC PDU usually includes RLC PDUs corresponding to the number of logical channels (in the LTE system, the number of logical channels is generally about 2 to 4). However, in the next generation mobile communication system, one PDCP PDU is generated as one RLC PDU since there is no RLC concatenation function in the RLC layer. Therefore, the RLC PDUs may be included in one MAC PDU by the number obtained by multiplying the IP packet (PDCP SDU) by the number of logical channels. In a simple arithmetic calculation, at most four RLC PDUs may be included in one MAC PDU in the LTE system, while in the next generation mobile communication system, more than 500 RLC PDUs may be included in one MAC PDU. Therefore, in the next generation mobile communication system, if one MAC PDU is missed, it is necessary to retransmit several hundred RLC PDUs.

By the way, in the LTE system, when the missed RLC PDUs are reported to the transmitting end, a serial number of the missed RLC PDUs is transmitted by being included in the RLC status report one by one. Therefore, if RLC PDUs having a serial number of 500 are missed, a large overhead is used because 500 RLC serial numbers should be transmitted by being included in the RLC status report, and the transmitting end requires a lot of processing time to interpret them.

Therefore, the present disclosure proposes a method of reporting an RLC status suitable for a next generation mobile communication system. The core idea of the present disclosure is characterized in that the missed region is indicated and reported for the RLC PDUs consecutively missed. For example, if Nos. 400 to 700 are missed, it may be transmitted to the transmitting end that up to No. 399 may be received well and up to 300 numbers starting from No. 400 are missed.

FIG. 2G is a diagram illustrating a first method of reporting an RLC status according to the present disclosure.

FIG. 2G is a diagram illustrating an example of an RLC status report transmitted from a receiving side RLC layer apparatus to a transmitting side RLC layer apparatus according to the first method of reporting an RLC status according to the present disclosure (assuming a 12-bit RLC SN length, 16-bit SO start and SOend). In this case, the RLC SN length, the SOstart and the SOend length may be changed and replaced with a predetermined length.

The receiving side RLC layer device stores the received RLC PDUs in the receiving buffer and then checks the serial number to recognize the serial number of the RLC PDU missed during the transmission. If the predetermined condition is satisfied, the receiving side RLC layer apparatus generates an RLC status report message and transmits the generated RLC status report message to the transmitting side RLC layer apparatus. The predetermined condition may be a case where polling is received from the transmitting side RLC layer device, that is, the poll bit is set to be '1' in the RLC header of the received RLC PDU. The RLC status report message includes information on the RLC PDU reception state of the receiving side RLC layer apparatus, and the transmitting side RLC layer apparatus identifies the RLC PDU successfully transmitted and the RLC PDU failed to transmit, through the RLC status report message. The RLC status report message may be written like 2g-05 in FIG. 2G. The RLC status report message includes one ACK_SN or one ACK_SN and one or more NACK. The presence of NACK_SN is indicated by an E1 field. The E1 field indicates whether one NACK_SN, an E1 field, and an E2 field follow, and the E2 field indicates whether or not SOstart and SOend fields indicating a part of the NACK_SN follow. The ACK_SN field includes the serial number subsequent to the highest serial number among the serial numbers of RLC PDUs successfully received so far and the NACK_SN includes the serial numbers of the RLC PDUs that have not been received. For example, the transmitting side RLC layer apparatus transmits RLC PDU [7] to RLC PDU [10] at any time, and the receiving side RLC layer apparatus receives only RLC PDU [7] and RLC PDU [9] and stores the received RLC PDU [7] and RLC PDU [9] in the receiving buffer. If the RLC status report message generation condition is satisfied at any time, the receiving side RLC layer apparatus generates the RLC status report message. A serial number 10 is included in the ACK_SN field of the RLC status report message, and a serial number 8 is included in the NACK_SN field. The transmitting side RLC layer apparatus receiving the RLC status report message determines that the RLC PDU having a serial number lower than the lowest NACK_SN, that is, the RLC PDUs having a serial number lower than 7 is successfully transmitted and discards it in a retransmitting buffer. In addition, PDCP SDUs mapped to the RLC PDUs having a serial number lower than 7 among the PDCP SDUs stored in the transmission buffer is also discarded. The transmitting side RLC layer apparatus retransmits the RLC PDU [8] reporting that the receiving side RLC layer apparatus has not received.

The RLC layer apparatus transmits the RLC PDU with the serial number, and checks whether the transmitted RLC PDU succeeds based on the RLC status report message and retransmits the RLC PDU, thereby ensuring reliable transmission/reception.

By receiving a general RLC status report message, the transmitting side RLC layer apparatus acquires the following two pieces of information.

Identify RLC PDU failing to transmit
Identify RLC PDU failing to transmit

The transmitting side RLC layer apparatus is recognized which RLC PDU to retransmit in the future by identifying the RLC PDU failing to transmit, and it determines which RLC PDU or PDCP SDU of RLC PDUs or PDCP SDUs stored in the retransmission buffer and the transmission buffer is discarded.

The fields applied to the first method of reporting an RLC status according to the present disclosure are as follows.

The D/C field has a length of 1 bit and indicates whether the RLC PDU is an RLC data PDU or an RLC control PDU. (Table 1-16).

TABLE 1

| D/C field value | Description |
| --- | --- |
| 0 | Control PDU |
| 1 | Data PDU |

The CPT field has a length of 3 bit and indicates a kind of RLC control PDU. (Table 1-9).

TABLE 2

| CPT field value | Description |
| --- | --- |
| 000 | STATUS PDU |
| 001-111 | Reserved (PDUs with this coding will be discarded by the receiving entity for this release of the protocol) |

ACK_SN indicates the next serial number of the RLC PDU that has not yet been received and a serial number that is not reported as missed in the RLC status report. When the transmitting end receives the RLC status report, the transmitting end is determined that the serial number indicated by the ACK_SN and the serial number indicated by the NACK_SN are excluded, and a serial number smaller than ACK_SN has been received successfully (when the NACK_SN is indicated together with the SOstart and the SOend, it is determined that the SOstart and the SOend successfully receive only a part other than the part indicated by the NACK_SN). The ACK_SN has a predetermined length, and the predetermined length can be variously defined such as 10 bits, 16 bits, and 18 bits.

The E1 field has a length of 1 bit and indicates whether or not the NACK_SN, the E1 field, and the E2 field follow.

TABLE 3

| E1 field value | Description |
| --- | --- |
| 0 | A set of NACK_SN, E1 and E2 does not follow. |
| 1 | A set of NACK_SN, E1 and E2 follows. |

NACK_SN indicates the serial number of the missed RLC PDU, and may indicate a part of the missed RLC PDU together with SOstart and SOend. The NACK_SN has a predetermined length, and the predetermined length can be variously defined such as 10 bits, 16 bits, or 18 bits.

The E2 field has a length of 1 bit and indicates whether the SOstart and the SOend follow. (Table 1-19).

TABLE 4

| E2 field value | Description |
| --- | --- |
| 0 | A set of SOstart and SOend does not follow for this NACK_SN. |
| 1 | A set of SOstart and SOend follows for this NACK_SN. |

The SOstart field indicates a head location of the part when indicating a part of the NACK_SN. When the head location is indicated, it may be indicated by units of byte. The SOstart has a predetermined length, and the predetermined length can be variously defined such as 15 bits, 16 bits, and 18 bits.

The SOend field indicates a tail location of the part when indicating a part of the NACK_SN. When the tail location is indicated, it may be indicated by a byte unit. The SOend has a predetermined length, and the predetermined length can be variously defined such as 15 bits, 16 bits, and 18 bits.

In order to apply the method for reporting a first RLC status described above, a format such as 2g-05 may be used. In order to facilitate processing in units of bytes, a reservation field such as 2g-10 is used or added so that the RLC status report format can be uniformly generated in units of bytes. Although the length of the RLC serial number and the length of the SOstart and the SOend are set to be different lengths, the RLC status report format may be configured in units of byte by setting (using and adding) the reserved field. That is, when the RLC status report is transmitted, the transmitting end RLC layer generates the RLC status report in units of byte, and the receiving end may quickly read and analyze the RLC status report in units of byte.

Figure 2H:
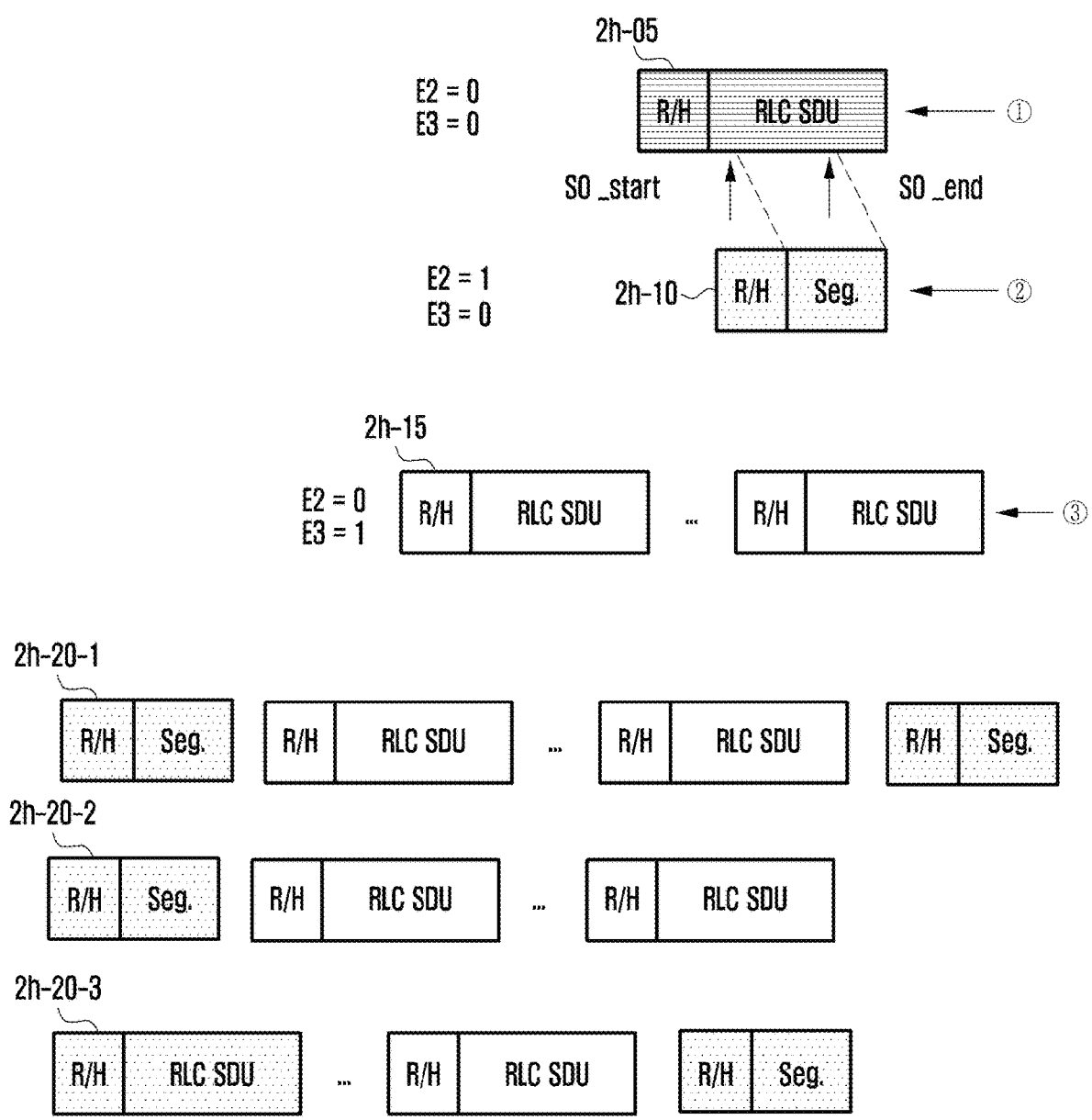
FIGS. 2HA-2HB are diagrams illustrating a second method of reporting an RLC status according to the present disclosure.
Figure 2H:
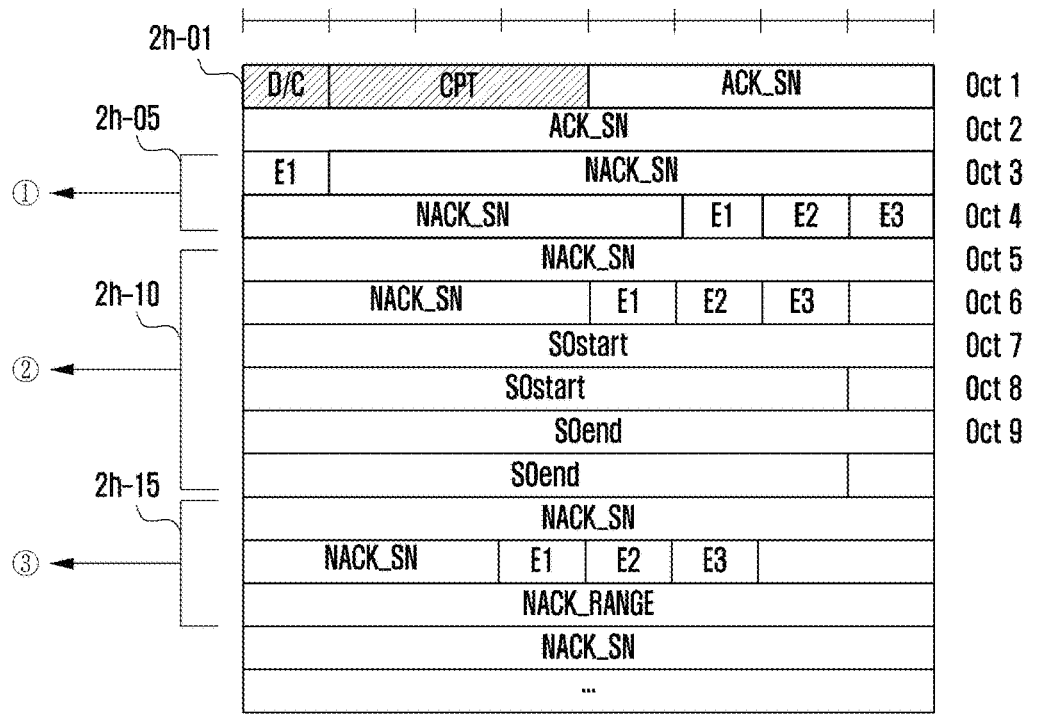
Figure 2H:
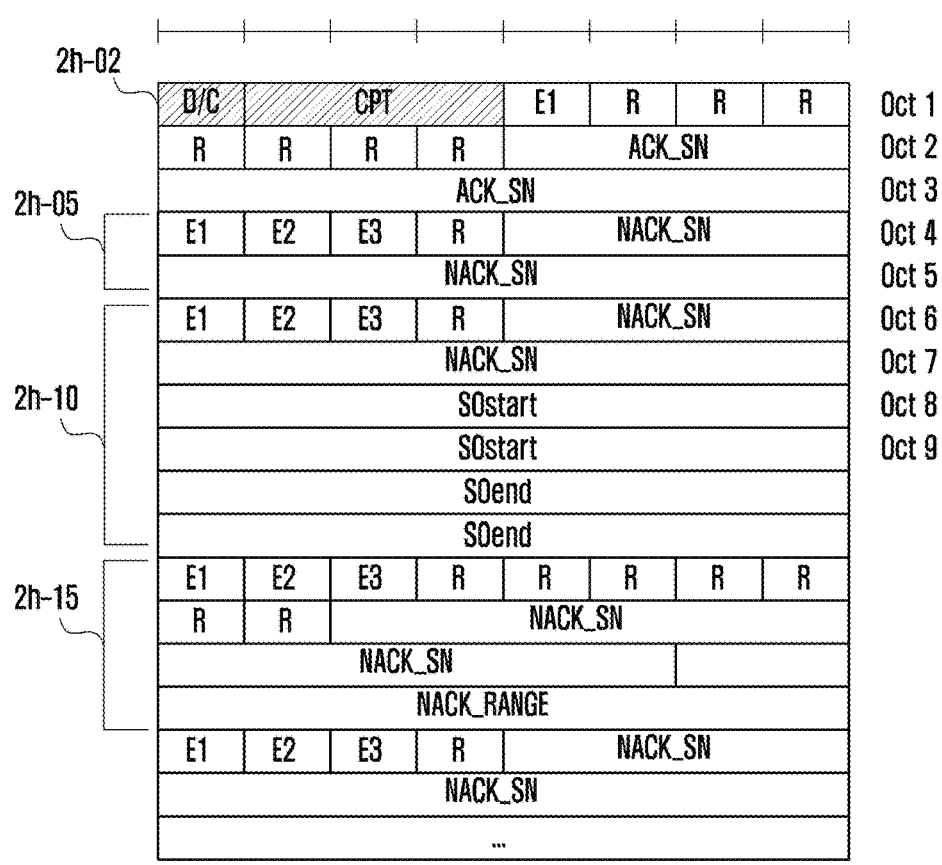

FIGS. 2HA-2HB are diagrams illustrating a second method of reporting an RLC status according to the present disclosure.

FIGS. 2HA-2HB are diagrams illustrating an example of an RLC status report transmitted from a receiving side RLC layer apparatus to a transmitting side RLC layer apparatus according to the second method of reporting an RLC status according to the present disclosure (assuming a 12-bit RLC SN length, 16-bit SO start and SOend).

The receiving side RLC layer device stores the received RLC PDUs in the receiving buffer and then checks the serial number to recognize the serial number of the RLC PDU missed during the transmission. If the predetermined condition is satisfied, the receiving side RLC layer apparatus generates an RLC status report message and transmits the generated RLC status report message to the transmitting side RLC layer apparatus. The predetermined condition may be a case where polling is received from the transmitting side RLC layer device, that is, the poll bit is set to be '1' in the RLC header of the received RLC PDU. The RLC status report message includes information on the RLC PDU reception state of the receiving side RLC layer apparatus, and the transmitting side RLC layer apparatus identifies the RLC PDU successfully transmitted and the RLC PDU failed to transmit, through the RLC status report message. The RLC status report message may be written like 2h-05 in FIGS. 2HA-2HB. The RLC status report message includes one ACK_SN or a set of one ACK_SN and one or more NACK_SN, E1, E2, and E3 fields. It is indicated by the E1 field whether there are the set of NACK_SN, E1, E2, and E3 fields. The E1 field indicates whether a set of one NACK_SN field, the E1 field, the E2 field, and the E3 field follow, and the E2 field indicates whether or not SOstart and SOend fields indicating a part of the NACK_SN follow. The E3 field indicates whether there are NACK_RANGE (number of missing RLC PDUs) fields indicating how many serial numbers above (larger) or below (smaller) from the serial number indicated by the NACK_SN are missed. The NACK_RANGE field is a field indicating how many serial numbers above (having larger serial number) or below (having smaller serial number) from the serial number indicated by the NACK_SN are missed.

The ACK_SN field may include the serial number sequent to the highest sequence number among the serial numbers of RLC PDUs that have successfully received so far and the NACK_SN may include the serial number that has not successfully received so far. When a plurality of consecutive RLC PDUs are missed, the highest sequence number that has not been received so far or the lowest serial number that has not been received so far can be included in the NACK_SN in order to use NACK_SN together with the NACK_RANGE field, and the N field may include the number of missed serial numbers. The NACK_SN and NACK_RANGE fields may be defined and applied by various other methods to indicate a number of RLC PDUs that have been missed consecutively.

The missing of RLC PDUs can occur in a variety of ways.

First, individual RLC PDUs may be missed. That is, it may be necessary to indicate the serial number of the missed independent RLC PDU (2h-05). The individual RLC PDUs indicate the RLC serial number of the individual RLC PDU as the NACK_SN like 2h-10, and set E1 to 1 to indicate another missed packet behind. Since there is no need to indicate segment, E2 is set to be 0, and since there is no need to indicate the regions for several missed RLC PDUs, E3 may be set to be 0 to indicate that the individual RLC PDU has been missed like 2h-05.

Second, segments of individual RLC PDUs may be missed. That is, it may be necessary to indicate the serial number of the missed independent RLC PDU segment (2h-10). In this case, the segments of the RLC PDUs individually indicate the RLC serial numbers of the individual RLC PDUs as the NACK_SN like 2h-10, and E2 is set to be 1 to indicate the segment to indicate that the SOstart field and the SOend field follow and uses the SOstart Field and the SOend field to indicate the segment location of the corresponding RLC PDU. In order to indicate another missed packet behind, E1 is set to be 1, and since the regions for the plurality of missed RLC PDUs are not indicated, E3 may be set to be 0 to indicate the segments of the individual RLC PDUs are missed like 2h-10.

Third, a number of consecutive RLC PDUs may be missed at once. That is, it may be necessary to indicate a number of consecutive RLC PDUs at once (2h-15). A number of consecutive RLC PDUs indicate, by the NACK_SN, RLC serial numbers of an individual RLC PDU corresponding to the lowest serial number or the highest serial number like 2h-15, and in order to indicate regions for a number of RLC PDUs consecutively missed, E3 may be set to be 1 to indicate that the NACK_RANGE field follows and indicate the regions for the corresponding consecutive RLC PDUs using the NACK_RANGE field. In this case, the NACK_RANGE field may indicate how many the consecutive NACK_SNs have been missed. Then, to indicate another missed packet, E1 may be set to be 1. Since there is no need to indicate the segment, E2 may be set to be 0 to indicate that the plurality of RLC PDUs are missed consecutively like 2h-15.

Fourth, the last segment of one RLC PDU, a number of RLC PDUs consecutive thereafter, and a first segment of one RLC PDU consecutive thereafter may be missed at once (2h-20-1). In this case, a last segment of one RLC PDU, a number of RLC PDUs consecutive thereafter, and a first segment of one RLC PDU consecutive thereafter indicate the first and last segments in the same manner as 2h-10 and a number of consecutive RLC PDUs are indicated in the same manner as 2h-15, which may be reported to the transmitting end.

Fifth, the last segment of one RLC PDU and a number of RLC PDUs consecutive thereafter may be missed at once (2h-20-2). In this case, the last segment of one RLC PDU and a number of RLC PDUs consecutive thereafter indicate the first segment in the same manner as 2h-10 and a number of consecutive RLC PDUs are indicated in the same manner as 2h-15, which may be reported to the transmitting end.

Sixth, a number of consecutive RLC PDUs and the first segment of a number of RLC PDUs consecutive thereafter may be missed at once (2h-20-3). In this case, a number of consecutive RLC PDUs and a first segment of one RLC PDU consecutive thereafter indicate the last segment in the same manner as 2h-10 and a number of consecutive RLC PDUs are indicated in the same manner as 2h-15, which may be reported to the transmitting end.

In order to apply the second method for reporting an RLC status described above, a format such as 2h-01 may be used. In order to facilitate processing in units of bytes, a reservation field such as 2h-02 is used or added so that the RLC status report format can be uniformly generated in units of bytes. Although the length of the RLC serial number and the length of the SOstart and the SOend are set to be different lengths, the RLC status report format may be configured in units of byte by setting (using and adding) the reserved field. That is, when the RLC status report is transmitted, the transmitting end RLC layer generates the RLC status report in units of byte, and the receiving end may quickly read and analyze the RLC status report in units of byte.

When the RLC status report is performed at the receiving end, if the transmission resources are insufficient, it may not include all the report information to be indicated as 2h-05, 2h-10, and 2h-15. Therefore, if the transmission resources are insufficient, a method of indicating a larger number of missed RLC PDUs with the same transmission resource should be used first to perform a report. That is, if the 2h-15 method may be applied to the RLC PDUs that should be reported to be missed, the 2h-15 method is firstly applied to perform the report, followed by the 2h-05 method, and then the 2h-10 method can be applied to perform the report.

As an example of the application method in an embodiment, the receiving end RLC apparatus may request the retransmission to the transmitting end RLC apparatus since the RLC PDUs corresponding to all the serial numbers between 2<serial number≤8 as NACK_SN=8, N=6 are missed. As another example, the transmitting side RLC layer apparatus transmits RLC PDU [5] to RLC PDU [80] at any time, and the receiving side RLC layer apparatus receives only RLC PDU [5], RLC PDU [78], RLC PDU [79], and RLC PDU [80] and stores the received RLC PDU [5], RLC PDU [78], RLC PDU [79], and RLC PDU [80] in the receiving buffer. If the RLC status report message generation condition is satisfied at any time, the receiving side RLC layer apparatus generates the RLC status report message. The ACK_SN field of the RLC status report message may include the serial number 81, the NACK_SN field may include the serial number 6, and another NACK_SN field may include 69 in the N field together with the serial number 8 (6, serial number≤77). The transmitting side RLC layer apparatus receiving the RLC status report message determines that the RLC PDU having a serial number lower than the lowest NACK_SN, that is, the RLC PDUs having a serial number lower than 6 is successfully transmitted and discards it in a retransmitting buffer. In addition, PDCP SDUs mapped to the RLC PDUs having a serial number lower than 6 among the PDCP SDUs stored in the transmission buffer is also discarded. The transmitting side RLC layer apparatus retransmits the RLC PDU [6] to RLC PDU [8] to RLC PDU [77] reporting that the receiving side RLC layer apparatus has not received.

The RLC layer apparatus transmits the RLC PDU with the serial number, and checks whether the transmitted RLC PDU succeeds based on the RLC status report message and retransmits the RLC PDU, thereby ensuring reliable transmission/reception.

By receiving a general RLC status report message, the transmitting side RLC layer apparatus acquires the following two pieces of information largely.
Identify RLC PDU failing to transmit
Identify RLC PDU failing to transmit
The transmitting side RLC layer apparatus is recognized which RLC PDU to retransmit in the future by identifying the RLC PDU failing to transmit, and it determines which RLC PDU or PDCP SDU of RLC PDUs or PDCP SDUs stored in the retransmission buffer and the transmission buffer is discarded.

The fields applied to the second method of reporting an RLC status according to the present disclosure are as follows.

The D/C field has a length of 1 bit and indicates whether the RLC PDU is an RLC data PDU or an RLC control PDU. (Table 1-16).

TABLE 5

| D/C field value | Description |
| --- | --- |
| 0 | Control PDU |
| 1 | Data PDU |

The CPT field has a length of 3 bit and indicates a kind of RLC control PDU. (Table 1-9).

TABLE 6

| CPT field value | Description |
| --- | --- |
| 000 | STATUS PDU |
| 001-111 | Reserved (PDUs with this coding will be discarded by the receiving entity for this release of the protocol) |

ACK_SN indicates the next serial number of the RLC PDU that has not yet been received and a serial number that is not reported as missed in the RLC status report. When the transmitting end receives the RLC status report, the transmitting end determined that the serial number indicated by the ACK_SN and the serial numbers included in the ranged indicated by the NACK_SN and the NACK_RANGE field are excluded, and a serial number smaller than ACK_SN has been received successfully (when the NACK_SN is indicated the SOstart and the SOend together, it is determined that the SOstart and the SOend successfully receive only a part other than the part indicated by the NACK_SN). The ACK_SN has a predetermined length, and the predetermined length can be variously defined such as 12 bits, 16 bits, and 18 bits.

The E1 field has a length of 1 bit and indicates whether or not the NACK_SN, the E1 field, the E2 field, and the E3 field follow.

TABLE 7

| E1 field value | Description |
| --- | --- |
| 0 | A set of NACK_SN, E1, E2, and E3 does not follow. |
| 1 | A set of NACK_SN, E1, E2, and E3 follows. |

The NACK_SN may include the serial number that has not received so far. When a plurality of consecutive RLC PDUs are missed, the highest sequence number that has not been received so far or the lowest serial number that has not been received so far can be included in the NACK_SN in order to use NACK_SN together with the NACK_RANGE field, and the N field may include the number of missed serial numbers. The NACK_SN and NACK_RANGE fields may be defined and applied by various other methods to indicate a number of RLC PDUs that have been missed consecutively. The NACK_SN has a predetermined length, and the predetermined length can be variously defined such as 12 bits, 16 bits, or 18 bits.

The NACK_RANGE field is a field indicating how many serial numbers above (having larger serial number) or below (having smaller serial number) from the serial number indicated by the NACK_SN are missed.

The E2 field has a length of 1 bit and indicates whether the SOstart and the SOend follow. (Table 1-19).

TABLE 8

| E2 field value | Description |
|---|---|
| 0 | A set of SOstart and SOend does not follow for this NACK_SN. |
| 1 | A set of SOstart and SOend follow for this NACK_SN. |

The SOstart field indicates a head location of the part when indicating a part of the NACK_SN. When the head location is indicated, it may be indicated by units of byte. The SOstart has a predetermined length, and the predetermined length can be variously defined such as 15 bits, 16 bits, and 18 bits.

The SOend field indicates a tail location of the part when indicating a part of the NACK_SN. When the tail location is indicated, it may be indicated by a byte unit. The SOend has a predetermined length, and the predetermined length can be variously defined such as 15 bits, 16 bits, and 18 bits.

The E3 field indicates whether there are NACK_RANGE (number of missing RLC PDUs) fields indicating how many serial numbers above (larger) or below (smaller) from the serial number indicated by the NACK_SN are missed.

TABLE 9

| E3 field value | Description |
|---|---|
| 0 | NACK_RANGE does not follow for this NACK_SN. |
| 1 | NACK_RANGE follows for this NACK_SN. |

Figure 2I:
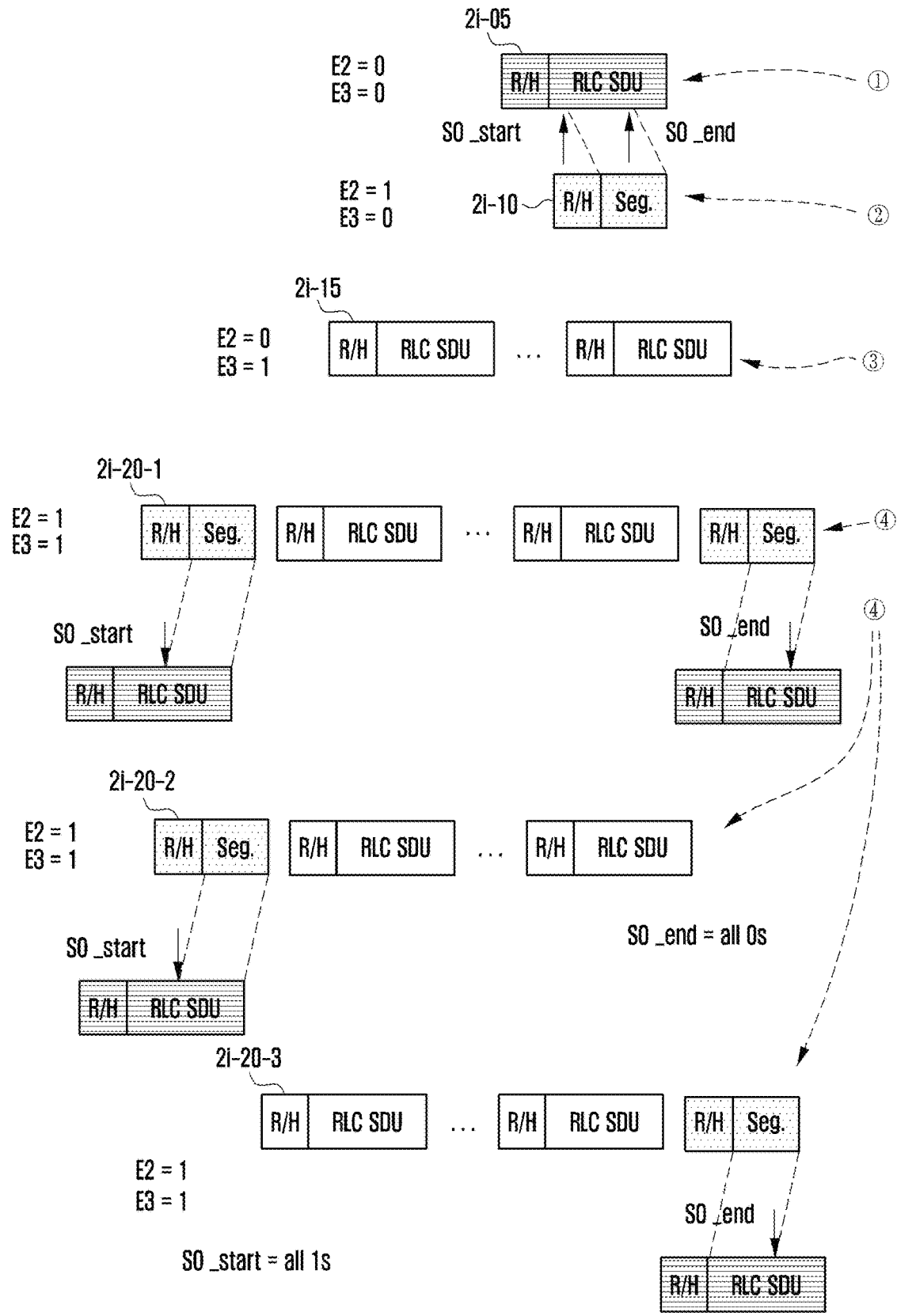
FIGS. 2IA-2IC are diagrams illustrating a third method of reporting an RLC status according to the present disclosure.
Figure 2I:
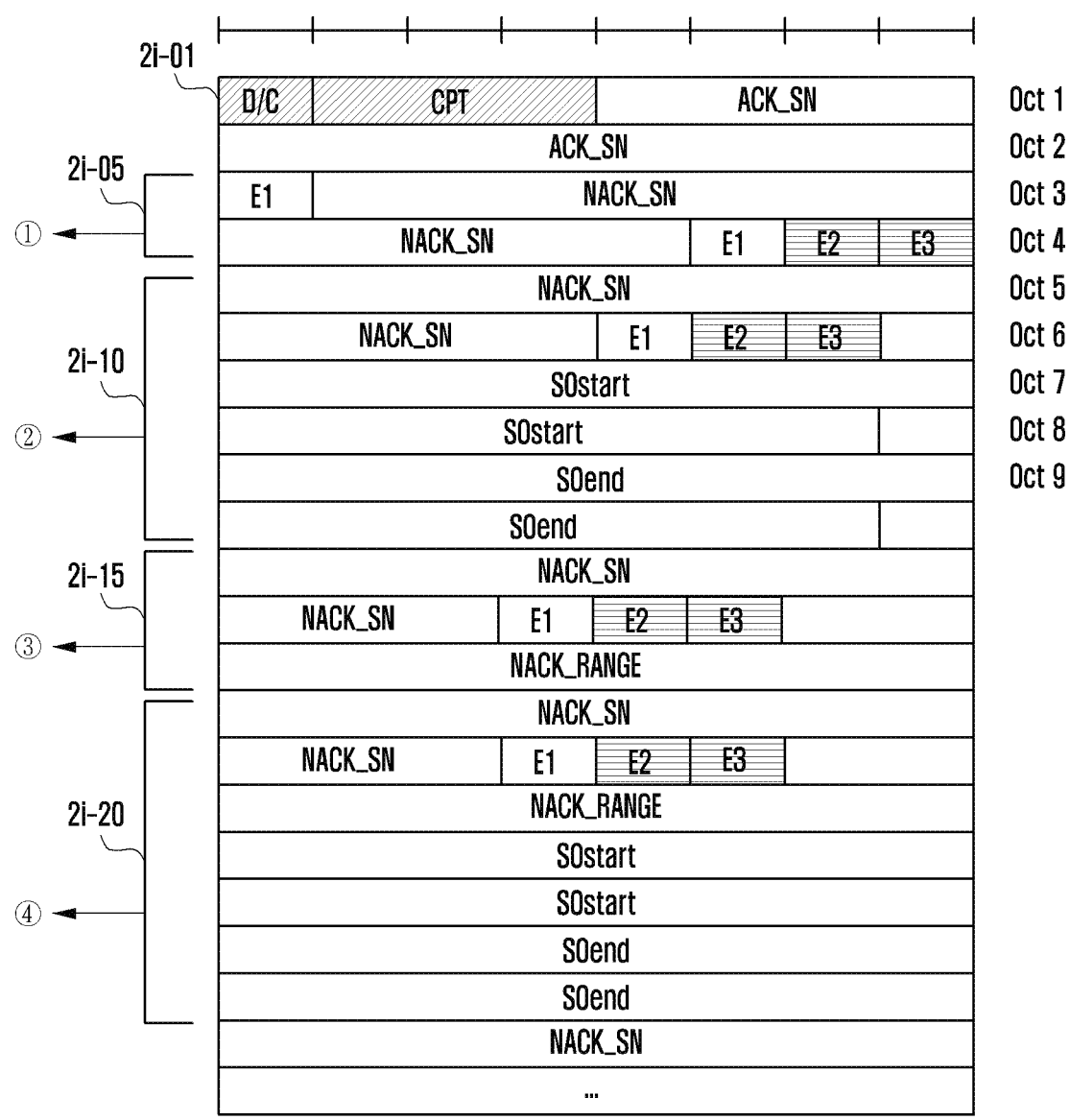
Figure 2I:
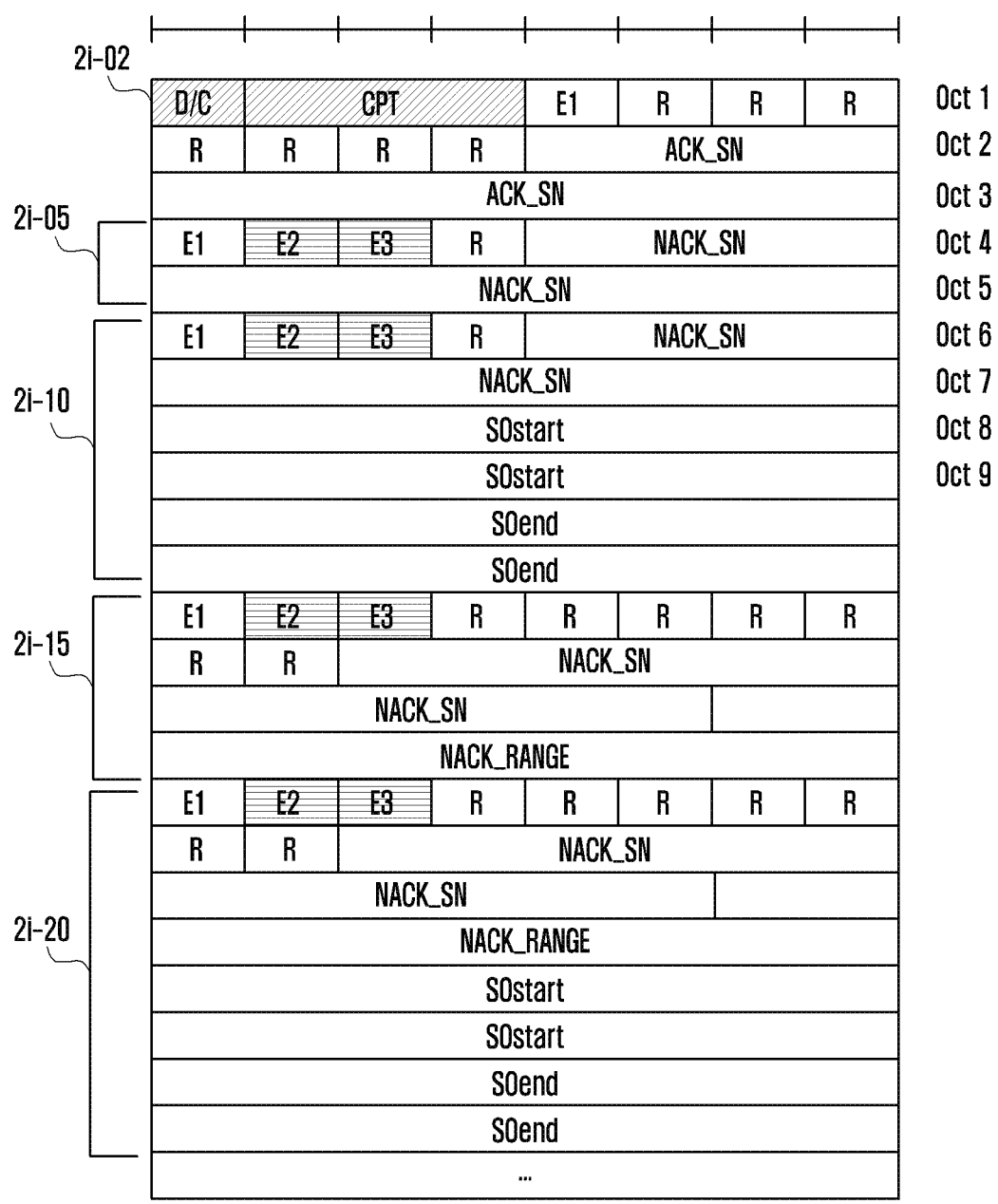

FIGS. 2IA-2IC are diagrams illustrating a third method of reporting an RLC status according to the present disclosure.

FIGS. 2IA-2IC are diagrams illustrating an example of an RLC status report transmitted from a receiving side RLC layer apparatus to a transmitting side RLC layer apparatus according to the third method of reporting an RLC status according to the present disclosure (assuming a 12-bit RLC SN length, 16-bit SO start and SOend). The third method for reporting an RLC status additionally proposes and applies a method that can reduce the overhead over the second method for reporting an RLC status.

The receiving side RLC layer device stores the received RLC PDUs in the receiving buffer and then checks the serial number to recognize the serial number of the RLC PDU missed during the transmission. If the predetermined condition is satisfied, the receiving side RLC layer apparatus generates an RLC status report message and transmits the generated RLC status report message to the transmitting side RLC layer apparatus. The predetermined condition may be a case where polling is received from the transmitting side RLC layer device, that is, the poll bit is set to be '1' in the RLC header of the received RLC PDU. The RLC status report message includes information on the RLC PDU reception state of the receiving side RLC layer apparatus, and the transmitting side RLC layer apparatus identifies the RLC PDU successfully transmitted and the RLC PDU failed to transmit, through the RLC status report message. The RLC status report message may be written like 2i-01 in FIGS. 2IA-2IC. The RLC status report message includes one ACK_SN or a set of one ACK_SN and one or more NACK_SN, E1, E2, and E3 fields. It is indicated by the E1 field whether there are the set of NACK_SN, E1, E2, and E3 fields. The E1 field indicates whether a set of one NACK_SN field, the E1 field, the E2 field, and the E3 field follow, and the E2 field indicates whether or not SOstart and SOend fields indicating a part of the NACK_SN follow when the E3 field indicates that the NACK_RANGE field does not follow to indicate only one NACK_SN. However, if the E2 field indicates whether the SOstart field and the SOend field indicating the segment information on the head part and the tail part of the NACK_RANGE follow when the E3 field indicates that the NACK_RANGE field follows. In this case, it can be promised that if the E2 field indicates that the SOstart field and the SOend field follow and the E3 field indicates that the NACK_RANGE field exists, the NACK_RANGE field follows just after the NACK_SN and the SO field and the SOend field follow thereafter. If the E3 field indicates that the NACK_RANGE field follows and the E2 field indicates that the SOstart field and the SOend field follow, the SOstart field and the SOend field may indicate information different from the information indicating the NACK_SN when there is no NACK_RANGE. That is, the SOstart field is information indicating whether in the RLC PDU having a serial number which is NACK_SN-1, a segment starts from any location of an original RLC PDU and is segmented to the end, and the SOend field is information indicating whether in the RLC PDU having a serial number which is NACK_SN+NACK_RANGE, a segment starts from any location of an original RLC PDU and is segmented up to any location. The information indicated by these fields is defined and promised, and conversely, may be defined as follows. For example, the SOend field is information indicating whether in the RLC PDU having a serial number which is NACK_SN-1, a segment starts from any location of an original RLC PDU and is segmented to the end, and the SOstart field is information indicating whether in the RLC PDU having a serial number which is NACK_SN+NACK_RANGE, a segment starts from any location of an original RLC PDU and is segmented up to any location.

The E3 field indicates whether there are NACK_RANGE (number of missing RLC PDUs) fields indicating how many serial numbers above (larger) or below (smaller) from the serial number indicated by the NACK_SN are missed. The NACK_RANGE field is a field indicating how many serial numbers above (having larger serial number) or below (having smaller serial number) from the serial number indicated by the NACK_SN are missed.

The ACK_SN field may include the serial number sequent to the highest sequence number among the serial numbers of RLC PDUs that have successfully received so far and the NACK_SN may include the serial number that has not successfully received so far. When a plurality of consecutive RLC PDUs are missed, the highest sequence number that has not been received so far or the lowest serial number that has not been received so far can be included in the NACK_SN in order to use NACK_SN together with the NACK_RANGE field, and the N field may include the number of missed serial numbers. The NACK_SN and NACK_RANGE fields may be defined and applied by various other methods to indicate a number of RLC PDUs that have been missed consecutively.

The missing of RLC PDUs can occur in a variety of ways.

First, individual RLC PDUs may be missed. That is, it may be necessary to indicate the serial number of the missed independent RLC PDU (2i-05). The RLC PDUs of the individual RLC PDUs are designated as the NACK_SN having the RLC serial number of the individual RLC PDUs like 2i-05. In order to indicate another missed packet behind, E1 is set to be 1, and since there is no need to indicate the segment, E2 is set to be 0 and since there is no need to indicate the regions for the plurality of missed RLC PDUs, E3 may be set to be 0, thereby indicating that the individual RLC PDU is missed like 2i-05.

Second, segments of individual RLC PDUs may be missed. That is, it may be necessary to indicate the serial number of the missed independent RLC PDU segment (2j-10). The segments of the RLC PDUs individually indicate the RLC serial numbers of the individual RLC PDUs as the NACK_SN like 2i-10, and E2 is set to be 1 to indicate the segment to indicate that the SOstart field and the SOend field follow, and uses the SOstart Field and the SOend field to indicate the segment location of the corresponding RLC PDU. In order to indicate another missed packet behind, E1 is set to be 1. Since the regions for the plurality of missed RLC PDUs is not indicated, E3 may be set to be 0 to indicate the segments of the individual RLC PDUs are missed like 2i-10.

Third, a number of consecutive RLC PDUs may be missed at once. That is, it may be necessary to indicate a number of consecutive RLC PDUs at once (2i-15). A number of consecutive RLC PDUs indicate, by the NACK_SN, RLC serial numbers of an individual RLC PDU corresponding to the lowest serial number or the highest serial number like 2i-15, and in order to indicate the regions for a number of RLC PDUs consecutively missed, E3 may be set to be 1 to indicate that the NACK_RANGE field follows and indicate the regions for the corresponding consecutive RLC PDUs using the NACK_RANGE field. In this case, the NACK_RANGE field may indicate how many the consecutive NACK_SNs have been missed. Then, to indicate another missed packet, E1 may be set to be 1. Since there is no need to indicate the segment, E2 may be set to be 0 to indicate that the plurality of RLC PDUs are missed consecutively like 2i-15.

Fourth, the last segment of one RLC PDU, a number of RLC PDUs consecutive thereafter, and a first segment of one RLC PDUs consecutive thereafter may be missed at once (2i-20-1). The last segment of one RLC PDU and a number of RLC PDUs consecutive thereafter and the first segment of one RLC PDU consecutive thereafter may be indicated by using the NACK_RANGE field, the SOstart field, and the SOend field together like 2i-20. That is, the SOstart field may indicate whether in the RLC PDU having a serial number which is NACK_SN−1, a segment starts from any location of an original RLC PDU and is segmented to the end, and the SOend field may indicate whether in the RLC PDU having a serial number which is NACK_SN+NACK_RANGE, a segment starts from any location of an original RLC PDU and is segmented up to any location. Accordingly, the last segment of one RLC PDU, a number of subsequent consecutive RLC PDUs, and the first segment of one of subsequent consecutive RLC PDUs indicate the first and last segments in the same manner as 2i-10 and a number of consecutive RLC PDUs are indicated in the same manner as 2i-15, which may be reported to the transmitting end.

Fifth, the last segment of one RLC PDU and a number of RLC PDUs consecutive thereafter may be missed at once (2i-20-2). The last segment of one RLC PDU and a number of RLC PDUs consecutive thereafter and the first segment of one RLC PDU consecutive thereafter may be indicated by using the NACK_RANGE field, the SOstart field, and the SOend field together like 2i-20. That is, the SOstart field may indicate whether in the RLC PDU having a serial number which is NACK_SN−1, a segment starts from any location of an original RLC PDU, and the SOend field may define, as a special value, a value having all zero as 000 . . . 0.0000 or a value having all 1 as 111 . . . 1111 to indicate that a segment of the RLC PDU having a serial number which is the NACK_SN+NACK_RANGE is not missed but the complete RLC PDU is missed. Accordingly, the last segment of one RLC PDU and a number of RLC PDUs consecutive thereafter indicate the first segment in the same manner as 2i-10 and a number of consecutive RLC PDUs are indicated in the same manner as 2i-15, thereby more reducing the overhead than the case of the reporting.

Sixth, a number of consecutive RLC PDUs and the first segment of a number of RLC PDUs consecutive thereafter may be missed at once (2i-20-3). In this case, a number of consecutive RLC PDUs and a first segment of one RLC PDU consecutive may be indicated by using the NACK_RANGE field, the SOstart field, and the SOend field together like 2i-20. That is, the SOstart field defines, as a special value, a value having all zero as 000 . . . 0.0000 or a value having all 1 as 111 . . . 1111 to indicate that there is no missed segment in the RLC PDU having a serial number which is the NACK_SN−1, and the SOend field may indicate whether in the RLC PDU having a serial number which is NACK_SN+NACK_RANGE, a segment starts from any location of an original RLC PDU and is segmented up to any location. Therefore, a number of consecutive RLC PDUs and the first segment of one RLC PDU consecutive thereafter indicate the last segment in the same manner as 2i-10 and a number of consecutive RLC PDUs are indicated in the same manner as 2i-15, thereby more reducing the overhead than the case of the reporting.

In order to apply the third method for reporting an RLC status described above, a format such as 2i-01 may be used. In order to facilitate processing in units of bytes, a reservation field such as 2i-02 is used or added so that the RLC status report format can be uniformly generated in units of bytes. Although the length of the RLC serial number and the length of the SOstart and the SOend are set to be different lengths, the RLC status report format may be configured in units of byte by setting (using and adding) the reserved field. That is, when the RLC status report is transmitted, the transmitting end RLC layer generates the RLC status report in units of byte, and the receiving end may quickly read and analyze the RLC status report in units of byte.

When the RLC status report is performed at the receiving end, if the transmission resources are insufficient, it may not include all the report information to be indicated as 2i-05, 2i-10, and 2i-15. Therefore, if the transmission resources are insufficient, a method of indicating a larger number of missed RLC PDUs with the same transmission resource should be used first to perform a report. That is, if the 2i-15 method may be applied to the RLC PDUs that should be reported to be missed, the 2i-15 method is firstly applied to perform the report, followed by the 2i-05 method, and then the 2i-10 method can be applied to perform the report. Also, if there are insufficient resources to report 2i-20, the reporting may be made by the 2i-15 method, except the SOstart field and the SOend field. In other words, if the resources are insufficient, the 2i-15 method is preferentially applied to perform the reporting, and the 2i-05 method may be considered, and the remaining methods may be considered.

The RLC layer apparatus transmits the RLC PDU with the serial number, and checks whether the transmitted RLC PDU succeeds based on the RLC status report message and retransmits the RLC PDU, thereby ensuring reliable transmission/reception.

By receiving a general RLC status report message, the transmitting side RLC layer apparatus acquires the following two pieces of information largely.

Identify RLC PDU failing to transmit
Identify RLC PDU failing to transmit

The transmitting side RLC layer apparatus is recognized which RLC PDU to retransmit in the future by identifying the RLC PDU failing to transmit, and it determines which RLC PDU or PDCP SDU of RLC PDUs or PDCP SDUs stored in the retransmission buffer and the transmission buffer is discarded.

The fields applied to the third method of reporting an RLC status according to the present disclosure are as follows.

The D/C field has a length of 1 bit and indicates whether the RLC PDU is an RLC data PDU or an RLC control PDU. (Table 1-16).

TABLE 10

| D/C field value | Description |
| --- | --- |
| 0 | Control PDU |
| 1 | Data PDU |

The CPT field has a length of 3 bit and indicates a kind of RLC control PDU. (Table 1-9).

TABLE 11

| CPT field value | Description |
| --- | --- |
| 000 | STATUS PDU |
| 001-111 | Reserved (PDUs with this coding will be discarded by the receiving entity for this release of the protocol) |

ACK_SN indicates the next serial number of the RLC PDU that has not yet been received and a serial number that is not reported as missed in the RLC status report. When the transmitting end receives the RLC status report, the transmitting end determined that the serial number indicated by the ACK_SN and the serial numbers included in the ranged indicated by the NACK_SN and the NACK_RANGE field are excluded, and a serial number smaller than ACK_SN has been received successfully (when the NACK_SN is indicated the SOstart and the SOend together, it is determined that the SOstart and the SOend successfully receive only a part other than the part indicated by the NACK_SN). The ACK_SN has a predetermined length, and the predetermined length can be variously defined such as 12 bits, 16 bits, and 18 bits.

The E1 field has a length of 1 bit and indicates whether or not the NACK_SN, the E1 field, the E2 field, and the E3 field follow.

TABLE 12

| E1 field value | Description |
| --- | --- |
| 0 | A set of NACK_SN, E1, E2, and E3 does not follow. |
| 1 | A set of NACK_SN, E1, E2, and E3 follows. |

The NACK_SN may include the serial number that has not received so far. When a plurality of consecutive RLC PDUs are missed, the highest sequence number that has not been received so far or the lowest serial number that has not been received so far can be included in the NACK_SN in order to use NACK_SN together with the NACK_RANGE field, and the N field may include the number of missed serial numbers. The NACK_SN and NACK_RANGE fields may be defined and applied by various other methods to indicate a number of RLC PDUs that have been missed consecutively. The NACK_SN has a predetermined length, and the predetermined length can be variously defined such as 12 bits, 16 bits, or 18 bits.

The NACK_RANGE field is a field indicating how many serial numbers above (having larger serial number) or below (having smaller serial number) from the serial number indicated by the NACK_SN are missed.

The E2 field has a length of 1 bit and indicates whether the SOstart and the SOend follow. (Table 1-19). If the E3 field indicates that there is the NACK_RANGE, it may be promised that the NACK_SN is followed by the NACK_RANGE, followed by the SOstart and SOend.

TABLE 13

| E2 field value | Description |
| --- | --- |
| 0 | A set of SOstart and SOend does not follow for this NACK_SN. |
| 1 | A set of SOstart and SOend follow for this NACK_SN. |

The E2 field indicates whether the SOstart and SOend fields indicating a part of the NACK_SN follow when indicating only one NACK_SN indicating that the NACK_RANGE field is not followed in the E3 field. However, if the E2 field indicates whether the SOstart field and the SOend field indicating the segment information on the head part and the tail part of the NACK_RANGE follow when the E3 field indicates that the NACK_RANGE field follows. That is, the SOstart and SOend fields may indicate different information according to whether the E3 field is configured. In this case, it can be promised that if the E2 field indicates that the SOstart field and the SOend field follow and the E3 field indicates that the NACK_RANGE field exists, the NACK_RANGE field follows just after the NACK_SN and the SO field and the SOend field follow thereafter. If the E3 field indicates that the NACK_RANGE field follows and the E2 field indicates that the SOstart field and the SOend field follow, the SOstart field and the SOend field may indicate information different from the information indicating the NACK_SN when there is no NACK_RANGE. That is, the SOstart field is information indicating whether in the RLC PDU having a serial number which is NACK_SN-1, a segment starts from any location of an original RLC PDU and is segmented to the end, and the SOend field is information indicating whether in the RLC PDU having a serial number which is NACK_SN+NACK_RANGE, a segment starts from any location of an original RLC PDU and is segmented up to any location. The information indicated by these fields is defined and promised, and conversely, may be defined as follows. That is, the SOend field is information indicating whether in the RLC PDU having a serial number which is NACK_SN-1, a segment starts from any location of an original RLC PDU and is segmented to the end, and the SOstart field is information indicating whether in the RLC PDU having a serial number which is NACK_SN+NACK_RANGE, a segment starts from any location of an original RLC PDU and is segmented up to any location. In addition, depending on the definition, the SOstart field may be information indicating whether in the RLC PDU having a serial number which is the NACK_SN-1 or the NACK_SN, a segment starts from any location of an original RLC PDU and is segmented to the end, and the SOend field may be information indicating whether in the RLC PDU having the serial number which is the NACK_SN+NACK_RANGE or the NACK_SN+NACK_RANGE+1, a segment starts from any location of an original RLC PDU and is segmented up to any location.

(When E3 Field is 0)

The SOstart field indicates a head location of the part when indicating a part of the NACK_SN. When the head location is indicated, it may be indicated by units of byte. The SOstart has a predetermined length, and the predetermined length can be variously defined such as 15 bits, 16 bits, and 18 bits.

The SOend field indicates the tail location of the part when indicating a part of the NACK_SN. When the tail location is indicated, it may be indicated by units of byte. The SOend has a predetermined length, and the predetermined length can be variously defined such as 15 bits, 16 bits, and 18 bits.

(When E3 Field is 1)

The SOstart field is information indicating whether in the RLC PDU having a serial number which is NACK_SN−1, a segment starts from any location of an original RLC PDU and is segmented to the end. Depending on the definition, the SOstart field is information indicating whether in the RLC PDU having a serial number which is NACK_SN, a segment starts from any location of an original RLC PDU and is segmented to the end. When the segmented location is indicated, it may be indicated by units of byte. The SOstart has a predetermined length, and the predetermined length can be variously defined such as 15 bits, 16 bits, and 18 bits. In addition, the SOstart field defines, as a special value, a value having all zero as 000 . . . 0.0000 or a value having all 1 as 111 . . . 1111 to indicate that there is no missed segment in the RLC PDU having a serial number which is the NACK_SN−1 or may indicate that the segment in the RLC PDU having a serial number which is the NACK_SN is not missed but the complete RLC PDU is missed.

The SOend field is information indicating whether in the RLC PDU having a serial number which is NACK_SN−1, a segment starts from the beginning of an original RLC PDU and is segmented to any location. In addition, depending on the definition, the SOend field is information indicating whether in the RLC PDU having a serial number which is NACK_SN+NACK_RANGE+1, a segment starts from the beginning of an original RLC PDU and is segmented to any location. When the segmented location is indicated, it may be indicated by units of byte. The SOend has a predetermined length, and the predetermined length can be variously defined such as 15 bits, 16 bits, and 18 bits. In addition, the SOend field defines, as a special value, a value having all zero as 000 . . . 0.0000 or a value having all 1 as 111 . . . 1111 to indicate that the segment in the RLC PDU having a serial number which is the NACK_SN+NACK_RANGE is not missed or the complete RLC PDU is missed or indicate that there is no segment missed in the RL PDU having a serial number which is NACK_SN+NACK_RANGE+1.

The E3 field indicates whether there are NACK_RANGE (number of missing RLC PDUs) fields indicating how many serial numbers above (larger) or below (smaller) from the serial number indicated by the NACK_SN are missed.

TABLE 14

| E3 field value | Description |
|---|---|
| 0 | NACK_RANGE does not follow for this NACK_SN. |
| 1 | NACK_RANGE follows for this NACK_SN. |

Figure 2J:
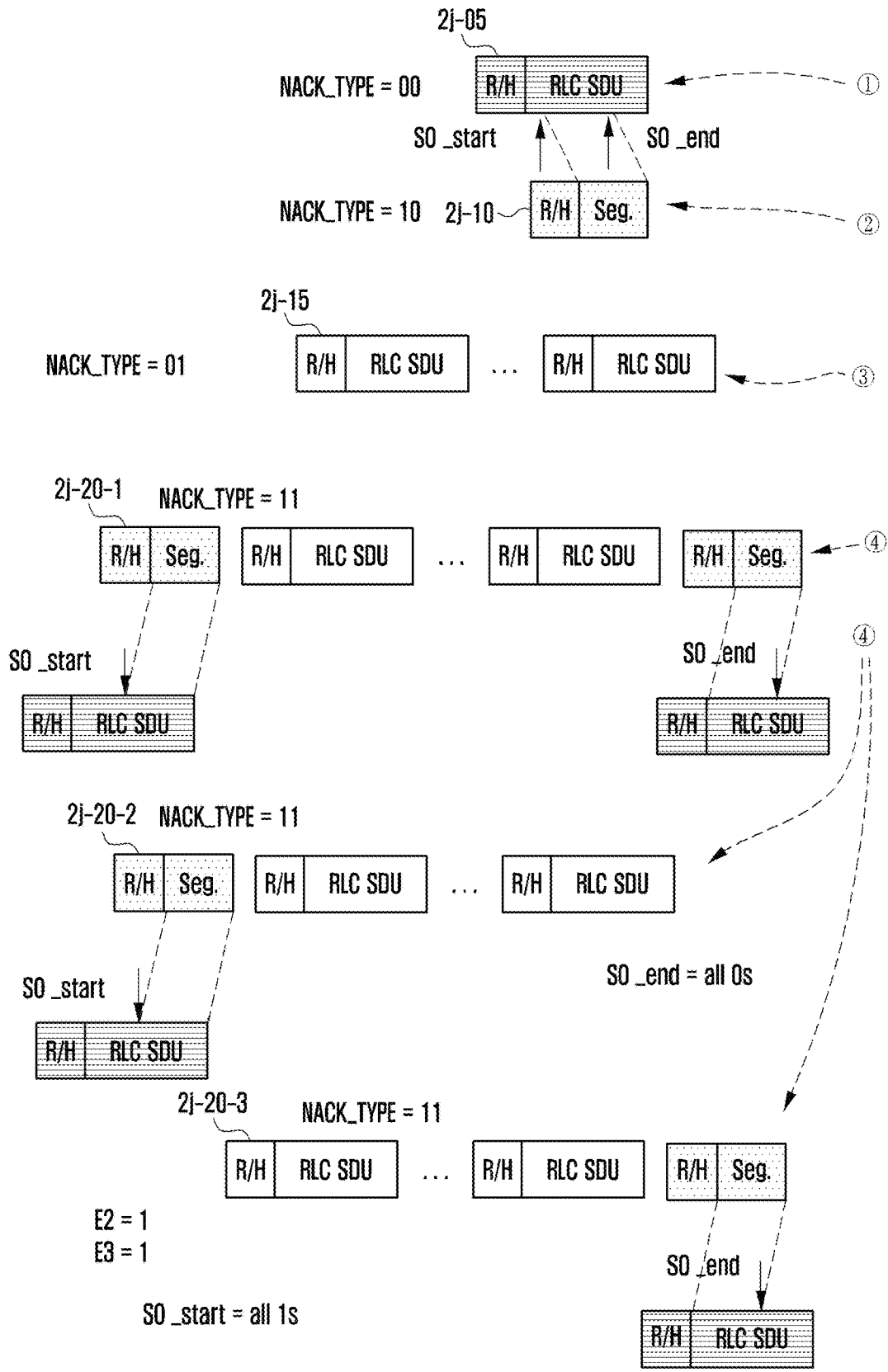
FIGS. 2JA-2JC are diagrams illustrating a fourth method of reporting an RLC status according to the present disclosure.
Figure 2J:
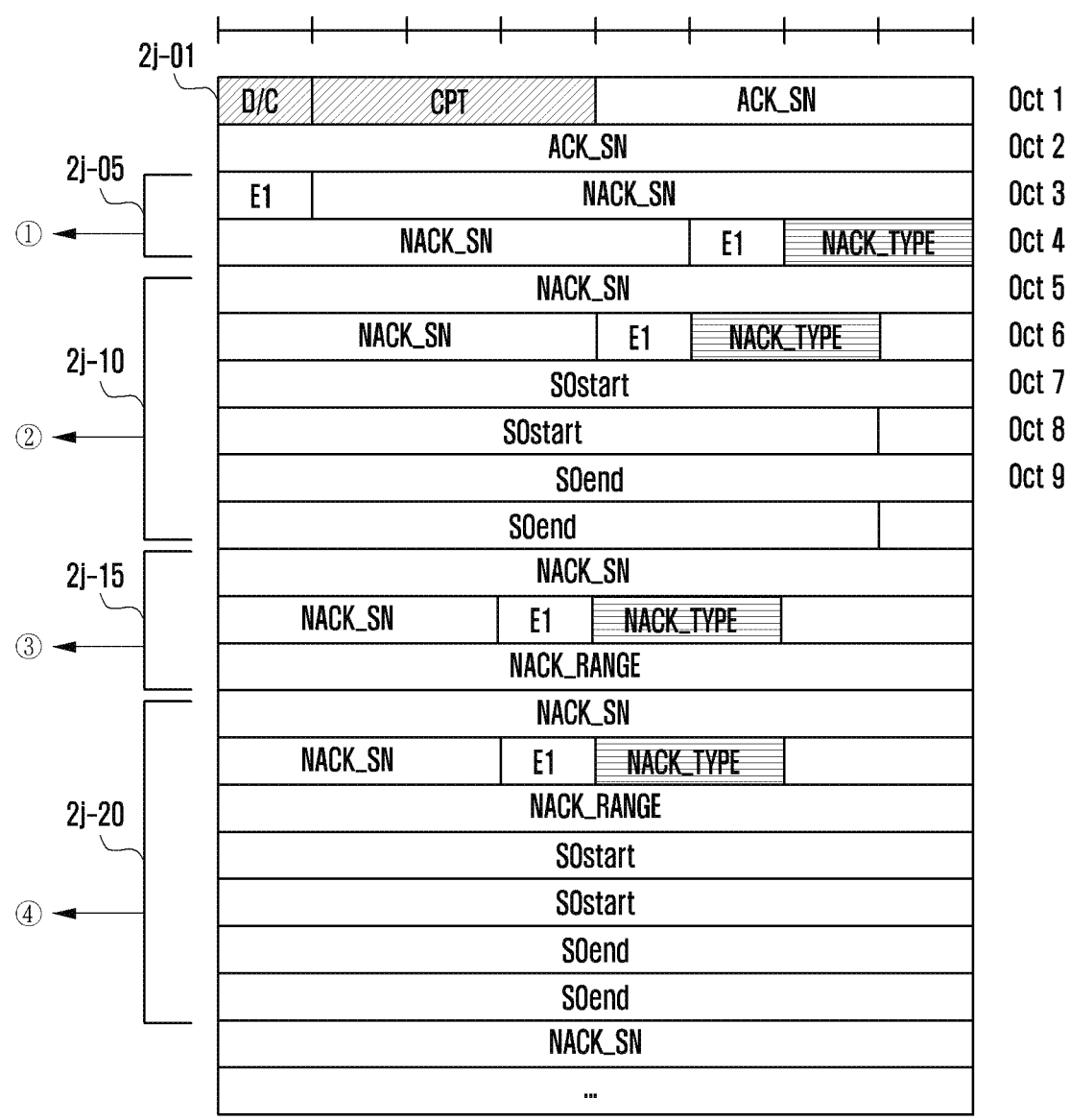
Figure 2J:
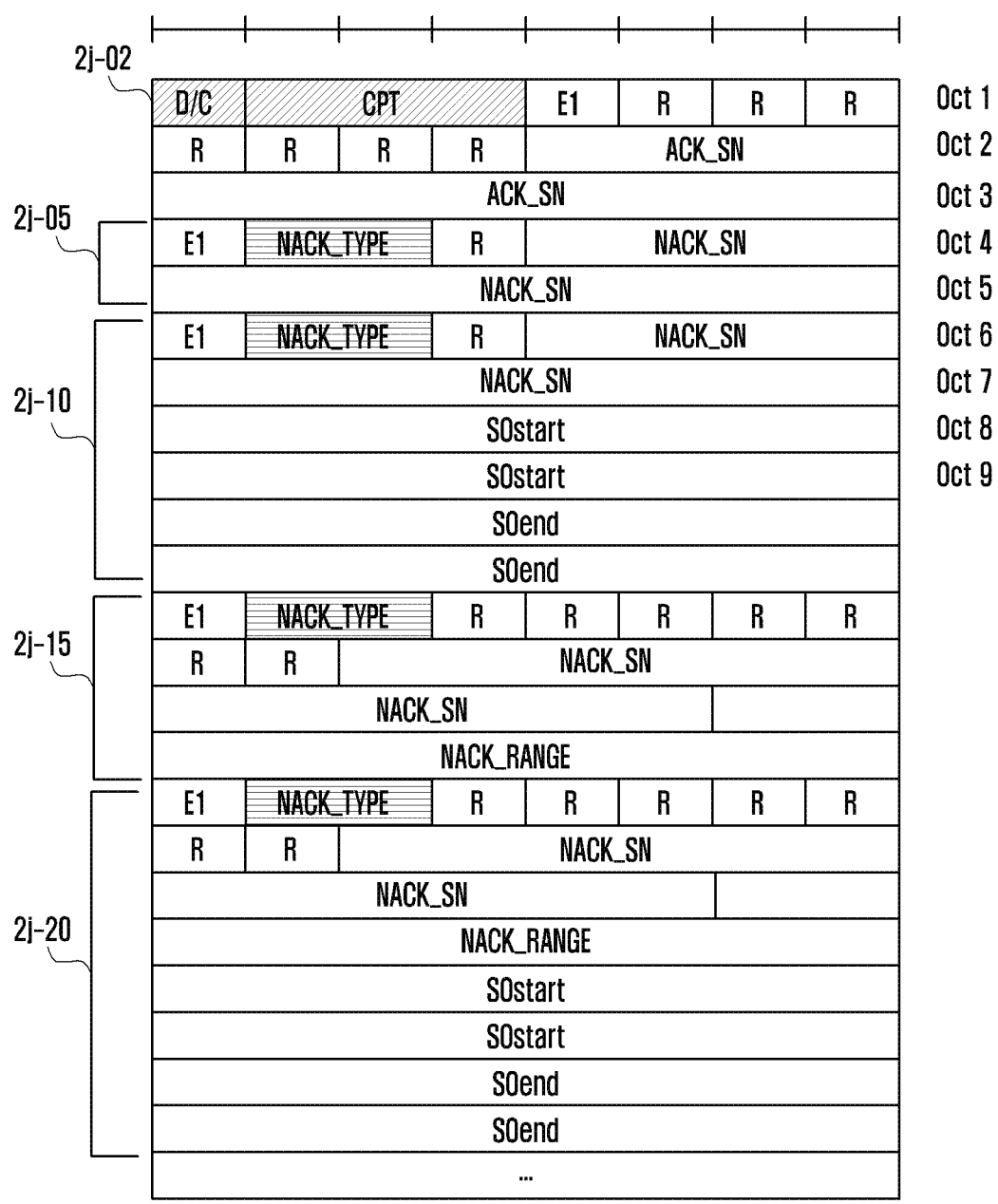

FIGS. 2JA-2JC are diagrams illustrating a fourth method of reporting an RLC status according to the present disclosure.

FIGS. 2JA-2JC are diagrams illustrating an example of an RLC status report transmitted from a receiving side RLC layer apparatus to a transmitting side RLC layer apparatus according to the fourth method of reporting an RLC status according to the present disclosure (assuming a 12-bit RLC SN length, 16-bit SO start and SOend). The third method for reporting an RLC status additionally proposes and applies a method that can reduce the overhead over the second method for reporting an RLC status.

The receiving side RLC layer device stores the received RLC PDUs in the receiving buffer and then checks the serial number to recognize the serial number of the RLC PDU missed during the transmission. If the predetermined condition is satisfied, the receiving side RLC layer apparatus generates an RLC status report message and transmits the generated RLC status report message to the transmitting side RLC layer apparatus. The predetermined condition may be a case where polling is received from the transmitting side RLC layer device, that is, the poll bit is set to be '1' in the RLC header of the received RLC PDU. The RLC status report message includes information on the RLC PDU reception state of the receiving side RLC layer apparatus, and the transmitting side RLC layer apparatus identifies the RLC PDU successfully transmitted and the RLC PDU failed to transmit, through the RLC status report message. The RLC status report message may be written like 2j-05 in FIGS. 2JA-2JC. The RLC status report message includes one ACK_SN or a set of one ACK_SN and one or more NACK_SN, E1, NACK_TYPE fields. It is indicated by the E1 field whether there are the set of NACK_SN, E1, NACK_TYPE fields. The E1 field indicates whether a set of one NACK_SN field, the E1 field, the E2 field, and the E3 field follow, and the NACK_TYPE field is a field consisting of 2 bits and indicates whether or not the NACK_RANGE field and the SOstart and SOend fields follow.

For example, if the NACK_TYPE field is 00, it indicates that both of the NACK_RANGE field and the SOstart and a SOend field do not follow, and the NACK_SN indicates the missing of the individual RLC PDU.

If the NACK_TYPE field is 10, then the NACK_RANGE field does not follow, it is indicated that the SOstart and SOend fields exist, and it is indicated that the segment of the individual RLC PDU corresponding to the NACK_SN is missed. In this case, the SOstart and the SOend indicate which part of the individual RLC PDU is missed and the start part (SOstart) and the last part (SOend) of the segment is indicated by units of byte.

If the NACK_TYPE field is 01, the NACK_RANGE field follows, it is indicated that there are no SOstart and SOend fields, and it is indicated that the regions for the plurality of RLC PDUs consecutive from the NACK_SN are missed at once. In this case, the NACK_RANGE field is a field indicating how many the RLC PDUs are consecutively missed from the NACK_SN. The NACK_RANGE (the number of consecutive missing RLC PDUs) field is a field indicating how many serial numbers above (having larger serial number) or below (having smaller serial number) from the serial number indicated by the NACK_SN are missed.

If the NACK_TYPE field is 11, the NACK_RANGE field follows, it is indicated that there are the SOstart and SOend fields, it is indicated that the regions for the plurality of RLC PDUs consecutive from the NACK_SN are missed at once, and it is indicated that segments which are ahead or follow are missed. In this case, it can be promised that if the NACK_TYPE field indicates that the SOstart field and the SOend field follow and the NACK_RANGE field exists, the NACK_RANGE field follows just after the NACK_SN and the SO field and the SOend field follow thereafter. In this case, the SOstart field and the SOend field indicate the segment information on the head part and the tail part of the NACK_RANGE when indicating that the NACK_RANGE field follows. That is, if the E3 field indicates that the NACK_RANGE field follows and the E2 field indicates that the SOstart field and the SOend field follow, the SOstart field and the SOend field may indicate information different from the information indicating the NACK_SN when there is no NACK_RANGE. That is, the SOstart field is information indicating whether in the RLC PDU having a serial number which is NACK_SN−1, a segment starts from any location of an original RLC PDU and is segmented to the end, and the SOend field is information indicating whether in the RLC PDU having a serial number which is NACK_SN+NACK_RANGE, a segment starts from any location of an original RLC PDU and is segmented up to any location. The information indicated by these fields is defined and promised, and conversely, may be defined as follows. In this case, the SOend field is information indicating whether in the RLC PDU having a serial number which is NACK_SN−1, a segment starts from any location of an original RLC PDU and is segmented to the end, and the SOstart field is information indicating whether in the RLC PDU having a serial number which is NACK_SN+NACK_RANGE, a segment starts from any location of an original RLC PDU and is segmented up to any location.

The ACK_SN field may include the serial number sequent to the highest sequence number among the serial numbers of RLC PDUs that have successfully received so far and the NACK_SN may include the serial number that has not successfully received so far. When a plurality of consecutive RLC PDUs are missed, the highest sequence number that has not been received so far or the lowest serial number that has not been received so far can be included in the NACK_SN in order to use NACK_SN together with the NACK_RANGE field, and the N field may include the number of missed serial numbers. The NACK_SN and NACK_RANGE fields may be defined and applied by various other methods to indicate a number of RLC PDUs that have been missed consecutively.

The missing of RLC PDUs can occur in a variety of ways.

First, individual RLC PDUs may be missed. That is, it may be necessary to indicate the serial number of the missed independent RLC PDU (2*j*-05). The individual RLC PDUs indicate the RLC serial number of the individual RLC PDU as the NACK_SN like 2*j*-05, and set E1 to 1 to indicate another missed packet behind. Since there is no need to indicate the segment and indicate the regions for the plurality of missed RLC PDUs, the NACK_TYPE field may be set to be 00 to indicate that the individual RLC PDU is missed like 2*j*-05.

Second, segments of individual RLC PDUs may be missed. That is, it may be necessary to indicate the serial number of the missed independent RLC PDU segment (2*j*-10). In this case, the segments of the RLC PDUs may individually indicate the RLC serial numbers of the individual RLC PDUs as the NACK_SN like 2*j*-10, and the NACK_TYPE field may set to be 10 to indicate the segment to indicate that the SOstart field and the SOend field follow, indicate that there is no NACK_RANGE field, and use the SOstart Field and the SOend field to indicate the segment location of the corresponding RLC PDU. That is, it may be indicated whether the segment of the individual RLC PDU is missed like 2*j*-10.

Third, a number of consecutive RLC PDUs may be missed at once. That is, it may be necessary to indicate a number of consecutive RLC PDUs at once (2*j*-15). A number of consecutive RLC PDUs indicate, by the NACK_SN, RLC serial numbers of an individual RLC PDU corresponding to the lowest serial number or the highest serial number like 2*j*-15, and in order to indicate the regions for a number of RLC PDUs consecutively missed, the NACK_TYPE field may be set to be 1 to indicate that the NACK_RANGE field follows, and indicate that there are no the SOstart field and the SOend field to indicate the regions for the corresponding consecutive RLC PDUs using the NACK_RANGE field. In this case, the NACK_RANGE field may indicate how many the consecutive NACK_SNs have been missed. To indicate another missed packet behind, the E1 may be set to be 1, indicating that the plurality of RLC PDUs consecutively missed like 2*j*-15 are missed.

Fourth, the last segment of one RLC PDU, a number of RLC PDUs consecutive thereafter, and a first segment of one RLC PDUs consecutive thereafter may be missed at once (2*j*-20-1). The last segment of one RLC PDU and a number of RLC PDUs consecutive thereafter and the first segment of one RLC PDU consecutive thereafter may be indicated by setting the NACK_TYPE field to be 11 and using the NACK_RANGE field, the SOstart field, and the SOend field together like 2*j*-20. That is, the SOstart field may indicate whether in the RLC PDU having a serial number which is NACK_SN−1, a segment starts from any location of an original RLC PDU and is segmented to the end, and the SOend field may indicate whether in the RLC PDU having a serial number which is NACK_SN+NACK_RANGE, a segment starts from any location of an original RLC PDU and is segmented up to any location. Accordingly, the last segment of one RLC PDU, a number of subsequent consecutive RLC PDUs, and the first segment of one of subsequent consecutive RLC PDUs indicate the first and last segments in the same manner as 2*j*-10 and a number of consecutive RLC PDUs are indicated in the same manner as 2*j*-15, which may be reported to the transmitting end.

Fifth, the last segment of one RLC PDU and a number of RLC PDUs consecutive thereafter may be missed at once (2*j*-20-2). The last segment of one RLC PDU and a number of RLC PDUs consecutive thereafter and the first segment of one RLC PDU consecutive thereafter may be indicated by setting the NACK_TYPE field to be 11 and using the NACK_RANGE field, the SOstart field, and the SOend field together like 2*j*-20. That is, the SOstart field may indicate whether in the RLC PDU having a serial number which is NACK_SN−1, a segment starts from any location of an original RLC PDU, and the SOend field may define, as a special value, a value having all zero as 000 . . . 0.0000 or a value having all 1 as 111 . . . 1111 to indicate that a segment of the RLC PDU having a serial number which is the NACK_SN+NACK_RANGE is not missed but the complete RLC PDU is missed. Accordingly, the last segment of one RLC PDU and a number of RLC PDUs consecutive thereafter indicate the first segment in the same manner as 2*j*-10 and a number of consecutive RLC PDUs are indicated in the same manner as 2*j*-15, thereby more reducing the overhead than the case of the reporting.

Sixth, a number of consecutive RLC PDUs and the first segment of a number of RLC PDUs consecutive thereafter may be missed at once (2*j*-20-3). In this case, a number of consecutive RLC PDUs and a first segment of one RLC PDU consecutive may be indicated by setting the NACK_TYPE field to be 11 and using the NACK_RANGE field, the SOstart field, and the SOend field together like 2*j*-20. That is, the SOstart field defines, as a special value, a value having all zero as 000 . . . 0.0000 or a value having all 1 as 111 . . . 1111 to indicate that there is no missed segment in the RLC PDU having a serial number which is the NACK_SN−1, and the SOend field may indicate whether in the RLC PDU having a serial number which is NACK_SN+ NACK_RANGE, a segment starts from any location of an original RLC PDU and is segmented up to any location. Therefore, a number of consecutive RLC PDUs and a first segment of one RLC PDU consecutive thereafter indicate the last segment in the same manner as 2j-10 and a number of consecutive RLC PDUs are indicated in the same manner as 2j-15, thereby more reducing the overhead than the case of the reporting.

In order to apply the fourth method for reporting an RLC status described above, a format such as 2j-01 may be used. In order to facilitate processing in units of bytes, a reservation field such as 2j-02 is used or added so that the RLC status report format can be uniformly generated in units of bytes. Although the length of the RLC serial number and the length of the SOstart and the SOend are set to be different lengths, the RLC status report format may be configured in units of byte by setting (using and adding) the reserved field. That is, when the RLC status report is transmitted, the transmitting end RLC layer generates the RLC status report in units of byte, and the receiving end may quickly read and analyze the RLC status report in units of byte.

When the RLC status report is performed at the receiving end, if the transmission resources are insufficient, it may not include all the report information to be indicated as 2j-05, 2j-10, and 2j-15. Therefore, if the transmission resources are insufficient, a method of indicating a larger number of missed RLC PDUs with the same transmission resource should be used first to perform a report. That is, if the 2j-15 method may be applied to the RLC PDUs that should be reported to be missed, the 2j-15 method is firstly applied to perform the report, followed by the 2j-05 method, and then the 2j-10 method can be applied to perform the report. Also, if there are insufficient resources to report 2j-20, the reporting may be made by the 2j-15 method, except the SOstart field and the SOend field. In other words, if the resources are insufficient, the 2j-15 method is preferentially applied to perform the reporting, and the 2j-05 method may be considered, and the remaining methods may be considered.

The RLC layer apparatus transmits the RLC PDU with the serial number, and checks whether the transmitted RLC PDU succeeds based on the RLC status report message and retransmits the RLC PDU, thereby ensuring reliable transmission/reception.

By receiving a general RLC status report message, the transmitting side RLC layer apparatus acquires the following two pieces of information largely.

Identify RLC PDU failing to transmit
Identify RLC PDU failing to transmit

The transmitting side RLC layer apparatus is recognized which RLC PDU to retransmit in the future by identifying the RLC PDU failing to transmit, and it determines which RLC PDU or PDCP SDU of RLC PDUs or PDCP SDUs stored in the retransmission buffer and the transmission buffer is discarded.

The fields applied to the fourth method of reporting an RLC status according to the present disclosure are as follows.

The D/C field has a length of 1 bit and indicates whether the RLC PDU is an RLC data PDU or an RLC control PDU. (Table 1-16).

TABLE 15

| D/C field value | Description |
| --- | --- |
| 0 | Control PDU |
| 1 | Data PDU |

The CPT field has a length of 3 bit and indicates a kind of RLC control PDU. (Table 1-9).

TABLE 16

| CPT field value | Description |
| --- | --- |
| 000 | STATUS PDU |
| 001-111 | Reserved |
| | (PDUs with this coding will be discarded by the receiving entity for this release of the protocol) |

ACK_SN indicates the next serial number of the RLC PDU that has not yet been received and a serial number that is not reported as missed in the RLC status report. Upon receiving the RLC status report at the transmitting end, it is determined that the serial number indicated by the ACK_SN is not included, the serial numbers indicated by the NACK_SN are not included, the serial number included in the range indicated by the NACK_SN and the NACK_RANGE field are not included, and the serial number smaller than the ACK_SN has been received successfully (when the NACK_SN is indicated together with the SOstart and the SOend, it is determined that the SOstart and the SOend successfully receive only a part other than the part indicated by the NACK_SN). The ACK_SN has a predetermined length, and the predetermined length can be variously defined such as 12 bits, 16 bits, and 18 bits.

The E1 field has a length of 1 bit and indicates whether or not the NACK_SN, the E1 field, the E2 field, and the E3 field follow.

TABLE 17

| E1 field value | Description |
| --- | --- |
| 0 | A set of NACK_SN, E1, E2, and E3 does not follow. |
| 1 | A set of NACK_SN, E1, E2, and E3 follows. |

The NACK_SN may include the serial number that has not received so far. When a plurality of consecutive RLC PDUs are missed, the highest sequence number that has not been received so far or the lowest serial number that has not been received so far can be included in the NACK_SN in order to use NACK_SN together with the NACK_RANGE field, and the N field may include the number of missed serial numbers. The NACK_SN and NACK_RANGE fields may be defined and applied by various other methods to indicate a number of RLC PDUs that have been missed consecutively. The NACK_SN has a predetermined length, and the predetermined length can be variously defined such as 12 bits, 16 bits, or 18 bits.

The NACK_RANGE field is a field indicating how many serial numbers above (having larger serial number) or below (having smaller serial number) from the serial number indicated by the NACK_SN are missed.

The NACK_TYPE field is a field which has a length of 2 bits and indicates whether the SOstart and SOend and the NACK_RANGE fields follow. If it is indicated that the SOstart and SOend and the NACK_RANGE fields may exist, it may be promised that if the NACK_SN is followed by the NACK_RANGE, followed by the SOstart and SOend.

TABLE 18

| NACK_TYPE field value | Description |
| --- | --- |
| 00 | A set of SOstart, SOend, and NACK_RANGE does not follow for this NACK_SN. |
| 10 | Only SOstart and SOend follow for this NACK_SN. |
| 01 | Only NACK_RANGE follow for this NACK_SN. |
| 11 | A set of SOstart, SOend, and NACK_RANGE follow for this NACK_SN. |

The NACK_TYPE field is a field consisting of a 2-bit field and indicates whether or not the NACK_RANGE field and the SOstart and SOend fields follow.

For example, if the NACK_TYPE field is 00, it indicates that both of the NACK_RANGE field and the SOstart and a SOend field do not follow, and the NACK_SN indicates the missing of the individual RLC PDU.

If the NACK_TYPE field is 10, then the NACK_RANGE field does not follow, it is indicated that the SOstart and SOend fields exist, and it is indicated that the segment of the individual RLC PDU corresponding to the NACK_SN is missed. In this case, the SOstart and the SOend indicate which part of the individual RLC PDU is missed and the start part (SOstart) and the last part (SOend) of the segment is indicated by units of byte.

If the NACK_TYPE field is 01, the NACK_RANGE field follows, it is indicated that there are no SOstart and SOend fields, and it is indicated that the regions for the plurality of RLC PDUs consecutive from the NACK_SN are missed at once. In this case, the NACK_RANGE field is a field indicating how many the RLC PDUs are consecutively missed from the NACK_SN. The NACK_RANGE (the number of consecutive missing RLC PDUs) field is a field indicating how many serial numbers above (having larger serial number) or below (having smaller serial number) from the serial number indicated by the NACK_SN are missed.

If the NACK_TYPE field is 11, the NACK_RANGE field follows, it is indicated that there are the SOstart and SOend fields, it is indicated that the regions for the plurality of RLC PDUs consecutive from the NACK_SN are missed at once, and it is indicated that segments which are ahead or follow are missed. In this case, it can be promised that if the NACK_TYPE field indicates that the SOstart field and the SOend field follow and the NACK_RANGE field exists, the NACK_RANGE field follows just after the NACK_SN and the SO field and the SOend field follow thereafter. In this case, the SOstart field and the SOend field indicate the segment information on the head part and the tail part of the NACK_RANGE when indicating that the NACK_RANGE field follows. That is, if the E3 field indicates that the NACK_RANGE field follows and the E2 field indicates that the SOstart field and the SOend field follow, the SOstart field and the SOend field may indicate information different from the information indicating the NACK_SN when there is no NACK_RANGE. That is, the SOstart field is information indicating whether in the RLC PDU having a serial number which is NACK_SN−1, a segment starts from any location of an original RLC PDU and is segmented to the end, and the SOend field is information indicating whether in the RLC PDU having a serial number which is NACK_SN+ NACK_RANGE, a segment starts from any location of an original RLC PDU and is segmented up to any location. The information indicated by these fields is defined and promised, and conversely, may be defined as follows. That is, the SOend field is information indicating whether in the RLC PDU having a serial number which is NACK_SN−1, a segment starts from any location of an original RLC PDU and is segmented to the end, and the SOstart field is information indicating whether in the RLC PDU having a serial number which is NACK_SN+NACK_RANGE, a segment starts from any location of an original RLC PDU and is segmented up to any location.

(When NACK_TYPE Field is 10)

The SOstart field indicates a head location of the part when indicating a part of the NACK_SN. When the head location is indicated, it may be indicated by units of byte. The SOstart has a predetermined length, and the predetermined length can be variously defined such as 15 bits, 16 bits, and 18 bits.

The SOend field indicates the tail location of the part when indicating a part of the NACK_SN. When the tail location is indicated, it may be indicated by units of byte. The SOend has a predetermined length, and the predetermined length can be variously defined such as 15 bits, 16 bits, and 18 bits.

(When NACK_TYPE Field is 11)

The SOstart field is information indicating whether in the RLC PDU having a serial number which is NACK_SN−1, a segment starts from any location of an original RLC PDU and is segmented to the end. Depending on the definition, the SOstart field is information indicating whether in the RLC PDU having a serial number which is NACK_SN, a segment starts from any location of an original RLC PDU and is segmented to the end. When the segmented location is indicated, it may be indicated by units of byte. The SOstart has a predetermined length, and the predetermined length can be variously defined such as 15 bits, 16 bits, and 18 bits. In addition, the SOstart field defines, as a special value, a value having all zero as 000 . . . 0.0000 or a value having all 1 as 111 . . . 1111 to indicate that there is no missed segment in the RLC PDU having a serial number which is the NACK_SN−1 or may indicate that the segment in the RLC PDU having a serial number which is the NACK_SN is not missed but the complete RLC PDU is missed.

The SOend field is information indicating whether in the RLC PDU having a serial number which is NACK_SN−1, a segment starts from the beginning of an original RLC PDU and is segmented to any location. In addition, depending on the definition, the SOend field is information indicating whether in the RLC PDU having a serial number which is NACK_SN+NACK_RANGE+1, a segment starts from the beginning of an original RLC PDU and is segmented to any location. When the segmented location is indicated, it may be indicated by units of byte. The SOend has a predetermined length, and the predetermined length can be variously defined such as 15 bits, 16 bits, and 18 bits. In addition, the SOend field defines, as a special value, a value having all zero as 000 . . . 0.0000 or a value having all 1 as 111 . . . 1111 to indicate that the segment in the RLC PDU having a serial number which is the NACK_SN+NACK_RANGE is not missed or the complete RLC PDU is missed or indicate that there is no segment missed in the RL PDU having a serial number which is NACK_SN+NACK_RANGE+1.

FIG. 2K is a diagram illustrating an operation of a terminal to which the embodiments of the present disclosure are applied.

In FIG. 2K, the operation of the terminal to which the second method for reporting an RLC state according to the present disclosure is applied is as follows.

The terminal identifies the missed RLC PDU information at the time of attempting to configure the RLC status report (2k-05).

If the missed RLC PDU information satisfies the first condition, the first operation may be performed. (2k-10)

If the missed RLC PDU information satisfies the second condition, the second operation may be performed. (2k-15)

If the missed RLC PDU information satisfies the third condition, the third operation may be performed. (2k-20)

If the missed RLC PDU information satisfies the fourth condition, the fourth operation may be performed. (2k-25)

If the missed RLC PDU information satisfies the fifth condition, the fifth operation may be performed. (2k-30)

If the missed RLC PDU information satisfies the sixth condition, the sixth operation may be performed. (2k-35)

In this case, the first condition is the case in which the individual RLC PDUs are missed. (2h-05). That is, the first operation may indicate, by the NACK_SN, the RLC serial numbers of the individual RLC PDUs like 2h-05 in order to indicate the serial numbers of the independently missed RLC PDUs, set the E1 to be 1 in order to indicate another missed packet behind, set the E2 to be 0 since there is no need to indicate the segment, and set the E3 to be 0 since there is no need to indicate the regions for the plurality of missed RLC PDUs, thereby indicating that the individual RLC PDU is missed like 2h-05.

In this case, the second condition is the case in which the individual RLC PDUs are missed. (2h-10). That is, the second operation may indicate, by the NACK_SN, the RLC serial numbers of the individual RLC PDUs like 2h-10 in order to indicate the missed independent RLC PDU segments, set the E2 to be 1 to the segment to, indicate that there are the SOstart field and the SOend field behind, and indicate the segment location of the corresponding RLC PDU using the SOstart field and the SOend field. In order to indicate another missed packet behind, E1 is set to be 1, and since the regions for the plurality of missed RLC PDUs are not indicated, E3 may be set to be 0 to indicate the segments of the individual RLC PDUs are missed like 2h-10.

In this case, the third condition is the case in which a number of consecutive RLC PDUs are missed at once. (2h-10). That is, the third operation may indicate, by the NACK_SN, RLC serial numbers of an individual RLC PDU corresponding to the lowest serial number or the highest serial number like 2h-15 in order to indicate a number of consecutive RLC PDUs at once, set the E3 to be 1 to in order to indicate regions for a number of RLC PDUs consecutively missed to indicate that the NACK_RANGE field follows, and indicate the regions for the corresponding consecutive RLC PDUs using the NACK_RANGE field. In this case, the NACK_RANGE field may indicate how many the consecutive NACK_SNs have been missed. Then, to indicate another missed packet, the E1 may be set to be 1. Since there is no need to indicate the segment, the E2 may be set to be 0 to indicate that the plurality of RLC PDUs are missed consecutively like 2h-15.

In this case, the fourth operation is the case in which the last segment of one RLC PDU, a number of RLC PDUs consecutive thereafter, and a first segment of one RLC PDU consecutive thereafter are missed at once (2h-20-1).

That is, in the fourth operation, the last segment of one RLC PDU, a number of RLC PDUs consecutive thereafter, and the first segment of one RLC PDU consecutive thereafter indicate the first and last segments in the same manner as 2h-10 and a number of consecutive RLC PDUs are indicated in the same manner as 2h-15, which may be reported to the transmitting end.

In this case, the fifth operation is the case in which the last segment of one RLC PDU and a number of RLC PDUs consecutive thereafter may be missed at once (2h-20-2). That is, in the fifth operation, the last segment of one RLC PDU and a number of RLC PDUs consecutive thereafter indicate the first segment in the same manner as 2h-10 and a number of consecutive RLC PDUs are indicated in the same manner as 2h-15, which may be reported to the transmitting end.

In this case, the sixth case is the case in which a number of consecutive RLC PDUs and the first segment of a number of RLC PDUs consecutive thereafter may be missed at once (2h-20-3). That is, in the sixth operation, a number of consecutive RLC PDUs and the first segment of one RLC PDU consecutive thereafter indicate the last segment in the same manner as 2h-10 and a number of consecutive RLC PDUs are indicated in the same manner as 2h-15, which may be reported to the transmitting end.

After one of the six conditions is satisfied and thus one operation is performed, the terminal again proceeds to step 2k-05 to again identify the six conditions to additionally report another missed RLC PDU and continuously performs the operation corresponding thereto to report all the missed RLC PDUs. The above operation may be repeatedly performed until the RLC status report for reporting the missed RLC PDUs is completed or the RLC status report is filled by the size of the allocated transmission resources.

In FIG. 2K, the operation of the terminal to which the third method for reporting an RLC state according to the present disclosure is applied is as follows.

The terminal identifies the missed RLC PDU information at the time of attempting to configure the RLC status report (2k-05).

If the missed RLC PDU information satisfies the first condition, the first operation may be performed. (2k-10)

If the missed RLC PDU information satisfies the second condition, the second operation may be performed. (2k-15)

If the missed RLC PDU information satisfies the third condition, the third operation may be performed. (2k-20)

If the missed RLC PDU information satisfies the fourth condition, the fourth operation may be performed. (2k-25)

If the missed RLC PDU information satisfies the fifth condition, the fifth operation may be performed. (2k-30)

If the missed RLC PDU information satisfies the sixth condition, the sixth operation may be performed. (2k-35)

In this case, the first condition is the case in which the individual RLC PDUs are missed. (2i-05). That is, the first operation may indicate, by the NACK_SN, the RLC serial numbers of the individual RLC PDUs like 2i-05, set E1 to be 1 in order to indicate another missed packet behind, set E2 to be 0 since there is no need to indicate the segment, and set E3 to be 0 since there is no need to indicate the regions for the plurality of missed RLC PDUs, thereby indicating that the individual RLC PDU is missed like 2i-05.

In this case, the second operation is the case in which the segments of the individual RLC PDUs are missed. (2i-10). That is, the second operation may indicate, by the NACK_SN, the serial numbers of the RLC serial numbers of the individual RLC PDUs like 2i-10, set E2 to be 1 to indicate the segment to indicate that there are the SOstart field and the SOend field behind, and indicate the segment location of the corresponding RLC PDU using the SOstart field and the SOend field. In order to indicate another missed packet behind, E1 is set to be 1. Since the regions for the plurality of missed RLC PDUs is not indicated, E3 may be set to be 0 to indicate the segments of the individual RLC PDUs are missed like 2i-10.

In this case, the third condition is the case in which a number of consecutive RLC PDUs are missed. (2i-15). That is, the third operation may indicate, by the NACK_SN, the RLC serial numbers of an individual RLC PDU corresponding to the lowest serial number or the highest serial number like 2i-15, set E3 to be 1 to indicate the regions for a number of RLC PDUs consecutively missed to indicate that the NACK_RANGE field follows, and indicate the regions for the corresponding consecutive RLC PDUs using the NACK_ RANGE field. In this case, the NACK_RANGE field may indicate how many the consecutive NACK_SNs have been missed. Then, to indicate another missed packet, E1 may be set to be 1. Since there is no need to indicate the segment, E2 may be set to be 0 to indicate that the plurality of RLC PDUs are missed consecutively like 2i-15.

In this case, the fourth condition is the case in which the last segment of one RLC PDU, a number of RLC PDUs consecutive thereafter, and the first segment of one RLC PDU consecutive thereafter are missed at once. (2i-20-1). That is, the fourth operation may indicate the missing of the last segment of one RLC PDU, a number of RLC PDUs consecutive thereafter, and the first segment of one RLC PDU consecutive thereafter by using the NACK_RANGE field and the SOstart field and the SOend field together like 2i-20. That is, the SOstart field may indicate whether in the RLC PDU having a serial number which is NACK_SN−1, a segment starts from any location of an original RLC PDU and is segmented to the end, and the SOend field may indicate whether in the RLC PDU having a serial number which is NACK_SN+NACK_RANGE, a segment starts from any location of an original RLC PDU and is segmented up to any location. Accordingly, the last segment of one RLC PDU, a number of subsequent consecutive RLC PDUs, and the first segment of one of subsequent consecutive RLC PDUs indicate the first and last segments in the same manner as 2i-10 and a number of consecutive RLC PDUs are indicated in the same manner as 2i-15, which may be reported to the transmitting end.

In this case, the fifth condition is the case in which the segment of one RLC PDU and a large number of RLC PDUs consecutive thereafter are missed at once (2i-20-2). That is, the fifth operation may indicate the mission of the last segment of one RLC PDU and a number of RLC PDUs consecutive thereafter by using the NACK_RANGE field and the SOstart field and the SOend field like 2i-20. That is, the SOstart field may indicate whether in the RLC PDU having a serial number which is NACK_SN−1, a segment starts from any location of an original RLC PDU, and the SOend field may define, as a special value, a value having all zero as 000 . . . 0.0000 or a value having all 1 as 111 . . . 1111 to indicate that a segment of the RLC PDU having a serial number which is the NACK_SN+NACK_ RANGE is not missed but the complete RLC PDU is missed. Accordingly, the last segment of one RLC PDU and a number of RLC PDUs consecutive thereafter indicate the first segment in the same manner as 2i-10 and a number of consecutive RLC PDUs are indicated in the same manner as 2i-15, thereby more reducing the overhead than the case of the reporting.

In this case, the sixth condition is the case in which a number of consecutive RLC PDUs and the first segment of one RLC PDU consecutive thereafter are missed at once (2i-20-3). That is, the sixth operation may indicate the missing of a number of consecutive RLC PDUs and the first segment of one RLC PDU consecutive thereafter by using the NACK_RANGE field and the SOstart and the SOend field like 2i-20. That is, the SOstart field defines, as a special value, a value having all zero as 000 . . . 0.0000 or a value having all 1 as 111 . . . 1111 to indicate that there is no missed segment in the RLC PDU having a serial number which is the NACK_SN−1, and the SOend field may indicate whether in the RLC PDU having a serial number which is NACK_SN+NACK_RANGE, a segment starts from any location of an original RLC PDU and is segmented up to any location. Therefore, a number of consecutive RLC PDUs and the first segment of one RLC PDU consecutive thereafter indicate the last segment in the same manner as 2i-10 and a number of consecutive RLC PDUs are indicated in the same manner as 2i-15, thereby more reducing the overhead than the case of the reporting.

After one of the six conditions is satisfied and thus one operation is performed, the terminal again proceeds to step 2k-05 to again identify the six conditions to additionally report another missed RLC PDU and continuously performs the operation corresponding thereto to report all the missed RLC PDUs. The above operation may be repeatedly performed until the RLC status report for reporting the missed RLC PDUs is completed or the RLC status report is filled by the size of the allocated transmission resources.

In FIG. 2K, the operation of the terminal to which the fourth method for reporting an RLC state according to the present disclosure is applied is as follows.

The terminal identifies the missed RLC PDU information at the time of attempting to configure the RLC status report (2k-05).

If the missed RLC PDU information satisfies the first condition, the first operation may be performed. (2k-10)

If the missed RLC PDU information satisfies the second condition, the second operation may be performed. (2k-15)

If the missed RLC PDU information satisfies the third condition, the third operation may be performed. (2k-20)

If the missed RLC PDU information satisfies the fourth condition, the fourth operation may be performed. (2k-25)

If the missed RLC PDU information satisfies the fifth condition, the fifth operation may be performed. (2k-30)

If the missed RLC PDU information satisfies the sixth condition, the sixth operation may be performed. (2k-35)

In this case, the first condition is the case in which the individual RLC PDUs are missed. (2j-05). That is, the first operation may indicate, by the NACK_SN, the RLC serial numbers of the individual RLC PDUs like 2i-05, set E1 to be 1 in order to indicate another missed packet behind, need not indicate the segment, and set the NACK_TYPE field to be 00 since there is no need to indicate the segment, thereby indicating that the individual RLC PDU is missed like 2j-05.

In this case, the second operation is the case in which the segments of the individual RLC PDUs are missed. (2j-10). That is, the second operation may indicate, by the NACK_SN, the serial numbers of the RLC serial numbers of the individual RLC PDUs like 2j-10, set the NACK_TYPE field to be 10 to indicate the segment to indicate that there are the SOstart field and the SOend field behind, indicate that there is no NACK FIELD field, and indicate the segment location of the corresponding RLC PDU using the SOstart field and the SOend field. That is, it may be indicated whether the segment of the individual RLC PDU is missed like 2j-10.

In this case, the third condition is the case in which a number of consecutive RLC PDUs are missed. (2j-15). That is, the third operation may indicate, by the NACK_SN, the RLC serial numbers of an individual RLC PDU corresponding to the lowest serial number or the highest serial number like 2ji-15, set the NACK_TYPE field to be 01 to indicate the regions for a number of RLC PDUs consecutively missed to indicate that the NACK_RANGE field follows, and indicate that there are no SOstart field and SOend field to indicate the regions for the corresponding consecutive RLC PDUs using the NACK_RANGE field. In this case, the NACK_RANGE field may indicate how many the consecutive NACK_SNs have been missed. To indicate another missed packet behind, the E1 may be set to be 1, indicating that the plurality of RLC PDUs consecutively missed like 2*j*-15 are missed.

In this case, the fourth condition is the case in which the last segment of one RLC PDU, a number of RLC PDUs consecutive thereafter, and the first segment of one RLC PDU consecutive thereafter are missed at once. (2*j*-20-1). That is, the fourth operation may indicate the missing of the last segment of one RLC PDU, a number of RLC PDUs consecutive thereafter, and the first segment of one RLC PDU consecutive thereafter by setting the NACK_TYPE field to be 11 and using the NACK_RANGE field and the SOstart field and the SOend field together like 2*j*-20. That is, the SOstart field may indicate whether in the RLC PDU having a serial number which is NACK_SN−1, a segment starts from any location of an original RLC PDU and is segmented to the end, and the SOend field may indicate whether in the RLC PDU having a serial number which is NACK_SN+NACK_RANGE, a segment starts from any location of an original RLC PDU and is segmented up to any location. Accordingly, the last segment of one RLC PDU, a number of subsequent consecutive RLC PDUs, and the first segment of one of subsequent consecutive RLC PDUs indicate the first and last segments in the same manner as 2*j*-10 and a number of consecutive RLC PDUs are indicated in the same manner as 2*j*-15, which may be reported to the transmitting end.

In this case, the fifth condition is the case in which the segment of one RLC PDU and a large number of RLC PDUs consecutive thereafter are missed at once (2*j*-20-2). That is, the fifth operation may indicate the mission of the last segment of one RLC PDU and a number of RLC PDUs consecutive thereafter by setting the NACK_TYPE field to be 11 and using the NACK_RANGE field and the SOstart field and the SOend field like 2*j*-20. That is, the SOstart field may indicate whether in the RLC PDU having a serial number which is NACK_SN−1, a segment starts from any location of an original RLC PDU, and the SOend field may define, as a special value, a value having all zero as 000 . . . 0.0000 or a value having all 1 as 111 . . . 1111 to indicate that a segment of the RLC PDU having a serial number which is the NACK_SN+NACK_RANGE is not missed but the complete RLC PDU is missed. Accordingly, the last segment of one RLC PDU and a number of RLC PDUs consecutive thereafter indicate the first segment in the same manner as 2*j*-10 and a number of consecutive RLC PDUs are indicated in the same manner as 2*j*-15, thereby more reducing the overhead than the case of the reporting.

In this case, the sixth condition is the case in which a number of consecutive RLC PDUs and the first segment of one RLC PDU consecutive thereafter are missed at once (2*j*-20-3). That is, the sixth operation may indicate the missing of a number of consecutive RLC PDUs and the first segment of one RLC PDU consecutive thereafter by setting the NACK_TYPE field to be 11 and using the NACK_RANGE field and the SOstart and the SOend field like 2*j*-20. That is, the SOstart field defines, as a special value, a value having all zero as 000 . . . 0.0000 or a value having all 1 as 111 . . . 1111 to indicate that there is no missed segment in the RLC PDU having a serial number which is the NACK_SN−1, and the SOend field may indicate whether in the RLC PDU having a serial number which is NACK_SN+NACK_RANGE, a segment starts from any location of an original RLC PDU and is segmented up to any location. Therefore, a number of consecutive RLC PDUs and a first segment of one RLC PDU consecutive thereafter indicate the last segment in the same manner as 2*j*-10 and a number of consecutive RLC PDUs are indicated in the same manner as 2*j*-15, thereby more reducing the overhead than the case of the reporting.

After one of the six conditions is satisfied and thus one operation is performed, the terminal again proceeds to step 2*k*-05 to again identify the six conditions to additionally report another missed RLC PDU and continuously performs the operation corresponding thereto to report all the missed RLC PDUs. The above operation may be repeatedly performed until the RLC status report for reporting the missed RLC PDUs is completed or the RLC status report is filled by the size of the allocated transmission resources.

Figure 2L:
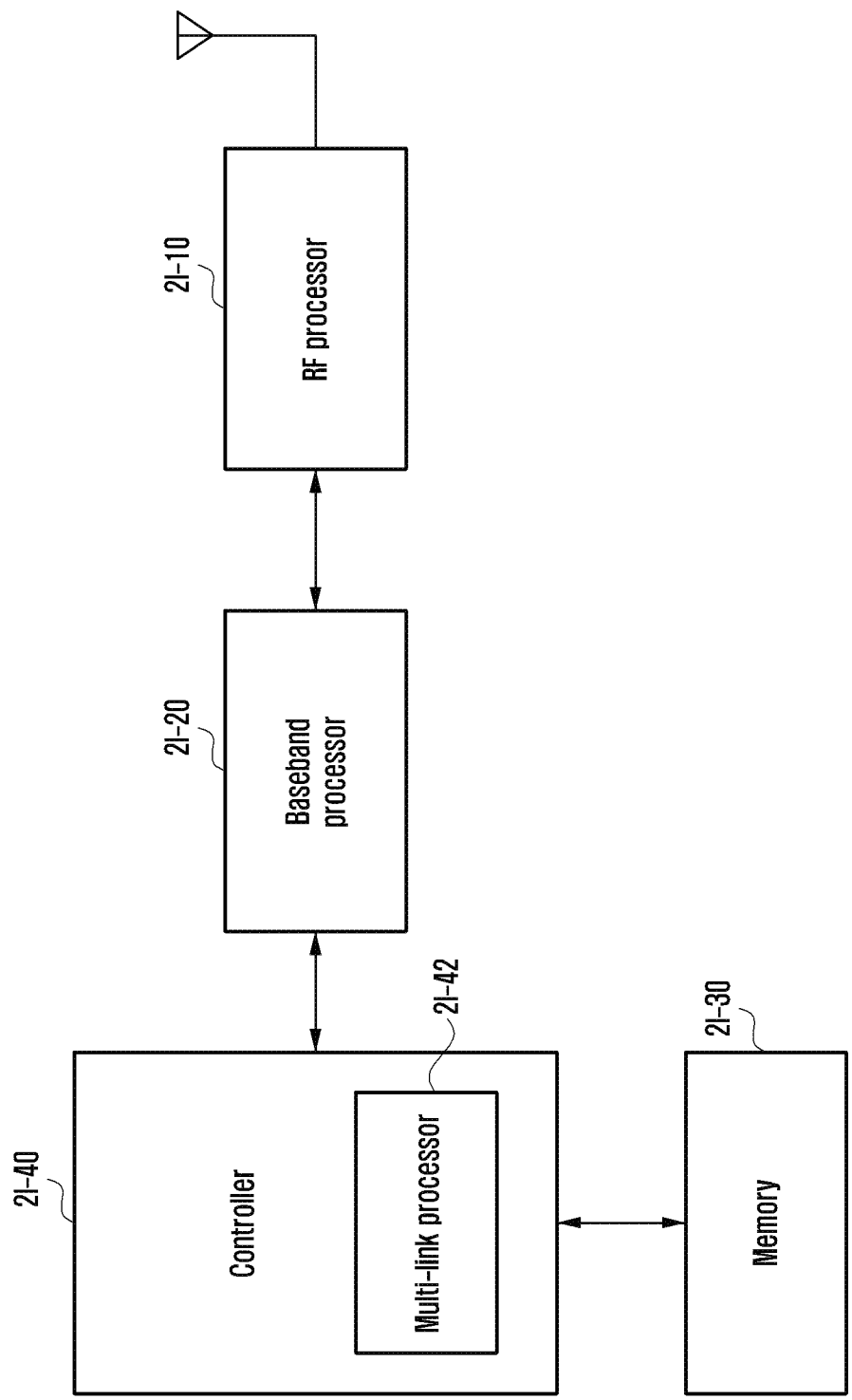
FIG. 2L is a diagram illustrating the structure of the terminal to which the embodiment of the present disclosure may be applied.

FIG. 2L is a diagram illustrating the structure of the terminal to which the embodiment of the present disclosure may be applied.

Referring to FIG. 2L, the terminal includes a radio frequency (RF) processor 2*l*-10, a baseband processor 2*l*-20, a memory 2*l*-30, and a controller 2*l*-40.

The RF processor 2*l*-10 serves to transmit/receive a signal through a radio channel, such as band conversion and amplification of a signal. That is, the RF processor 2*l*-10 up-converts a baseband signal provided from the baseband processor 2*l*-20 into an RF band signal and then transmits the RF band signal through an antenna and down-converts the RF band signal received through the antenna into the baseband signal. For example, the RF processor 2*l*-10 may include a transmitting filter, a receiving filter, an amplifier, a mixer, an oscillator, a digital to analog converter (DAC), an analog to digital converter (ADC), or the like. In the above figure, only one antenna is illustrated, but the terminal may include a plurality of antennas. Further, the RF processor 2*l*-10 may include the plurality of RF chains. Further, the RF processor 2*l*-10 may perform beamforming. For the beamforming, the RF processor 2*l*-10 may adjust a phase and a size of each of the signals transmitted and received through a plurality of antennas or antenna elements. In addition, the RF processor may perform MIMO and may receive a plurality of layers when performing a MIMO operation. The RF processor 2*l*-10 may perform reception beam sweeping by appropriately configuring a plurality of antennas or antenna elements under the control of the controller or adjust a direction and a beam width of the reception beam so that the reception beam is resonated with the transmission beam.

The baseband processor 2*l*-20 performs a conversion function between the baseband signal and the bit string according to a physical layer standard of the system. For example, when data are transmitted, the baseband processor 2*l*-20 generates complex symbols by coding and modulating a transmitting bit string. Further, when data are received, the baseband processor 2*l*-20 recovers the received bit string by demodulating and decoding the baseband signal provided from the RF processor 2*l*-10. For example, according to the orthogonal frequency division multiplexing (OFDM) scheme, when data are transmitted, the baseband processor 2*l*-20 generates the complex symbols by coding and modulating the transmitting bit string, maps the complex symbols to sub-carriers, and then performs an inverse fast Fourier transform (IFFT) operation and a cyclic prefix (CP) insertion to configure the OFDM symbols. Further, when data are received, the baseband processor 2*l*-20 divides the baseband signal provided from the RF processor 2*l*-10 in an OFDM symbol unit and recovers the signals mapped to the sub-carriers by a fast Fourier transform (FFT) operation and then recovers the receiving bit string by the modulation and decoding.

The baseband processor 2*l*-20 and the RF processor 2*l*-10 transmit and receive a signal as described above. Therefore, the baseband processor 2*l*-20 and the RF processor 2*l*-10 may be called a transmitter, a receiver, a transceiver, or a communication unit. Further, at least one of the baseband processor 2*l*-20 and the RF processor 2*l*-10 may include a plurality of communication modules to support a plurality of different radio access technologies. Further, at least one of the baseband processor 2*l*-20 and the RF processor 2*l*-10 may include different communication modules to process signals in different frequency bands. For example, the different wireless access technologies may include an LTE network, an NR network, and the like. Further, different frequency bands may include a super high frequency (SHF) (for example: 2.5 GHz, 5 GHz) band, a millimeter wave (for example: 60 GHz) band.

The memory 2*l*-30 stores data such as basic programs, application programs, and configuration information or the like for the operation of the terminal. Further, the memory 2*l*-30 provides the stored data according to the request of the controller 2*l*-40.

The controller 2*l*-40 controls the overall operations of the terminal. For example, the controller 2*l*-40 transmits/receives a signal through the baseband processor 2*l*-20 and the RF processor 2*l*-10. Further, the controller 2*l*-40 records and reads data in and from the memory 2*l*-30. For this purpose, the controller 2*l*-40 may include at least one processor. For example, the controller 2*l*-40 may include a communication processor (CP) performing a control for communication and an application processor (AP) controlling an upper layer such as the application programs. According to the embodiment of the present disclosure, the controller 2*l*-40 includes a multi-link processor 2*l*-42 that performs the processing to be operated in a multi-link mode.

Figure 2M:
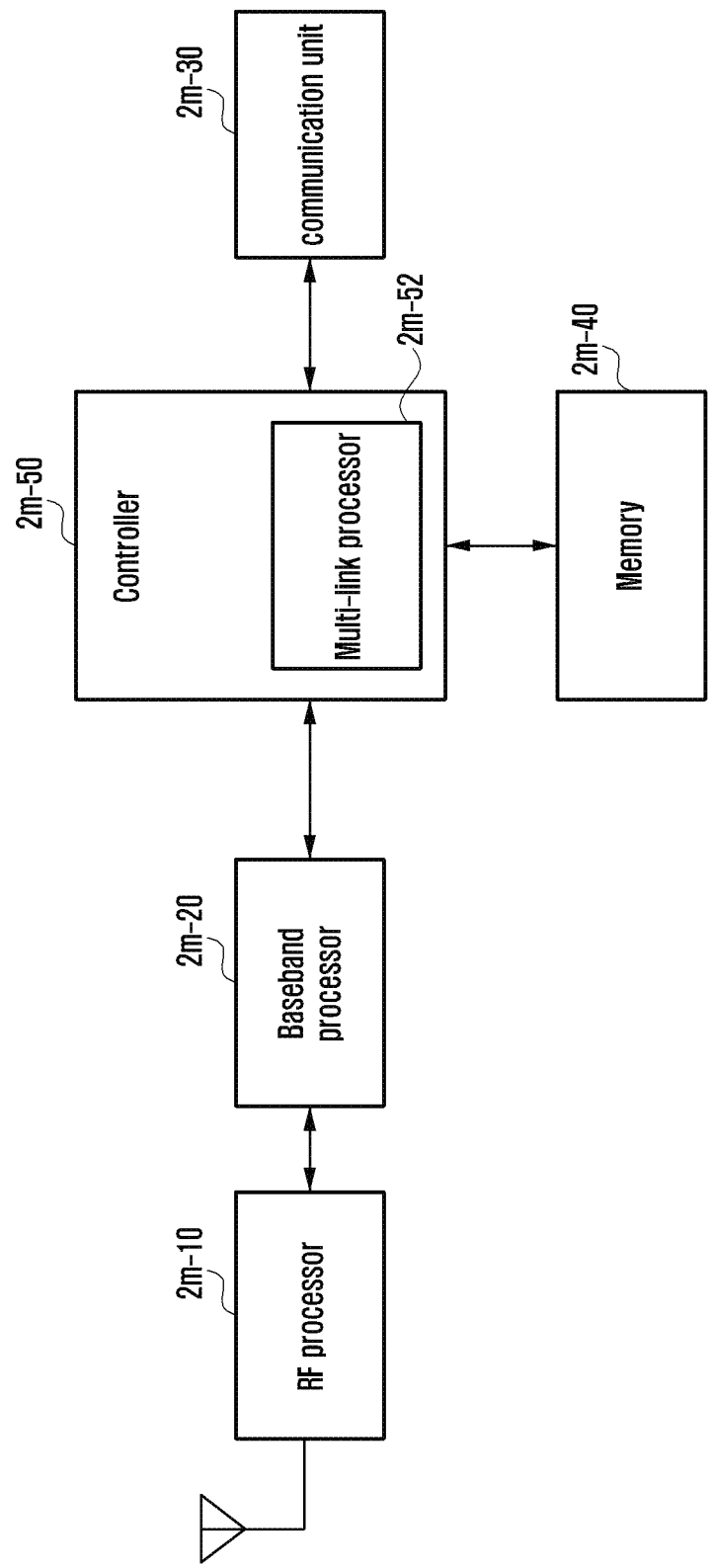
FIG. 2M is a block configuration diagram of TRP in a wireless communication system to which the embodiment of the present disclosure may be applied.

FIG. 2M illustrates a block configuration diagram of TRP in a wireless communication system to which the embodiment of the present disclosure may be applied.

As illustrated in FIG. 2M, the base station is configured to include an RF processor 2*m*-10, a baseband processor 2*m*-20, a communication unit 2*m*-30, a memory 2*m*-40, and a controller 2*m*-50.

The RF processor 2*m*-10 serves to transmit/receive a signal through a radio channel, such as band conversion and amplification of a signal. That is, the RF processor 2*m*-10 up-converts a baseband signal provided from the baseband processor 2*m*-20 into an RF band signal and then transmits the baseband signal through an antenna and down-converts the RF band signal received through the antenna into the baseband signal. For example, the RF processor 2*m*-10 may include a transmitting filter, a receiving filter, an amplifier, a mixer, an oscillator, a DAC, an ADC, etc. In the above figure, only one antenna is illustrated, but the first access node may include a plurality of antennas. Further, the RF processor 2*m*-10 may include the plurality of RF chains. Further, the RF processor 2*m*-10 may perform the beamforming. For the beamforming, the RF processor 2*m*-10 may adjust a phase and a size of each of the signals transmitted and received through a plurality of antennas or antenna elements. The RF processor may perform a downward MIMO operation by transmitting one or more layers.

The baseband processor 2*m*-20 performs a conversion function between the baseband signal and the bit string according to the physical layer standard of the first radio access technology. For example, when data are transmitted, the baseband processor 2*m*-20 generates complex symbols by coding and modulating a transmitting bit string. Further, when data are received, the baseband processor 2*m*-20 recovers the received bit string by demodulating and decoding the baseband signal provided from the RF processor 2*m*-10. For example, according to the OFDM scheme, when data are transmitted, the baseband processor 2*m*-20 generates the complex symbols by coding and modulating the transmitting bit string, maps the complex symbols to the sub-carriers, and then performs the IFFT operation and the CP insertion to configure the OFDM symbols. Further, when data are received, the baseband processor 2*m*-20 divides the baseband signal provided from the RF processor 2*m*-10 in an OFDM symbol unit and recovers the signals mapped to the sub-carriers by an FFT operation and then recovers the receiving bit string by the modulation and decoding. The baseband processor 2*m*-20 and the RF processor 2*m*-10 transmit and receive a signal as described above. Therefore, the baseband processor 2*m*-20 and the RF processor 2*m*-10 may be called a transmitter, a receiver, a transceiver, a communication unit, or a wireless communication unit.

The communicator 2*m*-30 provides an interface for performing communication with other nodes within the network.

The memory 2*m*-40 stores data such as basic programs, application programs, and setup information for the operation of the main base station. In particular, the memory 2*m*-40 may store the information on the bearer allocated to the accessed terminal, the measured results reported from the accessed terminal, etc. Further, the memory 2*m*-40 may store information that is a determination criterion on whether to provide a multiple connection to the terminal or stop the multiple connection to the terminal. Further, the memory 2*m*-40 provides the stored data according to the request of the controller 2*m*-50.

The controller 2*m*-50 controls the general operations of the main base station. For example, the controller 2*m*-50 transmits/receives a signal through the baseband processor 2*m*-20 and the RF processor 2*m*-10 or the backhaul communicator 2*m*-30. Further, the controller 2*m*-50 records and reads data in and from the memory 2*m*-40. For this purpose, the controller 2*m*-50 may include at least one processor. According to the embodiment of the present disclosure, the controller 2*m*-50 includes a multi-link processor 2*m*-52 that performs the processing to be operated in a multi-link mode.

Figure 3A:
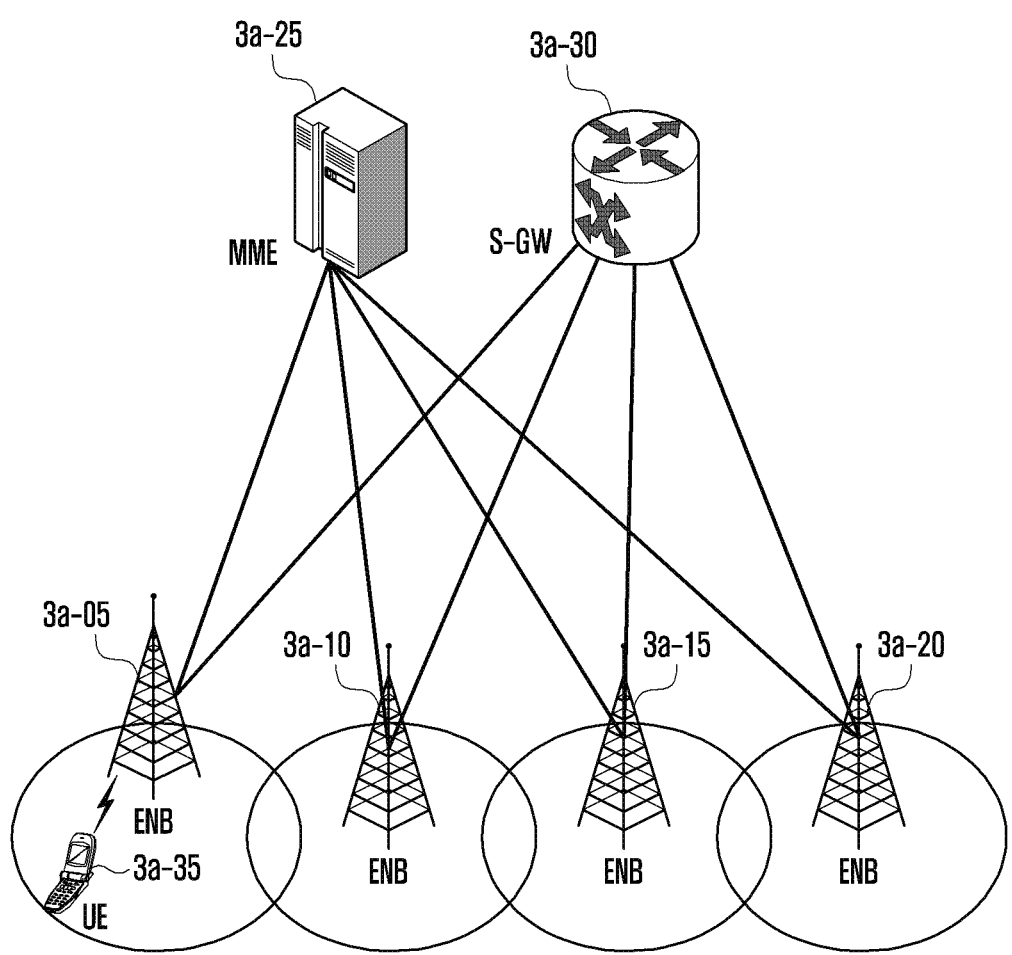
FIG. 3A is a diagram illustrating a structure of an LTE system to which the present disclosure may be applied.

FIG. 3A is a diagram illustrating a structure of an LTE system to which the present disclosure may be applied.

As illustrated in FIG. 3A, a radio access network of an LTE system is configured to include next generation base stations (evolved node B, hereinafter, ENB, Node B, or base station) 3*a*-05, 3*a*-10, 3*a*-15, and 3*a*-20, a mobility management entity (MME) 3*a*-25, and a serving-gateway (S-GW) 3*a*-30. User equipment (hereinafter, UE or terminal) 3*a*-35 accesses an external network through the ENBs 3*a*-05 to 3*a*-20 and the S-GW 3*a*-30.

In FIG. 3A, the ENBs 3*a*-05 to 3*a*-20 correspond to the existing node B of the UMTS system. The ENB is connected to the UE 3*a*-35 through a radio channel and performs more complicated role than the existing node B. In the LTE system, in addition to a real-time service like a voice over Internet protocol (VoIP) through the Internet protocol, all the user traffics are served through a shared channel and therefore an apparatus for collecting and scheduling status information such as a buffer status, an available transmission power status, and a channel status of the terminals is used.

Here, the eNBs 3a-05 to 3a-20 take charge of the collecting and scheduling. One ENB generally controls a plurality of cells. For example, to implement a transmission rate of 100 Mbps, the LTE system uses, as a radio access technology, orthogonal frequency division multiplexing (hereinafter, OFDM) in, for example, a bandwidth of 20 MHz. Further, an adaptive modulation & coding (hereinafter, referred to as AMC) determining a modulation scheme and a channel coding rate according to a channel status of the terminal is applied. The S-GW 3a-30 is an apparatus for providing a data bearer and generates or removes the data bearer according to the control of the MME 3a-25. The MME is an apparatus for performing a mobility management function for the terminal and various control functions and is connected to a plurality of base stations.

Figure 3B:
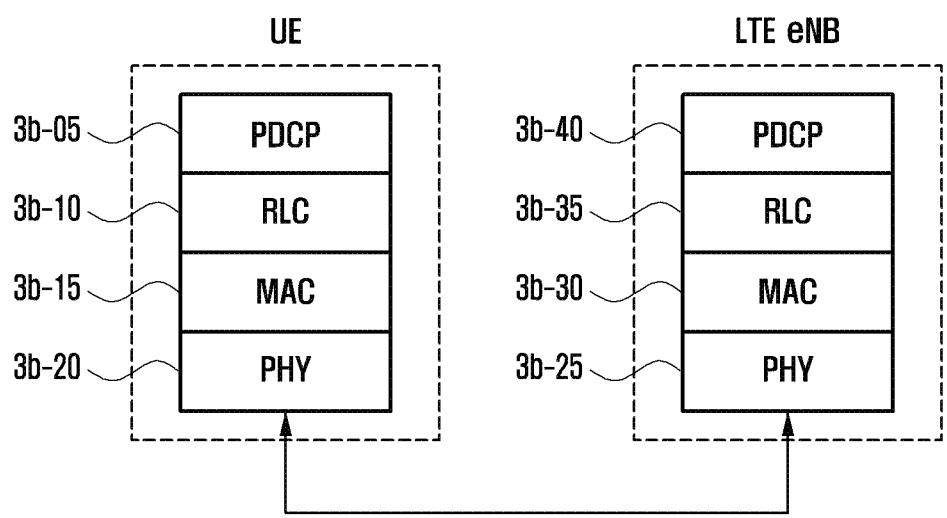
FIG. 3B is a diagram illustrating a radio protocol structure in the LTE system to which the present disclosure may be applied.

FIG. 3B is a diagram illustrating a radio protocol structure in the LTE system to which the present disclosure may be applied.

Referring to FIG. 3B, the radio protocol of the LTE system is configured to include packet data convergence protocols (PDCPs) 3b-05 and 3b-40, radio link controls (RLCs) 3b-10 and 3b-35, and medium access controls (MACs) 3b-15 and 3b-30, respectively, in the terminal and the ENB, respectively. The packet data convergence protocols (PDCPs) 3b-05 and 3b-40 are in charge of operations such as IP header compression/decompression. The main functions of the PDCP are summarized as follows.

- Header compression and decompression function (Header compression and decompression: ROHC only)
- Transfer function of user data (Transfer of user data)
- In-sequence delivery function (In-sequence delivery of upper layer PDUs at PDCP re-establishment procedure for RLC AM)
- Reordering function (For split bearers in DC (only support for RLC AM): PDCP PDU routing for transmission and PDCP PDU reordering for reception)
- Duplicate detection function (Duplicate detection of lower layer SDUs at PDCP re-establishment procedure for RLC AM)
- Retransmission function (Retransmission of PDCP SDUs at handover and, for split bearers in DC, of PDCP PDUs at PDCP data-recovery procedure, for RLC AM)
- Ciphering and deciphering function (Ciphering and deciphering)
- Timer-based SDU discard function (Timer-based SDU discard in uplink)

The radio link controls (hereinafter, referred to as RLCs) 3b-10 and 3b-35 reconfigures the PDCP packet data unit (PDU) to an appropriate size to perform the ARQ operation or the like. The main functions of the RLC are summarized as follows.

- Data transfer function (Transfer of upper layer PDUs)
- ARQ function (Error Correction through ARQ (only for AM data transfer))
- Concatenation, segmentation, reassembly functions (Concatenation, segmentation and reassembly of RLC SDUs (only for UM and AM data transfer))
- Re-segmentation function (Re-segmentation of RLC data PDUs (only for AM data transfer))
- Reordering function (Reordering of RLC data PDUs (only for UM and AM data transfer)
- Duplicate detection function (Duplicate detection (only for UM and AM data transfer))
- Error detection function (Protocol error detection (only for AM data transfer))
- RLC SDU discard function (RLC SDU discard (only for UM and AM data transfer))
- RLC re-establishment function (RLC re-establishment)

The MACs 3b-15 and 3b-30 are connected to several RLC layer devices configured in one terminal and perform an operation of multiplexing RLC PDUs into an MAC PDU and demultiplexing the RLC PDUs from the MAC PDU. The main functions of the MAC are summarized as follows.

- Mapping function (Mapping between logical channels and transport channels)
- Multiplexing/demultiplexing function (Multiplexing/demultiplexing of MAC SDUs belonging to one or different logical channels into/from transport blocks (TB) delivered to/from the physical layer on transport channels)
- Scheduling information reporting function (Scheduling information reporting)
- HARQ function (Error correction through HARQ)
- Priority handling function between logical channels (Priority handling between logical channels of one UE)
- Priority handling function between terminals (Priority handling between UEs by means of dynamic scheduling)
- MBMS service identification function (MBMS service identification)
- Transport format selection function (Transport format selection)
- Padding function (Padding)

Physical layers 3b-20 and 3b-25 perform an operation of channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

Figure 3C:
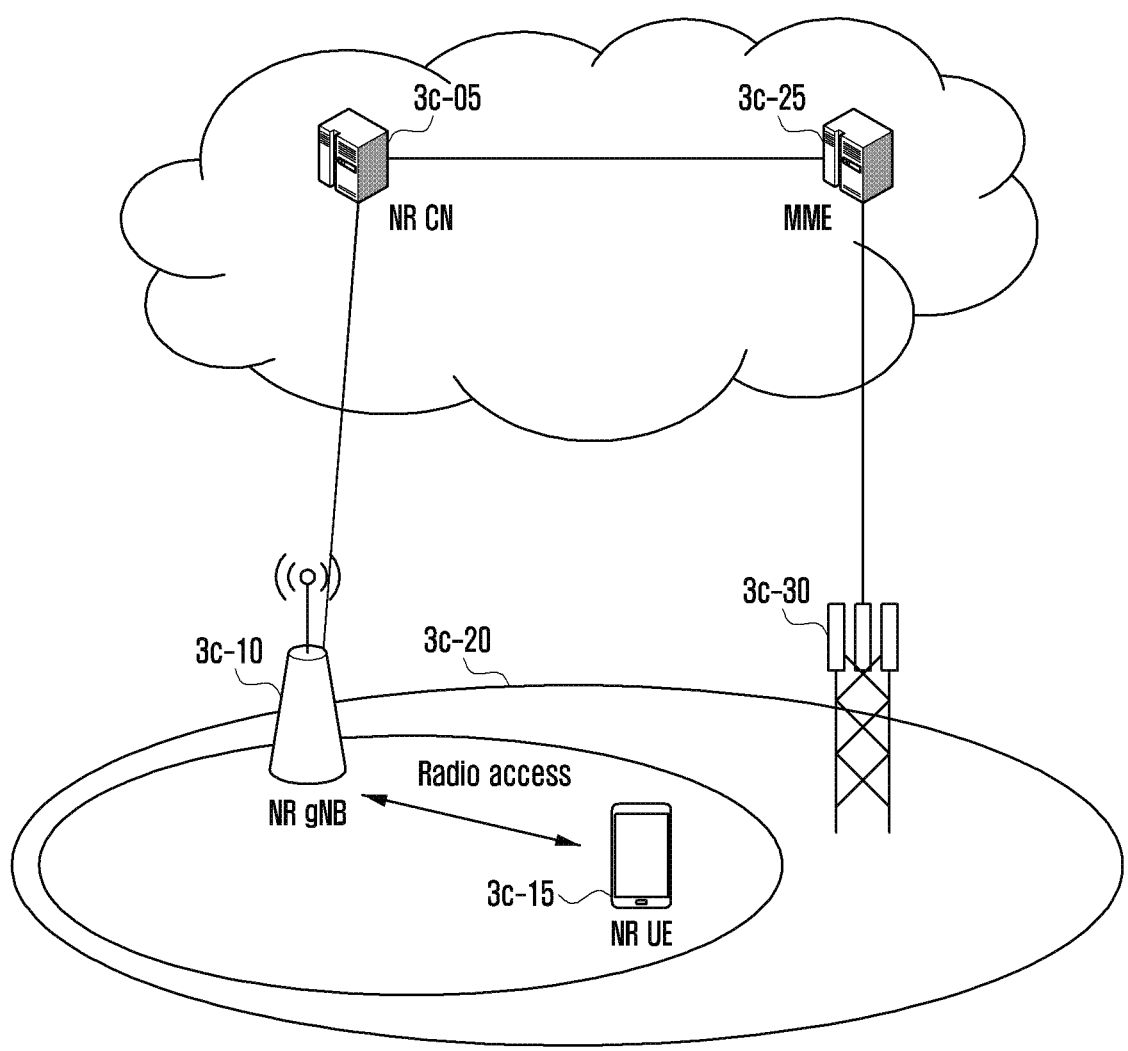
FIG. 3C is a diagram illustrating a structure of a next generation mobile communication system to which the present disclosure may be applied.

FIG. 3C is a diagram illustrating a structure of a next generation mobile communication system to which the present disclosure may be applied.

Referring to FIG. 3C, a radio access network of a next generation mobile communication system (hereinafter referred to as NR or 5G) is configured to include a next generation base station (New radio node B, hereinafter NR gNB or NR base station) 3c-10 and a new radio core network (NR CN) 3c-05. The user terminal (new radio user equipment, hereinafter, NR UE or UE) 3c-15 accesses the external network through the NR gNB 3c-10 and the NR CN 3c-05.

In FIG. 3C, the NR gNB 3c-10 corresponds to an evolved node B (eNB) of the existing LTE system. The NR gNB is connected to the NR UE 3c-15 via a radio channel and may provide a service superior to the existing node B. In the next generation mobile communication system, since all user traffics are served through a shared channel, an apparatus for collecting state information such as a buffer status, an available transmission power state, and a channel status of the UEs to perform scheduling is used. The NR gNB 3c-10 may serve as the device. One NR gNB generally controls a plurality of cells. In order to realize high-speed data transmission compared with the current LTE, the NR gNB may have an existing maximum bandwidth or more, and may be additionally incorporated into a beam-forming technology may be applied by using orthogonal frequency division multiplexing (hereinafter, referred to as OFDM) as a radio access technology. Further, an adaptive modulation & coding (hereinafter, referred to as AMC) determining a modulation scheme and a channel coding rate according to a channel status of the terminal is applied. The NR CN 3c-05 may perform functions such as mobility support, bearer setup, QoS setup, and the like. The NR CN is an apparatus for performing a mobility management function for the terminal and various control functions and is connected to a plurality of base stations. In addition, the next generation mobile communication system can interwork with the existing LTE system, and the NR CN is connected to the MME 3c-25 through the network interface. The MME is connected to the eNB 3c-30 which is the existing base station.

Figure 3D:
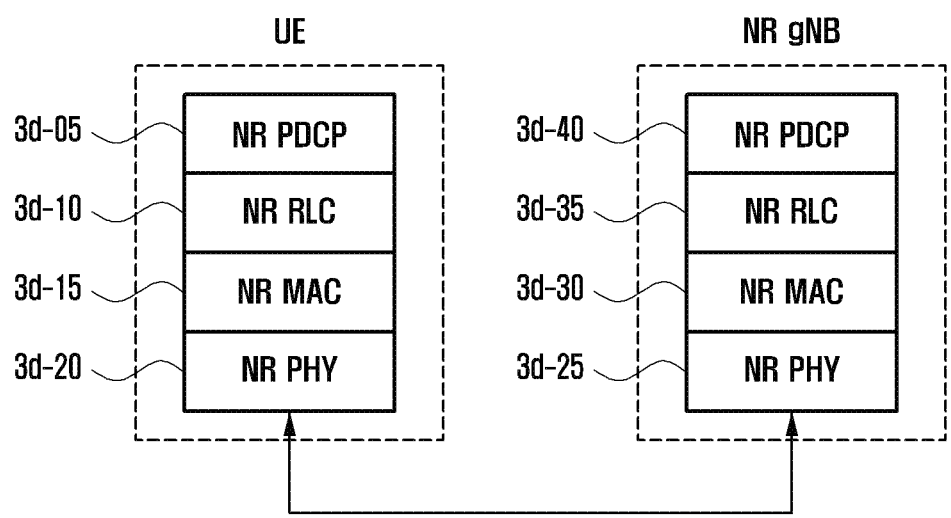
FIG. 3D is a diagram illustrating the radio protocol structure of the next generation mobile communication system to which the present disclosure may be applied.

FIG. 3D is a diagram illustrating the radio protocol structure of the next generation mobile communication system to which the present disclosure may be applied.

Referring to FIG. 3D, the radio protocol of the next generation mobile communication system is configured to include NR PDCPs 3d-05 and 3d-40, NR RLCs 3d-10 and 3d-35, and NR MACs 3d-15 and 3d-30 in the terminal and the NR base station. The main functions of the NR PDCPs 3d-05 and 3d-40 may include some of the following functions.

- Header compression and decompression function (Header compression and decompression: ROHC only)
- Transfer function of user data (Transfer of user data)
- In-sequence delivery function (In-sequence delivery of upper layer PDUs)
- Reordering function (PDCP PDU reordering for reception)
- Duplicate detection function (Duplicate detection of lower layer SDUs)
- Retransmission function (Retransmission of PDCP SDUs)
- Ciphering and deciphering function (Ciphering and deciphering)
- Timer-based SDU discard function (Timer-based SDU discard in uplink)

In this case, the reordering function of the NR PDCP apparatus refers to a function of reordered PDCP PDUs received in a lower layer in order based on a PDCP sequence number (SN) and may include a function of transferring data to the upper layer in the reordered order, a function of recording PDCP PDUs missed by the reordering, a function of reporting a state of the missed PDCP PDUs to a transmitting side, and a function of requesting a retransmission of the missed PDCP PDUs.

The main functions of the NR RLCs 3d-10 and 3d-35 may include some of the following functions.

- Data transfer function (Transfer of upper layer PDUs)
- In-sequence delivery function (In-sequence delivery of upper layer PDUs)
- Out-of-sequence delivery function (Out-of-sequence delivery of upper layer PDUs)
- ARQ function (Error correction through HARQ)
- Concatenation, segmentation, reassembly function (Concatenation, segmentation and reassembly of RLC SDUs)
- Re-segmentation function (Re-segmentation of RLC data PDUs)
- Reordering function (Reordering of RLC data PDUs)
- Duplicate detection function (Duplicate detection)
- Error detection function (Protocol error detection)
- RLC SDU discard function (RLC SDU discard)
- RLC re-establishment function (RLC re-establishment)

In this case, the in-sequence delivery function of the NR RLC apparatus refers to a function of delivering RLC SDUs received from a lower layer to an upper layer in order, and may include a function of reassembling and transferring an original one RLC SDU which is divided into a plurality of RLC SDUs and received. The NR RLC may include a function of reorder the received RLC PDUs based on the RLC sequence number (SN) or the PDCP sequence number (SN) and a function of recording the RLC PDUs missed by the reordering. The NR RLC may include a function of reporting a state of the missed RLC PDUs to the transmitting side and a function of requesting a retransmission of the missed RLC PDUs. The NR RLC may include a function of transferring only the SLC SDUs before the missed RLC SDU to the upper layer in order when there is the missed RLC SDU and a function of transferring all the received RLC SDUs to the upper layer before a predetermined timer starts if the timer expires even if there is the lost RLC SDU. Alternatively, the NR RLC may include a function of transferring all the RLC SDUs received until now to the upper layer in order if the predetermined timer expires even if there is the missed RLC SDU. Further, the NR RLC may process the RLC PDUs in the received order (in order of arrival regardless of the order of a serial number and the sequence number), and may transmit the processed RLC PDUs to the PDCP apparatus the out-of-sequence delivery. In the case of the segment, the NR RLC may receive the segments which are stored in the buffer or is to be received later and reconfigure the RLC PDUs into one complete RLC PDU and then transmit the complete RLC PDU to the PDCP apparatus. The NR RLC layer may not include the concatenation function and may perform the function in the NR MAC layer or may be replaced by the multiplexing function of the NR MAC layer.

In this case, the out-of-sequence delivery function of the NR RLC apparatus refers to a function of directly delivering the RLC SDUs received from the lower layer to the upper layer regardless of order. The NR RLC may include a function of reassembling and transferring an original one RLC SDU which is divided into several RLC SDUs and received, and a function of storing and reordering the RLC SN or the PDCP SP of the received RLC PDUs to record the missed RLC PDUs.

The NR MACs 3d-15 and 3d-30 may be connected to several NR RLC layer apparatus configured in one terminal, and the main functions of the NR MAC may include some of the following functions.

- Mapping function (Mapping between logical channels and transport channels)
- Multiplexing and demultiplexing function (Multiplexing/demultiplexing of MAC SDUs)
- Scheduling information reporting function (Scheduling information reporting)
- HARQ function (Error correction through HARQ)
- Priority handling function between logical channels (Priority handling between logical channels of one UE)
- Priority handling function between terminals (Priority handling between UEs by means of dynamic scheduling)
- MBMS service identification function (MBMS service identification)
- Transport format selection function (Transport format selection)
- Padding function (Padding)

The NR PHY layers 3d-20 and 3d-25 may perform an operation of channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

Figure 3E:
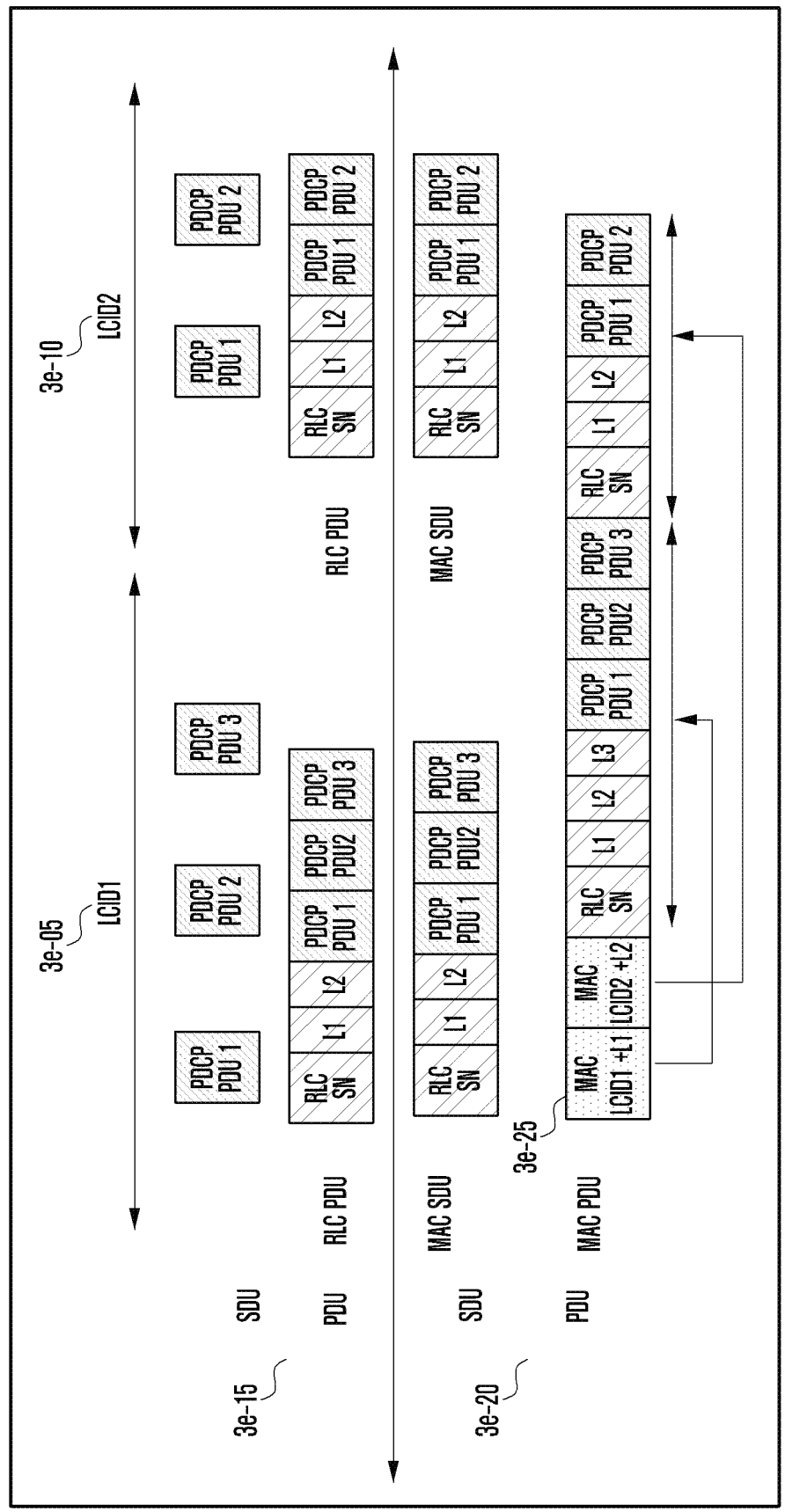
FIGS. 3EA-3EB are diagrams illustrating a structure of processing data in the LTE system.
Figure 3E:
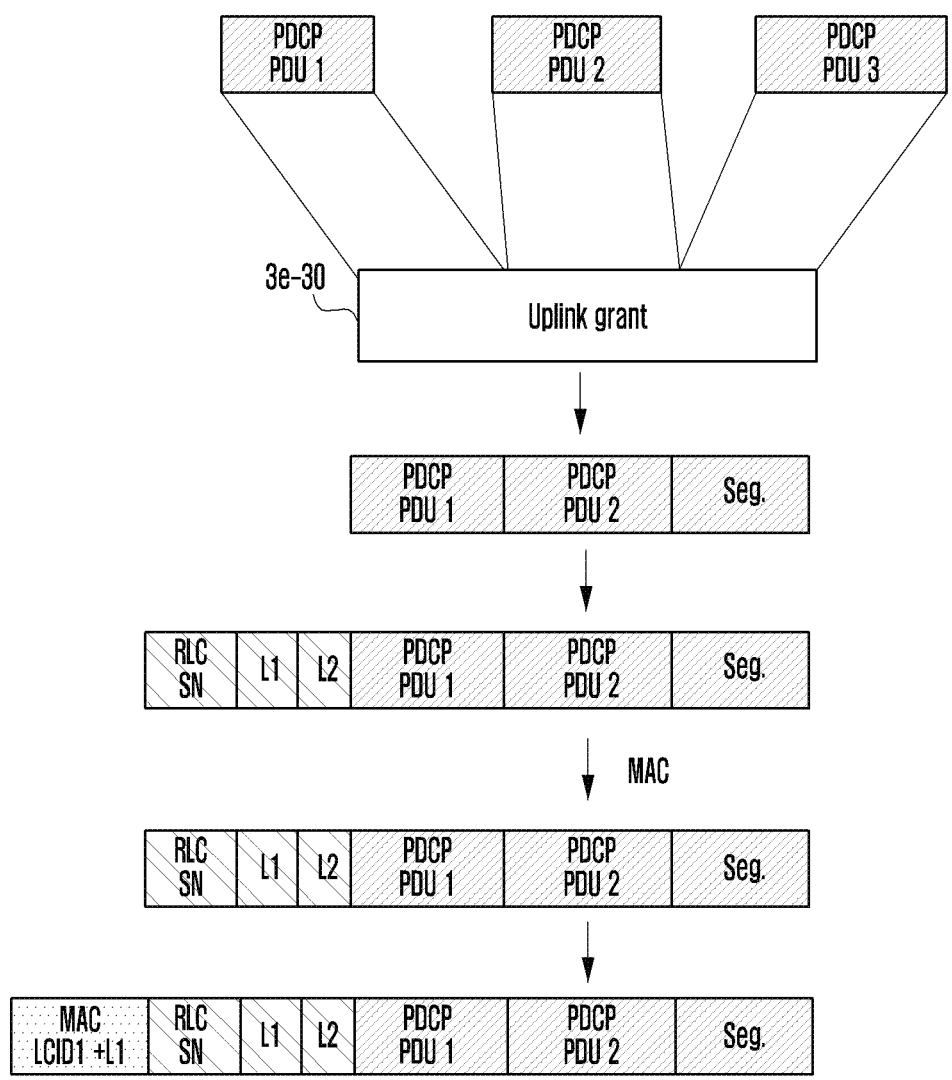

FIGS. 3EA-3EB are diagrams illustrating a structure of processing data in the LTE system.

As shown in FIGS. 3EA-3EB, in the LTE system, the data processing is performed in the PDCP layer and the RLC layer for each logical channel. That is, the logical channel 1

3e-05 and the logical channel 3 3e-10 have different PDCP layers and RLC layers and perform independent data processing. Then, the RLC PDU generated from the RLC layer of each logical channel is transmitted to the MAC layer, which is configured as one MAC PDU, and then transmitted to the receiving end. In the LTE system, the PDCP layer, the RLC layer, and the MAC layer may include the functions described with reference to FIG. 3B, and may perform corresponding operations.

The LTE system may be characterized in that the PDCP PDUs concatenate in the RLC layer and in the MAC PDU structure as shown in 3e-25, all the MAC subheaders are located at the head part and the MAC SDU part is located at the tail part of the MAC PDU. Due to the above characteristics, in the LTE system, the data processing may be performed in advance or prepared in the RLC layer before the uplink transmission resource (uplink grant) is received. If receiving the uplink transmission resource 3e-30 as shown in FIG. 3E, the terminal concatenates the PDCP PDUs received from the PDCP layer according to the uplink transmission resource to generate the RLC PDU. The uplink transmission resources are received from the base station in the MAC layer and then subjected to logical channel prioritization (LCP), and the uplink transmission resources are allocated to each logical channel. That is, the uplink transmission resource 3e-30 is the uplink transmission resource allocated from the MAC layer. If the size of the PDCP PDUs to be concatenated does not match the uplink transmission resource, the RLC layer performs a segmentation procedure to match the PDCP PDUs with the uplink transmission resources. The above procedure may be performed for each logical channel, and each RLC apparatus can configure an RLC header using the concatenated PDCP PDUs and transmit the completed RLC PDU to the MAC apparatus. The MAC apparatus may configure the RLC PDUs (MAC SDUs) received from each RLC layer as one MAC PDU and transmit the MAC PDU to the PHY apparatus. When the RLC apparatus performs a segmentation operation when configuring the RLC header and includes the segmented information in the header, the MAC apparatus may include the length information of each of the concatenated PDCP PDUs in the header (which is to be reassembled at the receiving end).

As described above, in the LTE system, the data processing of the RLC layer, the MAC layer, and the PHY layer starts from the time when the uplink transmission resource is received.

In the LTE system, the RLC layer may operate in an RLC acknowledged mode (AM) mode, an RLC unacknowledged mode (UM) mode, and an RLC transparent mode (TM) mode. In the RLC AM mode, the RLC layer supports the ARQ function, the transmitting end may receive the RLC status report from the receiving end and perform the retransmission on the RLC PDUs that receive the NACK through the status report. Accordingly, reliable data transmission may be achieved without error. Therefore, it is suitable for a service requiring high reliability. On the other hand, the ARQ function is not supported in the RLC UM mode. Therefore, the RLC status report is not received and there is no retransmission function. In the RLC UM mode, when the uplink transmission resource is received, the transmitting end RLC layer concatenates the PDCP PDUs (RLC SDUs) received from the upper layer and transmits the received PDCP PDUs to the lower layer. Therefore, the data can be continuously transmitted without the transmission delay and can be useful for a service sensitive to the transmission delay. In the RLC TM mode, the RLC layer directly transmits the PDCP PDUs received from the upper layer to the lower layer without performing any processing. That is, in the TM mode of the RLC layer, the data from the upper layer is transparently transmitted to the lower layer in the RLC layer. Therefore, it can be useful for transmitting system information, paging message, or the like transmitted on a common channel such as a common control channel (CCCH).

Figure 3F:
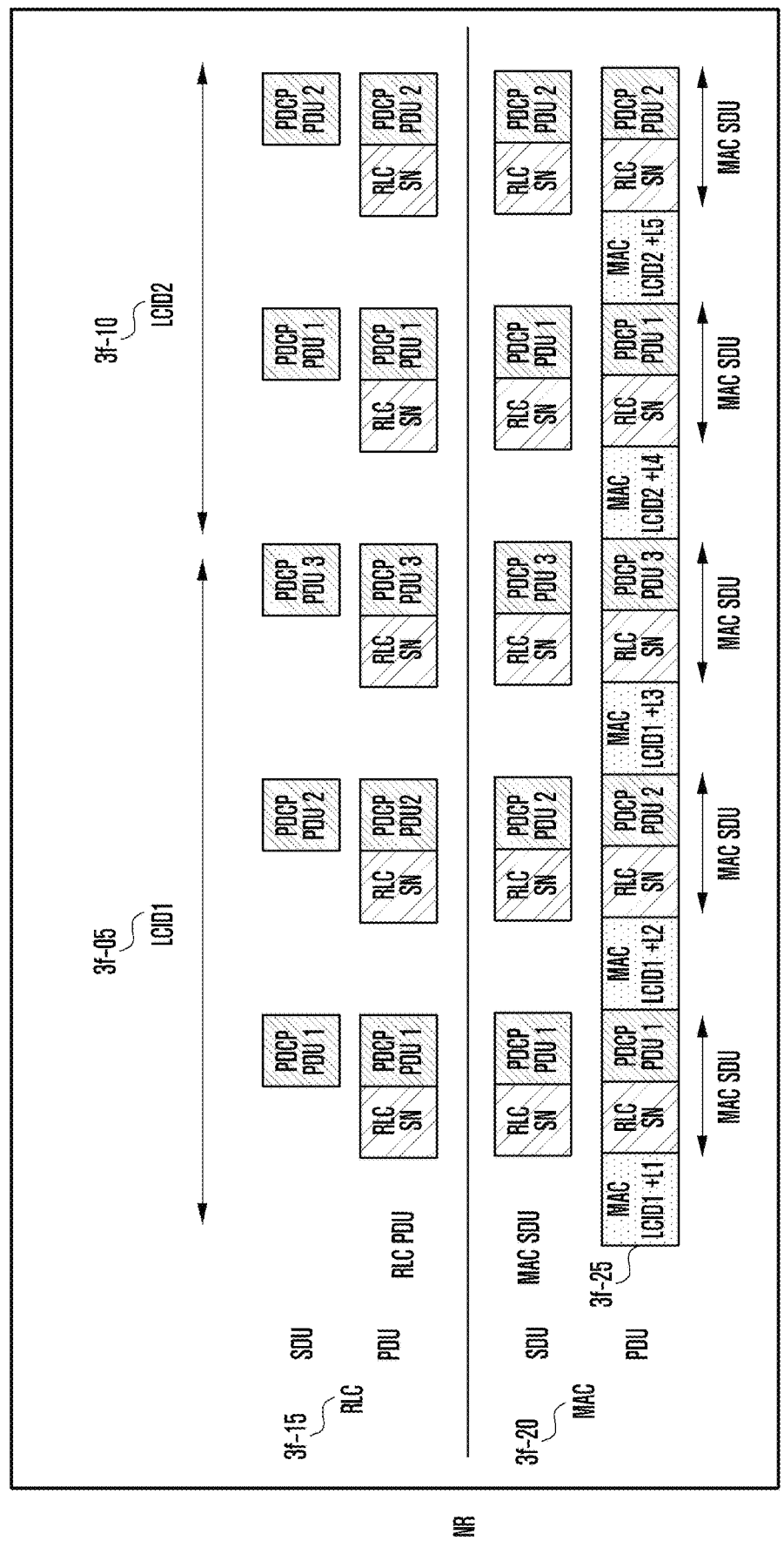
FIGS. 3FA-3FB are diagrams illustrating a structure of processing data in the next generation mobile communication system of the present disclosure.
Figure 3F:
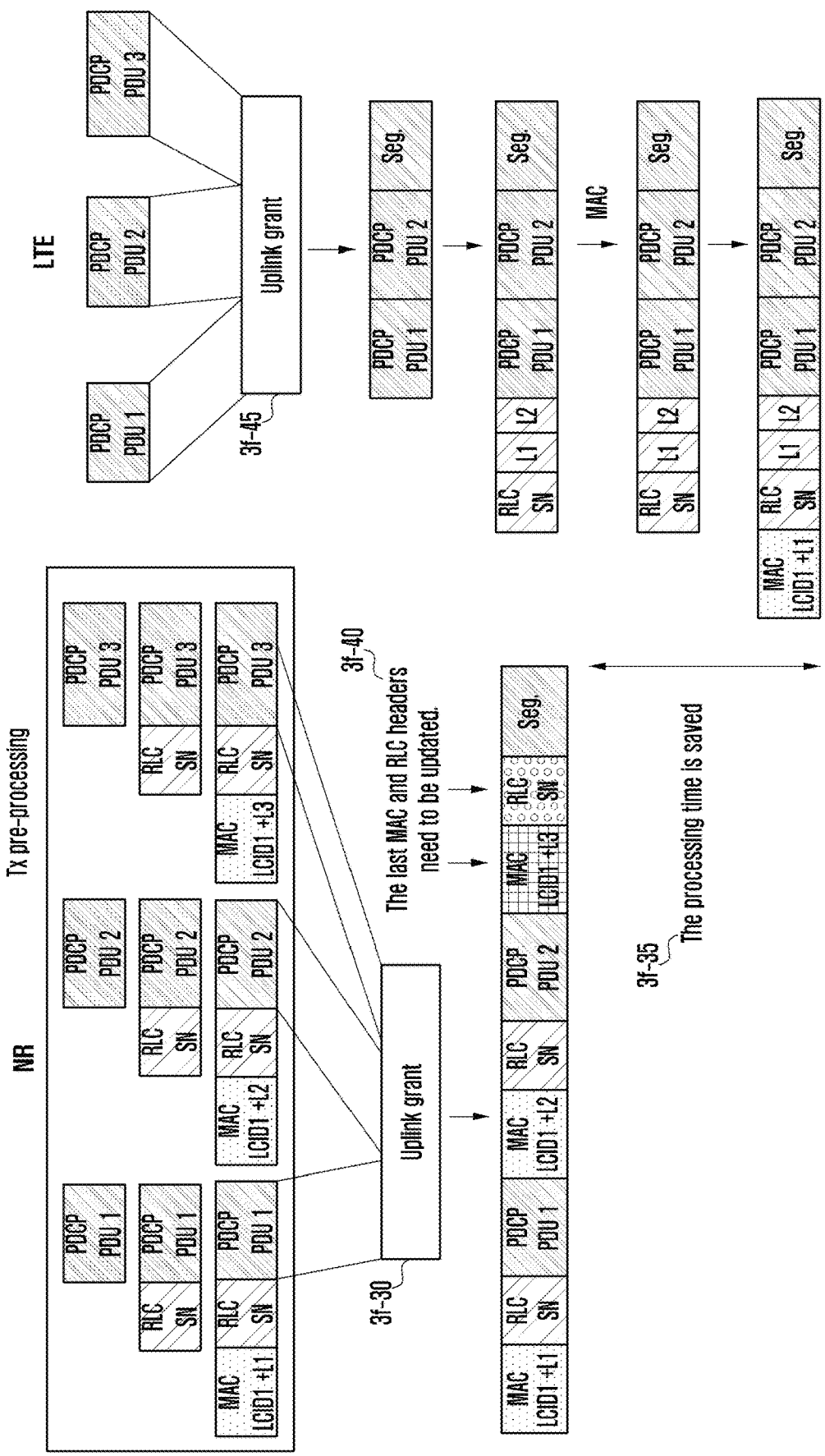

FIGS. 3FA-3FB are diagrams illustrating a structure of processing data in the next generation mobile communication system of the present disclosure.

As shown in FIGS. 3FA-3FB, in the next generation mobile communication system, the data processing is performed in the PDCP layer and the RLC layer for each logical channel. That is, the logical channel 1 3f-05 and the logical channel 3 3f-10 have different PDCP layers and RLC layers and perform independent data processing. Then, the RLC PDU generated from the RLC layer of each logical channel is transmitted to the MAC layer, which is configured as one MAC PDU, and then transmitted to the receiving end. In the LTE system, the PDCP layer, the RLC layer, and the MAC layer may include the functions described with reference to FIG. 3D, and may perform corresponding operations.

The next generation mobile communication system may be characterized in that the PDCP PDUs concatenate in the RLC layer and in the MAC PDU structure as shown in 3f-25, the MAC subheaders have for each MAC SDU, that is, are repeated in units of the MAC sub-header and the MAC SDU. Therefore, in the next generation mobile communication system, as shown in 3f-30, the data may be pre-processed in advance before receiving the uplink transmission resource. That is, if the terminal receives an IP packet from the PDCP layer before receiving the UL grant, the terminal may perform the PDCP processing (ciphering, integrity protection, or the like) on the IP packet, generate a PDCP header to generate the PDCP PDU, and transmit the PDCP PDU to the RLC layer to configure the RLC header, and transmit the RLC PDU to the MAC layer to configure the MAC subheader and the MAC SDU in advance.

If the terminal receives the uplink transmission resource 3f-30, the terminal may configure the MAC PDU by fetching the MAC subheaders and the MAC SDUs corresponding to the size of the uplink transmission resource, and if the uplink transmission resource is not sufficient, the segmentation operation may be performed to fully fill and efficiently use the transmission resources. Then, the corresponding RLC header (segmented information or length information) and MAC header (since the L field and length are changed) corresponding thereto can be updated (3f-40). Therefore, assuming that the NR system receives the uplink transmission resources at the same time points 3f-30 and 3f-45 as compared with the LTE system, the next generation mobile communication system may have a large gain in a processing time like 3f-35. The RLC layer and the PDCP layer may use a common serial number if necessary or when configured by a network.

The pre-processing operation may be performed for each logical channel, and the RLC PDUs pre-processed for each logical channel may be pre-processed to MAC SDUs and MAC subheaders in the MAC layer. In addition, if the MAC layer receives the uplink transmission resource 3f-30, the terminal may allocate the uplink transmission grant to each logical channel and multiplex the MAC SDUs and MAC sub-headers generated in advance. After receiving the uplink transmission resource from the base station, the terminal performs the logical channel prioritization (LCP) in the MAC layer, and allocates the uplink transmission resources to each logical channel. The terminal multiplexes the MAC SDUs and the MAC subheaders generated for each logical channel to form one MAC PDU and transmits the MAC PDU to the PHY layer. If the uplink transmission resources allocated to each logical channel are insufficient, the terminal may perform the segmentation request to the RLC layer and if the segmentation operation is performed in the RLC layer, the terminal includes the segmented information in the header and updates the segmented information and transmits the segmented information to the MAC layer again, in which the MAC layer may update the MAC header corresponding thereto. That is, the next generation mobile communication system starts the data processing of the PDCP layer, the RLC layer, and the MAC layer starts before receiving the uplink transmission resource.

In the next generation mobile communication system, the RLC layer may operate in an RLC acknowledged mode (AM) mode, an RLC unacknowledged mode (UM) mode, and an RLC transparent mode (TM) mode. In the RLC AM mode, the RLC layer supports the ARQ function, the transmitting end may receive the RLC status report from the receiving end and perform the retransmission on the RLC PDUs that receive the NACK through the status report. Accordingly, reliable data transmission may be achieved without error. Therefore, it is suitable for a service requiring high reliability. On the other hand, the ARQ function is not supported in the RLC UM mode. Therefore, the RLC status report is not received and there is no retransmission function. In the RLC UM mode, when the uplink transmission resource is received, the transmitting end RLC layer concatenates the PDCP PDUs (RLC SDUs) received from the upper layer and transmits the received PDCP PDUs to the lower layer. Therefore, the data can be continuously transmitted without the transmission delay and can be useful for a service sensitive to the transmission delay. In the RLC TM mode, the RLC layer directly transmits the PDCP PDUs received from the upper layer to the lower layer without performing any processing. That is, in the TM mode of the RLC layer, the data from the upper layer is transparently transmitted to the lower layer in the RLC layer. Therefore, it can be useful for transmitting system information, paging message, or the like transmitted on a common channel such as a common control channel (CCCH).

In the next generation mobile communication system, the RLC layer identifies the successful transmission of the transmitted RLC PDU for the RLC AM mode and, if there are missed RLC PDUs, a polling method is used so that the transmitting end reports the missed RLC PDUs from the receiving end for retransmission. That is, when the polling is triggered in the transmitting end, the RLC layer sets a poll bit having a length of 1 bit in the header of the RLC PDU to be 1 to request the receiving end to report the status report for the ACK/NACK of the RLC PDUs received so far. Upon receiving the RLC PDU in which a poll bit is set to be '1', the receiving end creates an RLC status report to form ACK/NACK information for the RLC PDUs received so far and transmit the ACK/NACK information to the transmitting end. Upon receiving the RLC status report, the transmitting end performs the retransmission for the RLC PDUs determined to be NACK to prevent the missed RLC PDU from occurring.

The conditions under which the RLC layer triggers the polling are as follows.

1. When the total number of transmitted RLC PDUs is greater than a predetermined number,
2. If the total amount/bytes of the transmitted RLC PDUs is greater than the predetermined amount/byte,
3. If the buffer is empty, that is, the last RLC PDU is transmitted,
4. If the window is stalled and can not transmit a new RLC PDU,
5. If the poll retransmission timer (t-pollRetransmit) expires.

As described above, there are many conditions for the RLC layer to trigger polling, and data pre-processing is possible in the next generation mobile communication system as described in FIGS. 3FA-3FB. That is, since the next generation mobile communication system has the structure as illustrated in FIGS. 3FA-3FB, several RLC PDUs may enter one MAC PDU. Since there is a concatenation function in the RLC layer in the LTE system as illustrated in FIGS. 3EA-3EB, a plurality of PDCP PDUs are concatenated to form one RLC PDU, which is in turn transmitted to the MAC layer. Therefore, one MAC PDU usually includes RLC PDUs corresponding to the number of logical channels (in the LTE system, the number of logical channels is generally about 2 to 4). However, in the next generation mobile communication system, one PDCP PDU is generated as one RLC PDU since there is no RLC concatenation function in the RLC layer. Therefore, the RLC PDUs may be included in one MAC PDU by the number obtained by multiplying the IP packet (PDCP SDU) by the number of logical channels. In a simple arithmetic calculation, at most four RLC PDUs may be included in one MAC PDU in the LTE system, while in the next generation mobile communication system, more than 500 RLC PDUs may be included in one MAC PDU.

Therefore, due to the polling triggering conditions in the RLC layer described above, a plurality of polling may be unnecessarily set in the RLC layer. However, this is not a big problem. The header of the RLC PDU header has a poll bit, which needs to be set to 0 or 1 and transmitted anyway. Therefore, the receiving end may preferable to solve the problem due to the setting of the plurality of poll bits as described above.

In addition, as described above, in the next generation mobile communication system, data pre-processing can be performed. Therefore, if the RLC layer sets the poll bit in the RLC PDU and then drives the polled retransmission timer (t-pollRetransmit), the polling retransmission timer may expire quickly and the polling may need to be again transmitted unnecessarily because the RLC PDU in which the polling is set may be greatly different in time from the actual transmission time.

The present disclosure proposes an RLC polling method considering data pre-processing in a next generation mobile communication system, and more specifically, proposes a method of driving two timers, a polling retransmission timer (t-pollingRetransmit) and an RLC status report prevention timer (t-StatusProhibit). In addition, we propose to introduce a polling prevention timer into the transmitting end as one method.

Since the data pre-processing can be performed in the next generation mobile communication system, the transmitting end RLC layer needs to drive the polling retransmission timer not at the time of transmitting the RLC PDU in which the polling is set to the lower layer but at the time of transmitting the RLC PDU in which the polling is set by including the RLC PDU in the MAC PDU actually receiving the uplink transmission resource. If the polling retransmission timer is driven or updated at the time of transmitting the RLC PDU including the polling to the lower layer in the RLC layer, the next generation mobile communication system can perform the data pre-processing. Therefore, the polling retransmission timer is updated several times while the plurality of RLC PDUs in which the polling is set are transmitted to the lower layer. As a result, the polling retransmission timer expires late and the function thereof can not be performed properly. On the other hand, since the data pre-processing can not be performed in the LTE system, the fact that the transmitting end RLC layer transmits the RLC PDU in which the polling is set means that it is configured to be directly included in the MAC PDU and transmitted. Therefore, it is reasonable to drive the polling retransmission timer at the time of transmitting the RLC PDU in which the polling is set to the RLC PDU.

By driving the polling retransmission timer as described above, if the RLC status report does not come until the transmission end configures the polling and the predetermined time has elapsed, that is, until the polling retransmission timer expires, the polling may be immediately reset and transmitted.

As described above, in the next generation mobile communication system, the RLC PDUs in which many unnecessary pollings are set may be transmitted to the receiving end.

The present disclosure proposes an embodiment for solving the problem caused due to many unnecessary pollings in the next generation mobile communication system.

This embodiment proposes a method of processing many unnecessary pollings at the receiving end. Since the polling bit is set to be 1 in the RLC header of the RLC PDU to be transmitted when the polling is transmitted from the transmitting end to the receiving end, even though several pollings are transmitted, there is no loss in terms of overhead. Therefore, a method for reasonably processing at the receiving end is proposed. The problem that can arise when the receiving end receives the plurality of pollings is that the receiving end may perform the plurality of RLC status reports. That is, when it is confirmed that the poll bit is set to 1 in the RLC PDU, the receiver configures ACK/NACK information for the recently received RLC PDUs and transmits the ACK/NACK information to the transmitter. If the plurality of RLC status reports are transmitted, the unnecessary overhead occurs and the processing time is wasted at the receiving end. Accordingly, when the RLC status report prevention timer (t-StatusProhibit) is driven, the RLC status report prevention timer may be driven when the RLC status report is configured and completed and is transmitted to the lower layer and the RLC status report is triggered by the polling. If the RLC status report prevention timer is driven, the receiving end does not generate the RLC status report any more until the RLC status report prevention timer expires. Therefore, it is possible to prevent unnecessary RLC status reports from being generated and transmitted.

The present disclosure proposes an embodiment for solving the problem caused due to many unnecessary pollings in the next generation mobile communication system.

This embodiment introduces and drives a polling prevention timer (t-pollProhibit) in order to prevent the plurality of pollings from occurring at the transmitting end. That is, when the condition for triggering polling occurs in the RLC layer when data pre-processing is performed, the polling bit is set to be 1 in one RLC PDU to be transmitted to the lower layer, and the polling prevention timer may be driven at the time of transmitting the RLC PDU in which the polling is set is transmitted to the lower layer. Therefore, if the polling prevention timer is driven, the polling is not set at the transmitting terminal even if the polling triggering condition is satisfied until the polling prevention expires. The polling may be transmitted after the polling prevention timer expires. If necessary, the polling may be periodically transmitted when the polling prevention timer expires. The purpose of the polling prevention timer is two. First, when many unnecessary pollings are prevented from being set and the plurality of pollings are set due to the data pre-processing, the polling retransmission timer is continuously updated due to the plurality of pollings and as a result is prevented from expiring too late.

In the present disclosure, for the RLC polling method considering the data pre-processing in the next generation mobile communication system as described above, the time and method for driving the polling retransmission (t-pollingRetransmit), the RLC status report prevention timer (t-StatusProhibit), and the polling prevention timer (t-pollProhibit) are proposed. Since the next generation mobile communication system terminal may perform multiple access to the LTE system and the next generation mobile communication system, different RLC layers need to be operated differently within one terminal. That is, the RLC layers need to differently drive the timers depending on whether the timers are connected to the LTE system or the next generation mobile communication system.

Figure 3G:
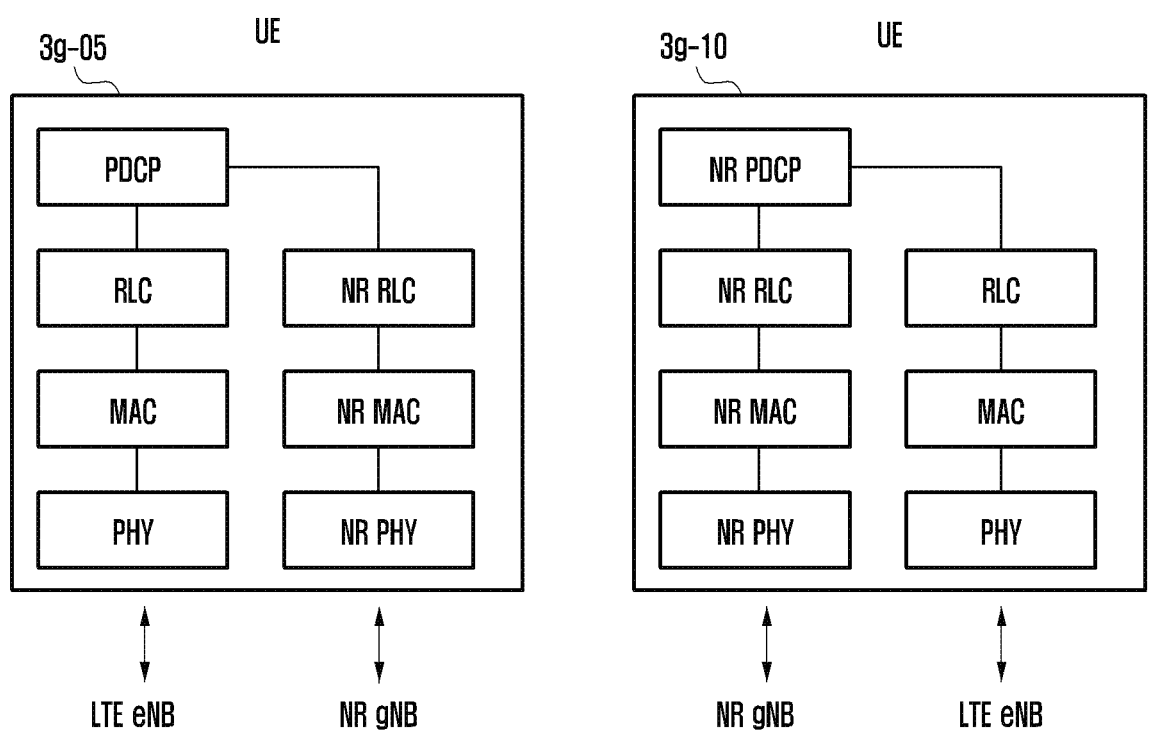
FIG. 3G is a diagram illustrating a scenario in which a terminal is connected to an LTE system (LTE eNB) and a next generation mobile communication system (NR gNB) by a multiple access.

FIG. 3G is a diagram illustrating a scenario in which a terminal is connected to an LTE system (LTE eNB) and a next generation mobile communication system (NR gNB) by a multiple access.

As illustrated in FIG. 3G, the terminal may establish the LTE system base station as a master base station and the next generation mobile communication system base station as a secondary base station to perform the multiple access (3g-05), and the terminal may establish the next generation mobile communication system base station as the master base station and the LTE system base station as the secondary base station to perform the multiple access (3g-10).

As described above, when the terminal is connected to the LTE system base station and the next generation mobile communication system by the multiple access, a method for driving each timer differently in each RLC layer as follows.

If satisfying the first condition, the terminal performs the first operation,

If satisfying the second condition, the terminal performs the second operation,

If satisfying the third condition, the terminal performs the third operation,

If satisfying the fourth condition, the terminal performs the fourth operation,

In this case, the first condition means the case where the terminal transmits data on the uplink and the connection for transmitting the data is connected to the LTE system.

In this case, the second condition means the case where the terminal transmits data on the uplink and the connection for transmitting the data is connected to the next generation mobile communication system.

In this case, the third condition means the case where the terminal receives data on the uplink and the connection for receiving the data is connected to the LTE system.

In this case, the fourth condition means the case where the terminal receives data on the uplink and the connection for receiving the data is connected to the next generation mobile communication system.

According to the first operation, when the polling triggering condition is satisfied in the RLC layer, the terminal sets the poll bit to be 1 in the RLC header of the RLC PDU and transmits the poll bit to the lower layer, and drives the polling retransmission timer at the time of transmitting the RLC PDU in which the polling is set to the lower layer.

According to the second operation, when the polling triggering condition is satisfied in the RLC layer, the terminal sets the poll bit to be 1 in the RLC header of the RLC PDU and transmits the poll bit to the lower layer, and drives the polling retransmission timer at the time of transmitting the RLC PDU in which the polling is set to the lower layer.

According to the third operation, if the terminal receives the polling from the RLC layer, the terminal configures the RLC status report and drives the RLC status report prevention timer at the time of transmitting the configured RLC status report to the lower layer or triggering the RLC status report due to the polling.

According to the third operation, if the terminal receives the polling from the RLC layer, the terminal configures the RLC status report and drives the RLC status report prevention timer at the time of transmitting the configured RLC status report to the lower layer or triggering the RLC status report due to the polling.

As described above, when the terminal is connected to the LTE system base station and the next generation mobile communication system by the multiple access, an embodiment for a method for driving each timer differently in each RLC layer as follows.

If satisfying the first condition, the terminal performs the first operation,

If satisfying the second condition, the terminal performs the second operation,

If satisfying the third condition, the terminal performs the third operation,

If satisfying the fourth condition, the terminal performs the fourth operation,

According to the first condition, the terminal transmits data to the uplink and the connection for transmitting the data refers to the case in which the terminal is connected to the LTE system.

According to the second condition, the terminal transmits data to the uplink and the connection for transmitting the data refers to the case in which the terminal is connected to the next generation mobile system.

According to the third condition, the terminal transmits data to the downlink and the connection for receiving the data refers to the case in which the terminal is connected to the LTE system.

According to the fourth condition, the terminal transmits data to the downlink and the connection for receiving the data refers to the case in which the terminal is connected to the next generation mobile system.

According to the first operation, when the polling triggering condition is satisfied in the RLC layer, the terminal sets the poll bit to be 1 in the RLC header of the RLC PDU and transmits the poll bit to the lower layer, and drives the polling retransmission timer at the time of transmitting the RLC PDU in which the polling is set to the lower layer.

According to the second operation, when the polling triggering condition is satisfied in the RLC layer, the terminal sets the poll bit to be 1 in the RLC header of the RLC PDU and transmits the poll bit to the lower layer, and drives the polling retransmission timer at the time of transmitting the RLC PDU in which the polling is set to the lower layer. The polling prevention timer is driven at the time of transmitting the RLC PDU in which the polling is set to the lower layer.

According to the third operation, if the terminal receives the polling from the RLC layer, the terminal configures the RLC status report and drives the RLC status report prevention timer at the time of transmitting the configured RLC status report to the lower layer or triggering the RLC status report due to the polling.

According to the third operation, if the terminal receives the polling from the RLC layer, the terminal configures the RLC status report and drives the RLC status report prevention timer at the time of transmitting the configured RLC status report to the lower layer or triggering the RLC status report due to the polling.

Figure 3H:
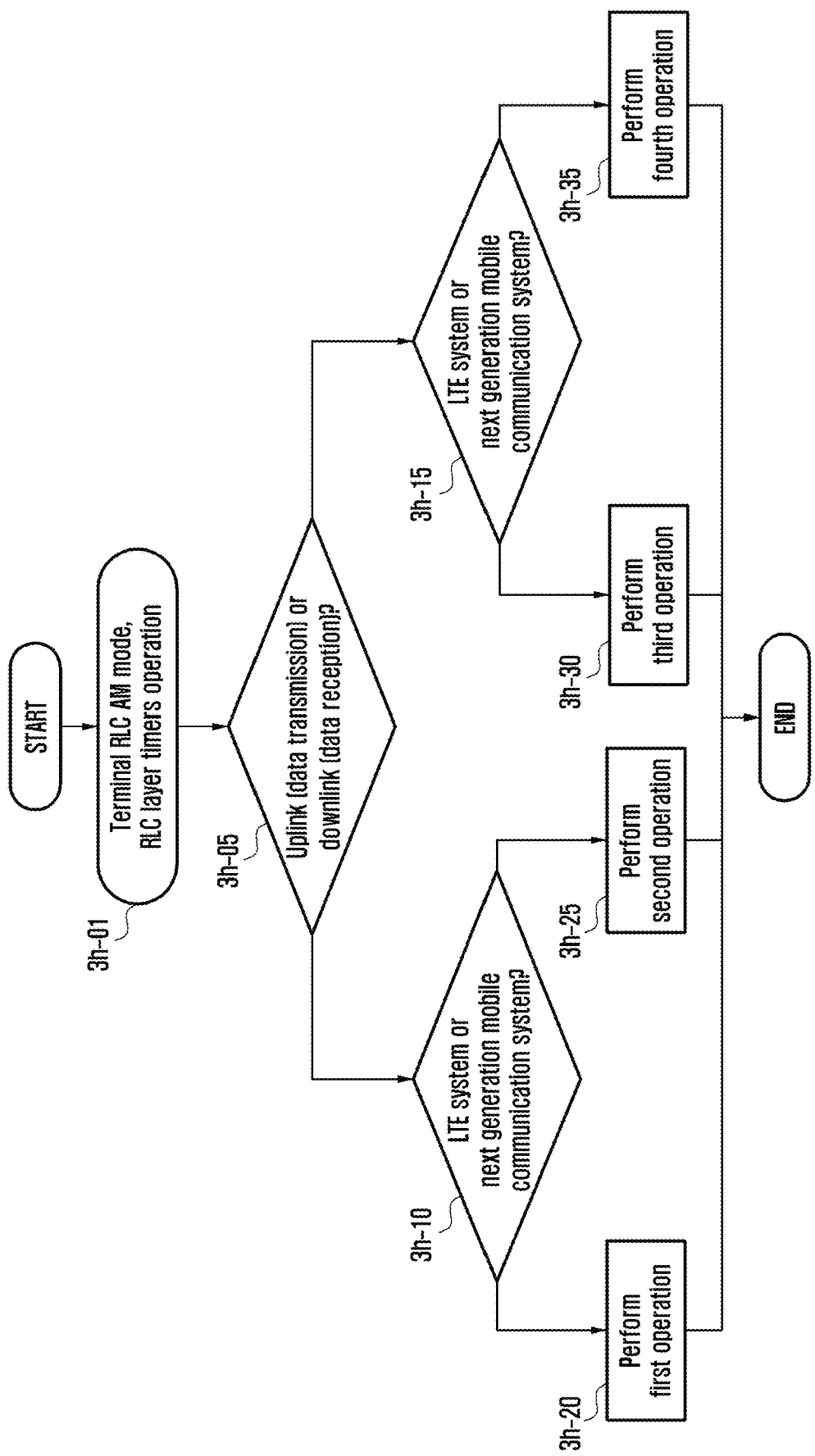
FIG. 3H is a diagram illustrating an operation of a terminal according to various embodiments of the present disclosure for a method of operating each timer differently in each RLC layer when the terminal is connected to the LTE system base station and the next generation mobile communication system by a multiple access.

FIG. 3H is a diagram illustrating an operation of a terminal according to various embodiments which are a method of operating each timer differently in each RLC layer when the terminal is connected to the LTE system base station and the next generation mobile communication system by a multiple access.

According to various embodiments described with reference to FIG. 3H, the terminal performs the first operation if the first condition is satisfied, the second operation if the second condition is satisfied, the third operation if the third condition is satisfied, and performs the fourth operation if the fourth condition is satisfied.

Figure 3I:
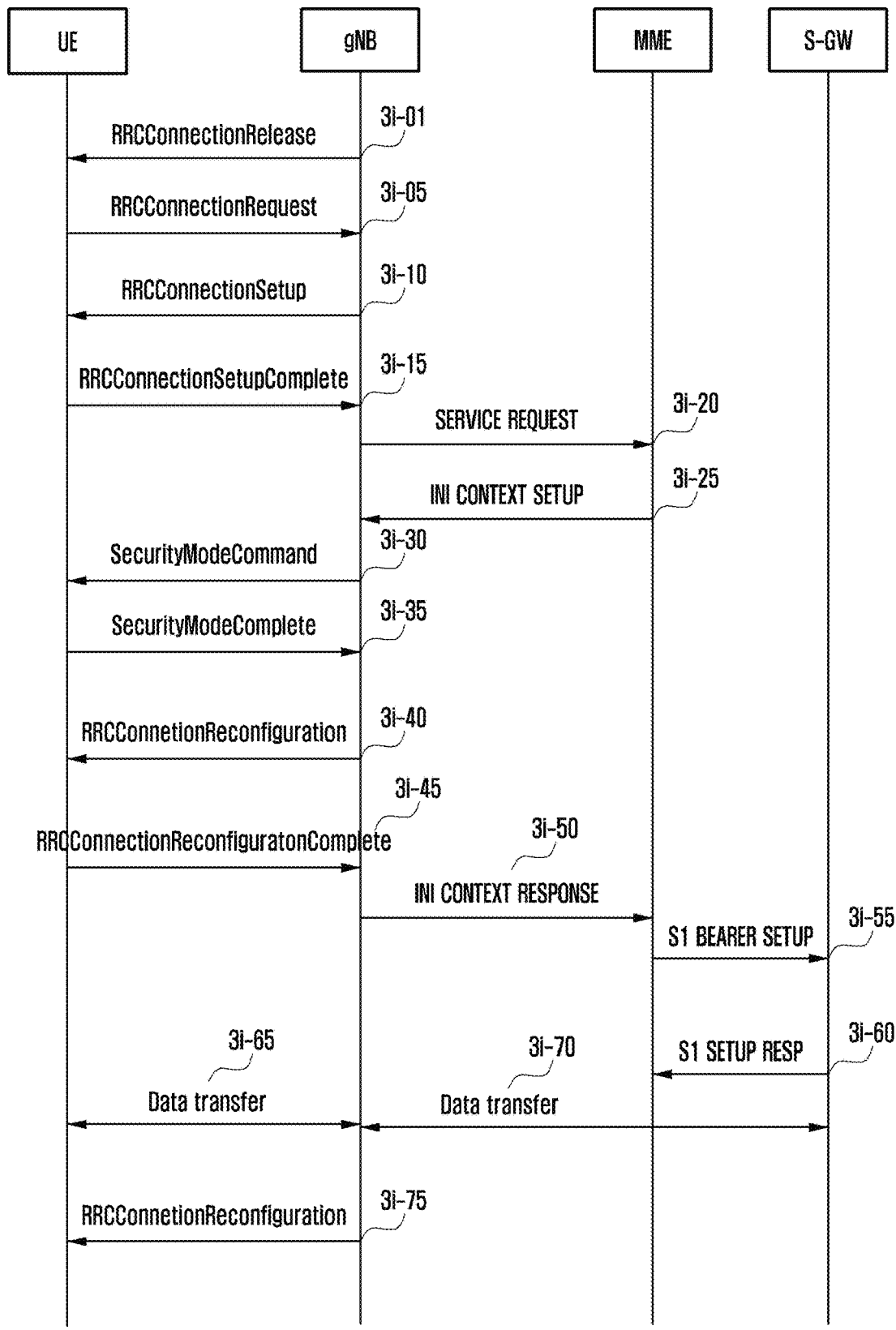
FIG. 3I is a diagram illustrating a procedure for establishing a connection between a base station and a terminal in the present disclosure.

FIG. 3I is a diagram illustrating a procedure for establishing a connection between a base station and a terminal in the present disclosure.

In FIG. 3I, the base station can transmit an RRCConnectionRelease message to the terminal if the terminal transmitting and receiving data in the RRC connection mode does not transmit or receive data for a predetermined reason or for a predetermined time to switch the terminal to RRC idle mode (3*i*-01). If the terminal (hereinafter, idle mode UE) that is not currently connected generates data to be transmitted later, the terminal performs an RRC connection setup procedure with the base station. The terminal establishes uplink transmission synchronization with the base station through a random access procedure and transmits an RRC-ConnectionRequest message to the base station (3*i*-05). The message includes establishmentCause of connection with the identifier of the terminal. The base station transmits an RRCConnectionSetup message to allow the terminal to set the RRC connection (3*i*-10). The message includes the setting for the timers to be used in the RLC device, the value for the timers, that is, the polling retransmission timer (t-pollRetransmit), the polling prevention timer (t-pollProhibit), the RLC status report timer (t-StatusProhibit) or the like and may set the valued therefor. The RRC connection is also called a signaling radio bearer (SRB) and is used for transmission and reception of the RRC message that is a control message between the terminal and the base station. The terminal establishing the RRC connection transmits an RRCConnetionSetupComplete message to the base station (3*i*-15). The message includes a control message called a service request that that allows the terminal to request a bearer setup for a predetermined service to the MME. The base station transmits a service request message included in the RRCConnectionSetupComplete message to the MME (3*i*-20) and the MME determines whether to provide the service the terminal requests As the determination result, if the MME decides to provide the service that the terminal requests, the MME transmits an initial context setup request message to the base station (3*i*-25). The initial context setup request message may include information such as quality of service (QoS) information to be applied when setting up a data radio bearer (DRB) and security related information (e.g., security key, security algorithm) to be applied to the DRB. The base station exchanges a SecurityModeCommand) message 3*i*-30 and a SecurityModeComplete message 3*i*-35 with the terminal to establish security. When the security establishment is completed, the base station transmits an RRCConnectionReconfiguration message to the terminal (3*i*-40). The message may include the setting for the timers to be used in the RLC device, the value for the timers, that is, the polling retransmission timer (t-pollRetransmit), the polling prevention timer (t-pollProhibit), the RLC status report timer (t-StatusProhibit) or the like and may set the valued therefor (3*i*-45). The base station that completes the DRB setup with the terminal transmits an initial context response message to the MME (3*i*-50) and the MME receiving the message exchanges an S1 bearer setup message and an S1 bearer setup response message with the S-GW to setup an S1 bearer (3*i*-55 and 3*i*-60). The S1 bearer is a data transmission connection established between the S-GW and the base station and corresponds to a DRB on a one-to-one basis. If all of the procedures are completed, the terminal transmits and receives data to and from the BS through the S-GW (3*i*-65 and 3*i*-70). As described above, the normal data transmission procedure largely consists of three stages: RRC connection setup, security setup, and DRB setup. In addition, the base station may transmit an RRCConnectionReconfiguration message to renew, add, or change the configuration to the terminal for a predetermined reason (3*i*-75). The message includes the setting for the timers to be used in the RLC device, the value for the timers, that is, the polling retransmission timer (t-pollRetransmit), the polling prevention timer (t-pollProhibit), the RLC status report timer (t-StatusProhibit) or the like and may set the valued therefor.

Figure 3J:
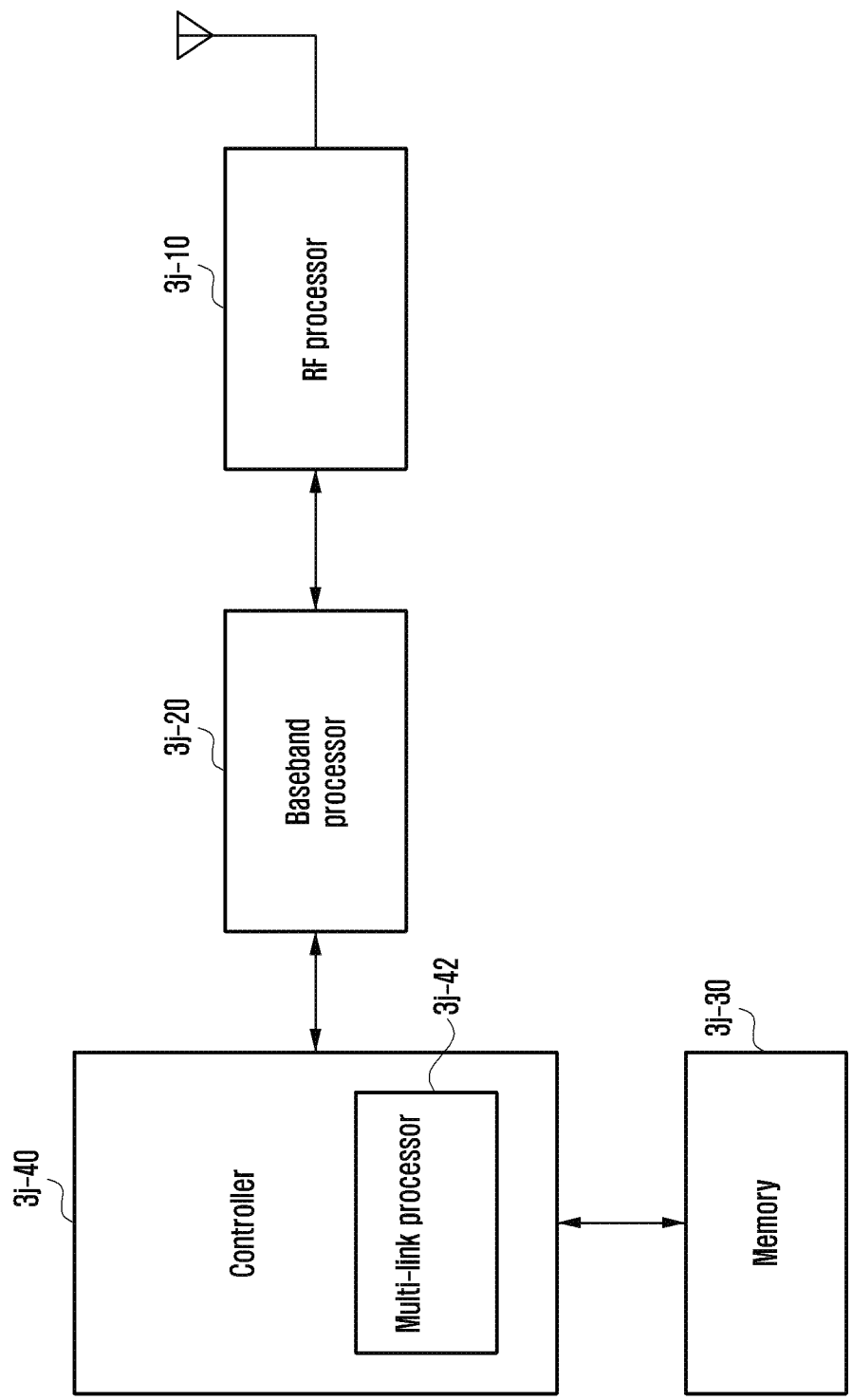
FIG. 3J is a diagram illustrating the structure of the terminal to which the embodiment of the present disclosure may be applied.

FIG. 3J is a diagram illustrating the structure of the terminal to which the embodiment of the present disclosure may be applied.

Referring to FIG. 7J, the terminal includes a radio frequency (RF) processor 3*j*-10, a baseband processor 3*j*-20, a memory 3*j*-30, and a controller 3*j*-40.

The RF processor 3*j*-10 serves to transmit and receive a signal through a radio channel, such as band conversion and amplification of a signal. That is, the RF processor 3*j*-10 up-converts a baseband signal provided from the baseband processor 3*j*-20 into an RF band signal and then transmits the RF band signal through an antenna and down-converts the RF band signal received through the antenna into the baseband signal. For example, the RF processor 3*j*-10 may include a transmitting filter, a receiving filter, an amplifier, a mixer, an oscillator, a digital to analog converter (DAC), an analog to digital converter (ADC), or the like. In the above figure, only one antenna is illustrated, but the terminal may include a plurality of antennas. Further, the RF processor 3*j*-10 may include a plurality of RF chains. Further, the RF processor 3*j*-10 may perform beamforming. For the beamforming, the RF processor 3*j*-10 may adjust a phase and a size of each of the signals transmitted and received through a plurality of antennas or antenna elements. In addition, the RF processor may perform MIMO and may receive a plurality of layers when performing a MIMO operation. The RF processor 3*j*-10 may perform reception beam sweeping by appropriately configuring a plurality of antennas or antenna elements under the control of the controller or adjust a direction and a beam width of the reception beam so that the reception beam is resonated with the transmission beam.

The baseband processor 3*j*-20 performs a conversion function between a baseband signal and a bit string according to a physical layer standard of a system. For example, when data are transmitted, the baseband processor 3*j*-20 generates complex symbols by coding and modulating a transmitted bit string. Further, when data are received, the baseband processor 3*j*-20 recovers the received bit string by demodulating and decoding the baseband signal provided from the RF processor 3*j*-10. For example, according to the orthogonal frequency division multiplexing (OFDM) scheme, when data are transmitted, the baseband processor 3*j*-20 generates the complex symbols by coding and modulating the transmitting bit string, maps the complex symbols to sub-carriers, and then performs an inverse fast Fourier transform (IFFT) operation and a cyclic prefix (CP) insertion to configure the OFDM symbols. Further, when data are received, the baseband processor 3*j*-20 divides the baseband signal provided from the RF processor 3*j*-10 in an OFDM symbol unit and recovers the signals mapped to the sub-carriers by a fast Fourier transform (FFT) operation and then recovers the received bit string by the modulation and decoding.

The baseband processor 3*j*-20 and the RF processor 3*j*-10 transmit and receive a signal as described above. Therefore, the baseband processor 3*j*-20 and the RF processor 3*j*-10 may be called a transmitter, a receiver, a transceiver, or a communication unit. Further, at least one of the baseband processor 3*j*-20 and the RF processor 3*j*-10 may include a plurality of communication modules to support a plurality of different radio access technologies. Further, at least one of the baseband processor 3*j*-20 and the RF processor 3*j*-10 may include different communication modules to process signals in different frequency bands. For example, the different wireless access technologies may include an LTE network, an NR network, and the like. Further, different frequency bands may include a super high frequency (SHF) (for example: 2.5 GHz, 5 GHz) band, a millimeter wave (for example: 60 GHz) band.

The memory 3*j*-30 stores data such as basic programs, application programs, and configuration information for the operation of the terminal. Further, the memory 3*j*-30 provides the stored data according to the request of the controller 3*j*-40.

The controller 3*j*-40 controls the overall operations of the terminal. For example, the controller 3*j*-40 transmits and receives a signal through the baseband processor 3*j*-20 and the RF processor 3*j*-10. Further, the controller 3*j*-40 records and reads data in and from the memory 3*j*-30. For this purpose, the controller 3*j*-40 may include at least one processor. For example, the controller 3*j*-40 may include a communication processor (CP) performing a control for communication and an application processor (AP) controlling a higher layer such as the application programs. According to the embodiment of the present disclosure, the controller 3*j*-40 includes a multi-link processor 3*j*-42 that performs the processing to be operated in a multi-link mode.

Figure 3K:
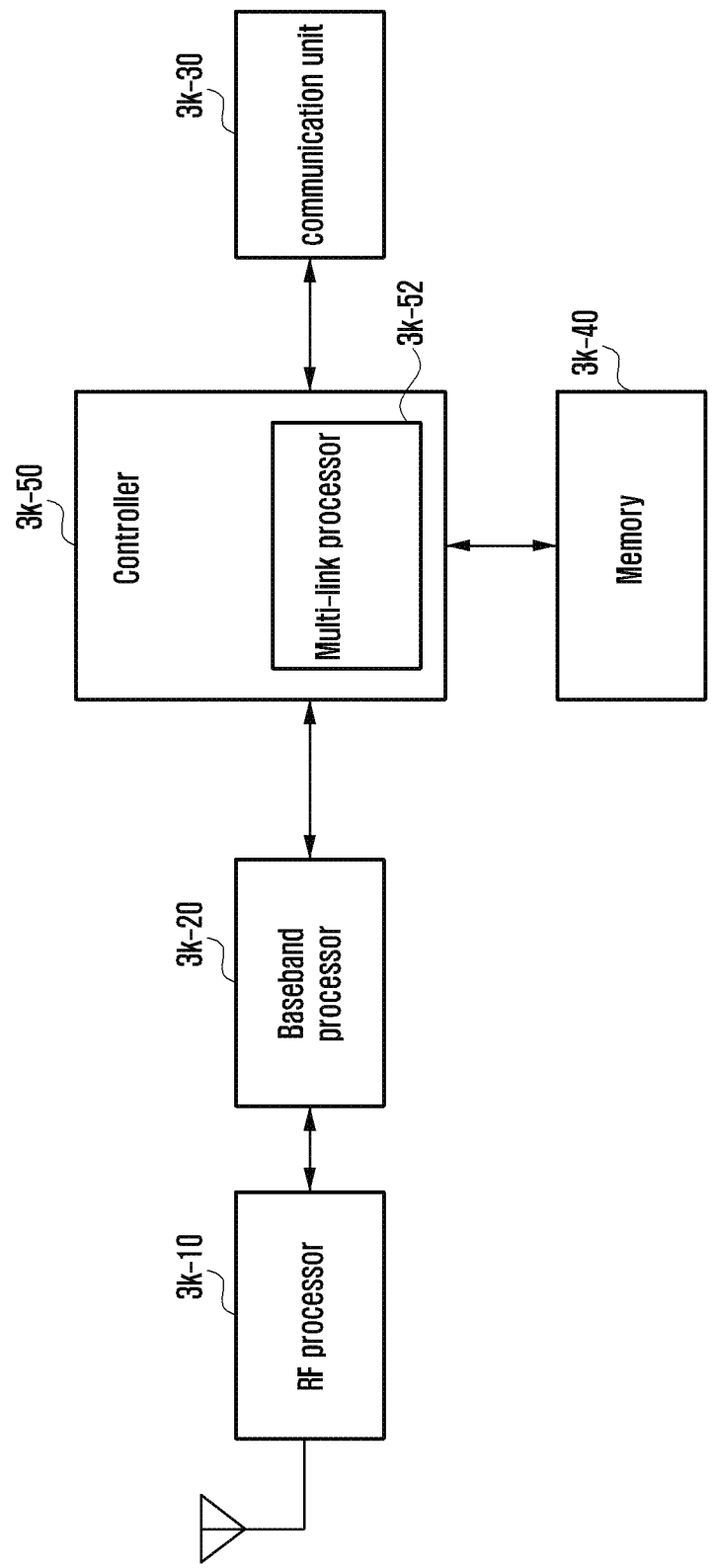
FIG. 3K is a block configuration diagram of the TRP in the wireless communication system to which the embodiment of the present disclosure may be applied.

FIG. 3K illustrates a block configuration diagram of the TRP in the wireless communication system to which the embodiment of the present disclosure may be applied.

As illustrated in FIG. 3K, the base station is configured to include an RF processor 3*k*-10, a baseband processor 3*k*-20, a communication unit 3*k*-30, a memory 3*k*-40, and a controller 3*k*-50.

The RF processor 3*k*-10 serves to transmit and receive a signal through a radio channel, such as band conversion and amplification of a signal. That is, the RF processor 3*k*-10 up-converts a baseband signal provided from the baseband processor 3*k*-20 into an RF band signal and then transmits the RF band signal through an antenna and down-converts the RF band signal received through the antenna into the baseband signal. For example, the RF processor 3*k*-10 may include a transmitting filter, a receiving filter, an amplifier, a mixer, an oscillator, a DAC, an ADC, or the like. In the above figure, only one antenna is illustrated, but the first access node may include a plurality of antennas. Further, the RF processor 3k-10 may include a plurality of RF chains. Further, the RF processor 3k-10 may perform the beamforming. For the beamforming, the RF processor 3k-10 may adjust a phase and a size of each of the signals transmitted/received through a plurality of antennas or antenna elements. The RF processor may perform a downward MIMO operation by transmitting one or more layers.

The baseband processor 3k-20 performs a conversion function between the baseband signal and the bit string according to the physical layer standard of the first radio access technology. For example, when data are transmitted, the baseband processor 3k-20 generates complex symbols by coding and modulating a transmitted bit string. Further, when data are received, the baseband processor 3k-20 recovers the received bit string by demodulating and decoding the baseband signal provided from the RF processor 3k-10. For example, according to the OFDM scheme, when data are transmitted, the baseband processor 3k-20 generates the complex symbols by coding and modulating the transmitting bit string, maps the complex symbols to the sub-carriers, and then performs the IFFT operation and the CP insertion to configure the OFDM symbols. Further, when data are received, the baseband processor 3k-20 divides the baseband signal provided from the RF processor 3k-10 in the OFDM symbol unit and recovers the signals mapped to the sub-carriers by the FFT operation and then recovers the receiving bit string by the modulation and decoding. The baseband processor 3k-20 and the RF processor 3k-10 transmit and receive a signal as described above. Therefore, the baseband processor 3k-20 and the RF processor 3k-10 may be called a transmitter, a receiver, a transceiver, or a communication unit.

The communication unit 3k-30 provides an interface for performing communication with other nodes within the network.

The memory 3k-40 stores data such as basic programs, application programs, and configuration information for the operation of the main base station. In particular, the memory 3k-40 may store the information on the bearer allocated to the accessed terminal, the measured results reported from the accessed terminal, etc. Further, the memory 3k-40 may store information that is a determination criterion on whether to provide a multiple connection to the terminal or stop the multiple connection to the terminal. Further, the memory 3k-40 provides the stored data according to the request of the controller 3k-50.

The controller 3k-50 controls the general operations of the main base station. For example, the controller 3k-50 transmits/receives a signal through the baseband processor 3k-20 and the RF processor 3k-10 or the backhaul communication unit 3k-30. Further, the controller 3k-50 records and reads data in and from the memory 3k-40. For this purpose, the controller 3k-50 may include at least one processor. According to the embodiment of the present disclosure, the controller 3k-50 includes a multi-link processor 3k-52 that performs the processing to be operated in a multi-link mode.

Figure 4A:
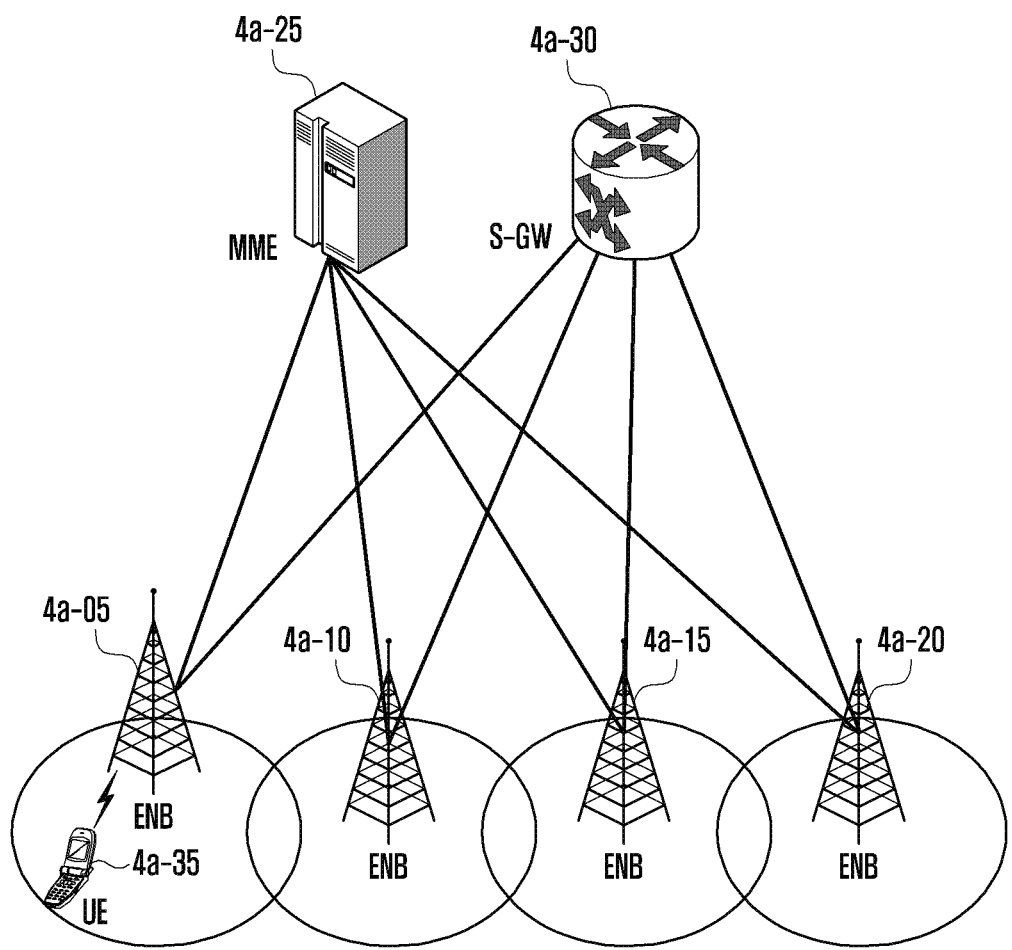
FIG. 4A is a diagram illustrating a structure of an LTE system referenced for the explanation of the present disclosure.

FIG. 4A is a diagram illustrating a structure of an LTE system referenced for the explanation of the present disclosure.

As illustrated in FIG. 4A, a radio access network of an LTE system is configured to include next generation base stations (evolved node B, hereinafter, eNB, Node B, or base station) 4a-05, 4a-10, 4a-15, and 4a-20, a mobility management entity (MME) 4a-25, and a serving-gateway (S-GW) 4a-30. User equipment (hereinafter, UE or terminal) 4a-35 accesses an external network through the eNBs 4a-05 to 4a-20 and the S-GW 4a-30.

In FIG. 4A, the eNB 4a-05 to 4a-20 correspond to the existing node B of the UMTS system. The eNB is connected to the UE 4a-35 through a radio channel and performs more complicated role than the existing node B. In the LTE system, in addition to a real-time service like a voice over Internet protocol (VoIP) through the Internet protocol, all the user traffics are served through a shared channel and therefore an apparatus for collecting and scheduling status information such as a buffer status, an available transmission power status, and a channel status of the terminals is used. Here, the eNBs 4a-05 to 4a-20 take charge of the collecting and scheduling. One eNB generally controls a plurality of cells. For example, to implement a transmission rate of 100 Mbps, the LTE system uses, as a radio access technology, orthogonal frequency division multiplexing (hereinafter, OFDM) in, for example, a bandwidth of 20 MHz. Further, an adaptive modulation & coding (hereinafter, referred to as AMC) determining a modulation scheme and a channel coding rate according to a channel status of the terminal is applied. The S-GW 4a-30 is an apparatus for providing a data bearer and generates or removes the data bearer according to the control of the MME 4a-25. The MME is an apparatus for performing a mobility management function for the terminal and various control functions and is connected to a plurality of base stations.

Figure 4B:
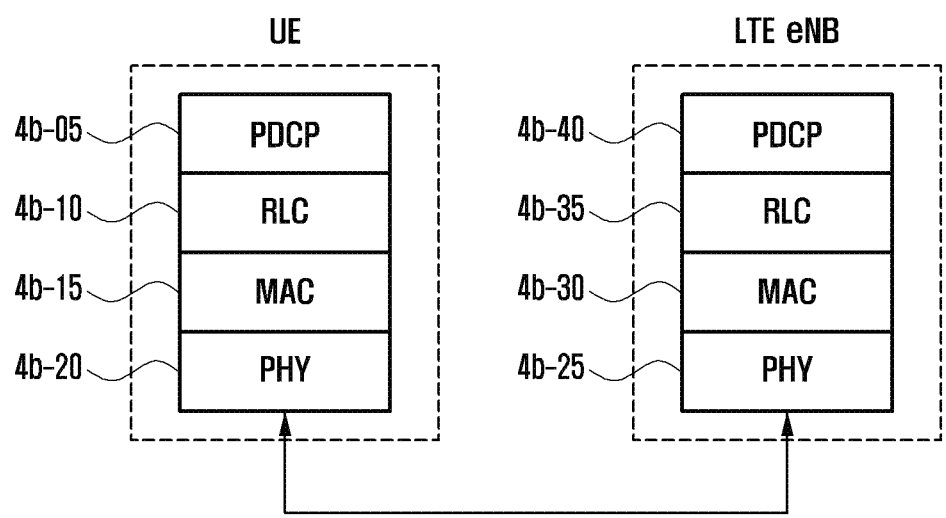
FIG. 4B is a diagram illustrating the radio protocol structure in the LTE system referenced for the explanation of the present disclosure.

FIG. 4B is a diagram illustrating the radio protocol structure in the LTE system referenced for the explanation of the present disclosure.

Referring to FIG. 4B, the radio protocol of the LTE system is configured to include packet data convergence protocols (PDCPs) 4b-05 and 4b-40, radio link controls (RLCs) 4b-10 and 4b-35, and medium access controls (MACs) 4b-15 and 4b-30 in the terminal and the eNB, respectively. The PDCPs 4b-05 and 4b-40 are in charge of operations such as IP header compression/decompression. The main functions of the PDCP are summarized as follows.
- Header compression and decompression function (Header compression and decompression: ROHC only)
- Transfer function of user data (Transfer of user data)
- In-sequence delivery function (In-sequence delivery of upper layer PDUs at PDCP re-establishment procedure for RLC AM)
- Reordering function (For split bearers in DC (only support for RLC AM): PDCP PDU routing for transmission and PDCP PDU reordering for reception)
- Duplicate detection function (Duplicate detection of lower layer SDUs at PDCP re-establishment procedure for RLC AM)
- Retransmission function (Retransmission of PDCP SDUs at handover and, for split bearers in DC, of PDCP PDUs at PDCP data-recovery procedure, for RLC AM)
- Ciphering and deciphering function (Ciphering and deciphering)
- Timer-based SDU discard function (Timer-based SDU discard in uplink)

The radio link controls (hereinafter, referred to as RLCs) 1b-10 and 1b-35 reconfigures the PDCP packet data unit (PDU) to an appropriate size to perform the ARQ operation or the like. The main functions of the RLC are summarized as follows.
- Data transfer function (Transfer of upper layer PDUs)
- ARQ function (Error Correction through ARQ (only for AM data transfer))

Concatenation, segmentation, reassembly functions (Concatenation, segmentation and reassembly of RLC SDUs (only for UM and AM data transfer))

Re-segmentation function (Re-segmentation of RLC data PDUs (only for AM data transfer))

Reordering function (Reordering of RLC data PDUs (only for UM and AM data transfer)

Duplicate detection function (Duplicate detection (only for UM and AM data transfer))

Error detection function (Protocol error detection (only for AM data transfer))

RLC SDU discard function (RLC SDU discard (only for UM and AM data transfer))

RLC re-establishment function (RLC re-establishment)

The MACs 4b-15 and 4b-30 are connected to several RLC layer devices configured in one terminal and perform an operation of multiplexing RLC PDUs into an MAC PDU and demultiplexing the RLC PDUs from the MAC PDU. The main functions of the MAC are summarized as follows.

Mapping function (Mapping between logical channels and transport channels)

Multiplexing/demultiplexing function (Multiplexing/demultiplexing of MAC SDUs belonging to one or different logical channels into/from transport blocks (TB) delivered to/from the physical layer on transport channels)

Scheduling information reporting function (Scheduling information reporting)

HARQ function (Error correction through HARQ)

Priority handling function between logical channels (Priority handling between logical channels of one UE)

Priority handling function between terminals (Priority handling between UEs by means of dynamic scheduling)

MBMS service identification function (MBMS service identification)

Transport format selection function (Transport format selection)

Padding function (Padding)

Physical layers 4b-20 and 4b-25 perform an operation of channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

Figure 4C:
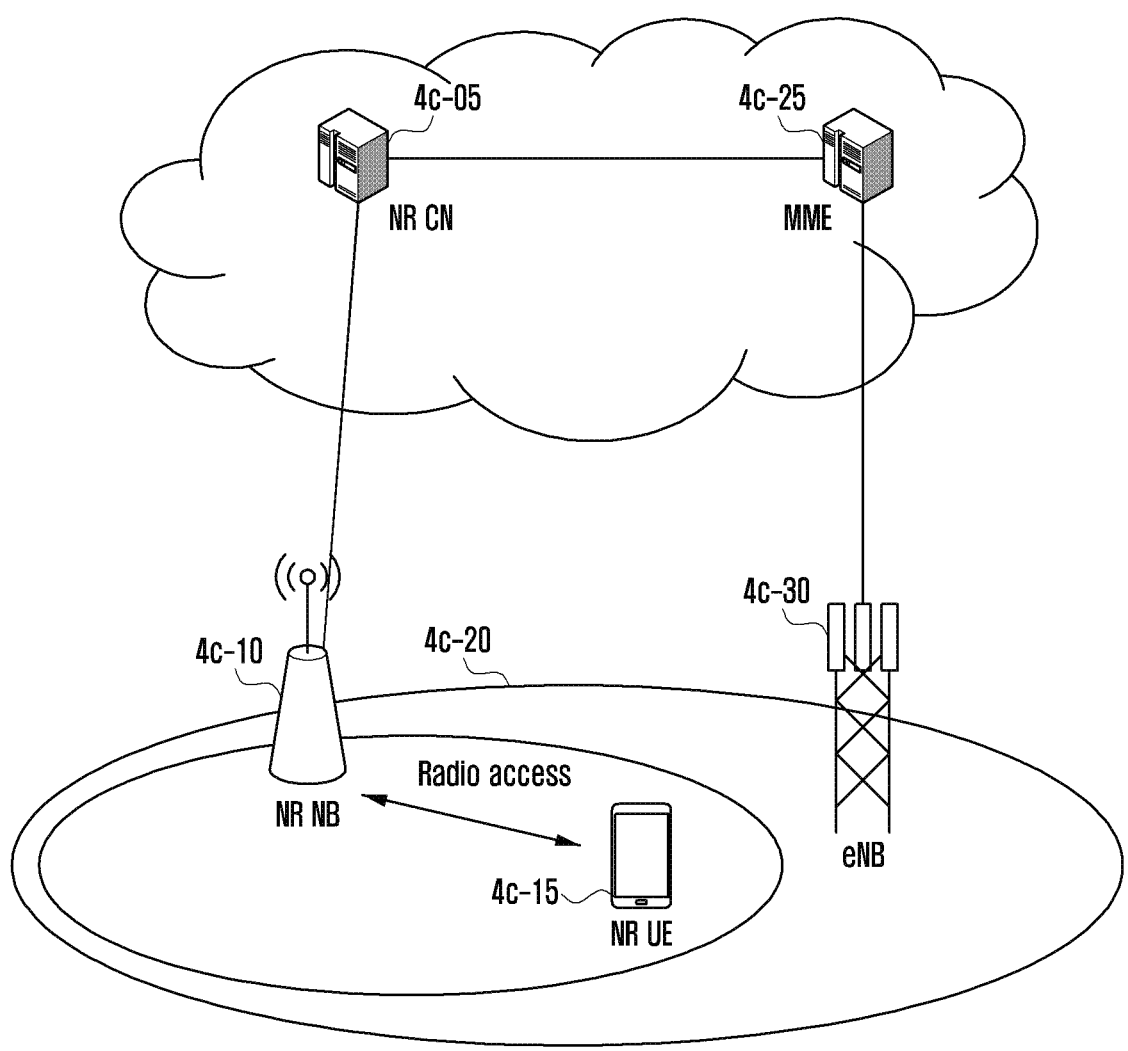
FIG. 4C is a diagram illustrating the structure of the next generation mobile communication system to which the present disclosure is applied.

FIG. 4C is a diagram illustrating a structure of a next generation mobile communication system to which the present disclosure is applied.

Referring to FIG. 4C, a radio access network of a next generation mobile communication system is configured to include a next generation base station (New radio node B, hereinafter NR NB or NR base station) 4c-10 and a new radio core network (NR CN) 4c-05. The user terminal (new radio user equipment, hereinafter, NR UE or UE) 4c-15 accesses the external network through the NR NB 4c-10 and the NR CN 4c-05.

In FIG. 4C, the NR NB 4c-10 corresponds to an evolved node B (eNB) of the existing LTE system. The NR NB is connected to the NR UE 4c-15 via a radio channel and may provide a service superior to the existing node B. In the next generation mobile communication system, since all user traffics are served through a shared channel, an apparatus for collecting state information such as a buffer status, an available transmission power state, and a channel status of the UEs to perform scheduling is used. The NR NB 4c-10 may serve as the device. One NR NB generally controls a plurality of cells. In order to realize the high-speed data transmission compared with the existing LTE, the NR gNB may have the existing maximum bandwidth or more, and may be additionally incorporated into a beam-forming technology by using orthogonal frequency division multiplexing (hereinafter, referred to as OFDM) as a radio access technology. Further, an adaptive modulation & coding (hereinafter, referred to as AMC) determining a modulation scheme and a channel coding rate according to a channel status of the terminal is applied. The NR CN 4c-05 may perform functions such as mobility support, bearer setup, QoS setup, and the like. The NR CN is a device for performing a mobility management function for the terminal and various control functions and is connected to a plurality of base stations. In addition, the next generation mobile communication system can interwork with the existing LTE system, and the NR CN is connected to the MME 4c-25 through the network interface. The MME is connected to the eNB 4c-30 which is the existing base station.

Figure 4D:
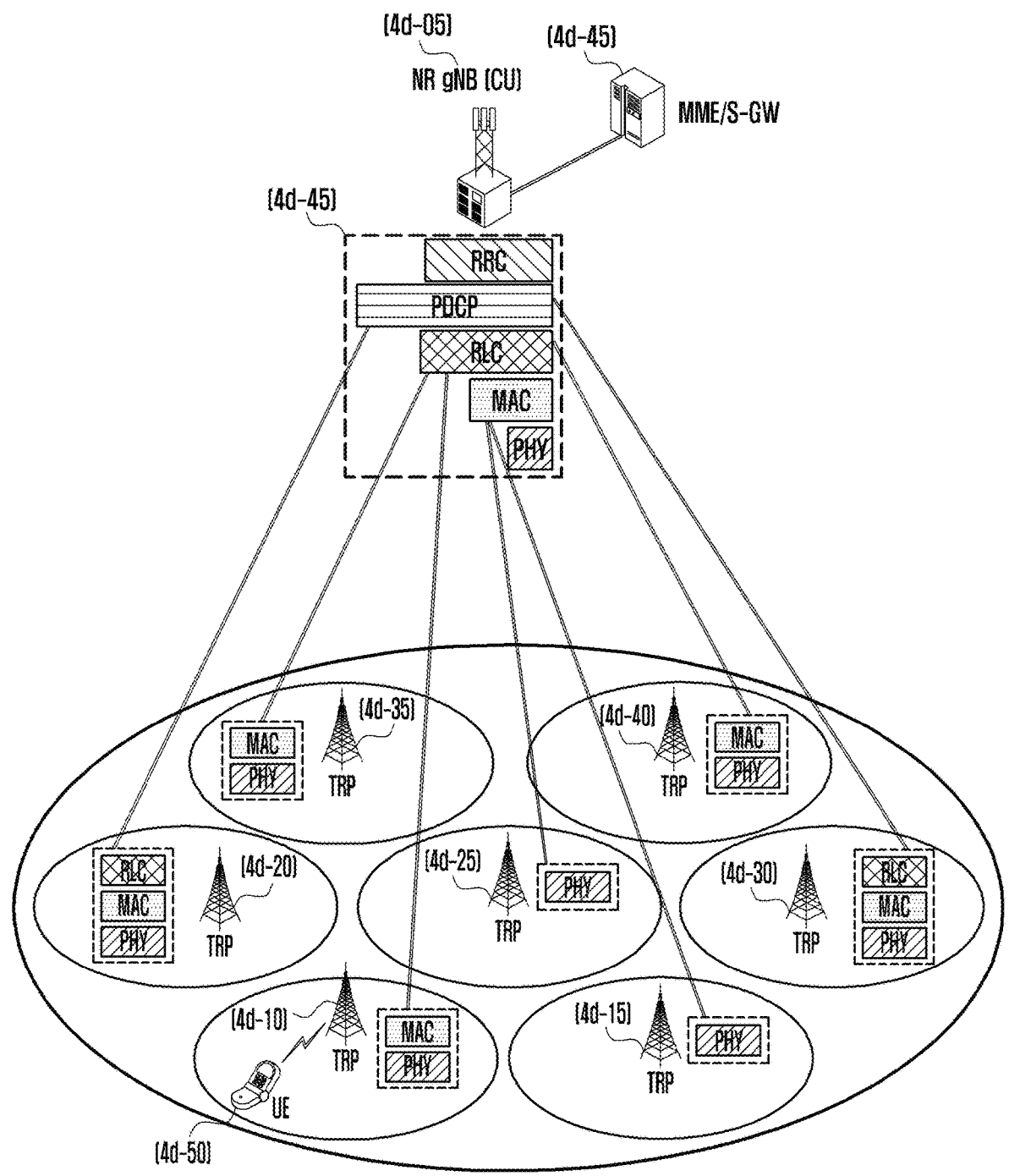
FIG. 4D is a diagram illustrating a structure of another next generation mobile communication system to which the present disclosure may be applied.

FIG. 4D is a diagram illustrating a structure of another next generation mobile communication system to which the present disclosure may be applied.

Referring to FIG. 4D, the cell in which the NR gNB 4d-05 operated based on the beam serves may be configured of a plurality of transmission reception points 4d-10, 4d-15, 4d-20, 4d-25, 4d-30, 4d-35, and 4d-40. The TRPs 4d-10 to 4d-40 represent blocks which separate some functions of transmitting/receiving physical signals from the existing LTE base station (eNB) and is configured of a plurality of antennas. The NR gNB 4d-05 may be expressed as a central unit (CB), and the TRP may be expressed as a distributed unit (DB). The functions of the NR gNB (4d-05) and the TRP may be configured by separating each layer in the PDCP/RLC/MAC/PHY layers like 4d-45. That is, the TRP can perform the function of the corresponding layer only with the PHY layer (4d-15, 4d-25), the TRP can perform the functions of the corresponding layers only with the PHY layer and MAC layer 4d-10, 4d-35, and 4d-40, and the TRP may perform the functions of the corresponding layers with only the PHY layer, the MAC layer, and the RLC layer (4d-20 and 4d-30). In particular, the TRPs 4d-10 and 4d-40 may use a beamforming technology of transmitting/receiving data by using a plurality of transmitting/receiving antennas to generate narrow beams in several directions. The user terminal 4d-50 accesses the NR gNB 4d-05 and the external network through the TRPs 4d-10 to 4d-40. That is, in order to provides services to users, the NR gNB 4d-05 collects and schedules state information such as a buffer status, an available transmission power state, and a channel status of the terminals to support a connection between the terminals and a core network (CN).

Figure 4E:
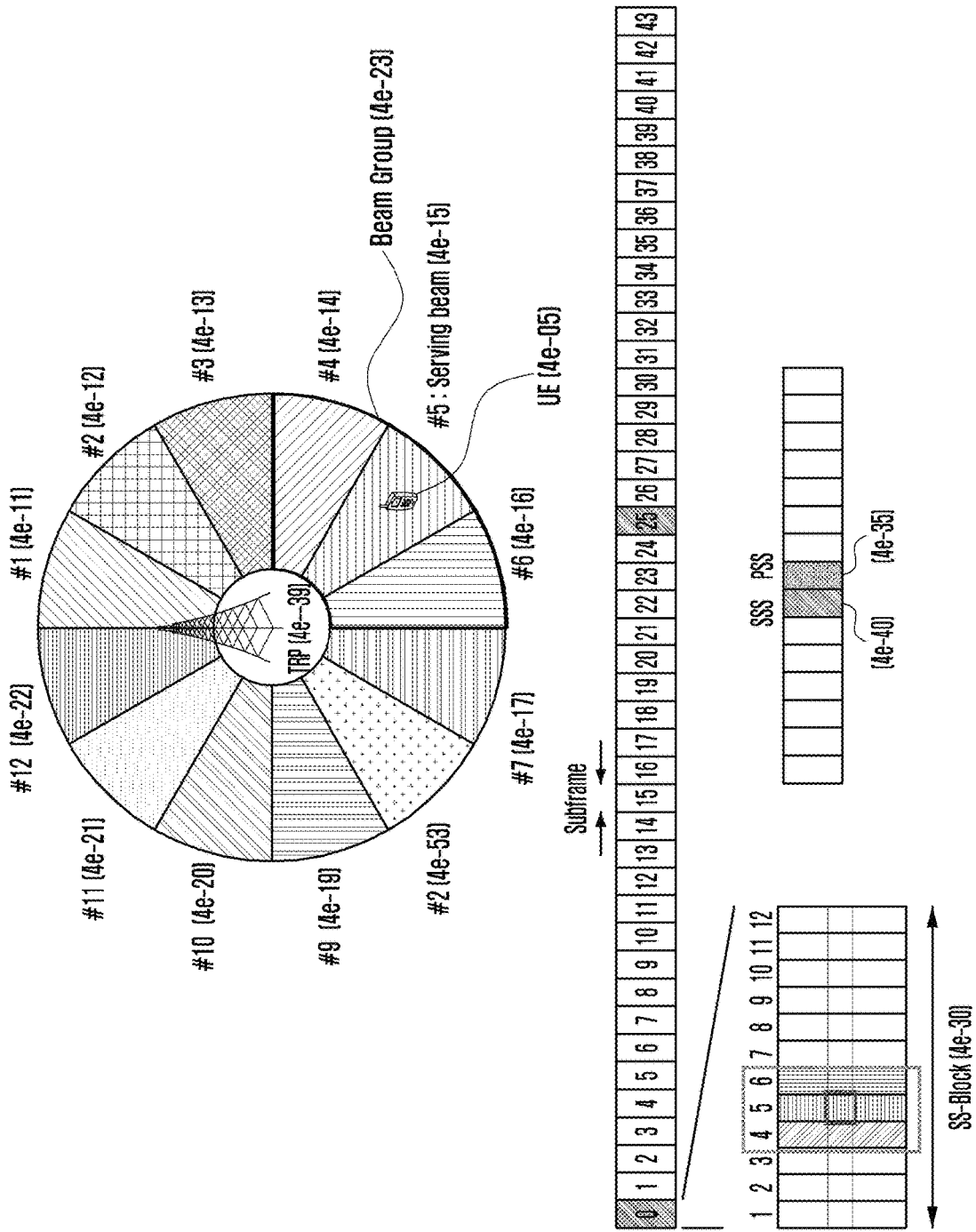
FIG. 4E is a diagram illustrating a structure of a subframe in which a synchronization signal is transmitted in the next generation mobile communication system.

FIG. 4E is a diagram illustrating a structure of a synchronization block (SS-block) which is a subframe in which a synchronization signal is transmitted in the next generation mobile communication system.

The NR system aims at a higher transmission rate than LTE and considers scenarios operating at high frequencies to achieve wide frequency bandwidth. In particular, it is possible to consider a scenario in which a directional beam is generated at a high frequency and data having a high data rate are transmitted. Accordingly, it is possible to consider scenarios in which communications are made using different beams when the base station or a transmission reception point (TRP) 4e-10 communicates with terminals 4e-05 in a cell.

In the illustrated figures, the TRP 4e-10 transmits a directional downlink signal through 12 beams 4e-11 to 4e-22. In order to measure which beam the terminal 4e-05 uses to communicate with the TRP, the terminal receives a PSS 4e-35 for timing acquisition of the symbol, an SSS 4e-40 for detecting a cell ID, a timing of the subframe, a BRS for identifying a beam or the like. A beam index value for identifying each beam from the reference signal may also be derived. In the present illustrated figures, it is assumed that different beams are swept over every symbol in the subframe and transmitted. The terminal 4e-05 receives a plurality of first downlink signals xSS in the first subframe 4e-30. The first subframe refers to a subframe through which a plurality of synchronization signals are transmitted, and is referred to as a synchronization signal block (SS-Block) 4e-30. That is, the SS-Block is defined as the subframe in which the synchronization signal is transmitted among all the subframes. The first downlink signal is based on the PSS/SSS and an ESS may be added in a high frequency using a beam, and a signal may be transmitted in a time window in which the corresponding beam is transmitted on a beam-by-beam basis. That is, one first sub-frame 4e-30 consists of n consecutive time windows (symbols), and the first downlink signal is transmitted in each time period. Alternatively, in the case of sub-6 GHz, the first downlink signal is transmitted in a first time window and other downlink signals are transmitted in the remaining time windows. In particular, the terminal 4e-05 may receive only the first downlink signal of the serving cell/serving beam and receive the first downlink signal transmitted in a beam group consisting of a serving cell/serving beam and neighboring beams adjacent to the serving beam. The beam group may be configured in the base station as N best beams with good channel between the base station and the terminal.

In the case of the channel measurement using the synchronization signal as described above, it can be particularly used for radio resource monitoring (RRM) measurement. That is, the channel measurement using the synchronization signal can be used for the channel measurement of the serving cell and neighboring cells. To this end, when the channel measurement of the serving cell is indicated, it is useful to inform the terminal of the position of the SS-Block of the neighboring cells necessary for the measurement. In the present disclosure, a method for this purpose will be described with reference to various embodiments.

Figure 4F:
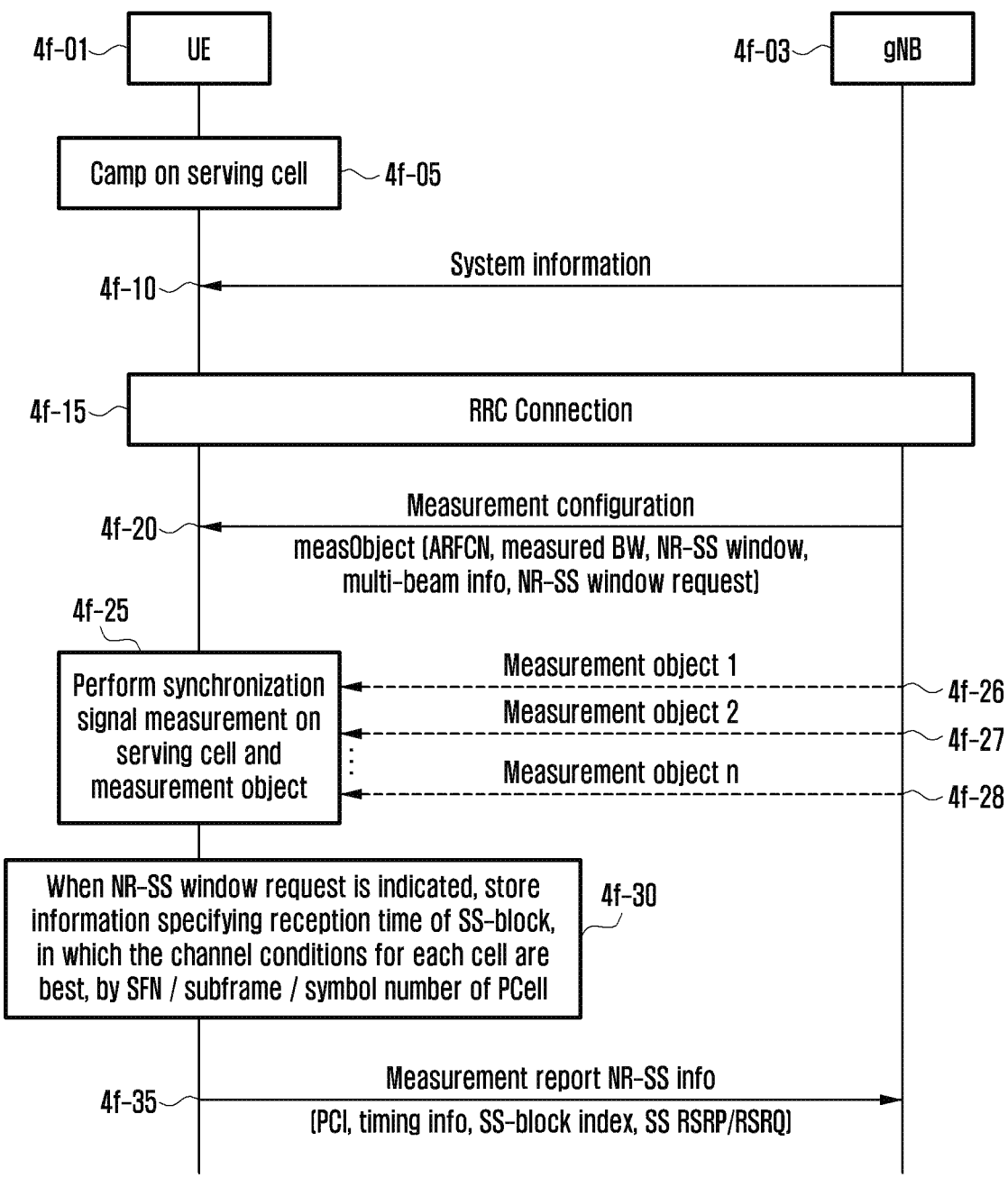
FIG. 4F is a diagram for explaining an overall operation of a channel measurement using the synchronization signal proposed in the present disclosure.

FIG. 4F is a diagram illustrating an overall operation of a channel measurement using the synchronization signal proposed in the present disclosure.

A terminal 4f-01 in an idle mode RRC_IDLE finds a suitable cell and camps on the corresponding base station 4f-03 (4f-05), and receives the system information from the base station 4f-10. In the idle mode, the terminal is in a state in which the terminal may not transmit data because of not being connected to the network for power saving or the like and is shifted to a connected mode (RRC_CONNECTED) to transmit data (4f-15). In addition, the camping means that the terminal is staying in the corresponding cell and receives a paging message to determine whether data is coming on the downlink.

Then, the base station 4f-03 transmits measurement configuration-related configuration information to the RRCConnectionReconfiguration message to instruct the terminal 4f-01 to measure the neighboring cells. The message includes information on the measurement object of the neighboring cells, and is transmitted by being included in measObject (4f-20). In addition, the information element may include an absolute radio frequency channel number (ARFCN), bandwidth information to be measured, NR-SS window information in the NR, multi-beam information, NR-SS window request information, or the like.

In the existing LTE, the base station may set the terminal to report the measurement information periodically or at the time of occurrence of the event depending on the measured values of the serving cell and the neighboring cells. The event includes a case in which the following conditions are satisfied.

Event A1: Serving becomes better than absolute threshold;

Event A2: Serving becomes worse than absolute threshold;

Event A3: Neighbor becomes amount of offset better than PCell/PSCell;

Event A4: Neighbor becomes better than absolute threshold;

Event A5: PCell/PSCell become worse than absolute threshold1 AND Neighbor becomes better than another absolute threshold2.

Event A6: Neighbor becomes amount of offset better than SCell.

In step 4f-25, the terminal performs synchronization signal measurement on the measurement object received from the base station. The NR-SS window information and the NR-SS window request may be included for each measurement object. The present disclosure includes a function of reporting, by the base station, the above two measurement values as well as a result obtained by measuring a synchronization signal measurement result of the terminal through an automatic neighboring (ANR) function. This is activated when the base station transmits the NR-SS window request in the measObject when requesting the terminal to measure the neighboring cells. The most important reason for requesting the terminal to report the NR-SS window measurement value through the ANR is that the base station may not know the location of the SS-block of the neighboring cells. When the base station certainly knows the reception timing (specified by the SFN/subframe/symbol number of the PCell) of the synchronization signal block (SS-Block) of the neighboring cells to be measured, the base station may transmit the corresponding information to the terminal to instruct the neighboring cell measurement However, when the reception timing (specified by the SFN/subframe/symbol number of PCell) of the synchronization signal block (SS-Block) of the neighboring cells is unknown, the corresponding information may not be transmitted to the terminal. That is, when the terminal fails to receive the NR-SS window information from the base station, the terminal needs to search for the synchronization signal over the whole area. Since the performance of the above operation by all the terminals included in the base station is not efficient, if the result of the search for the performed synchronization signal is transmitted to the base station, the reception timing (specified by SFN/subframe/symbol number of PCell) of the synchronization signal block (SS-Block) of the meaningful neighboring cells may be transmitted to the terminals. In addition, when the multi-beam information is included in the measurement value setting signal, the terminal performs the downlink beam sweep operation in accordance with the set multi-beam information. That is, it is possible to perform reception beam sweeping, which is matched to receive accurate timing and a good signal sensitivity of the signal transmitted in the set multi-beam.

In step 4f-30, when the NR-SS window request is indicated, the terminal stores information specifying the reception time of the SS-block, in which the channel conditions for each cell are best, by the SFN/subframe/symbol number of the PCell and transmits the information to the base station by including the information in the measurement value report in step 4*f*-35. The RRC message includes the NR-SS information. Specifically, the RRC message includes information on physical cell identity (PCI), timing information, SS-block index, and reference signal received power/reference signal received quality (RSRP/RSRQ) of the synchronization signal. If the NR-SS window request information is not included in the measurement value setting, the terminal follows the same process as the measurement value report in LTE. That is, the measurement is performed based on the periodic or event-based measurement report set by the base station, and the measurement value is reported when the corresponding measurement report condition is satisfied. The measurement value report includes the physical cell identity (PCI), the measurement value index (measId), the cell global identity (CGI) information, and the RSRP/RSRQ information of the synchronization signal.

Figure 4G:
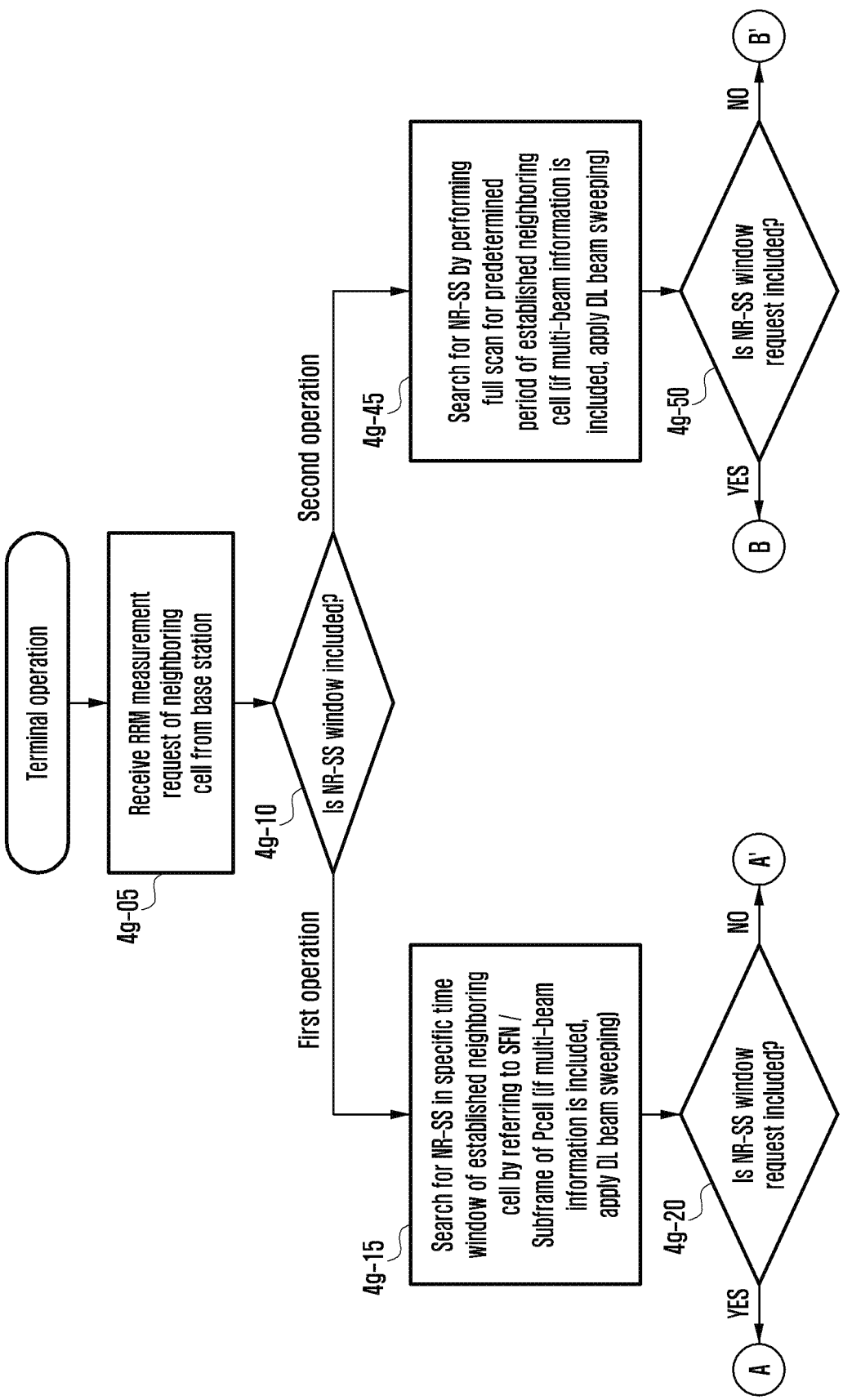
FIGS. 4GA-4GB are diagrams for explaining a channel measurement and reporting operation using the synchronization signal of the terminal to which the present disclosure is applied.
Figure 4G:
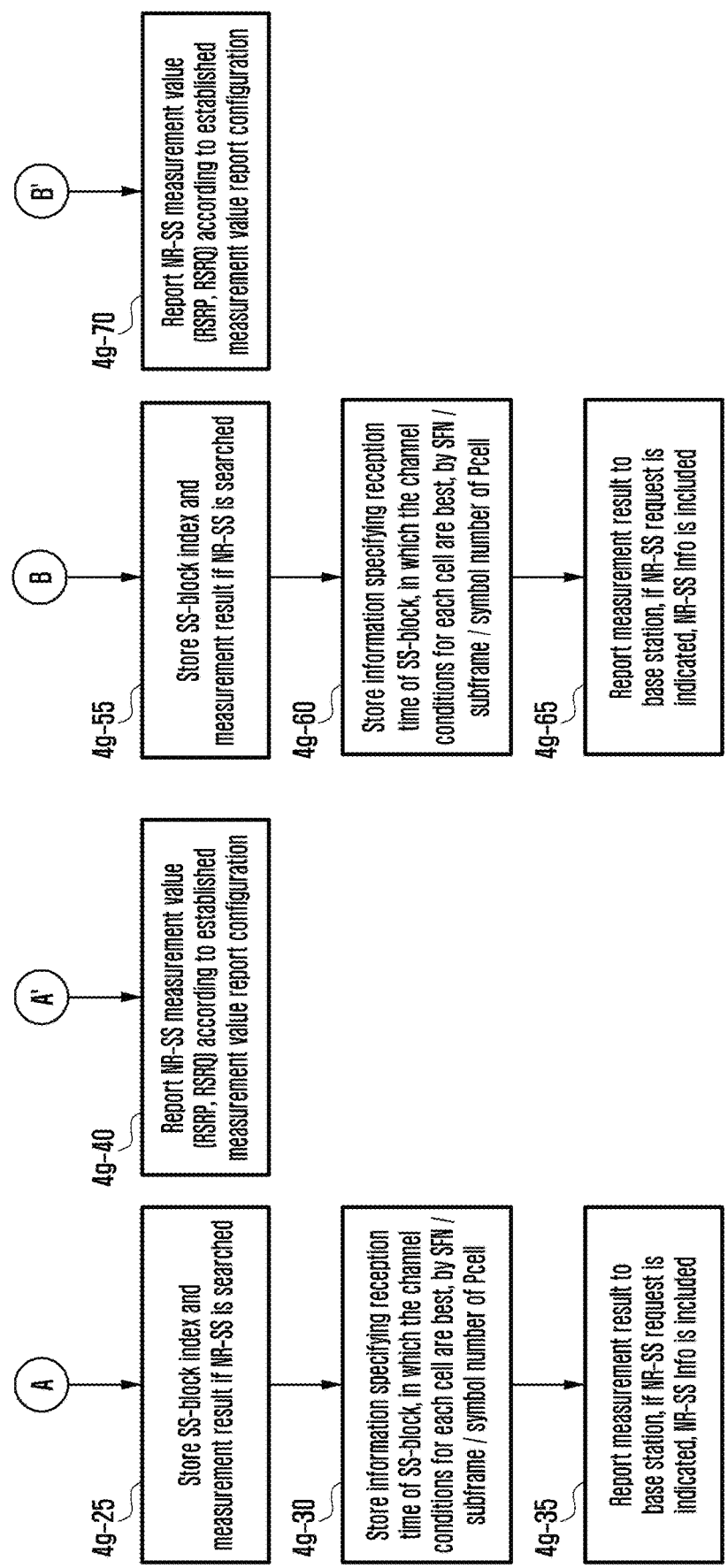

FIGS. 4GA-4GB are diagrams illustrating a channel measurement and reporting operation using the synchronization signal of the terminal to which the present disclosure is applied.

The terminal of the present disclosure learns a method for instructing and performing measurement for radio resource management (RRM) of neighboring cells from an NR base station. In particular, the measurement for the radio resource management is different from that in the LTE in that the measurement is performed through the synchronization signal. For reference, a cell-specific reference signal (CRS) was used to measure the neighbor cells in the LTE.

The terminal in the RRC connection state can receive the RRM measurement request of the neighboring cells from the base station for each measurement object (4*g*-05). That is, the RRCConnectionReconfiguration message including a measurement set value for how to measure the neighboring cells by the measObject from the base station is transmitted to the terminal. The neighboring cell measurement setup information signal may include an absolute radio frequency channel number (ARFCN), bandwidth information to be measured, NR-SS window information in the NR, multi-beam information, NR-SS window request information, or the like. As described above, the information is set for each measurement object and for each measObject. The terminal identifies whether the NR-SS window information is included the RRM measurement setup signal for each measurement object (4*g*-10). When NR-SS window information is included, accurately, when information (information specified by SFN/subframe/symbol number of PCell) on at which reception time the synchronization signal in the neighboring cells to be measured may be received is included, the terminal measures the synchronization signal of the neighboring cells received at the corresponding set time and performs the first operation (4*g*-15). In addition, if multi-beam information is included in the step, the terminal performs a beam sweep operation on the downlink reception beam. That is, it is possible to perform reception beam sweeping, which is matched to receive accurate timing and a good signal sensitivity of the signal transmitted in the set multi-beam. When the NR-SS window request information is included in the RRM measurement request message (4*g*-20), the terminal searches for and measures the NR-SS within the set NR-SS window and stores the measured result in the buffer together with the index of the SS-block (4*g*-25). In step 4*g*-30, the terminal stores information for specifying the reception time of the SS-block having the best channel condition for each cell by the SFN/subframe/symbol number of the PCell. In the step, the stored synchronization signal measurement value is reported to the base station. That is, when an NR-SS request is instructed from the base station, the terminal transmits the measured NR-SS information to the base station. The NR-SS related measurement value report includes the physical cell identity (PCI), the timing information, the SS-block index, and the RSRP/RSRQ information of the synchronization signal in neighboring cells to be measured (4*g*-35). For reference, when the base station requests the NR-SS window request, if the base station does not have the accurate synchronous signal window (NR-SS window) information for the neighboring cells or is to obtain more accurate information. If the base station does not include the NR-SS window request information, the terminal reports the measured value of the neighboring cells according to another report condition received from the base station (4*g*-40). The report conditions may be set to be reported periodically or at the time of occurrence of an event according to the measurement values of the serving cell and the neighboring cells similarly to the LTE. The event includes a case in which the following conditions are satisfied Event A1: Serving becomes better than absolute threshold;

Event A2: Serving becomes worse than absolute threshold;

Event A3: Neighbor becomes amount of offset better than PCell/PSCell;

Event A4: Neighbor becomes better than absolute threshold;

Event A5: PCell/PSCell become worse than absolute threshold) AND Neighbor becomes better than another absolute threshold2.

Event A6: Neighbor becomes amount of offset better than SCell.

That is, when the terminal satisfies the measurement report condition set by the base station, it reports the NR-SS measurement values (RSRP, RSRQ) (4*g*-40). In addition, the measurement value report includes the physical cell identity (PCI), the measurement value index (measId), the cell global identity (CGI) information, and the RSRP/RSRQ information of the synchronization signal.

In addition, returning back to the step 4*g*-10, when NR-SS window information is not included, accurately, when information (information specified by SFN/subframe/symbol number of PCell) on at which reception time the synchronization signal in the neighboring cells to be measured may be received is not included, the terminal measures the synchronization signal of the neighboring cells by performing the full scan at all the reception time and performs the second operation (4*g*-45). In addition, if multi-beam information is included in the step, the terminal performs a beam sweep operation on the downlink reception beam. That is, it is possible to perform reception beam sweeping, which is matched to receive accurate timing and a good signal sensitivity of the signal transmitted in the set multi-beam. Thereafter, when the NR-SS window request information is included in the RRM measurement request message (4*g*-50), the terminal searches for and measures the NR-SS by performing the full scan at all the reception time and stores the measured result in the buffer together with the index of the SS-block (4*g*-55). In step 4*g*-60, the terminal stores information for specifying the reception time of the SS-block having the best channel condition for each cell by the SFN/subframe/symbol number of the PCell. In the step, the stored synchronization signal measurement value is reported to the base station. That is, when an NR-SS request is instructed from the base station, the terminal transmits the measured NR-SS information to the base station. The NR-SS related measurement value report includes the physical cell identity (PCI), the timing information, the SS-block index, and the RSRP/RSRQ information of the synchronization signal in neighboring cells to be measured (4g-65). For reference, when the base station requests the NR-SS window request, if the base station does not have the accurate synchronous signal window (NR-SS window) information for the neighboring cells or is to obtain more accurate information. If the base station does not include the NR-SS window request information, the terminal reports the measured value of the neighboring cells according to another report condition received from the base station. The report conditions may be set to be reported periodically or at the time of occurrence of an event according to the measurement values of the serving cell and the neighboring cells similarly to the LTE. The event includes a case in which the following conditions are satisfied.

Event A1: Serving becomes better than absolute threshold;
Event A2: Serving becomes worse than absolute threshold;
Event A3: Neighbor becomes amount of offset better than PCell/PSCell;
Event A4: Neighbor becomes better than absolute threshold;
Event A5: PCell/PSCell become worse than absolute threshold1 AND Neighbor becomes better than another absolute threshold2.
Event A6: Neighbor becomes amount of offset better than SCell.

That is, when the terminal satisfies the measurement report condition set by the base station, it reports the NR-SS measurement values (RSRP, RSRQ) (4g-70). In addition, the measurement value report includes the physical cell identity (PCI), the measurement value index (measId), the cell global identity (CGI) information, and the RSRP/RSRQ information of the synchronization signal.

Figure 4H:
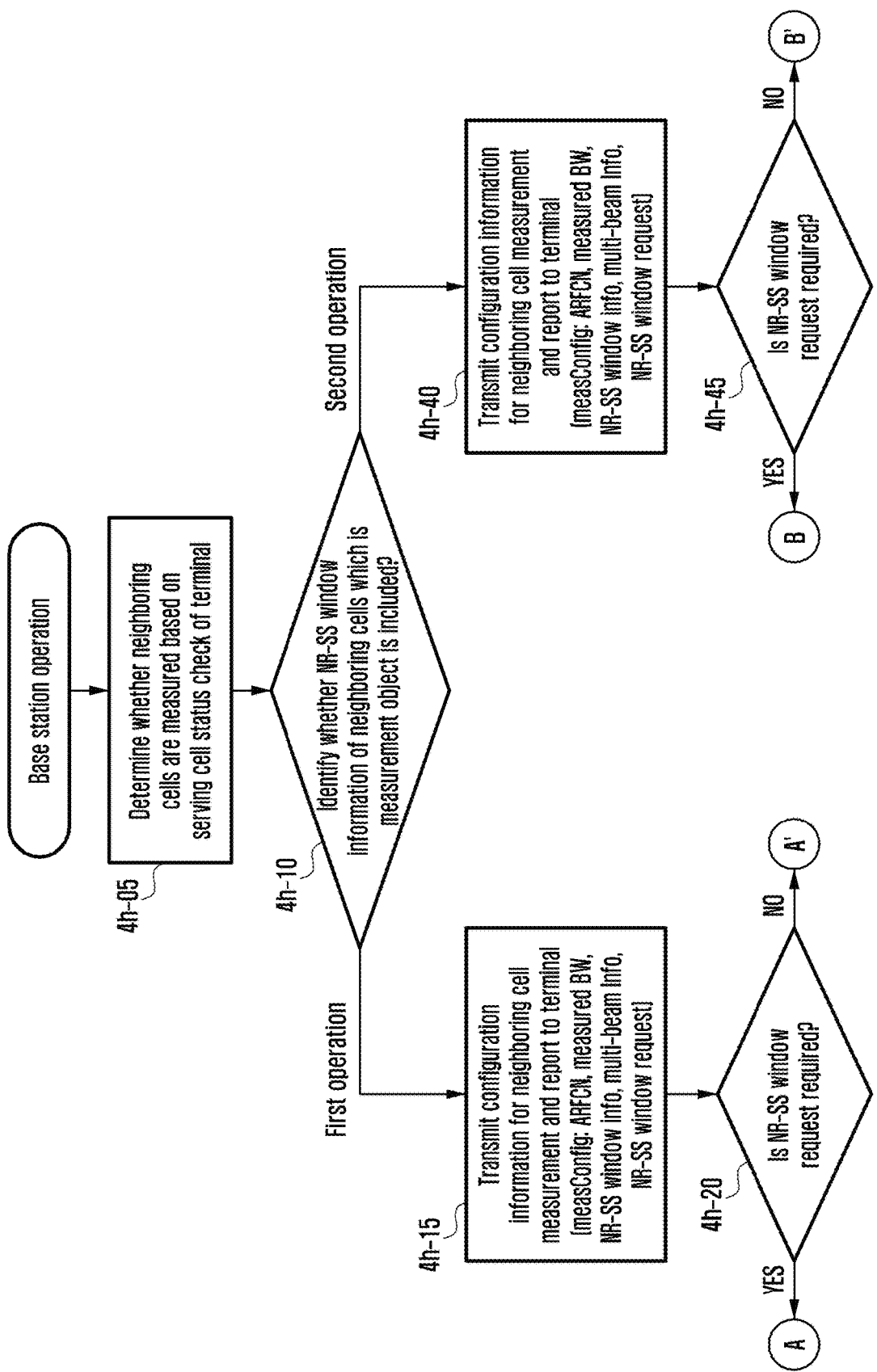
FIGS. 4HA-4HB are diagrams diagram for explaining a channel measurement setting and applying operation using the synchronization signal of the base station to which the present disclosure is applied.
Figure 4H:
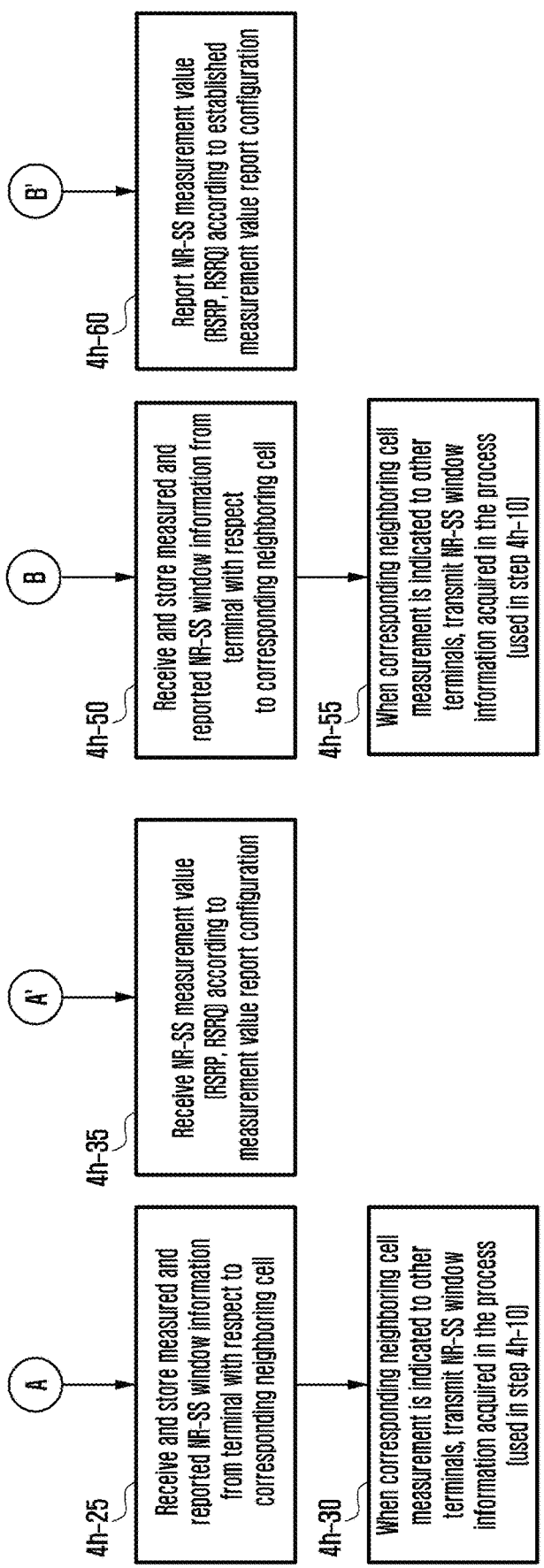

FIGS. 4HA-4HB are diagrams illustrating a channel measurement setting and applying operation using the synchronization signal of the base station to which the present disclosure is applied. The NR base station in the present disclosure checks the serving cell quality state of the terminal and determines whether to measure neighboring cells (4h-05). In this figure, the base station is instructed to perform measurement for radio resource management (RRM) of the neighboring cells and a base station operation using a report message received from the terminal will be described. In particular, the measurement for the radio resource management is different from that in LTE in that the measurement is performed through the synchronization signal. For reference, a cell-specific reference signal (CRS) was used to measure the neighbor cells in the LTE.

If it is determined that it is necessary to instruct the terminal to measure the neighboring cells in the step, the base station determines whether the corresponding neighboring cells has the NR-SS window information in step 4h-10. If the terminal has the synchronization signal window information for the neighboring cells to be measured, the terminal transmits the synchronization signal window information to the terminal, including the synchronization signal window information related to the measurement of the synchronization signal for the corresponding measurement object. The neighboring cell measurement setup information signal may include an absolute radio frequency channel number (ARFCN), bandwidth information to be measured, NR-SS window information in the NR, multi-beam information, NR-SS window request information, or the like. In addition, it is also possible to transmit the measurement report configuration message for allowing the terminal to report the measured value separately. The report configuration may be set to be reported periodically or at the time of occurrence of an event according to the measurement values of the serving cell and the neighboring cells similarly to the LTE. In step 4h-20, the base station may request the terminal to measure and report the NR-SS window reception time according to whether the synchronization signal window information of the neighboring cells is accurate or not. If the base station requests the NR-SS window, it receives and stores the NR-SS window information measured and reported from the terminal for the neighboring cells that request the measurement (4h-25). In step 4h-30, the base station may transmit the NR-SS window information when instructing another terminal to perform the neighboring cell measurement using the synchronization signal reception time information of the neighboring cells received in the step. This means that it can be used in the neighboring cell measurement instruction step for other terminals, that is, in steps 4h-10. If the base station does not include the NR-SS window request information, the base station receives the measured value of the neighboring cells according to the report conditions set from the base station. The report conditions may be set to be reported periodically or at the time of occurrence of an event according to the measurement values of the serving cell and the neighboring cells similarly to the LTE (4h-35).

If the base station does not have the synchronization signal window information for the neighboring cells to be measured by the terminal in step 4h-10, the base station transmits the synchronization signal window information to the terminal except for the synchronization signal window information (4h-40). If the synchronization signal window information is excluded, the terminal can perform a full scan for all reception times and may be defined to search for and measure a synchronization signal. The neighboring cell measurement setup information signal may include an absolute radio frequency channel number (ARFCN), bandwidth information to be measured, multi-beam information, NR-SS window request information, or the like. In addition, it is also possible to transmit the measurement report configuration message for allowing the terminal to report the measured value separately. The report configuration may be set to be reported periodically or at the time of occurrence of an event according to the measurement values of the serving cell and the neighboring cells similarly to the LTE. In step 4h-45, the base station may request the terminal to measure and report the reception time of the NR-SS window. Since the base station does not know the synchronization signal receiving time of the neighboring cells, it is to obtain the information through the terminal. If the base station requests the NR-SS window, it receives and stores the NR-SS window information measured and reported from the terminal for the neighboring cells that request the measurement (4h-50). In step 4h-55, the base station may transmit the NR-SS window information when instructing another terminal to perform the neighboring cell measurement using the synchronization signal reception time information of the neighboring cells received in the step. This means that it can be used in the neighboring cell measurement instruction step for other terminals, that is, in steps 4h-10. If the base station does not include the NR-SS window request information, the base station receives the measured value of the neighboring cells according to the report conditions set from the base station. The report conditions may be set to be reported periodically or at the time of occurrence of an event according to the measurement values of the serving cell and the neighboring cells similarly to the LTE (4h-60).

Figure 4I:
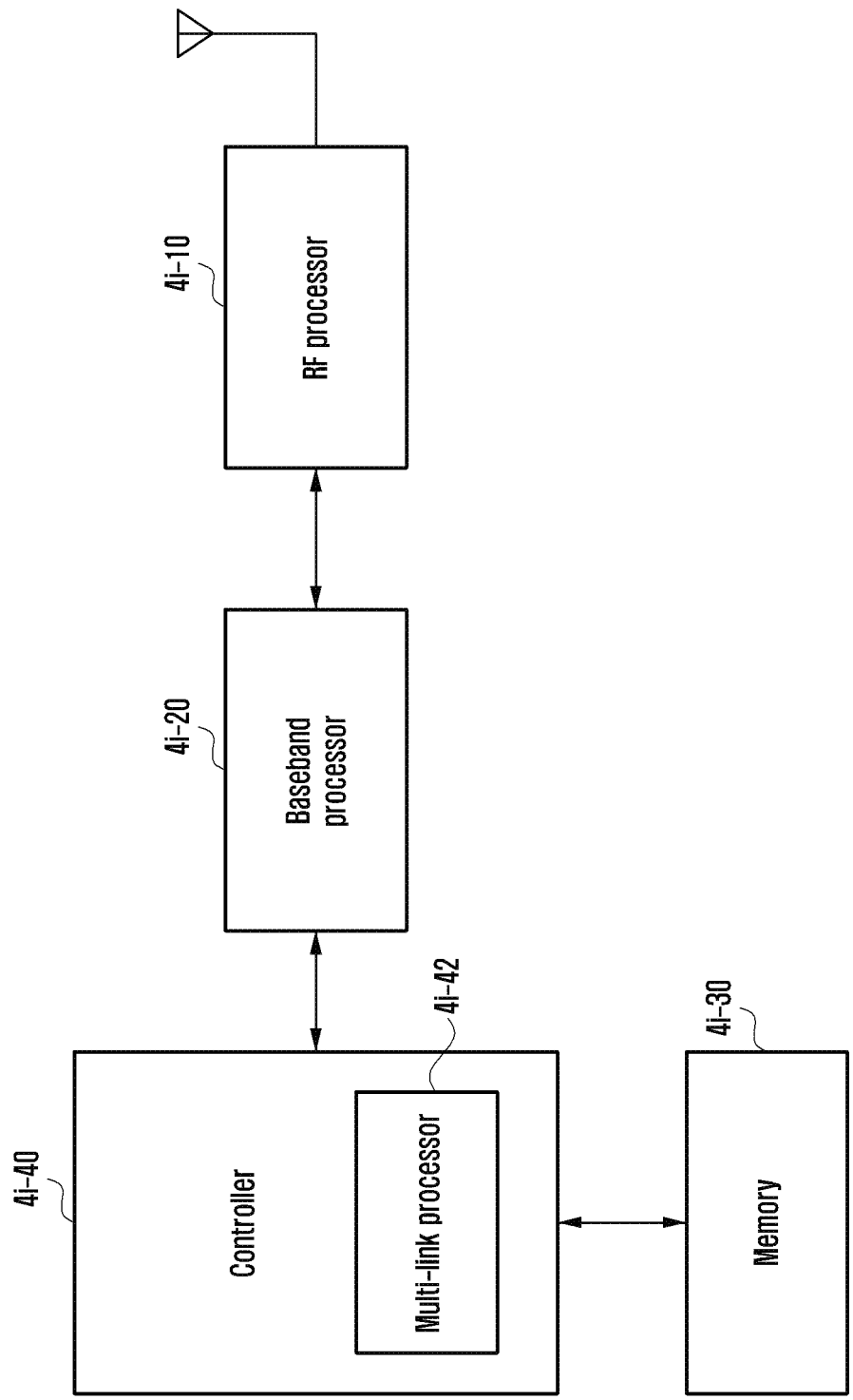
FIG. 4I is a block diagram illustrating an internal structure of the terminal to which the present disclosure is applied.

FIG. 4I is a block diagram illustrating an internal structure of the terminal to which the present disclosure is applied.

Referring to FIG. 4I, the terminal includes a radio frequency (RF) processor 4i-10, a baseband processor 4i-20, a memory 4i-30, and a controller 4i-40.

The RF processor 4i-10 serves to transmit and receive a signal through a radio channel, such as band conversion and amplification of a signal. That is, the RF processor 4i-10 up-converts a baseband signal provided from the baseband processor 4i-20 into an RF band signal and then transmits the RF band signal through an antenna and down-converts the RF band signal received through the antenna into the baseband signal. For example, the RF processor 4i-10 may include a transmitting filter, a receiving filter, an amplifier, a mixer, an oscillator, a digital to analog converter (DAC), an analog to digital converter (ADC), or the like. In the above figure, only one antenna is illustrated, but the terminal may include a plurality of antennas. Further, the RF processor 4i-10 may include a plurality of RF chains. Further, the RF processor 4i-10 may perform beamforming. For the beamforming, the RF processor 4i-10 may adjust a phase and a size of each of the signals transmitted and received through a plurality of antennas or antenna elements. In addition, the RF processor may perform MIMO and may receive a plurality of layers when performing a MIMO operation.

The baseband processor 4i-20 performs a conversion function between a baseband signal and a bit string according to a physical layer standard of a system. For example, when data are transmitted, the baseband processor 4i-20 generates complex symbols by coding and modulating a transmitted bit string. Further, when data are received, the baseband processor 4i-20 recovers the received bit string by demodulating and decoding the baseband signal provided from the RF processor 4i-10. For example, according to the orthogonal frequency division multiplexing (OFDM) scheme, when data are transmitted, the baseband processor 4i-20 generates the complex symbols by coding and modulating the transmitting bit string, maps the complex symbols to sub-carriers, and then performs an inverse fast Fourier transform (IFFT) operation and a cyclic prefix (CP) insertion to construct the OFDM symbols. Further, when data are received, the baseband processor 4i-20 divides the baseband signal provided from the RF processor 4i-10 in an OFDM symbol unit and recovers the signals mapped to the sub-carriers by a fast Fourier transform (FFT) operation and then recovers the received bit string by the modulation and decoding.

The baseband processor 4i-20 and the RF processor 4i-10 transmit and receive a signal as described above. Therefore, the baseband processor 4i-20 and the RF processor 4i-10 may be called a transmitter, a receiver, a transceiver, or a communication unit. Further, at least one of the baseband processor 4i-20 and the RF processor 4i-10 may include a plurality of communication modules to support a plurality of different radio access technologies. Further, at least one of the baseband processor 4i-20 and the RF processor 4i-10 may include different communication modules to process signals in different frequency bands. For example, different radio access technologies may include the WLAN (for example: IEEE 802.11), a cellular network (for example: LTE), or the like. Further, the different frequency bands may include a super high frequency (SHF) (for example: 2 NRHz, NRhz) band, a millimeter wave (for example: 60 GHz) band.

The memory 4i-30 stores data such as basic programs, application programs, and configuration information for the operation of the terminal. In particular, the memory 4i-30 may store information associated with a second access node performing wireless communication using a second access technology. Further, the memory 4i-30 provides the stored data according to the request of the controller 4i-40.

The controller 4i-40 controls the overall operations of the terminal. For example, the controller 4i-40 transmits and receives a signal through the baseband processor 4i-20 and the RF processor 4i-10. Further, the controller 4i-40 records and reads data in and from the memory 4i-30. For this purpose, the controller 4i-40 may include at least one processor. For example, the controller 4i-40 may include a communication processor (CP) performing a control for communication and an application processor (AP) controlling an upper layer such as the application programs. According to the embodiment of the present disclosure, the controller 4i-40 includes a multi-link processor 4i-42 that performs the processing to be operated in a multi-link mode.

Figure 4J:
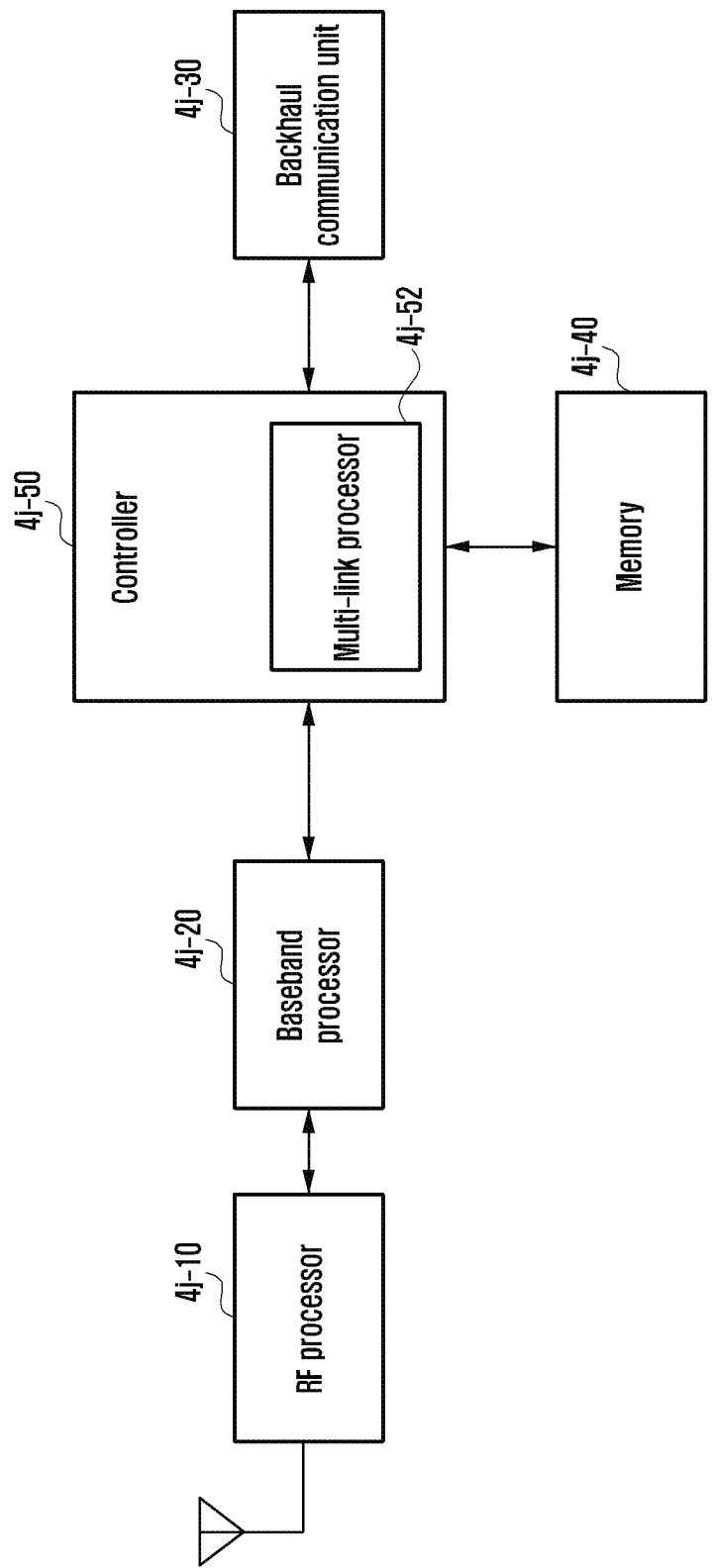
FIG. 4J is a block diagram illustrating a configuration of the base station according to the present disclosure.

FIG. 4J is a block diagram illustrating a configuration of the base station according to the present disclosure.

As illustrated in FIG. 4J, the base station is configured to include an RF processor 4j-10, a baseband processor 4j-20, a backhaul communication unit 4j-30, a memory 4j-40, and a controller 4j-50.

The RF processor 4j-10 serves to transmit and receive a signal through a radio channel, such as band conversion and amplification of a signal. That is, the RF processor 4j-10 up-converts a baseband signal provided from the baseband processor 4j-20 into an RF band signal and then transmits the RF band signal through an antenna and down-converts the RF band signal received through the antenna into the baseband signal. For example, the RF processor 4j-10 may include a transmitting filter, a receiving filter, an amplifier, a mixer, an oscillator, a DAC, an ADC, or the like. In the above figure, only one antenna is illustrated, but the first access node may include a plurality of antennas. Further, the RF processor 4j-10 may include a plurality of RF chains. Further, the RF processor 4j-10 may perform the beamforming. For the beamforming, the RF processor 4j-10 may adjust a phase and a size of each of the signals transmitted/received through a plurality of antennas or antenna elements. The RF processor may perform a downward MIMO operation by transmitting one or more layers.

The baseband processor 4j-20 performs a conversion function between the baseband signal and the bit string according to the physical layer standard of the first radio access technology. For example, when data are transmitted, the baseband processor 4j-20 generates complex symbols by coding and modulating a transmitted bit string. Further, when data are received, the baseband processor 4j-20 recovers the received bit string by demodulating and decoding the baseband signal provided from the RF processor 4j-10. For example, according to the OFDM scheme, when data are transmitted, the baseband processor 4j-20 generates the complex symbols by coding and modulating the transmitting bit string, maps the complex symbols to the sub-carriers, and then performs the IFFT operation and the CP insertion to construct the OFDM symbols. Further, when data are received, the baseband processor 4j-20 divides the baseband signal provided from the RF processor 4j-10 in the OFDM symbol unit and recovers the signals mapped to the sub-carriers by the FFT operation and then recovers the receiving bit string by the modulation and decoding. The baseband processor 4j-20 and the RF processor 4j-10 transmit and receive a signal as described above. Therefore, the baseband processor 4j-20 and the RF processor 4j-10 may be called a transmitter, a receiver, a transceiver, or a communication unit.

The backhaul communication unit 4j-30 provides an interface for performing communication with other nodes within the network. That is, the backhaul communication unit 4j-30 converts bit strings transmitted from the main base station to other nodes, for example, an auxiliary base station, a core network, etc., into physical signals and converts the physical signals received from other nodes into the bit strings.

The memory 4j-40 stores data such as basic programs, application programs, and configuration information for the operation of the main base station. In particular, the memory 4j-40 may store the information on the bearer allocated to the accessed terminal, the measured results reported from the accessed terminal, etc. Further, the memory 4j-40 may store information that is a determination criterion on whether to provide a multiple connection to the terminal or stop the multiple connection to the terminal. Further, the memory 4j-40 provides the stored data according to the request of the controller 4j-50.

The controller 4j-50 controls the general operations of the main base station. For example, the controller 4j-50 transmits/receives a signal through the baseband processor 4j-20 and the RF processor 4j-10 or the backhaul communication unit 4j-30. Further, the controller 4j-50 records and reads data in and from the memory 4j-40. For this purpose, the controller 4j-50 may include at least one processor. According to the embodiment of the present disclosure, the controller 4j-50 includes a multi-link processor 4j-52 that performs the processing to be operated in a multi-link mode.

Figure 5A:
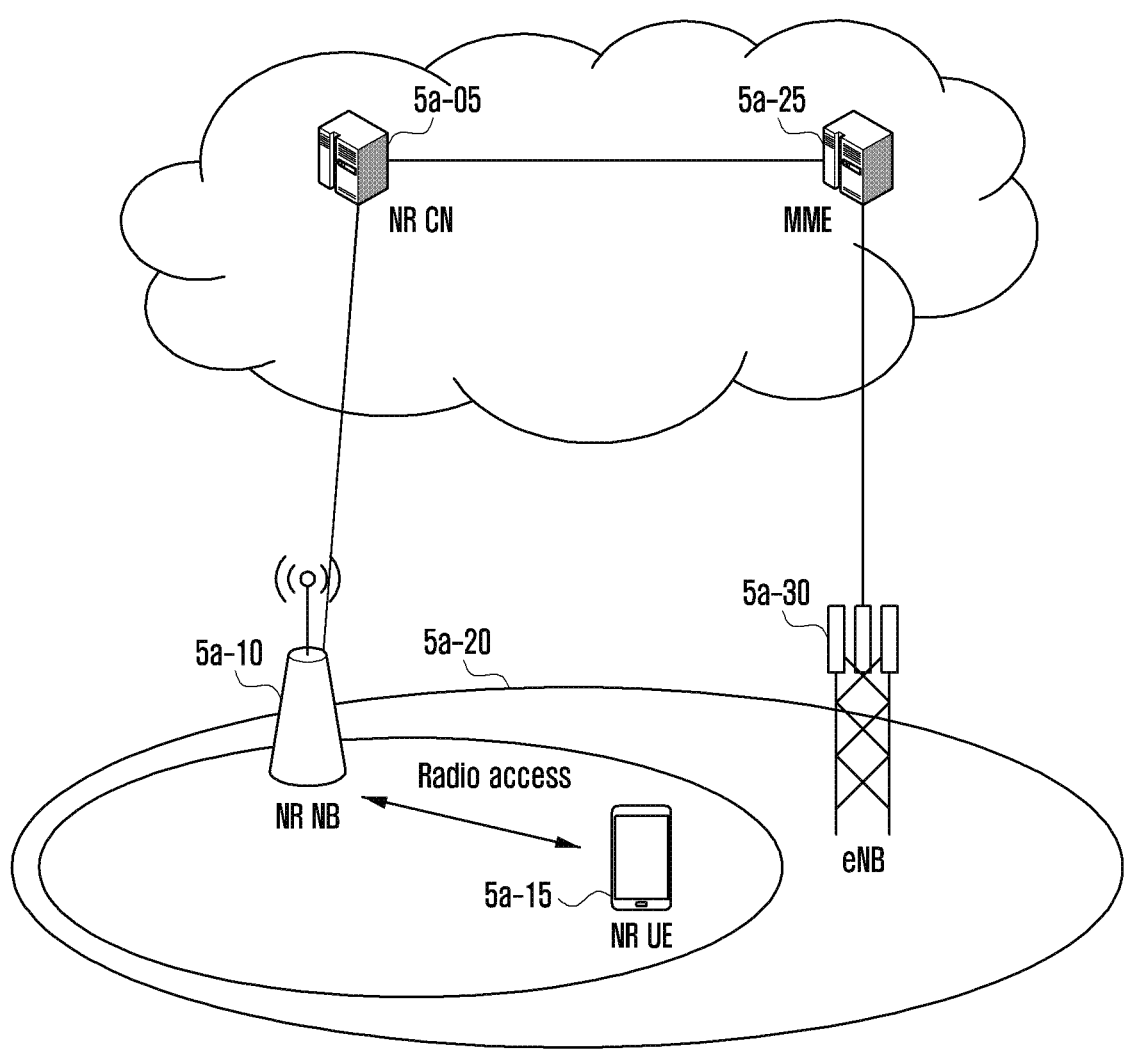
FIG. 5A is a diagram illustrating a structure of the next generation mobile communication system.

FIG. 5A is a diagram illustrating a structure of the next generation mobile communication system.

Referring to FIG. 5A, a radio access network of a next generation mobile communication system is configured to include a next generation base station (New radio node B, hereinafter NR NB or NR base station) 5a-10 and a new radio core network (NR CN) 5a-05. The user terminal (new radio user equipment, hereinafter, NR UE or UE) 5a-15 accesses the external network through the NR NB 5a-10 and the NR CN 5a-05.

In FIG. 5A, the NR NB 5a-10 corresponds to an evolved node B (eNB) of the existing LTE system. The NR NB is connected to the NR UE 5a-15 via a radio channel and may provide a service superior to the existing node B. In the next generation mobile communication system, since all user traffics are served through a shared channel, an apparatus for collecting state information such as a buffer state, an available transmission power state, and a channel state of the UEs to perform scheduling is used. The NR NB 5a-10 may serve as the device. One NR NB generally controls a plurality of cells. In order to realize the high-speed data transmission compared with the existing LTE, the NR gNB may have the existing maximum bandwidth or more, and may be additionally incorporated into a beam-forming technology by using orthogonal frequency division multiplexing (hereinafter, referred to as OFDM) as a radio access technology. Further, an adaptive modulation & coding (hereinafter, referred to as AMC) determining a modulation scheme and a channel coding rate according to a channel status of the terminal is applied. The NR CN 5a-05 may perform functions such as mobility support, bearer setup, QoS setup, and the like. The NR CN is an apparatus for performing a mobility management function for the terminal and various control functions and is connected to a plurality of base stations. In addition, the next generation mobile communication system can interwork with the existing LTE system, and the NR CN is connected to the MME 5a-25 through the network interface. The MME is connected to the eNB 5a-30 which is the existing base station.

Figure 5B:
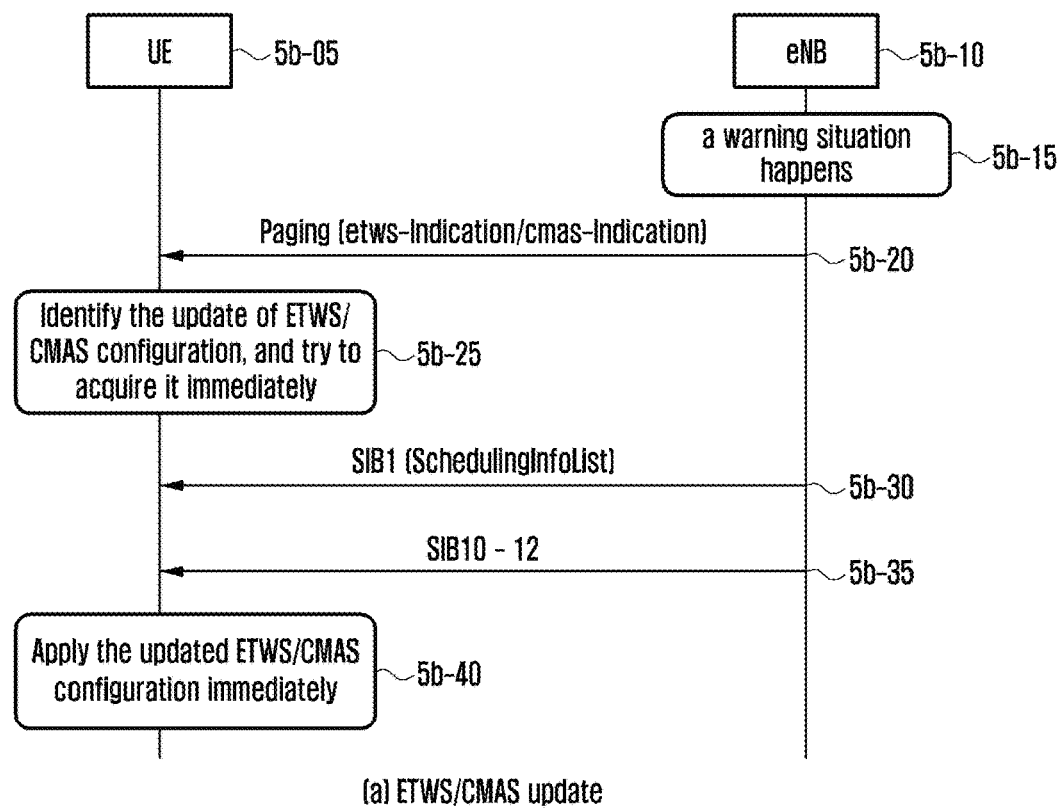
FIG. 5B is a diagram for explaining a case in which an access connection configuration information is urgently renewed in the existing LTE system.
Figure 5B:
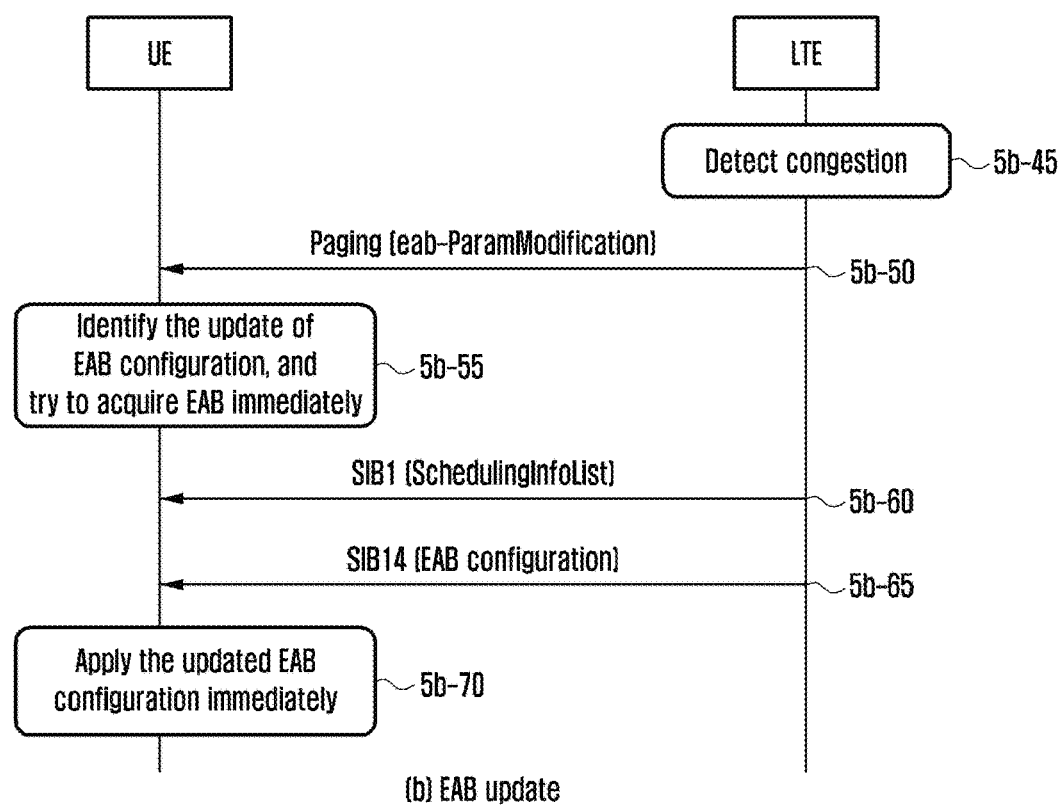

FIG. 5B is a diagram illustrating a case in which an access connection configuration information is urgently renewed in the existing LTE system.

In the LTE system, when there is system information to be updated, the system information is informed to the terminal informs using a paging message. The paging information is updated or immediately updated according to the type of system information to be updated when being received. Except for specific system information such as ETWS/CMAS and extended access barring (EAB), for most system information, the update time is determined based on the modification period. The Modification Period is the time period set by the network. The boundary of the Modification Period is the time when SFN mod m=0. Here, m is the time period of the Modification Period and is set by the network. If the network provides the updated system information in the n-th Modification Period, the network uses the paging message in the n−1-th Modification to inform the terminal that the updated system information is provided form the Modification Period. The EAB which is the access connection configuration information of the ETWS/CMAS or the mechanical communication device for the purpose of disaster alarm needs to be provided to a terminal 5b-15 as soon as possible when a disaster occurs (5b-15) or a network congestion (5b-45) occurs. The ETWS/CMAS configuration information indicates that a disaster situation has occurred and may include relevant information together. The EAB is one of the access connection configuration information, and is information necessary for determining whether the mechanical communication devices may access the network. If the configuration information is updated based on the Modification Period, a delay occurs until the next Modification Period. Therefore, when the terminal receives the paging message including the separate indicator 5b-20 from the base station 5b-10, it immediately updates the configuration information regardless of the Modification Period (5b-25, 5b-55). The ETWS/CMAS configuration information is provided to the SIB 10, the SIB 11, and the SIB 12, and it is necessary to first receive the SIB 1 including the scheduling information of the system information in order to receive it. The terminal receiving the paging message including the separate indicator immediately receives the SIB1 (5b-30), and then receives the SIB10, SIB11, and SIB12 (5b-35). The EAB configuration information is included in the SIB 14, and the terminal receiving the paging message including the separate indicator 5b-50 immediately receives the SIB1 (5b-60) and then receives the SIB14 (5b-65). The terminal that has obtained the configuration information immediately applies it (5b-40, 5b-70).

Figure 5C:
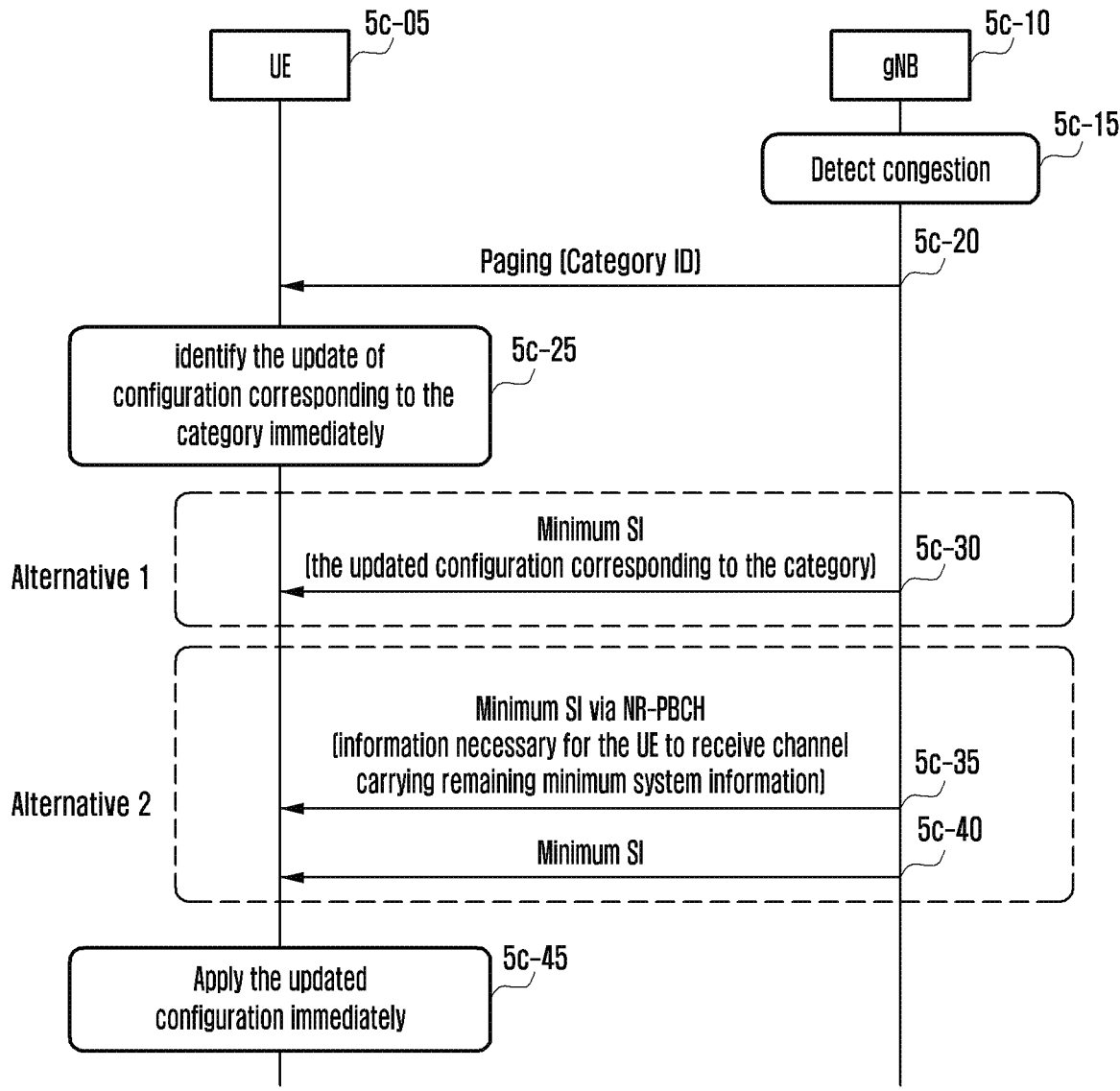
FIG. 5C is a diagram for explaining a method for renewing access connection configuration information in the next generation mobile communication system according to the present disclosure.

FIG. 5C is a diagram illustrating a method for renewing access connection configuration information in the next generation mobile communication system according to the present disclosure.

In the next generation mobile communication system, the access connection configuration information will be provided based on the category. One category is mapped to the following various elements.

Application triggering the access
Services (e.g. MMTEL voice, MMTEL video, SMS)
Call types (e.g. emergency access, high priority access, MT access)
Device/subscription indicators (e.g. low priority UEs)
Signaling procedure(s) (e.g. NAS procedures, RRC procedures)
Slice For example, an emergency call may be mapped to category 0, highPriorityAccess call may be mapped to Category 1, EAB call may be mapped to Category 5, and Application 1 call may be mapped to Category 12.

The network provides the access connection configuration information corresponding to each category as the system information. After identifying which category the access triggered by the terminal corresponds to, the terminal uses the corresponding access connection configuration information to determine whether or not the access is permitted. The access connection configuration information for each category may be included in another SIB according to the same SIB or category. The present disclosure is characterized in that the access connection configuration information to be immediately updated and applied is indicated on a category basis. When the network 5c-10 recognizes the network congestion state (5c-15), it updates the access connection configuration information corresponding to the category in order to suppress the access belonging to the specific category and then provides the updated access connection setting information to the terminals within the service region as the system information. In addition, it indicates to the terminals in the service area by the paging message 5c-20 whether the access connection configuration information belonging to which category should be immediately updated and applied. The terminal receiving the paging message immediately receives the access configuration information corresponding to the indicated category (5c-25). The access configuration information will be included in the Minimum SI (system information). The Minimum SI includes essential system information. It includes information corresponding to MIB, SIB1, and SIB2 in the LTE system. The Minimum SI is periodically broadcast. All contents of the Minimum SI may be provided to the NR-PBCH channel (5c-30), some of the contents may be provided to the NR-PBCH (5c-35), and the remaining contents may be provided to the terminal using another channel. When only some of the contents are transmitted to the NR-PBCH, the NR-PBCH includes scheduling information necessary for receiving the content of the remaining Minimum SI. The access connection configuration information may be included in the Minimum SI transmitted to the NR-PBCH or another channel. The access connection configuration information for the ETWS/CAMS, or mechanical communication device may be included in the NR-PBCH. This is because the time required for the terminal to update and apply it can be somewhat reduced. The terminal receiving the access connection configuration information corresponding to the category indicated by the paging message immediately applies the configuration information (5c-45). The access connection configuration information corresponding to the category may be included in the same SIB. Accordingly, the terminal may immediately receive the SIB and acquire the access connection configuration information corresponding to the category that is not immediately updated. However, the access connection configuration information that is actually applied immediately is the access connection configuration information corresponding to the category indicated in the paging message.

In another embodiment, the SIB information to be updated immediately may be included. For example, the network can perform the indication using the paging message to immediately update SIB4, SIB10, and SIB14. The paging message includes an indicator indicating SIB4, SIB10, and SIB14. Upon receiving the indicator, the terminal immediately starts the SIB reception operation. In addition, although not indicated in the paging message, the terminal needs to receive an SIB including scheduling information of other SIBs.

Figure 5D:
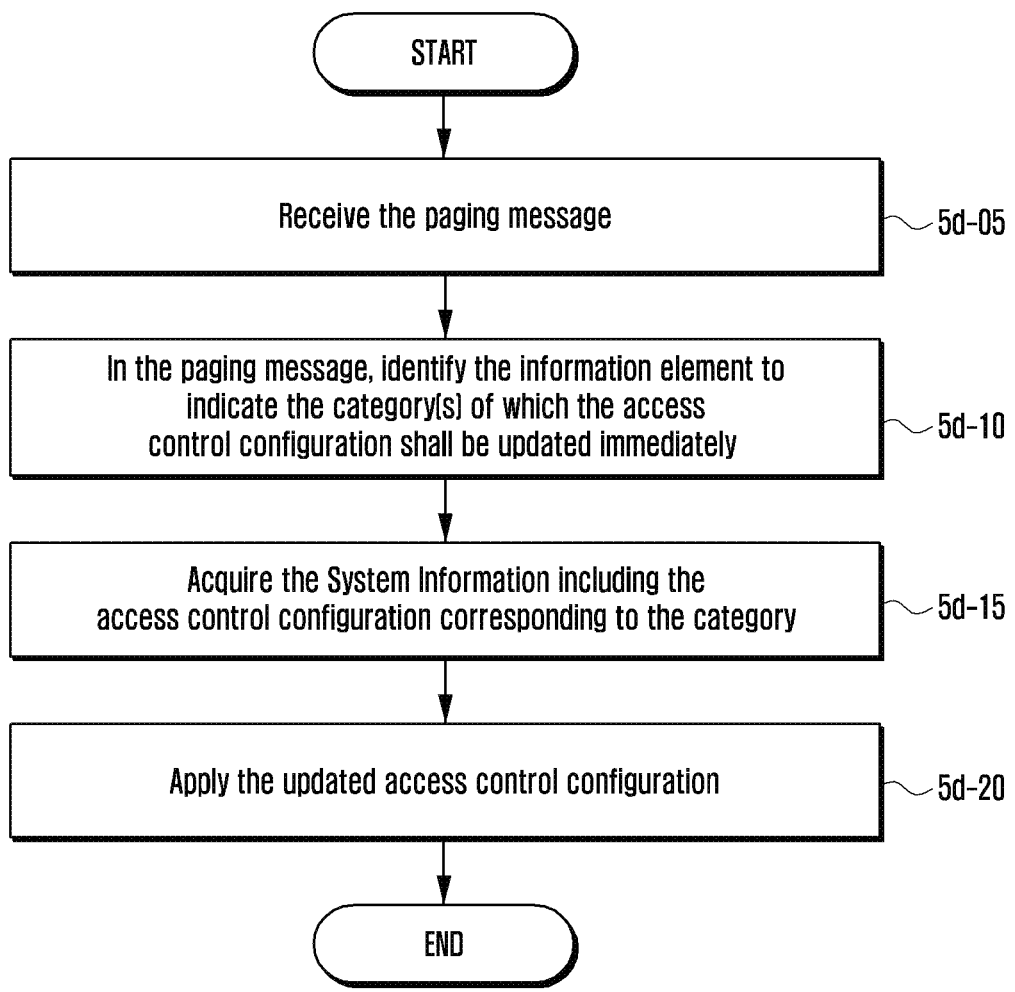
FIG. 5D is a flowchart of the terminal operation in the present disclosure.

FIG. 5D illustrates a flowchart of the terminal operation in the present disclosure.

In step 5d-05, the terminal receives the paging message from the network. In step 5d-10, the terminal confirms that the received paging message has an indicator indicating that there is an access connection setting information to be immediately updated. The indicator is category information corresponding to the access connection setting information. For example, the information is a category ID. Alternatively, the SIB information to be immediately updated may be included in the paging message. The category information or the SIB information may be provided in a bitmap form. In step 5d-15, the terminal receives the SIB including access connection configuration information corresponding to the category. In step 5d-20, the terminal applies the updated access connection configuration information.

Figure 5E:
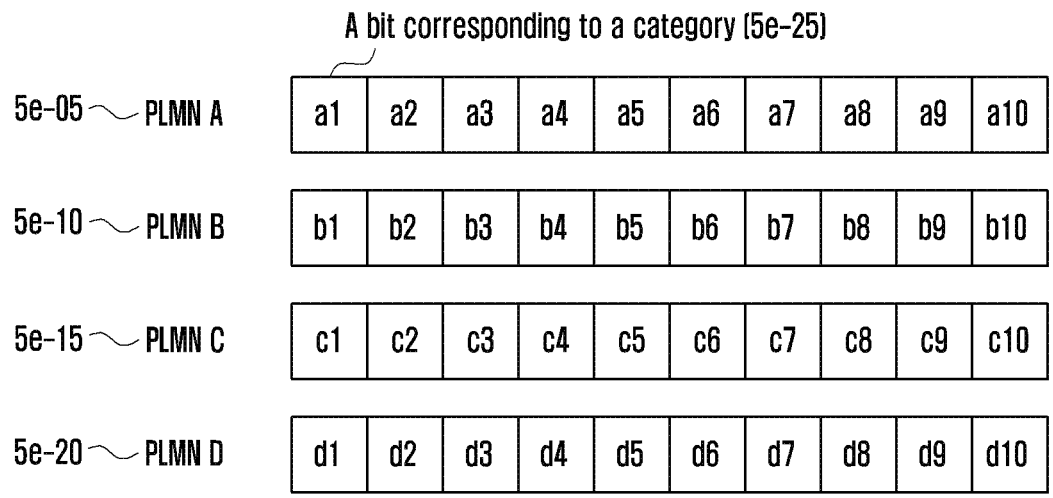
FIG. 5E is a diagram for explaining a first method for renewing access connection configuration information to be urgently renewed in the present disclosure.

FIG. 5E is a diagram illustrating a first method for renewing access connection configuration information to be urgently renewed in the present disclosure.

The category information stored in the paging message may be indicated in bitmap form. The size of the bitmap corresponds to the total number of categories provided by the network. Each bit stored in the bitmap corresponds to one category (5e-25), and the order is the same as the category ID order or the category list order. There is one bitmap for each PLMN 5e-05, 5e-10, 5e-15, and 5e-20. This is because different categories and the corresponding access connection configuration information may be provided to each PLMN. Thus, the sizes of the bitmaps for each PLMN may be different.

Figure 5F:
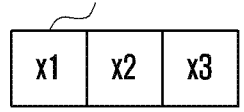
FIG. 5F is a diagram for explaining a second method for renewing access connection configuration information to be urgently renewed in the present disclosure.
Figure 5F:
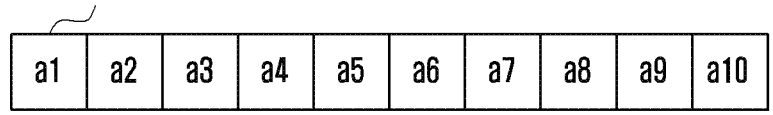

FIG. 5F is a diagram illustrating a second method for renewing access connection configuration information to be urgently renewed in the present disclosure.

The system information related to the disaster alarm may be indicated in bitmap form included in the paging message (5f-05). Each bit corresponds to one disaster alarm.

The system information to be updated and applied immediately may be indicated for each SIB. The SIB information stored in the paging message may be indicated in bitmap form. The size of the bitmap corresponds to the total number of SIBs provided by the network. Each bit stored in the bitmap corresponds to one SIB (5f-10), and the order thereof is the same as that of the SIB in the network.

Figure 5G:
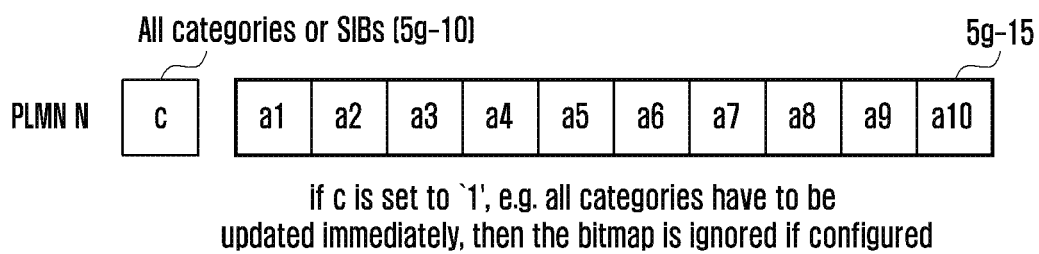
FIG. 5G is a diagram for explaining a third method for renewing access connection configuration information to be urgently renewed in the present disclosure.

FIG. 5G is a diagram illustrating a third method for renewing access connection configuration information to be urgently renewed in the present disclosure.

It is possible to immediately update and apply the access connection configuration information corresponding to all categories. Since the bitmap form requires a large number of bits, if a 1-bit indicator indicating a specific case is defined as described above, unnecessary signaling overhead may be reduced. The 1-bit indicator or the 1-bit indicator (5g-10) for each PLMN is used to indicate that the access connection configuration information corresponding to all categories or the access connection configuration information corresponding to all categories belonging to one PLMN is immediately updated and applied. The indicator is stored in the paging message, and when the indicator is set, the bitmap information is ignored even if the bitmap information (5g-15) is included in the paging message.

FIG. 5H is a diagram illustrating a fourth method for renewing access connection configuration information to be urgently renewed in the present disclosure.

Only the terminals belonging to a specific group can apply the access connection configuration information. To this end, the indicator indicating the specific group is included in the paging message. The indicator may be the bitmap form, or an ENUMERATED form. For example, they may be classified into three groups as follows.

Group A
corresponds to all UEs
Group B
corresponds to the UEs that are neither in their HPLMN nor in a PLMN that is equivalent to it
Group C
corresponds to the UEs that are neither in the PLMN listed as most preferred PLMN of the country where the UEs are roaming in the operator-defined PLMN selector list on the USIM, nor in their HPLMN nor in a PLMN that is equivalent to their HPLMN The groups may be provided for each category or common to all categories. If the information is not provided, the terminal is considered the group A. For example, category 1 is set as the access connection setting information to be immediately updated in the paging message. If the group B is indicated with respect to the category, the terminal identifies whether it belongs to the group B, and if the terminal belongs to the group B, The access connection configuration information corresponding the category 1 is immediately updated and applied.

Figure 5I:
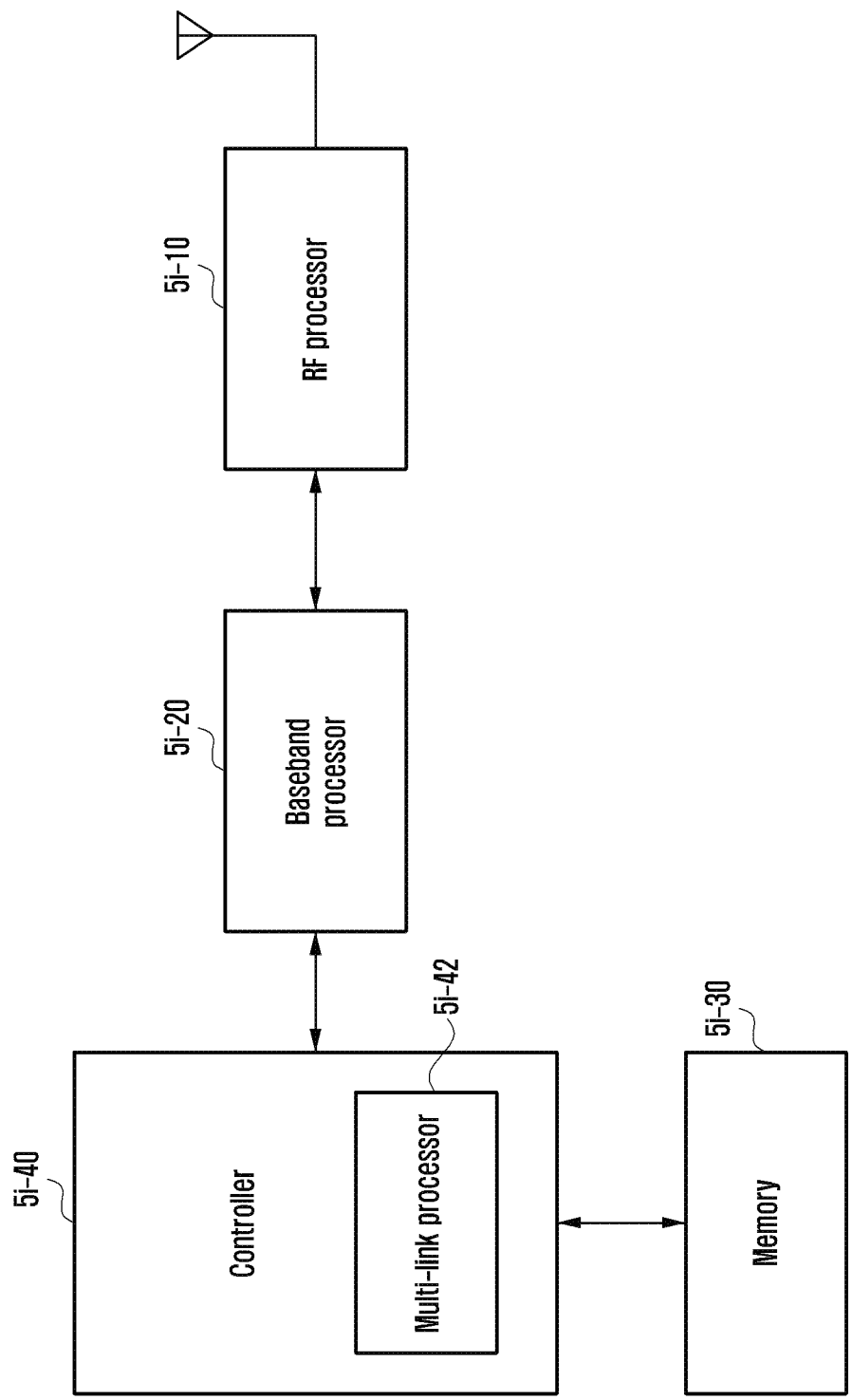
FIG. 5I is a block diagram illustrating an internal structure of the terminal to which the present disclosure is applied.

The structure of the terminal is illustrated in FIG. 5I.

Referring to FIG. 5I, the terminal includes a radio frequency (RF) processor 5i-10, a baseband processor 5i-20, a memory 5i-30, and a controller 5i-40.

The RF processor 5i-10 serves to transmit and receive a signal through a radio channel, such as band conversion and amplification of a signal. That is, the RF processor 5i-10 up-converts a baseband signal provided from the baseband processor 5i-20 into an RF band signal and then transmits the RF band signal through an antenna and down-converts the RF band signal received through the antenna into the baseband signal. For example, the RF processor 5i-10 may include a transmitting filter, a receiving filter, an amplifier, a mixer, an oscillator, a digital to analog converter (DAC), an analog to digital converter (ADC), or the like. In the above figure, only one antenna is illustrated, but the terminal may include a plurality of antennas. Further, the RF processor 5i-10 may include a plurality of RF chains. Further, the RF processor 5i-10 may perform beamforming. For the beamforming, the RF processor 5i-10 may adjust a phase and a size of each of the signals transmitted and received through a plurality of antennas or antenna elements. In addition, the RF processor may perform MIMO and may receive a plurality of layers when performing a MIMO operation.

The baseband processor 5i-20 performs a conversion function between a baseband signal and a bit string according to a physical layer standard of a system. For example, when data are transmitted, the baseband processor 5i-20 generates complex symbols by coding and modulating a transmitted bit string. Further, when data are received, the baseband processor 5i-20 recovers the received bit string by demodulating and decoding the baseband signal provided from the RF processor 5i-10. For example, according to the orthogonal frequency division multiplexing (OFDM) scheme, when data are transmitted, the baseband processor 5i-20 generates the complex symbols by coding and modulating the transmitting bit string, maps the complex symbols to sub-carriers, and then performs an inverse fast Fourier transform (IFFT) operation and a cyclic prefix (CP) insertion to construct the OFDM symbols. Further, when data are received, the baseband processor 5i-20 divides the baseband signal provided from the RF processor 5i-10 in an OFDM symbol unit and recovers the signals mapped to the sub-carriers by a fast Fourier transform (FFT) operation and then recovers the received bit string by the modulation and decoding.

The baseband processor 5i-20 and the RF processor 5i-10 transmit and receive a signal as described above. Therefore, the baseband processor 5i-20 and the RF processor 5i-10 may be called a transmitter, a receiver, a transceiver, or a communication unit. Further, at least one of the baseband processor 5i-20 and the RF processor 5i-10 may include a plurality of communication modules to support a plurality of different radio access technologies. Further, at least one of the baseband processor 5i-20 and the RF processor 5i-10 may include different communication modules to process signals in different frequency bands. For example, different radio access technologies may include the WLAN (for example: IEEE 802.11), a cellular network (for example: LTE), or the like. Further, the different frequency bands may include a super high frequency (SHF) (for example: 2 NRHz, NRhz) band, a millimeter wave (for example: 60 GHz) band.

The memory 5i-30 stores data such as basic programs, application programs, and configuration information for the operation of the terminal. In particular, the memory 5i-30 may store information associated with a second access node performing wireless communication using a second access technology. Further, the memory 5i-30 provides the stored data according to the request of the controller 5i-40.

The controller 5i-40 controls the overall operations of the terminal. For example, the controller 5i-40 transmits and receives a signal through the baseband processor 5i-20 and the RF processor 5i-10. Further, the controller 5i-50 records and reads data in and from the memory 5i-30. For this purpose, the controller 5i-40 may include at least one processor. For example, the controller 5i-40 may include a communication processor (CP) performing a control for communication and an application processor (AP) controlling an upper layer such as the application programs. According to the embodiment of the present disclosure, the controller 5i-40 includes a multi-link processor 5i-42 that performs the processing to be operated in a multi-link mode.

Figure 5J:
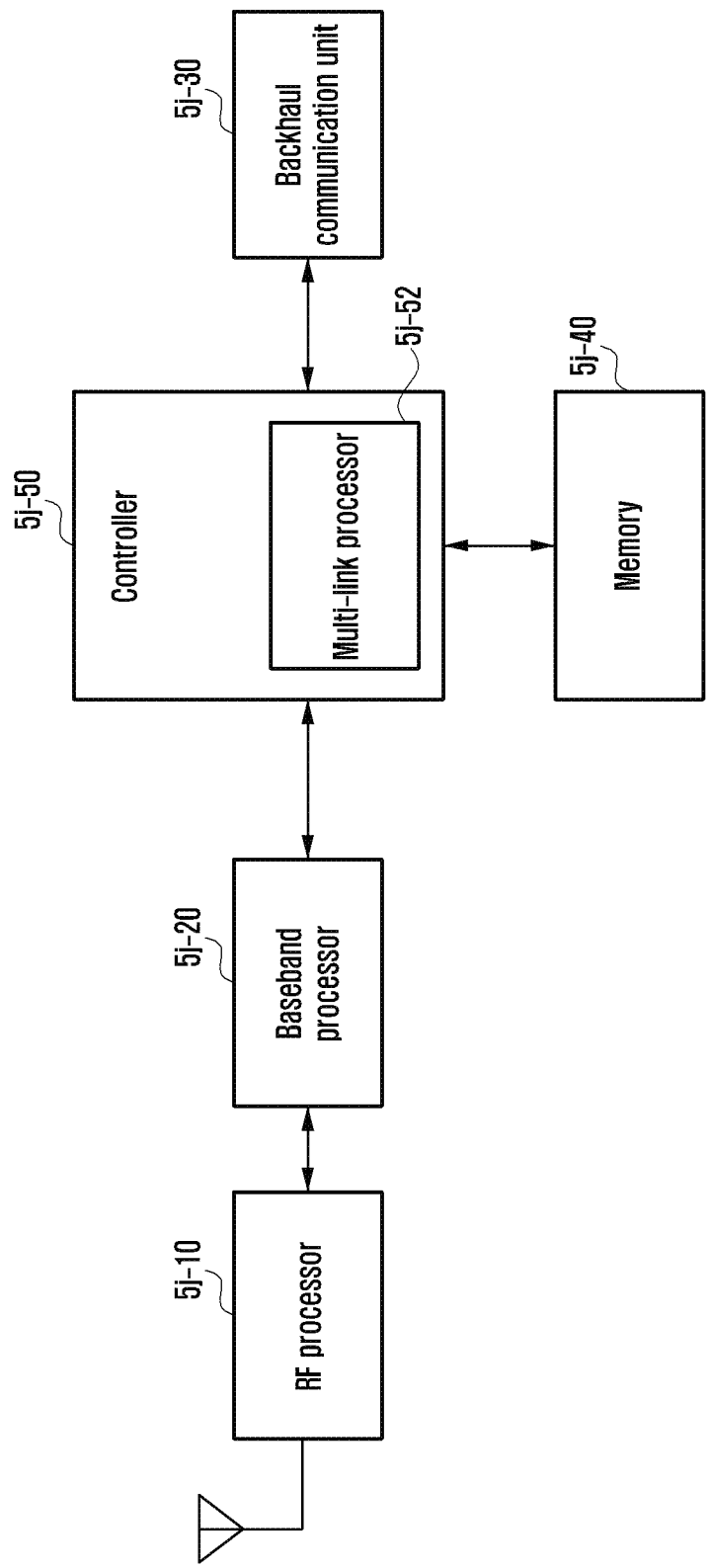
FIG. 5J is a block diagram illustrating a configuration of the base station according to the present disclosure.

FIG. 5J illustrates a block configuration diagram of a main base station in a wireless communication system according to an embodiment of the present disclosure.

As illustrated in FIG. 5J, the base station is configured to include an RF processor 5j-10, a baseband processor 5j-20, a backhaul communication unit 5j-30, a memory 5j-40, and a controller 5j-50.

The RF processor 5j-10 serves to transmit and receive a signal through a radio channel, such as band conversion and amplification of a signal. That is, the RF processor 5j-10 up-converts a baseband signal provided from the baseband processor 5j-20 into an RF band signal and then transmits the RF band signal through an antenna and down-converts the RF band signal received through the antenna into the baseband signal. For example, the RF processor 5j-10 may include a transmitting filter, a receiving filter, an amplifier, a mixer, an oscillator, a DAC, an ADC, or the like. In the above figure, only one antenna is illustrated, but the first access node may include a plurality of antennas. Further, the RF processor 5j-10 may include a plurality of RF chains. Further, the RF processor 5j-10 may perform the beamforming. For the beamforming, the RF processor 5j-10 may adjust a phase and a size of each of the signals transmitted/received through a plurality of antennas or antenna elements. The RF processor may perform a downward MIMO operation by transmitting one or more layers.

The baseband processor 5j-20 performs a conversion function between the baseband signal and the bit string according to the physical layer standard of the first radio access technology. For example, when data are transmitted, the baseband processor 5j-20 generates complex symbols by coding and modulating a transmitted bit string. Further, when data are received, the baseband processor 5j-20 recovers the received bit string by demodulating and decoding the baseband signal provided from the RF processor 5j-10. For example, according to the OFDM scheme, when data are transmitted, the baseband processor 5j-20 generates the complex symbols by coding and modulating the transmitting bit string, maps the complex symbols to the sub-carriers, and then performs the IFFT operation and the CP insertion to construct the OFDM symbols. Further, when data are received, the baseband processor 5j-20 divides the baseband signal provided from the RF processor 5j-10 in the OFDM symbol unit and recovers the signals mapped to the sub-carriers by the FFT operation and then recovers the receiving bit string by the modulation and decoding. The baseband processor 5j-20 and the RF processor 5j-10 transmit and receive a signal as described above. Therefore, the baseband processor 5j-20 and the RF processor 5j-10 may be called a transmitter, a receiver, a transceiver, or a communication unit.

The backhaul communication unit 5j-30 provides an interface for performing communication with other nodes within the network. That is, the backhaul communication unit 5j-30 converts bit strings transmitted from the main base station to other nodes, for example, an auxiliary base station, a core network, etc., into physical signals and converts the physical signals received from other nodes into the bit strings.

The memory 5j-40 stores data such as basic programs, application programs, and configuration information for the operation of the main base station. In particular, the memory 5j-40 may store the information on the bearer allocated to the accessed terminal, the measured results reported from the accessed terminal, etc. Further, the memory 5j-40 may store information that is a determination criterion on whether to provide a multiple connection to the terminal or stop the multiple connection to the terminal. Further, the memory 5j-40 provides the stored data according to the request of the controller 5j-50.

The controller 5j-50 controls the general operations of the main base station. For example, the controller 5j-50 transmits/receives a signal through the baseband processor 5j-20 and the RF processor 5j-10 or the backhaul communication unit 5j-30. Further, the controller 5j-50 records and reads data in and from the memory 5j-40. For this purpose, the controller 5j-50 may include at least one processor. According to the embodiment of the present disclosure, the controller 5j-50 includes a multi-link processor 5j-52 that performs the processing to be operated in a multi-link mode.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of transmitting a radio link control (RLC) status report by a receiving apparatus in a wireless communication system, the method comprising:
   receiving an RLC protocol data unit (PDU) from a transmitting apparatus;
   generating a status PDU based on the RLC PDU; and
   transmitting the status PDU to the transmitting apparatus,
   wherein the status PDU includes a first field indicating whether a second field and a third field follow, the second field indicating a sequence number (SN) of a RLC data unit identified as lost, the third field indicating whether a fourth field follows for the second field, and the fourth field including a number of consecutively lost RLC data units starting from and including the SN,
   wherein a first reserved field is placed immediately after the first field and an octet including the first field is byte aligned based on the first reserved field, and
   wherein a second reserved field is placed immediately after the third field and an octet including the third field is byte aligned based on the second reserved field.

2. The method of claim 1, wherein the first field includes an extension bit 1 (E1) field, the second field includes a negative acknowledgement sequence number (NACK_SN) field, the third field includes an extension bit 3 (E3) field, and the fourth field includes a NACK_range field.

3. The method of claim 2, wherein, in case that the E3 field indicates that the NACK_range field follows the NACK_SN field, the status PDU further includes:
   a segment offset (SO) start field indicating a position of a first byte of a portion of the RLC data unit with the SN indicated by the NACK_SN field within an original RLC data unit; and
   an SO end field indicating a position of a last byte of a portion of a RLC data unit with a SN associated with the NACK_range field within an original RLC data unit.

4. The method of claim 3, wherein the SN associated with the NACK_range field and indicated by the SO end field is determined by the following equation, the SN associated with the SO end field=the SN indicated by the NACK_SN field+the number of consecutively lost RLC data units indicated by the NACK_range field−1.

5. The method of claim 4, wherein the status PDU further includes an extension bit 2 (E2) field, and
   wherein the E2 field indicates whether the SO start field and the SO end field follow for the NACK_SN field.

6. A method of receiving a radio link control (RLC) status report by a transmitting apparatus in a wireless communication system, the method comprising:
   transmitting an RLC protocol data unit (PDU) to a receiving apparatus;
   receiving a status PDU generated based on the RLC PDU from the receiving apparatus; and
   identifying, from the status PDU, a first field indicating whether a second field and a third field follow, the second field indicating a sequence number (SN) of a RLC data unit identified as lost, the third field indicating whether a fourth field follows for the second field, and the fourth field including a number of consecutively lost RLC data units starting from and including the SN, wherein a first reserved field is placed immediately after the first field and an octet including the first field is byte aligned based on the first reserved field, and wherein a second reserved field is placed immediately after the third field and an octet including the third field is byte aligned based on the second reserved field.

7. The method of claim 6, wherein the first field includes an extension bit 1 (E1) field, the second field includes a negative acknowledgement sequence number (NACK_SN) field, the third field includes an extension bit 3 (E3) field, and the fourth field includes a NACK_range field.

8. The method of claim 7, wherein, in case that the E3 field indicates that NACK_range field follows the NACK_SN field, the status PDU further includes:

a segment offset (SO) start field indicating a position of a first byte of a portion of the RLC data unit with the SN indicated by the NACK_SN field within an original RLC data unit; and an SO end field indicating a position of a last byte of a portion of a RLC data unit with a SN associated with the NACK_range field within an original RLC data unit.

9. The method of claim 8, wherein the SN associated with the NACK_range field and indicated by the SO end field is determined by the following equation, the SN associated with the SO end field=the SN indicated by the NACK_SN field+the number of consecutively lost RLC data units indicated by the NACK_range field−1.

10. The method of claim 9, wherein the status PDU further includes an extension bit 2 (E2) field, and wherein the E2 field indicates whether the SO start field and the SO end field follow for the NACK_SN field.

11. A receiving apparatus of transmitting a radio link control (RLC) status report in a wireless communication system, the receiving apparatus comprising:

a transceiver; and
a controller configured to:
receive an RLC protocol data unit (PDU) from a transmitting apparatus via the transceiver,
generate a status PDU based on the RLC PDU, and
transmit the status PDU to the transmitting apparatus via the transceiver, wherein the status PDU includes a first field indicating whether a second field and a third field follow, the second field indicating a sequence number (SN) of a RLC data unit identified as lost, the third field indicating whether a fourth field follows for the second field, and the fourth field including a number of consecutively lost RLC data units starting from and including the SN, wherein a first reserved field is placed immediately after the first field and an octet including the first field is byte aligned based on the first reserved field, and wherein a second reserved field is placed immediately after the third field and an octet including the third field is byte aligned based on the second reserved field.

12. The receiving apparatus of claim 11, wherein the first field includes an extension bit 1 (E1) field, the second field includes a negative acknowledgement sequence number (NACK_SN) field, the third field includes an extension bit 3 (E3) field, and the fourth field includes a NACK_range field.

13. The receiving apparatus of claim 12, wherein, in case that the E3 field indicates that the NACK_range field follows the NACK_SN field, the status PDU further includes:

a segment offset (SO) start field indicating a position of a first byte of a portion of the RLC data unit with the SN indicated by the NACK_SN field within an original RLC data unit; and an SO end field indicating a position of a last byte of a portion of a RLC data unit with a SN associated with the NACK_range field within an original RLC data unit.

14. The receiving apparatus of claim 13, wherein the SN associated with the NACK_range field and indicated by the SO end field is determined by the following equation, the SN associated with the SO end field=the SN indicated by the NACK_SN field+the number of consecutively lost RLC data units indicated by the NACK_range field−1.

15. The receiving apparatus of claim 14, wherein the status PDU further includes an extension bit 2 (E2) field, and wherein the E2 field indicates whether the SO start field and the SO end field follow for the NACK_SN field.

16. A transmitting apparatus of receiving a radio link control (RLC) status report in a wireless communication system, the transmitting apparatus comprising:

a transceiver; and
a controller configured to:
transmit an RLC protocol data unit (PDU) to a receiving apparatus via the transceiver,
receive a status PDU generated based on the RLC PDU from the receiving apparatus via the transceiver, and
identify, from the status PDU, a first field indicating whether a second field and a third field follow, the second field indicating a sequence number (SN) of a RLC data unit identified as lost, the third field indicating whether a fourth field follows for the second field, and the fourth field including a number of consecutively lost RLC data units starting from and including the SN, wherein a first reserved field is placed immediately after the first field and an octet including the first field is byte aligned based on the first reserved field, and wherein a second reserved field is placed immediately after the third field and an octet including the third field is byte aligned based on the second reserved field.

17. The transmitting apparatus of claim 16, wherein the first field includes an extension bit 1 (E1) field, the second field includes a negative acknowledgement sequence number (NACK_SN) field, the third field includes an extension bit 3 (E3) field, and the fourth field includes a NACK_range field.

18. The transmitting apparatus of claim 17, wherein, in case that the E3 field indicates that NACK_range field follows the NACK_SN field, the status PDU further includes:

a segment offset (SO) start field indicating a position of a first byte of a portion of the RLC data unit with the SN indicated by the NACK_SN field within an original RLC data unit; and an SO end field indicating a position of a last byte of a portion of a RLC data unit with a SN associated with the NACK_range field within an original RLC data unit.

19. The transmitting apparatus of claim 18, wherein the SN associated with the NACK_range field and indicated by the SO end field is determined by the following equation, the SN associated with the SO end field=the SN indicated by the NACK_SN field+the number of consecutively lost RLC data units indicated by the NACK_range field−1.

20. The transmitting apparatus of claim 19, wherein the status PDU further includes an extension bit 2 (E2) field, and wherein the E2 field indicates whether the SO start field and the SO end field follow for the NACK_SN field.

* * * * *